United States Patent
Petersen et al.

(10) Patent No.: US 9,641,393 B2
(45) Date of Patent: *May 2, 2017

(54) FORMING CROWDS AND PROVIDING ACCESS TO CROWD DATA IN A MOBILE ENVIRONMENT

(71) Applicant: WALDECK TECHNOLOGY, LLC, Wilmington, DE (US)

(72) Inventors: Steven L. Petersen, Los Gatos, CA (US); Scott Curtis, Durham, NC (US); Kenneth Jennings, Raleigh, NC (US)

(73) Assignee: WALDECK TECHNOLOGY, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,563

(22) Filed: Aug. 3, 2015

(65) Prior Publication Data
US 2016/0036639 A1 Feb. 4, 2016

Related U.S. Application Data

(63) Continuation of application No. 12/645,532, filed on Dec. 23, 2009, now Pat. No. 9,098,723.
(Continued)

(51) Int. Cl.
*G06F 17/00* (2006.01)
*G06F 17/30* (2006.01)
(Continued)

(52) U.S. Cl.
CPC ...... *H04L 41/0893* (2013.01); *G06F 21/6227* (2013.01); *G06Q 10/10* (2013.01);
(Continued)

(58) Field of Classification Search
CPC ......... G06F 17/30864; G06F 17/30867; G06F 17/30011; G06Q 10/10; G06Q 30/02
(Continued)

(56) References Cited

U.S. PATENT DOCUMENTS 5,539,232 A 7/1996 Nakanishi et al.
6,199,014 B1 3/2001 Walker et al.
(Continued)

FOREIGN PATENT DOCUMENTS

EP 1463354 12/2005
WO WO 2008/000046 1/2008

OTHER PUBLICATIONS

Borah, B., et al., "A Clustering Technique Using Density Difference," IEEE—ICSCN 2007, MIT Campus, Anna University, Chennai, India, Feb. 22-24, 2007, pp. 585-588.
(Continued)

*Primary Examiner* — Robert Beausoliel, Jr.
*Assistant Examiner* — Michael Pham

(57) ABSTRACT

A system and method are provided for forming crowds of users and providing access to corresponding crowd data. In one embodiment, a central system, which includes one or more servers, operates to obtain current locations for users of mobile devices. The system forms a crowd including a number of users based on the current locations of the number of users using a spatial crowd formation process based on an optimal inclusion distance that is a function of density of users of the plurality of users within a bounding region. The central system then generates crowd data for the crowd and provides access to the crowd data for the crowd. In one embodiment, the crowd data for the crowd includes an aggregate profile for the crowd. In another embodiment, the crowd data includes data characterizing the crowd. The central system provides access to the crowd data by serving crowd data requests.

21 Claims, 88 Drawing Sheets

Related U.S. Application Data

(60) Provisional application No. 61/149,205, filed on Feb. 2, 2009, provisional application No. 61/227,192, filed on Jul. 21, 2009, provisional application No. 61/236,296, filed on Aug. 24, 2009.

(51) Int. Cl.

| | | |
|---|---|---|
| *H04L 12/24* | (2006.01) | |
| *G06Q 10/10* | (2012.01) | |
| *G06Q 30/02* | (2012.01) | |
| *H04W 4/02* | (2009.01) | |
| *H04L 29/08* | (2006.01) | |
| *G06F 21/62* | (2013.01) | |
| *H04W 64/00* | (2009.01) | |

(52) U.S. Cl.
CPC ............ *G06Q 30/02* (2013.01); *H04L 67/18* (2013.01); *H04L 67/22* (2013.01); *H04L 67/24* (2013.01); *H04L 67/306* (2013.01); *H04W 4/02* (2013.01); *H04W 4/021* (2013.01); *H04W 4/028* (2013.01); *H04W 64/00* (2013.01)

(58) Field of Classification Search
USPC .......................................................... 707/736
See application file for complete search history.

(56) References Cited

U.S. PATENT DOCUMENTS

| | | |
|---|---|---|
| 6,204,844 B1 | 3/2001 | Fumarolo et al. |
| 6,240,069 B1 | 5/2001 | Alperovich et al. |
| 6,359,896 B1 | 3/2002 | Baker et al. |
| 6,490,587 B2 | 12/2002 | Easty et al. |
| 6,529,136 B2 | 3/2003 | Cao et al. |
| 6,708,172 B1 | 3/2004 | Wong et al. |
| 6,819,919 B1 | 11/2004 | Tanaka |
| 6,820,081 B1 | 11/2004 | Kawai et al. |
| 6,961,562 B2 | 11/2005 | Ross |
| 6,968,179 B1 | 11/2005 | De Vries |
| 6,987,885 B2 | 1/2006 | Gonzalez-Banos et al. |
| 7,116,985 B2 | 10/2006 | Wilson et al. |
| 7,123,918 B1 | 10/2006 | Goodman |
| 7,124,164 B1 | 10/2006 | Chemtob |
| 7,158,798 B2 | 1/2007 | Lee et al. |
| 7,236,739 B2 | 6/2007 | Chang |
| 7,247,024 B2 | 7/2007 | Bright et al. |
| 7,272,357 B2 | 9/2007 | Nishiga et al. |
| 7,280,822 B2 | 10/2007 | Fraccaroli |
| 7,359,724 B2 | 4/2008 | Torvinen |
| 7,398,081 B2 | 7/2008 | Moran |
| 7,418,268 B1 | 8/2008 | Cabano et al. |
| 7,423,580 B2 | 9/2008 | Markhovsky et al. |
| 7,444,655 B2 | 10/2008 | Sardera |
| 7,509,131 B2 | 3/2009 | Krumm et al. |
| 7,558,404 B2 | 7/2009 | Ma et al. |
| 7,620,404 B2 | 11/2009 | Chesnais et al. |
| 7,680,959 B2 | 3/2010 | Svendsen |
| 7,692,684 B2 | 4/2010 | Ku et al. |
| 7,787,886 B2 | 8/2010 | Markhovsky et al. |
| 7,840,224 B2 | 11/2010 | Vengroff et al. |
| 8,010,601 B2 | 8/2011 | Jennings et al. |
| 8,108,414 B2 | 1/2012 | Stackpole |
| 8,208,943 B2 | 6/2012 | Petersen et al. |
| 8,224,353 B2 | 7/2012 | Wright et al. |
| 8,401,771 B2 | 3/2013 | Krumm et al. |
| 8,495,065 B2 | 7/2013 | Petersen et al. |
| 8,825,074 B2 | 9/2014 | Petersen et al. |
| 2001/0013009 A1 | 8/2001 | Greening et al. |
| 2002/0010628 A1 | 1/2002 | Burns |
| 2002/0019829 A1 | 2/2002 | Shapiro |
| 2002/0049690 A1* | 4/2002 | Takano .............. G06N 3/006 706/47 |
| 2002/0086676 A1 | 7/2002 | Hendrey et al. |
| 2002/0087335 A1 | 7/2002 | Meyers et al. |
| 2003/0005056 A1 | 1/2003 | Yamamoto et al. |
| 2003/0020623 A1 | 1/2003 | Cao et al. |
| 2003/0055614 A1 | 3/2003 | Pelikan et al. |
| 2003/0078840 A1 | 4/2003 | Strunk et al. |
| 2004/0009750 A1 | 1/2004 | Beros et al. |
| 2004/0025185 A1 | 2/2004 | Goci et al. |
| 2004/0181668 A1 | 9/2004 | Blew et al. |
| 2004/0192331 A1 | 9/2004 | Gorday et al. |
| 2005/0038876 A1 | 2/2005 | Chaudhuri |
| 2005/0070298 A1 | 3/2005 | Caspi et al. |
| 2005/0113123 A1 | 5/2005 | Torvinen |
| 2005/0130634 A1 | 6/2005 | Godfrey |
| 2005/0174975 A1 | 8/2005 | Mgrdechian et al. |
| 2005/0176406 A1 | 8/2005 | Krishnakumar et al. |
| 2005/0210387 A1 | 9/2005 | Alagappan et al. |
| 2005/0231425 A1 | 10/2005 | Coleman et al. |
| 2005/0256813 A1 | 11/2005 | Bahbouh et al. |
| 2006/0046743 A1 | 3/2006 | Mirho |
| 2006/0161599 A1 | 7/2006 | Rosen |
| 2006/0166679 A1 | 7/2006 | Karaoguz et al. |
| 2006/0195361 A1 | 8/2006 | Rosenberg |
| 2006/0229058 A1 | 10/2006 | Rosenberg |
| 2006/0256008 A1 | 11/2006 | Rosenberg |
| 2006/0256959 A1 | 11/2006 | Hymes |
| 2006/0270419 A1 | 11/2006 | Crowley et al. |
| 2007/0005419 A1 | 1/2007 | Horvitz et al. |
| 2007/0008129 A1 | 1/2007 | Soliman |
| 2007/0015518 A1 | 1/2007 | Winter et al. |
| 2007/0030824 A1 | 2/2007 | Ribaudo et al. |
| 2007/0032242 A1 | 2/2007 | Goodman |
| 2007/0075898 A1 | 4/2007 | Markhovsky et al. |
| 2007/0135138 A1 | 6/2007 | Brown et al. |
| 2007/0142065 A1 | 6/2007 | Richey et al. |
| 2007/0149214 A1 | 6/2007 | Walsh et al. |
| 2007/0150444 A1 | 6/2007 | Chesnais et al. |
| 2007/0167174 A1 | 7/2007 | Halcrow et al. |
| 2007/0174243 A1 | 7/2007 | Fritz |
| 2007/0179863 A1 | 8/2007 | Stoll |
| 2007/0203644 A1 | 8/2007 | Thota et al. |
| 2007/0210937 A1 | 9/2007 | Smith et al. |
| 2007/0218900 A1 | 9/2007 | Abhyanker |
| 2007/0237096 A1 | 10/2007 | Vengroff et al. |
| 2007/0250476 A1 | 10/2007 | Krasnik |
| 2007/0255785 A1 | 11/2007 | Hayashi et al. |
| 2007/0282621 A1 | 12/2007 | Altman et al. |
| 2007/0290832 A1 | 12/2007 | Kalinichenko et al. |
| 2008/0016018 A1 | 1/2008 | Malik |
| 2008/0016205 A1 | 1/2008 | Svendsen |
| 2008/0039121 A1 | 2/2008 | Muller et al. |
| 2008/0076418 A1 | 3/2008 | Beyer, Jr. |
| 2008/0086741 A1 | 4/2008 | Feldman et al. |
| 2008/0097999 A1 | 4/2008 | Horan |
| 2008/0106599 A1 | 5/2008 | Liu et al. |
| 2008/0113674 A1 | 5/2008 | Baig |
| 2008/0118106 A1 | 5/2008 | Kilambi et al. |
| 2008/0140650 A1 | 6/2008 | Stackpole |
| 2008/0146250 A1 | 6/2008 | Aaron |
| 2008/0155080 A1 | 6/2008 | Marlow et al. |
| 2008/0182563 A1 | 7/2008 | Wugofski et al. |
| 2008/0182591 A1 | 7/2008 | Krikorian |
| 2008/0188261 A1 | 8/2008 | Arnone |
| 2008/0222295 A1 | 9/2008 | Robinson et al. |
| 2008/0227473 A1 | 9/2008 | Haney |
| 2008/0242317 A1 | 10/2008 | Abhyanker |
| 2008/0249983 A1 | 10/2008 | Meisels et al. |
| 2008/0250312 A1 | 10/2008 | Curtis |
| 2008/0280635 A1 | 11/2008 | Lei et al. |
| 2008/0288355 A1 | 11/2008 | Rosen |
| 2008/0306826 A1 | 12/2008 | Kramer et al. |
| 2008/0318597 A1 | 12/2008 | Berns et al. |
| 2009/0005968 A1 | 1/2009 | Vengroff et al. |
| 2009/0005987 A1 | 1/2009 | Vengroff et al. |
| 2009/0023410 A1 | 1/2009 | Ghosh |
| 2009/0024315 A1 | 1/2009 | Scheibe |
| 2009/0030999 A1 | 1/2009 | Gatzke et al. |
| 2009/0047972 A1 | 2/2009 | Neeraj |
| 2009/0076894 A1 | 3/2009 | Bates et al. |
| 2009/0082038 A1 | 3/2009 | McKiou et al. |

(56) References Cited

U.S. PATENT DOCUMENTS

| | | |
|---|---|---|
| 2009/0110177 A1 | 4/2009 | Sivakumar |
| 2009/0112467 A1 | 4/2009 | Jiang et al. |
| 2009/0115570 A1 | 5/2009 | Cusack, Jr. |
| 2009/0115617 A1 | 5/2009 | Sano et al. |
| 2009/0132652 A1 | 5/2009 | Athale et al. |
| 2009/0138346 A1 | 5/2009 | Kalaboukis et al. |
| 2009/0144211 A1 | 6/2009 | O'Sullivan et al. |
| 2009/0150501 A1 | 6/2009 | Davis et al. |
| 2009/0164431 A1 | 6/2009 | Zivkovic et al. |
| 2009/0164459 A1 | 6/2009 | Jennings et al. |
| 2009/0201896 A1 | 8/2009 | Davis et al. |
| 2009/0210480 A1 | 8/2009 | Sivasubramaniam et al. |
| 2009/0222388 A1 | 9/2009 | Hua et al. |
| 2009/0286550 A1 | 11/2009 | Weinroth |
| 2009/0287783 A1 | 11/2009 | Beare et al. |
| 2009/0307263 A1 | 12/2009 | Skibiski et al. |
| 2009/0319178 A1 | 12/2009 | Khosravy et al. |
| 2010/0004857 A1 | 1/2010 | Pereira et al. |
| 2010/0017261 A1 | 1/2010 | Evans et al. |
| 2010/0020776 A1 | 1/2010 | Youssef et al. |
| 2010/0042364 A1 | 2/2010 | Nakamura et al. |
| 2010/0082301 A1 | 4/2010 | Skibiski et al. |
| 2010/0130226 A1 | 5/2010 | Arrasvuori et al. |
| 2010/0153213 A1 | 6/2010 | Pomplun et al. |
| 2010/0197318 A1 | 8/2010 | Petersen et al. |
| 2010/0197319 A1 | 8/2010 | Petersen et al. |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2011/0043475 A1 | 2/2011 | Rigazio et al. |
| 2011/0136506 A1 | 6/2011 | Stewart |
| 2012/0041983 A1 | 2/2012 | Jennings |
| 2012/0072495 A1 | 3/2012 | Jennings et al. |
| 2013/0035114 A1 | 2/2013 | Holden et al. |

OTHER PUBLICATIONS

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.

Oh, Sejin et al., "CAMAR: Context-aware Mobile Augmented Reality in Smart Space," In Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Wu et al., "Crowd Flow Segmentation Using a Novel Region Growing Scheme," In Proceedings PCM 2009, 10th Pacific Rim Conference on Multimedia, Bangkok, Thailand, Dec. 15-18, 2009, pp. 898-907, 10 pages.

Benford, S. et al., "Crowded Collaborative Virtual Environments," Proceedings of the SIGCHI Conference on Human Factors in Computing Systems, Atlanta, Georgia, Mar. 22-27, 1997, 7 pages.

Anciaux, N. et al., "Data Degradation: Making Private Data Less Sensitive Over Time," CIKM 2008, Oct. 26-30, 2008, Napa Valley, California, 2 pages.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Fire Eagle," at <http://fireeagle.yahoo.net>, copyright 2007-2011, Yahoo! Inc., printed Apr. 28, 2011, 2 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

Arrington, M., "I Saw the Future of Social Networking the Other Day," TechCrunch, Apr. 9, 2008, at <http://www.techcrunch.com/2008/04/09/i-saw-the-future-of-social-networking-the-other-day/>, printed May 27, 2009, 28 pages.

Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

"About Loopt," at <http://about.loopt.com/>, printed May 3, 2011, 4 pages.

"Loopt—About Us," at <https://loopt.com/loopt/aboutUs.aspx>, from the Internet Archive, dated Jun. 29, 2007, copyright 2007, Loopt, Inc., 1 page.

"MobiClique," publication date unknown (copyright 2007-2009), Thomson, originally found at <http://www.thlab.net/~apietila/mobiclique/>, printed Oct. 23, 2009, 5 pages.

Abstract, Ratti, C. et al., "Mobile Landscapes: using location data from cell phones for urban analysis," Environment and Planning B: Planning and Design, vol. 33, No. 5, 2006, pp. 727-748, 1 page.

Ye, Y., et al., "Neighborhood Density Method for Selecting Initial Cluster Centers in K-Means Clustering," PAKDD 2006, pp. 189-198.

Hardt, D. et al., "OpenID Attribute Exchange 1.0—Final," at <http://openid.net/specs/openid-attribute-exchange-1_0.html>, Dec. 5, 2007, 11 pages.

"OpenID Foundation website," at <http://openid.net>, copyright 2006-2011, OpenID Foundation, printed Apr. 28, 2011, 2 pages.

Quinn, M. et al., "Parallel Implementation of the Social Forces Model," Proceedings of the Second International Conference in Pedestrian and Evacuation Dynamics, Greenwich, England, 2003, pp. 63-74, found at <http://web.engr.oregonstate.edu/~metoyer/docs/parallelPeds.pdf>, 12 pages.

"Plazes—Right Plaze, Right Time," at <http://plazes.com>, copyright 2004-2011, Plazes AG, printed May 3, 2011, 2 pages.

Miller, B. N. et al., "PocketLens: Toward a Personal Recommender System," ACM Transactions on Information Systems, vol. 22, No. 3, Jul. 2004, pp. 437-476, 40 pages.

Cox, L.P. et al., "Presence-Exchanges: Toward Sustainable Presence-Sharing," In Proc. of 7th IEEE Workshop on Mobile Computing Systems and Applications, Apr. 6-7, 2006, Semiahmoo Resort, Washington, pp. 55â€"60, 6 pages.

"Resource Description Framework (RDF) / W3C Semantic Web Activity," at <http://www.w3.org/RDF/>, from the Internet Archive dated Jul. 30, 2008, printed Aug. 10, 2012, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—Technology," at <http://www.sensenetworks.com/technology.php>, copyright 2008-2009, Sense Networks, printed Jan. 12, 2009, 2 pages.

"Sense Networks—The Minimum Volume Embedding Algorithm," at <http://www.sensenetworks.com/mve_algorithm.php>, copyright 2008-2009, Sense Networks, printed Jan. 12, 2009, 2 pages.

(56) References Cited

OTHER PUBLICATIONS

Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.

"Six degrees of separation," at <http://en.wikipedia.org/wiki/Six_degrees_of_separation>, last modified on Apr. 19, 2011,printed Apr. 28, 2011, 11 pages.

Cox et al., "SmokeScreen: Flexible Privacy Controls for Presence-Sharing," Proceedings of the 5th International Conference on Mobile Systems, Applications, and Services (2007) (MobiSys '07), Jun. 11-13, 2007, San Juan, Puerto Rico, 13 pages.

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

"What is LinkedIn?," at <http://www.linkedin.com/static?key=what_is_linkedin&trk=hb_what>, copyright 2011, LinkedIn Corporation, printed Apr. 28, 2011, 1 page.

\* cited by examiner

FORMING CROWDS AND PROVIDING ACCESS TO CROWD DATA IN A MOBILE ENVIRONMENT

CROSS REFERENCE TO RELATED APPLICATIONS

This application is a continuation of U.S. patent application Ser. No. 12/654,532, which was filed Dec. 23, 2009, which claims the benefit of provisional patent application Ser. No. 61/149,205, filed Feb. 2, 2009, provisional patent application Ser. No. 61/227,192, filed Jul. 21, 2009, and provisional patent application Ser. No. 61/236,296, filed Aug. 24, 2009, the disclosures of which are hereby incorporated by reference in their entireties.

RELATED APPLICATIONS

This application is related to:
U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009;
U.S. patent application Ser. No. 12/645,539, entitled ANONYMOUS CROWD TRACKING, which was filed Dec. 23, 2009;
U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009;
U.S. patent application Ser. No. 12/645,546, entitled CROWD FORMATION FOR MOBILE DEVICE USERS, which was filed Dec. 23, 2009;
U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; and
U.S. patent application Ser. No. 12/645,560, entitled HANDLING CROWD REQUESTS FOR LARGE GEOGRAPHIC AREAS, which was filed Dec. 23, 2009;
all of which are commonly owned and assigned and are hereby incorporated herein by reference in their entireties.

FIELD OF THE DISCLOSURE

The present disclosure relates to forming crowds of users in a mobile environment and providing access to crowd data for those crowds.

BACKGROUND

With the growing popularity of mobile smart phones, such as the Apple® iPhone, mobile social networking applications are becoming extremely popular. However, a major concern with current mobile social networking applications is user privacy. What is needed is a mobile social networking application that operates within a strict privacy framework.

SUMMARY

The present disclosure provides a system and method for forming crowds of users and providing access to corresponding crowd data. In one embodiment, a central system, which includes one or more servers, operates to obtain current locations for users of mobile devices. The central system forms a crowd including a number of users based on the current locations of the number of users using a spatial crowd formation process based on an optimal inclusion distance that is a function of density of users of the plurality of users within a bounding region for the spatial crowd formation process. The optimal inclusion distance is subject to change as the crowd is formed. The central system then generates crowd data for the crowd and provides access to the crowd data for the crowd in response to receiving a request for the crowd data. In one embodiment, the crowd data for the crowd includes an aggregate profile for the crowd generated based on user profiles of the users in the crowd and, in some embodiments, a user profile or select subset of the user profile of a requestor or a target user profile. In another embodiment, the crowd data includes data characterizing the crowd such as, but not limited to, data identifying a degree of fragmentation of the crowd, a best-case average degree of separation (DOS) for one or more crowd fragments in the crowd, a worst-case average DOS for one or more crowd fragments in the crowd, a best-case average DOS for the crowd, a worst-case average DOS for the crowd, a degree of bidirectionality of friend relationships in one or more crowd fragments in the crowd, and/or a degree of bidirectionality of friend relationships in the crowd.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
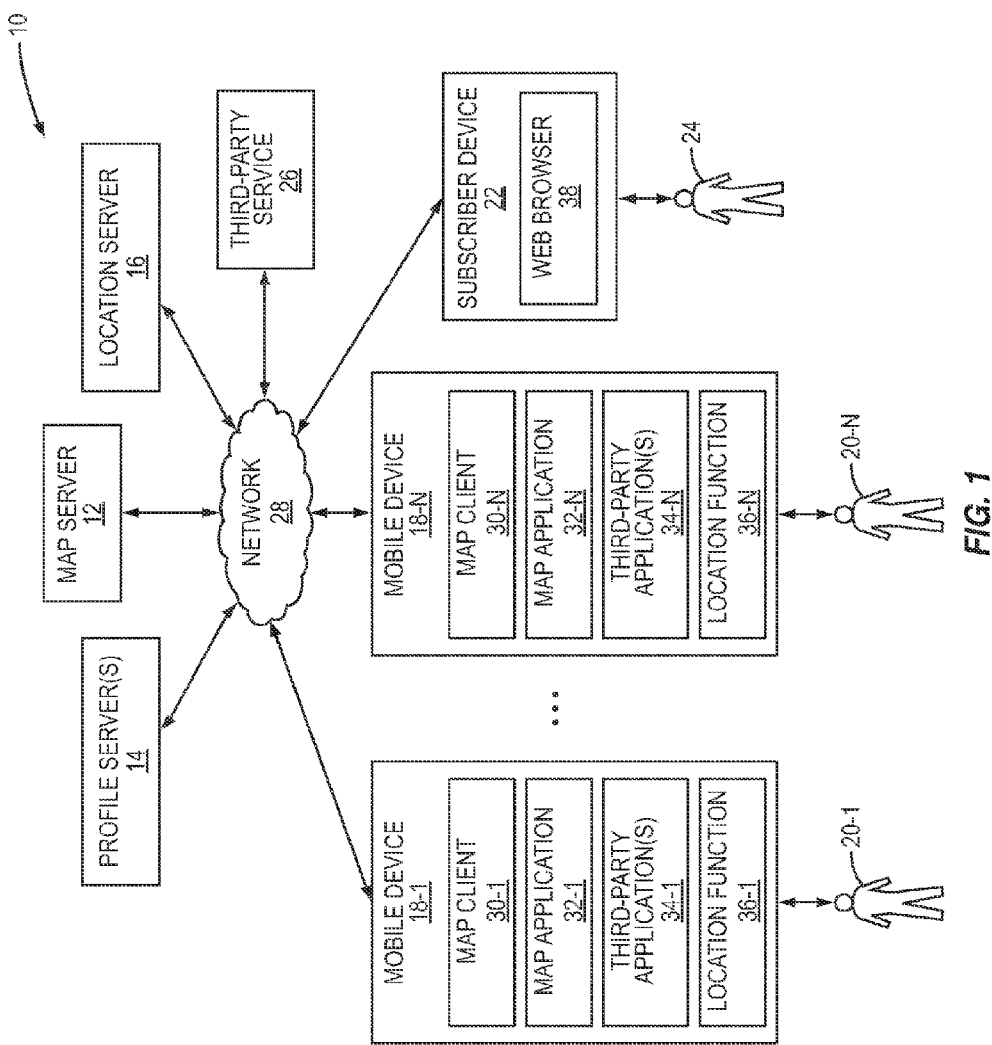
FIG. 1 illustrates a Mobile Aggregate Profile (MAP) system according to one embodiment of the present disclosure.

FIG. 1 illustrates a Mobile Aggregate Profile (MAP) system 10 according to one embodiment of the present disclosure. In this embodiment, the system 10 includes a MAP server 12, one or more profile servers 14, a location server 16, a number of mobile devices 18-1 through 18-N having associated users 20-1 through 20-N, a subscriber device 22 having an associated subscriber 24, and a third-party service 26 communicatively coupled via a network 28. The network 28 may be any type of network or any combination of networks. Specifically, the network 28 may include wired components, wireless components, or both wired and wireless components. In one exemplary embodiment, the network 28 is a distributed public network such as the Internet, where the mobile devices 18-1 through 18-N are enabled to connect to the network 28 via local wireless connections (e.g., WiFi or IEEE 802.11 connections) or wireless telecommunications connections (e.g., 3G or 4G telecommunications connections such as GSM, LTE, W-CDMA, or WiMAX connections).

As discussed below in detail, the MAP server 12 operates to obtain current locations, including location updates, and user profiles of the users 20-1 through 20-N of the mobile devices 18-1 through 18-N. The current locations of the users 20-1 through 20-N can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20-1 through 20-N, the MAP server 12 is enabled to provide a number of features such as, but not limited to, maintaining a historical record of anonymized user profile data by location, generating aggregate profile data over time for a Point of Interest (POI) or Area of Interest (AOI) using the historical record of anonymized user profile data, identifying crowds of users using current locations and/or user profiles of the users 20-1 through 20-N, generating aggregate profiles for crowds of users at a POI or in an AOI using the current user profiles of users in the crowds, and crowd tracking. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20-1 through 20-N of the mobile devices 18-1 through 18-N. For example, the one or more profile servers 14 may be servers providing social network services such the Facebook® social networking service, the MySpace® social networking service, the LinkedIN® social networking service, and/or the like. As discussed below, using the one or more profile servers 14, the MAP server 12 is enabled to directly or indirectly obtain the user profiles of the users 20-1 through 20-N of the mobile devices 18-1 through 18-N. The location server 16 generally operates to receive location updates from the mobile devices 18-1 through 18-N and make the location updates available to entities such as, for instance, the MAP server 12. In one exemplary embodiment, the location server 16 is a server operating to provide Yahoo!'s FireEagle service.

The mobile devices 18-1 through 18-N may be mobile smart phones, portable media player devices, mobile gaming devices, or the like. Some exemplary mobile devices that may be programmed or otherwise configured to operate as the mobile devices 18-1 through 18-N are the Apple® iPhone, the Palm Pre, the Samsung Rogue, the Blackberry Storm, and the Apple® iPod Touch® device. However, this list of exemplary mobile devices is not exhaustive and is not intended to limit the scope of the present disclosure.

The mobile devices 18-1 through 18-N include MAP clients 30-1 through 30-N, MAP applications 32-1 through 32-N, third-party applications 34-1 through 34-N, and location functions 36-1 through 36-N, respectively. Using the mobile device 18-1 as an example, the MAP client 30-1 is preferably implemented in software. In general, in the preferred embodiment, the MAP client 30-1 is a middleware layer operating to interface an application layer (i.e., the MAP application 32-1 and the third-party applications 34-1) to the MAP server 12. More specifically, the MAP client 30-1 enables the MAP application 32-1 and the third-party applications 34-1 to request and receive data from the MAP server 12. In addition, the MAP client 30-1 enables applications, such as the MAP application 32-1 and the third-party applications 34-1, to access data from the MAP server 12. For example, as discussed below in detail, the MAP client 30-1 enables the MAP application 32-1 to request anonymized aggregate profiles for crowds of users located at a POI or within an AOI and/or request anonymized historical user profile data for a POI or AOI.

The MAP application 32-1 is also preferably implemented in software. The MAP application 32-1 generally provides a user interface component between the user 20-1 and the MAP server 12. More specifically, among other things, the MAP application 32-1 enables the user 20-1 to initiate historical requests for historical data or crowd requests for crowd data (e.g., aggregate profile data and/or crowd characteristics data) from the MAP server 12 for a POI or AOI. The MAP application 32-1 also enables the user 20-1 to configure various settings. For example, the MAP application 32-1 may enable the user 20-1 to select a desired social networking service (e.g., Facebook, MySpace, LinkedIN, etc.) from which to obtain the user profile of the user 20-1 and provide any necessary credentials (e.g., username and password) needed to access the user profile from the social networking service.

The third-party applications 34-1 are preferably implemented in software. The third-party applications 34-1 operate to access the MAP server 12 via the MAP client 30-1. The third-party applications 34-1 may utilize data obtained from the MAP server 12 in any desired manner. As an example, one of the third party applications 34-1 may be a gaming application that utilizes historical aggregate profile data to notify the user 20-1 of POIs or AOIs where persons having an interest in the game have historically congregated.

The location function 36-1 may be implemented in hardware, software, or a combination thereof. In general, the location function 36-1 operates to determine or otherwise obtain the location of the mobile device 18-1. For example, the location function 36-1 may be or include a Global Positioning System (GPS) receiver.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to historical aggregate profile data for one or more POIs and/or one or more AOIs, pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the third-party service 26 is a service that has access to data from the MAP server 12 such as a historical aggregate profile data for one or more POIs or one or more AOIs, crowd data such as aggregate profiles for one or more crowds at one or more POIs or within one or more AOIs, or crowd tracking data. Based on the data from the MAP server 12, the third-party service 26 operates to provide a service such as, for example, targeted advertising. For example, the third-party service 26 may obtain anonymous aggregate profile data for one or more crowds located at a POI and then provide targeted advertising to known users located at the POI based on the anonymous aggregate profile data. Note that while targeted advertising is mentioned as an exemplary third-party service 26, other types of third-party services 26 may additionally or alternatively be provided. Other types of third-party services 26 that may be provided will be apparent to one of ordinary skill in the art upon reading this disclosure.

Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

Figure 2:
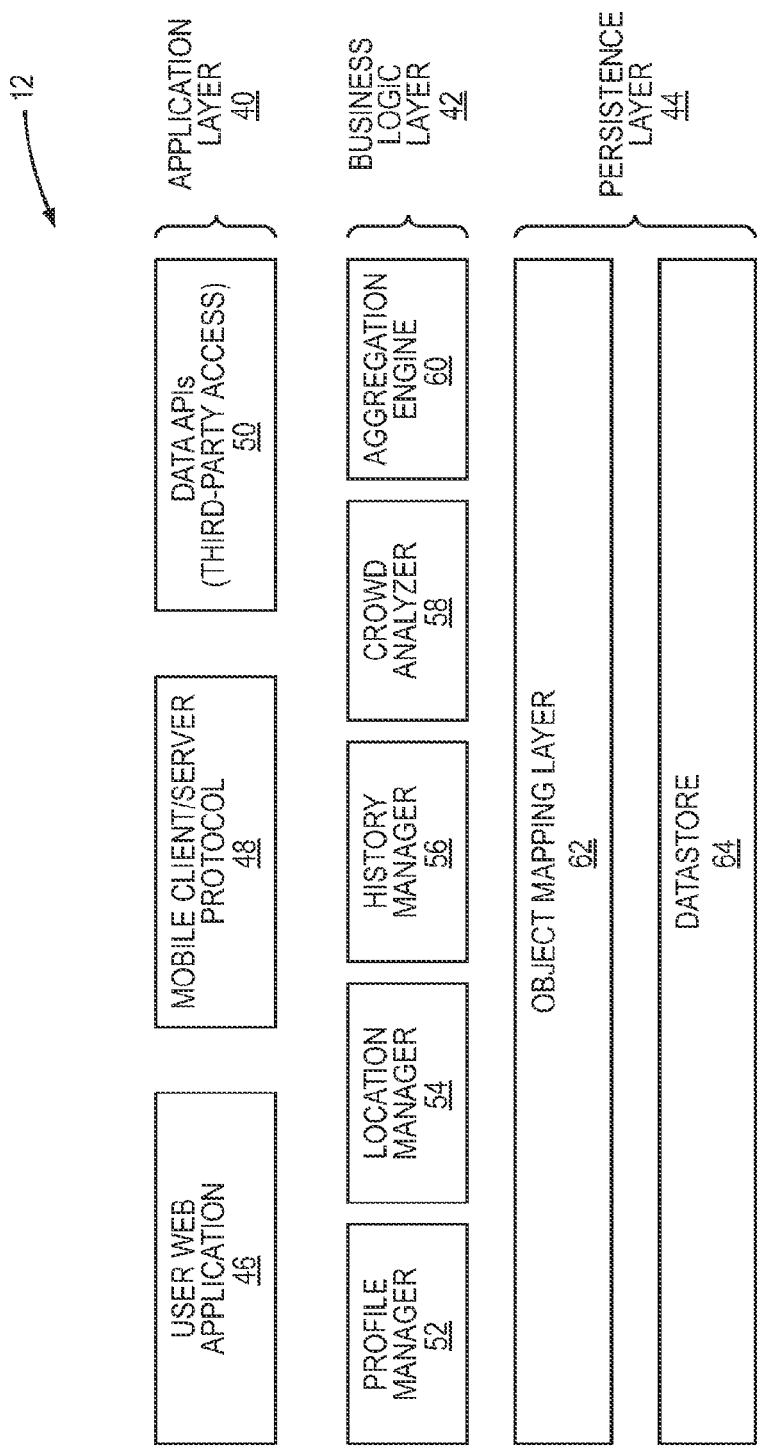
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30-1 through 30-N hosted by the mobile devices 18-1 through 18-N. The data APIs 50 enable third-party services, such as the third-party service 26, to access the MAP server 12.

The business logic layer 42 includes a profile manager 52, a location manager 54, a history manager 56, a crowd analyzer 58, and an aggregation engine 60, each of which is preferably implemented in software. The profile manager 52 generally operates to obtain the user profiles of the users 20-1 through 20-N directly or indirectly from the one or more profile servers 14 and store the user profiles in the persistence layer 44. The location manager 54 operates to obtain the current locations of the users 20-1 through 20-N including location updates. As discussed below, the current locations of the users 20-1 through 20-N may be obtained directly from the mobile devices 18-1 through 18-N and/or obtained from the location server 16.

The history manager 56 generally operates to maintain a historical record of anonymized user profile data by location. The crowd analyzer 58 operates to form crowds of users. In one embodiment, the crowd analyzer 58 utilizes a spatial crowd formation algorithm. However, the present disclosure is not limited thereto. In addition, the crowd analyzer 58 may further characterize crowds to reflect degree of fragmentation, best-case and worst-case degree of separation (DOS), and/or degree of bi-directionality, as discussed below in more detail. Still further, the crowd analyzer 58 may also operate to track crowds. The aggregation engine 60 generally operates to provide aggregate profile data in response to requests from the mobile devices 18-1 through 18-N, the subscriber device 22, and the third-party service 26. The aggregate profile data may be historical aggregate profile data for one or more POIs or one or more AOIs or aggregate profile data for crowd(s) currently at one or more POIs or within one or more AOIs.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as Livejournal and Facebook. The MAP server 12 may then persist RDF descriptions of the users 20-1 through 20-N as a proprietary extension of the FOAF vocabulary that includes additional properties desired for the MAP system 10.

Figure 3:
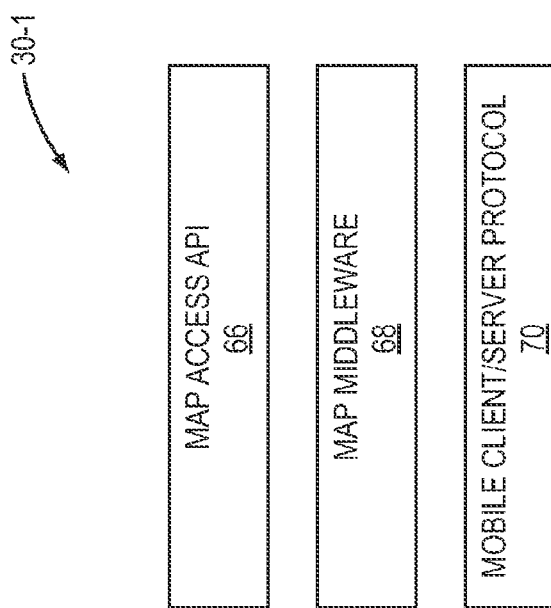
FIG. 3 is a block diagram of the MAP client of one of the mobile devices of FIG. 1 according to one embodiment of the present disclosure.

FIG. 3 illustrates the MAP client 30-1 of FIG. 1 in more detail according to one embodiment of the present disclosure. This discussion is equally applicable to the other MAP clients 30-2 through 30-N. As illustrated, in this embodiment, the MAP client 30-1 includes a MAP access API 66, a MAP middleware component 68, and a mobile client/server protocol component 70. The MAP access API 66 is implemented in software and provides an interface by which the MAP client 30-1 and the third-party applications 34-1 are enabled to access the MAP server 12. The MAP middleware component 68 is implemented in software and performs the operations needed for the MAP client 30-1 to operate as an interface between the MAP application 32-1 and the third-party applications 34-1 at the mobile device 18-1 and the MAP server 12. The mobile client/server protocol component 70 enables communication between the MAP client 30-1 and the MAP server 12 via a defined protocol.

Figure 4:
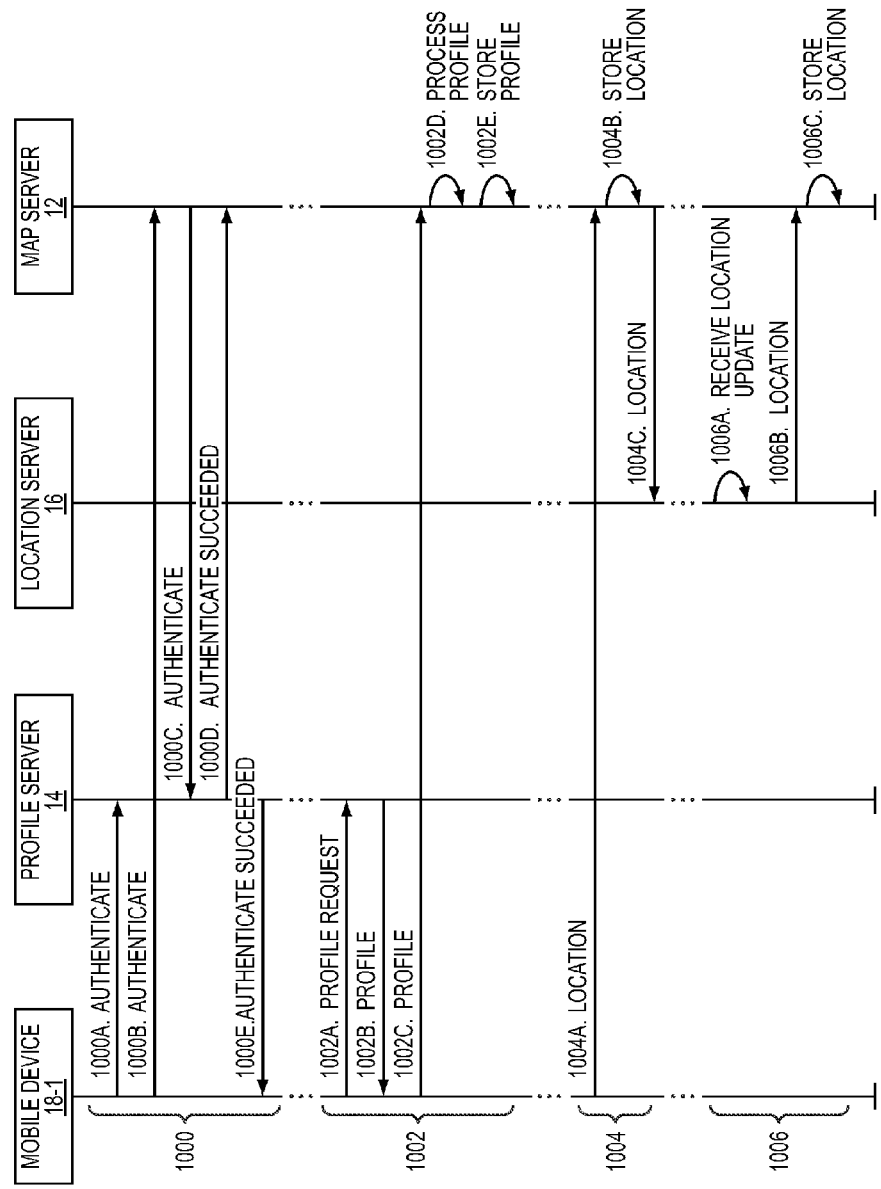
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of the user 20-1 of the mobile device 18-1 to the MAP server 12 according to one embodiment of the present disclosure. This discussion is equally applicable to user profiles of the other users 20-2 through 20-N of the other mobile devices 18-2 through 18-N. First, an authentication process is performed (step 1000). For authentication, in this embodiment, the mobile device 18-1 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20-1 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30-1 of the mobile device 18-1 (step 1000E).

At some point after authentication is complete, a user profile process is performed such that a user profile of the user 20-1 is obtained from the profile server 14 and delivered to the MAP server 12 (step 1002). In this embodiment, the MAP client 30-1 of the mobile device 18-1 sends a profile request to the profile server 14 (step 1002A). In response, the profile server 14 returns the user profile of the user 20-1 to the mobile device 18-1 (step 1002B). The MAP client 30-1 of the mobile device 18-1 then sends the user profile of the user 20-1 to the MAP server 12 (step 1002C). Note that while in this embodiment the MAP client 30-1 sends the complete user profile of the user 20-1 to the MAP server 12, in an alternative embodiment, the MAP client 30-1 may filter the user profile of the user 20-1 according to criteria specified by the user 20-1. For example, the user profile of the user 20-1 may include demographic information, general interests, music interests, and movie interests, and the user 20-1 may specify that the demographic information or some subset thereof is to be filtered, or removed, before sending the user profile to the MAP server 12.

Upon receiving the user profile of the user 20-1 from the MAP client 30-1 of the mobile device 18-1, the profile manager 52 of the MAP server 12 processes the user profile (step 1002D). More specifically, in the preferred embodiment, the profile manager 52 includes social network handlers for the social network services supported by the MAP server 12. Thus, for example, if the MAP server 12 supports user profiles from Facebook, MySpace, and LinkedIN, the profile manager 52 may include a Facebook handler, a MySpace handler, and a LinkedIN handler. The social network handlers process user profiles to generate user profiles for the MAP server 12 that include lists of keywords for each of a number of profile categories. The profile categories may be the same for each of the social network handlers or different for each of the social network handlers. Thus, for this example assume that the user profile of the user 20-1 is from Facebook. The profile manager 52 uses a Facebook handler to process the user profile of the user 20-1 to map the user profile of the user 20-1 from Facebook to a user profile for the MAP server 12 including lists of keywords for a number of predefined profile categories. For example, for the Facebook handler, the profile categories may be a demographic profile category, a social interaction profile category, a general interests profile category, a music interests profile category, and a movie interests profile category. As such, the user profile of the user 20-1 from Facebook may be processed by the Facebook handler of the profile manager 52 to create a list of keywords such as, for example, liberal, High School Graduate, 35-44, College Graduate, etc. for the demographic profile category, a list of keywords such as Seeking Friendship for the social interaction profile category, a list of keywords such as politics, technology, photography, books, etc. for the general interests profile category, a list of keywords including music genres, artist names, album names, or the like for the music interests profile category, and a list of keywords including movie titles, actor or actress names, director names, move genres, or the like for the movie interests profile category. In one embodiment, the profile manager 52 may use natural language processing or semantic analysis. For example, if the Facebook user profile of the user 20-1 states that the user 20-1 is 20 years old, semantic analysis may result in the keyword of 18-24 years old being stored in the user profile of the user 20-1 for the MAP server 12.

After processing the user profile of the user 20-1, the profile manager 52 of the MAP server 12 stores the resulting user profile for the user 20-1 (step 1002E). More specifically, in one embodiment, the MAP server 12 stores user records for the users 20-1 through 20-N in the datastore 64 (FIG. 2). The user profile of the user 20-1 is stored in the user record of the user 20-1. The user record of the user 20-1 includes a unique identifier of the user 20-1, the user profile of the user 20-1, and, as discussed below, a current location of the user 20-1. Note that the user profile of the user 20-1 may be updated as desired. For example, in one embodiment, the user profile of the user 20-1 is updated by repeating step 1002 each time the user 20-1 activates the MAP application 32-1.

Note that while the discussion herein focuses on an embodiment where the user profiles of the users 20-1 through 20-N are obtained from the one or more profile servers 14, the user profiles of the users 20-1 through 20-N may be obtained in any desired manner. For example, in one alternative embodiment, the user 20-1 may identify one or more favorite websites. The profile manager 52 of the MAP server 12 may then crawl the one or more favorite websites of the user 20-1 to obtain keywords appearing in the one or more favorite websites of the user 20-1. These keywords may then be stored as the user profile of the user 20-1.

At some point, a process is performed such that a current location of the mobile device 18-1 and thus a current location of the user 20-1 is obtained by the MAP server 12 (step 1004). In this embodiment, the MAP application 32-1 of the mobile device 18-1 obtains the current location of the mobile device 18-1 from the location function 36-1 of the mobile device 18-1. The MAP application 32-1 then provides the current location of the mobile device 18-1 to the MAP client 30-1, and the MAP client 30-1 then provides the current location of the mobile device 18-1 to the MAP server 12 (step 1004A). Note that step 1004A may be repeated periodically or in response to a change in the current location of the mobile device 18-1 in order for the MAP application 32-1 to provide location updates for the user 20-1 to the MAP server 12.

In response to receiving the current location of the mobile device 18-1, the location manager 54 of the MAP server 12 stores the current location of the mobile device 18-1 as the current location of the user 20-1 (step 1004B). More specifically, in one embodiment, the current location of the user 20-1 is stored in the user record of the user 20-1 maintained in the datastore 64 of the MAP server 12. Note that only the current location of the user 20-1 is stored in the user record of the user 20-1. In this manner, the MAP server 12 maintains privacy for the user 20-1 since the MAP server 12 does not maintain a historical record of the location of the user 20-1. As discussed below in detail, historical data maintained by the MAP server 12 is anonymized in order to maintain the privacy of the users 20-1 through 20-N.

In addition to storing the current location of the user 20-1, the location manager 54 sends the current location of the user 20-1 to the location server 16 (step 1004C). In this embodiment, by providing location updates to the location server 16, the MAP server 12 in return receives location updates for the user 20-1 from the location server 16. This is particularly beneficial when the mobile device 18-1 does not permit background processes, which is the case for the Apple® iPhone. As such, if the mobile device 18-1 is an Apple® iPhone or similar device that does not permit background processes, the MAP application 32-1 will not be able to provide location updates for the user 20-1 to the MAP server 12 unless the MAP application 32-1 is active.

Therefore, when the MAP application 32-1 is not active, other applications running on the mobile device 18-1 (or some other device of the user 20-1) may directly or indirectly provide location updates to the location server 16 for the user 20-1. This is illustrated in step 1006 where the location server 16 receives a location update for the user 20-1 directly or indirectly from another application running on the mobile device 18-1 or an application running on another device of the user 20-1 (step 1006A). The location server 16 then provides the location update for the user 20-1 to the MAP server 12 (step 1006B). In response, the location manager 54 updates and stores the current location of the user 20-1 in the user record of the user 20-1 (step 1006C). In this manner, the MAP server 12 is enabled to obtain location updates for the user 20-1 even when the MAP application 32-1 is not active at the mobile device 18-1.

Figure 5:
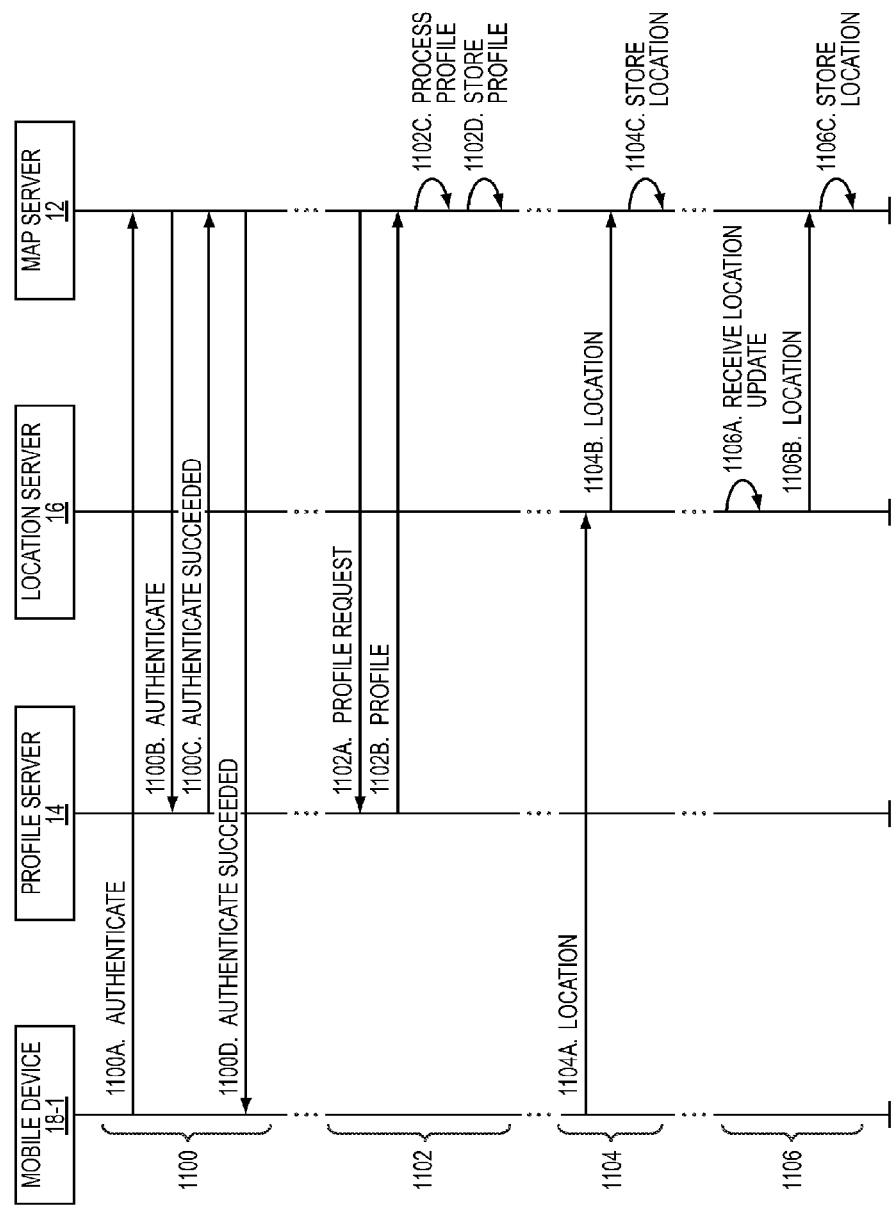
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20-1 of the mobile device 18-1 according to another embodiment of the present disclosure. This discussion is equally applicable to user profiles of the other users 20-2 through 20-N of the other mobile devices 18-2 through 18-N. First, an authentication process is performed (step 1100). For authentication, in this embodiment, the mobile device 18-1 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20-1 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30-1 of the mobile device 18-1 (step 1100D).

At some point after authentication is complete, a user profile process is performed such that a user profile of the user 20-1 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20-1 to the profile manager 52 of the MAP server 12 (step 1102B). Note that while in this embodiment the profile server 14 returns the complete user profile of the user 20-1 to the MAP server 12, in an alternative embodiment, the profile server 14 may return a filtered version of the user profile of the user 20-1 to the MAP server 12. The profile server 14 may filter the user profile of the user 20-1 according to criteria specified by the user 20-1. For example, the user profile of the user 20-1 may include demographic information, general interests, music interests, and movie interests, and the user 20-1 may specify that the demographic information or some subset thereof is to be filtered, or removed, before sending the user profile to the MAP server 12.

Upon receiving the user profile of the user 20-1, the profile manager 52 of the MAP server 12 processes to the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories. The profile categories may be the same for each of the social network handlers or different for each of the social network handlers.

After processing the user profile of the user 20-1, the profile manager 52 of the MAP server 12 stores the resulting user profile for the user 20-1 (step 1102D). More specifically, in one embodiment, the MAP server 12 stores user records for the users 20-1 through 20-N in the datastore 64 (FIG. 2). The user profile of the user 20-1 is stored in the user record of the user 20-1. The user record of the user 20-1 includes a unique identifier of the user 20-1, the user profile of the user 20-1, and, as discussed below, a current location of the user 20-1. Note that the user profile of the user 20-1 may be updated as desired. For example, in one embodiment, the user profile of the user 20-1 is updated by repeating step 1102 each time the user 20-1 activates the MAP application 32-1.

Note that the while the discussion herein focuses on an embodiment where the user profiles of the users 20-1 through 20-N are obtained from the one or more profile servers 14, the user profiles of the users 20-1 through 20-N may be obtained in any desired manner. For example, in one alternative embodiment, the user 20-1 may identify one or more favorite websites. The profile manager 52 of the MAP server 12 may then crawl the one or more favorite websites of the user 20-1 to obtain keywords appearing in the one or more favorite websites of the user 20-1. These keywords may then be stored as the user profile of the user 20-1.

At some point, a process is performed such that a current location of the mobile device 18-1 and thus a current location of the user 20-1 is obtained by the MAP server 12 (step 1104). In this embodiment, the MAP application 32-1 of the mobile device 18-1 obtains the current location of the mobile device 18-1 from the location function 36-1 of the mobile device 18-1. The MAP application 32-1 then provides the current location of the user 20-1 of the mobile device 18-1 to the location server 16 (step 1104A). Note that step 1104A may be repeated periodically or in response to changes in the location of the mobile device 18-1 in order to provide location updates for the user 20-1 to the MAP server 12. The location server 16 then provides the current location of the user 20-1 to the MAP server 12 (step 1104B). The location server 16 may provide the current location of the user 20-1 to the MAP server 12 automatically in response to receiving the current location of the user 20-1 from the mobile device 18-1 or in response to a request from the MAP server 12.

In response to receiving the current location of the mobile device 18-1, the location manager 54 of the MAP server 12 stores the current location of the mobile device 18-1 as the current location of the user 20-1 (step 1104C). More specifically, in one embodiment, the current location of the user 20-1 is stored in the user record of the user 20-1 maintained in the datastore 64 of the MAP server 12. Note that only the current location of the user 20-1 is stored in the user record of the user 20-1. In this manner, the MAP server 12 maintains privacy for the user 20-1 since the MAP server 12 does not maintain a historical record of the location of the user 20-1. As discussed below in detail, historical data maintained by the MAP server 12 is anonymized in order to maintain the privacy of the users 20-1 through 20-N.

As discussed above, the use of the location server 16 is particularly beneficial when the mobile device 18-1 does not permit background processes, which is the case for the Apple® iPhone. As such, if the mobile device 18-1 is an Apple® iPhone or similar device that does not permit background processes, the MAP application 32-1 will not provide location updates for the user 20-1 to the location server 16 unless the MAP application 32-1 is active. However, other applications running on the mobile device 18-1 (or some other device of the user 20-1) may provide location updates to the location server 16 for the user 20-1 when the MAP application 32-1 is not active. This is illustrated in step 1106 where the location server 16 receives a location update for the user 20-1 from another application running on the mobile device 18-1 or an application running on another device of the user 20-1 (step 1106A). The location server 16 then provides the location update for the user 20-1 to the MAP server 12 (step 1106B). In response, the location manager 54 updates and stores the current location of the user 20-1 in the user record of the user 20-1 (step 1106C). In this manner, the MAP server 12 is enabled to obtain location updates for the user 20-1 even when the MAP application 32-1 is not active at the mobile device 18-1.

Figure 6:
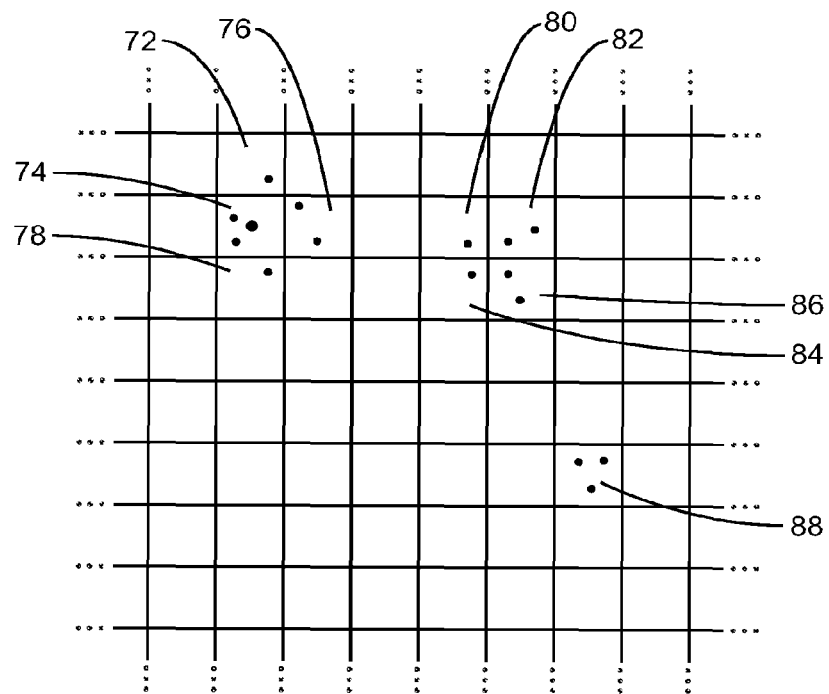
FIGS. 6 and 7 graphically illustrate bucketization of users according to location for purposes of maintaining a historical record of anonymized user profile data by location according to one embodiment of the present disclosure.

Using the current locations of the users 20-1 through 20-N and the user profiles of the users 20-1 through 20-N, the MAP server 12 can provide a number of features. A first feature that may be provided by the MAP server 12 is historical storage of anonymized user profile data by location. This historical storage of anonymized user profile data by location is performed by the history manager 56 of the MAP server 12. More specifically, as illustrated in FIG. 6, in the preferred embodiment, the history manager 56 maintains lists of users located in a number of geographic regions, or "location buckets." Preferably, the location buckets are defined by floor(latitude, longitude) to a desired resolution. The higher the resolution, the smaller the size of the location buckets. For example, in one embodiment, the location buckets are defined by floor(latitude, longitude) to a resolution of $1/10,000^{th}$ of a degree such that the lower left-hand corners of the squares illustrated in FIG. 6 are defined by the floor(latitude, longitude) values at a resolution of $1/10,000^{th}$ of a degree. In the example of FIG. 6, users are represented as dots, and location buckets 72 through 88 have lists of 1, 3, 2, 1, 1, 2, 1, 2, and 3 users, respectively.

As discussed below in detail, at a predetermined time interval such as, for example, 15 minutes, the history manager 56 makes a copy of the lists of users in the location buckets, anonymizes the user profiles of the users in the lists to provide anonymized user profile data for the corresponding location buckets, and stores the anonymized user profile data in a number of history objects. In one embodiment, a history object is stored for each location bucket having at least one user. In another embodiment, a quadtree algorithm is used to efficiently create history objects for geographic regions (i.e., groups of one or more adjoining location buckets).

Figure 7:
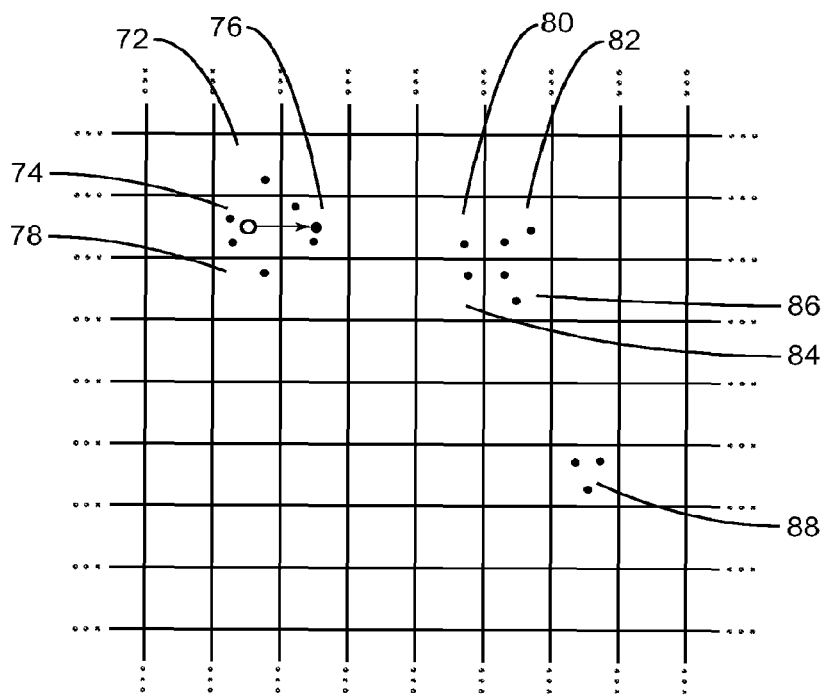

FIG. 7 graphically illustrates a scenario where a user moves from one location bucket to another, namely, from the location bucket 74 to the location bucket 76. As discussed below in detail, assuming that the movement occurs during the time interval between persistence of the historical data by the history manager 56, the user is included on both the list for the location bucket 74 and the list for the location bucket 76. However, the user is flagged or otherwise marked as inactive for the location bucket 74 and active for the location bucket 76. As discussed below, after making a copy of the lists for the location buckets to be used to persist the historical data, users flagged as inactive are removed from the lists of users for the location buckets. Thus, in sum, once a user moves from the location bucket 74 to the location bucket 76, the user remains in the list for the location bucket 74 until the predetermined time interval has expired and the anonymized user profile data is persisted. The user is then removed from the list for the location bucket 74.

Figure 8:
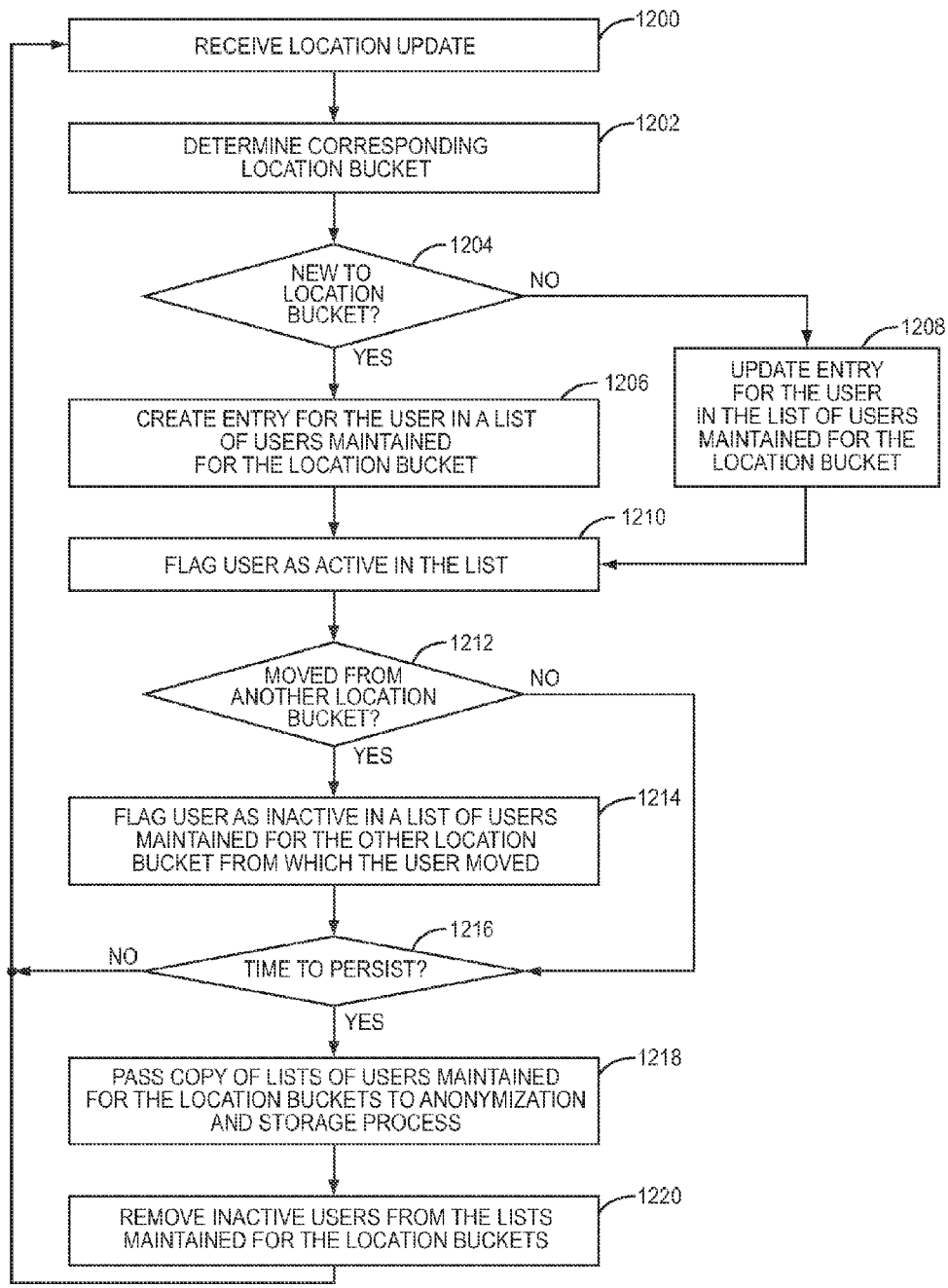
FIG. 8 is a flow chart illustrating the operation of a foreground bucketization process performed by the MAP server to maintain the lists of users for location buckets for purposes of maintaining a historical record of anonymized user profile data by location according to one embodiment of the present disclosure.

FIG. 8 is a flow chart illustrating the operation of a foreground "bucketization" process performed by the history manager 56 to maintain the lists of users for location buckets according to one embodiment of the present disclosure. First, the history manager 56 receives a location update for a user (step 1200). For this discussion, assume that the location update is received for the user 20-1. The history manager 56 then determines a location bucket corresponding to the updated location (i.e., the current location) of the user 20-1 (step 1202). In the preferred embodiment, the location of the user 20-1 is expressed as latitude and longitude coordinates, and the history manager 56 determines the location bucket by determining floor values of the latitude and longitude coordinates, which can be written as floor (latitude, longitude) at a desired resolution. As an example, if the latitude and longitude coordinates for the location of the user 20-1 are 32.24267381553987 and −111.9249213502935, respectively, and the floor values are to be computed to a resolution of $1/10,000^{th}$ of a degree, then the floor values for the latitude and longitude coordinates are 32.2426 and −111.9249. The floor values for the latitude and longitude coordinates correspond to a particular location bucket.

After determining the location bucket for the location of the user 20-1, the history manager 56 determines whether the user 20-1 is new to the location bucket (step 1204). In other words, the history manager 56 determines whether the user 20-1 is already on the list of users for the location bucket. If the user 20-1 is new to the location bucket, the history manager 56 creates an entry for the user 20-1 in the list of users for the location bucket (step 1206). Returning to step 1204, if the user 20-1 is not new to the location bucket, the history manager 56 updates the entry for the user 20-1 in the list of users for the location bucket (step 1208). At this point, whether proceeding from step 1206 or 1208, the user 20-1 is flagged as active in the list of users for the location bucket (step 1210).

The history manager 56 then determines whether the user 20-1 has moved from another location bucket (step 1212). More specifically, the history manager 56 determines whether the user 20-1 is included in the list of users for another location bucket and is currently flagged as active in that list. If the user 20-1 has not moved from another location bucket, the process proceeds to step 1216. If the user 20-1 has moved from another location bucket, the history manager 56 flags the user 20-1 as inactive in the list of users for the other location bucket from which the user 20-1 has moved (step 1214).

At this point, whether proceeding from step 1212 or 1214, the history manager 56 determines whether it is time to persist (step 1216). More specifically, as mentioned above, the history manager 56 operates to persist history objects at a predetermined time interval such as, for example, every 15 minutes. Thus, the history manager 56 determines that it is time to persist if the predetermined time interval has expired. If it is not time to persist, the process returns to step 1200 and is repeated for a next received location update, which will typically be for another user. If it is time to persist, the history manager 56 creates a copy of the lists of users for the location buckets and passes the copy of the lists to an anonymization and storage process (step 1218). In this embodiment, the anonymization and storage process is a separate process performed by the history manager 56. The history manager 56 then removes inactive users from the lists of users for the location buckets (step 1220). The process then returns to step 300 and is repeated for a next received location update, which will typically be for another user.

Figure 9:
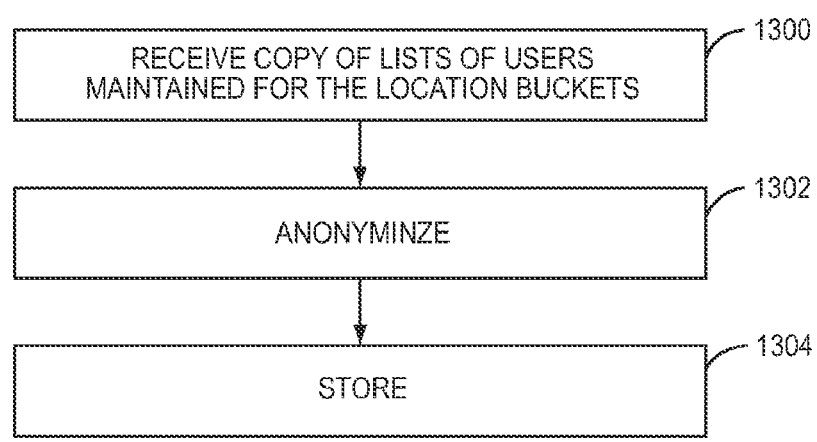
FIG. 9 is a flow chart illustrating the anonymization and storage process performed by the MAP server for the location buckets in order to maintain a historical record of anonymized user profile data by location according to one embodiment of the present disclosure.

FIG. 9 is a flow chart illustrating the anonymization and storage process performed by the history manager 56 at the predetermined time interval according to one embodiment of the present disclosure. First, the anonymization and storage process receives the copy of the lists of users for the location buckets passed to the anonymization and storage process by the bucketization process of FIG. 8 (step 1300). Next, anonymization is performed for each of the location buckets having at least one user in order to provide anonymized user profile data for the location buckets (step 1302). Anonymization prevents connecting information stored in the history objects stored by the history manager 56 back to the users 20-1 through 20-N or at least substantially increases a difficulty of connecting information stored in the history objects stored by the history manager 56 back to the users 20-1 through 20-N. Lastly, the anonymized user profile data for the location buckets is stored in a number of history objects (step 1304). In one embodiment, a separate history object is stored for each of the location buckets, where the history object of a location bucket includes the anonymized user profile data for the location bucket. In another embodiment, as discussed below, a quadtree algorithm is used to efficiently store the anonymized user profile data in a number of history objects such that each history object stores the anonymized user profile data for one or more location buckets.

Figure 10:
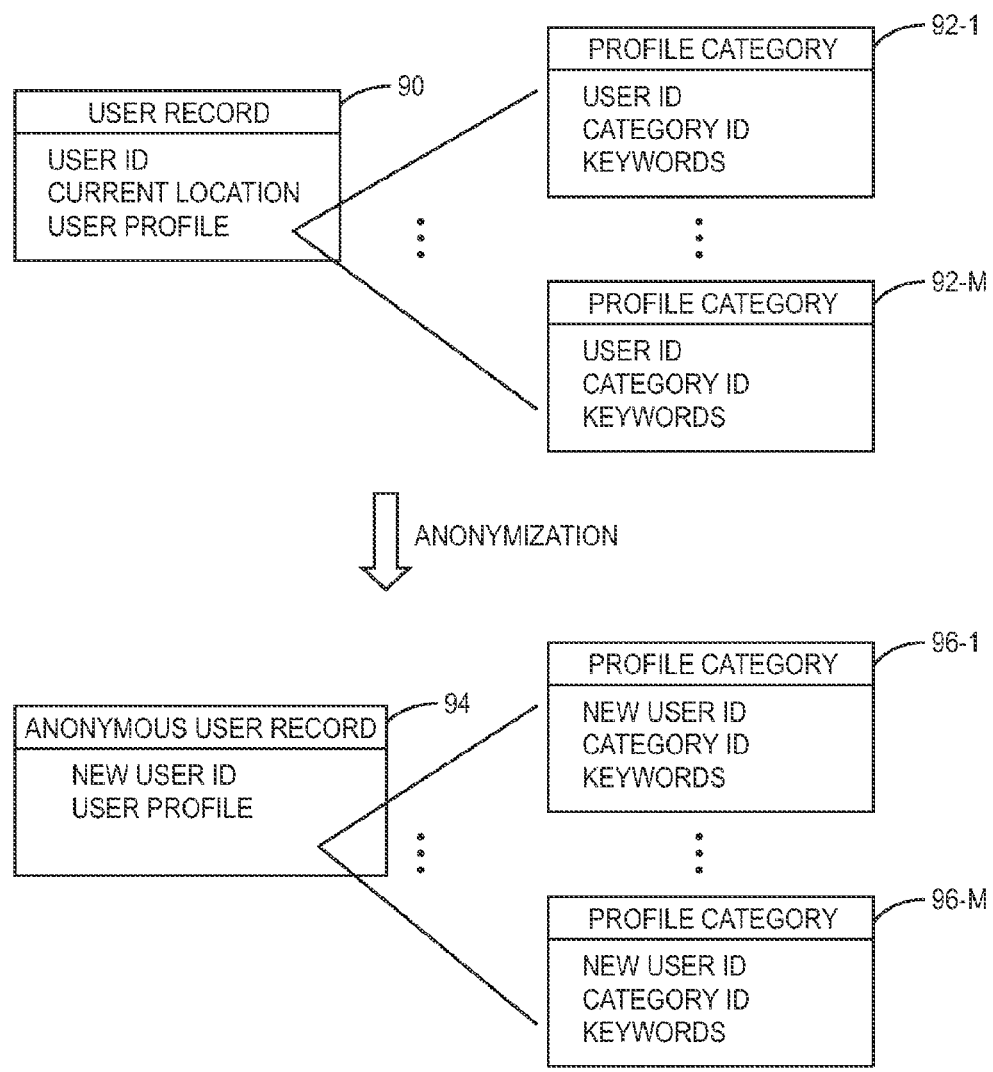
FIG. 10 graphically illustrates anonymization of a user record according to one embodiment of the present disclosure.

FIG. 10 graphically illustrates one embodiment of the anonymization process of step 1302 of FIG. 9. In this embodiment, anonymization is performed by creating anonymous user records for the users in the lists of users for the location buckets. The anonymous user records are not connected back to the users 20-1 through 20-N. More specifically, as illustrated in FIG. 10, each user in the lists of users for the location buckets has a corresponding user record 90. The user record 90 includes a unique user identifier (ID) for the user, the current location of the user, and the user profile of the user. The user profile includes keywords for each of a number of profile categories, which are stored in corresponding profile category records 92-1 through 92-M. Each of the profile category records 92-1 through 92-M includes a user ID for the corresponding user which may be the same user ID used in the user record 90, a category ID, and a list of keywords for the profile category.

For anonymization, an anonymous user record 94 is created from the user record 90. In the anonymous user record 94, the user ID is replaced with a new user ID that is not connected back to the user, which is also referred to herein as an anonymous user ID. This new user ID is different than any other user ID used for anonymous user records created from the user record of the user for any previous or subsequent time periods. In this manner, anonymous user records for a single user created over time cannot be linked to one another.

In addition, anonymous profile category records 96-1 through 96-M are created for the profile category records 92-1 through 92-M. In the anonymous profile category records 96-1 through 96-M, the user ID is replaced with a new user ID, which may be the same new user ID included in the anonymous user record 94. The anonymous profile category records 96-1 through 96-M include the same category IDs and lists of keywords as the corresponding profile category records 92-1 through 92-M. Note that the location of the user is not stored in the anonymous user record 94. With respect to location, it is sufficient that the anonymous user record 94 is linked to a location bucket.

In another embodiment, the history manager 56 performs anonymization in a manner similar to that described above with respect to FIG. 10. However, in this embodiment, the profile category records for the group of users in a location bucket, or the group of users in a number of location buckets representing a node in a quadtree data structure (see below), may be selectively randomized among the anonymous user records of those users. In other words, each anonymous user record would have a user profile including a selectively randomized set of profile category records (including keywords) from a cumulative list of profile category records for all of the users in the group.

In yet another embodiment, rather than creating anonymous user records 94 for the users in the lists maintained for the location buckets, the history manager 56 may perform anonymization by storing an aggregate user profile for each location bucket, or each group of location buckets representing a node in a quadtree data structure (see below). The aggregate user profile may include a list of all keywords and potentially the number of occurrences of each keyword in the user profiles of the corresponding group of users. In this manner, the data stored by the history manager 56 is not connected back to the users 20-1 through 20-N.

Figure 11:
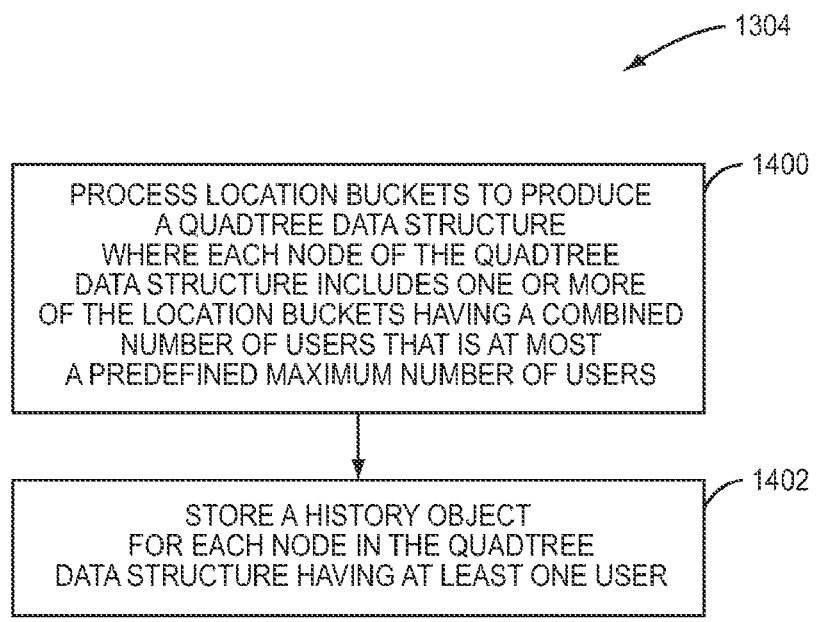
FIG. 11 is a flow chart for a quadtree based storage process that may be used to store anonymized user profile data for location buckets according to one embodiment of the present disclosure.

FIG. 11 is a flow chart illustrating the storing step (step 1304) of FIG. 9 in more detail according to one embodiment of the present disclosure. First, the history manager 56 processes the location buckets using a quadtree algorithm to produce a quadtree data structure, where each node of the quadtree data structure includes one or more of the location buckets having a combined number of users that is at most a predefined maximum number of users (step 1400). The history manager 56 then stores a history object for each node in the quadtree data structure having at least one user (step 1402).

Each history object includes location information, timing information, data, and quadtree data structure information. The location information included in the history object defines a combined geographic area of the location bucket(s) forming the corresponding node of the quadtree data structure. For example, the location information may be latitude and longitude coordinates for a northeast corner of the combined geographic area of the node of the quadtree data structure and a southwest corner of the combined geographic area for the node of the quadtree data structure. The timing information includes information defining a time window for the history object, which may be, for example, a start time for the corresponding time interval and an end time for the corresponding time interval. The data includes the anonymized user profile data for the users in the list(s) maintained for the location bucket(s) forming the node of the quadtree data structure for which the history object is stored. In addition, the data may include a total number of users in the location bucket(s) forming the node of the quadtree data structure. Lastly, the quadtree data structure information includes information defining a quadtree depth of the node in the quadtree data structure.

Figure 12:
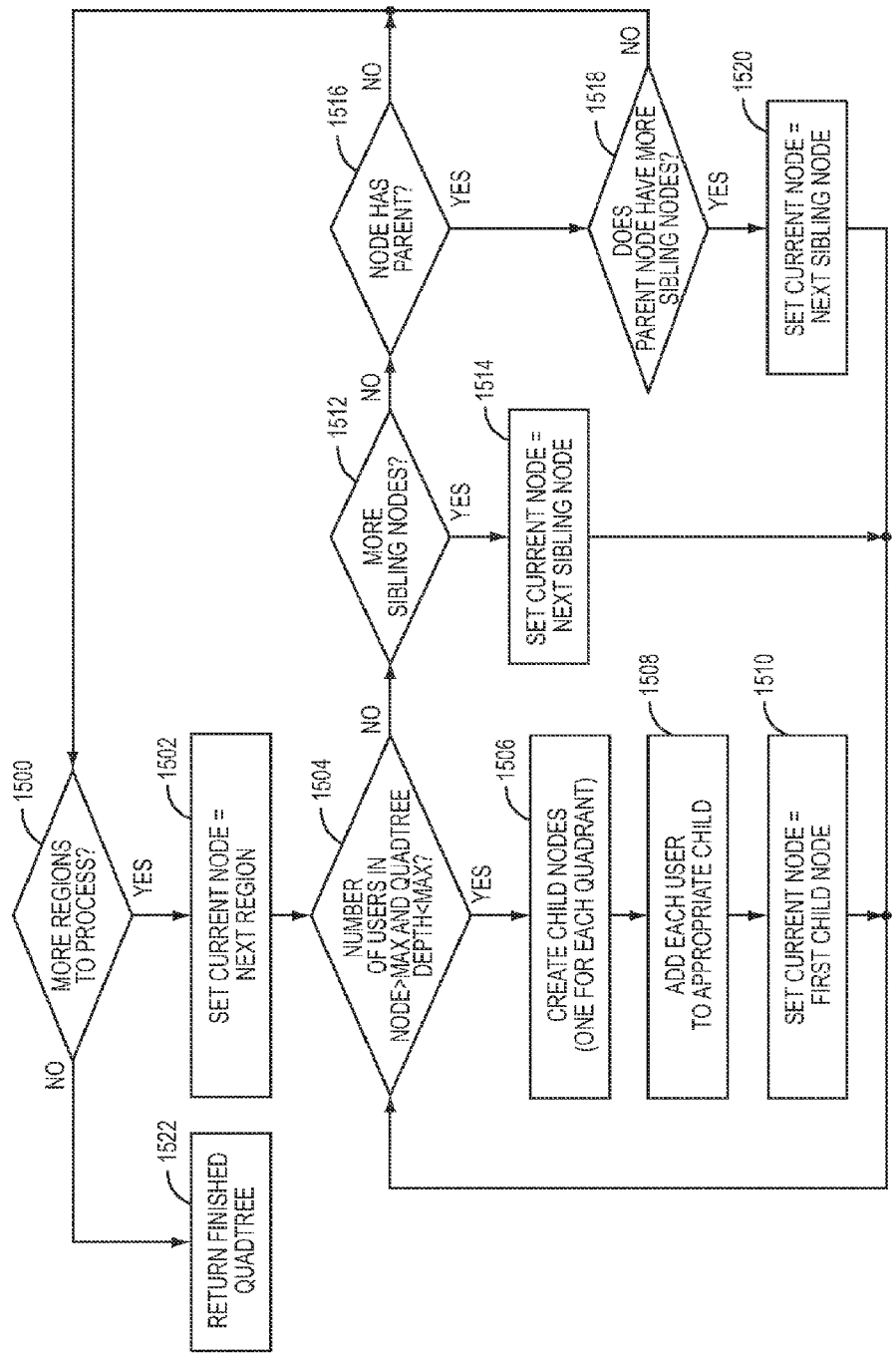
FIG. 12 is a flow chart illustrating a quadtree algorithm that may be used to process the location buckets for storage of the anonymized user profile data according to one embodiment of the present disclosure.

FIG. 12 is a flow chart illustrating a quadtree algorithm that may be used to process the location buckets to form the quadtree data structure in step 1400 of FIG. 11 according to one embodiment of the present disclosure. Initially, a geographic area served by the MAP server 12 is divided into a number of geographic regions, each including multiple location buckets. These geographic regions are also referred to herein as base quadtree regions. The geographic area served by the MAP server 12 may be, for example, a city, a state, a country, or the like. Further, the geographic area may be the only geographic area served by the MAP server 12 or one of a number of geographic areas served by the MAP server 12. Preferably, the base quadtree regions have a size of $2^n \times 2^n$ location buckets, where n is an integer greater than or equal to 1.

In order to form the quadtree data structure, the history manager 56 determines whether there are any more base quadtree regions to process (step 1500). If there are more base quadtree regions to process, the history manager 56 sets a current node to the next base quadtree region to process, which for the first iteration is the first base quadtree region (step 1502). The history manager 56 then determines whether the number of users in the current node is greater than a predefined maximum number of users and whether a current quadtree depth is less than a maximum quadtree depth (step 1504). In one embodiment, the maximum quadtree depth may be reached when the current node corresponds to a single location bucket. However, the maximum quadtree depth may be set such that the maximum quadtree depth is reached before the current node reaches a single location bucket.

If the number of users in the current node is greater than the predefined maximum number of users and the current quadtree depth is less than a maximum quadtree depth, the history manager 56 creates a number of child nodes for the current node (step 1506). More specifically, the history manager 56 creates a child node for each quadrant of the current node. The users in the current node are then assigned to the appropriate child nodes based on the location buckets in which the users are located (step 1508), and the current node is then set to the first child node (step 1510). At this point, the process returns to step 1504 and is repeated.

Once the number of users in the current node is not greater than the predefined maximum number of users or the maximum quadtree depth has been reached, the history manager 56 determines whether the current node has any more sibling nodes (step 1512). Sibling nodes are child nodes of the same parent node. If so, the history manager 56 sets the current node to the next sibling node of the current node (step 1514), and the process returns to step 1504 and is repeated. Once there are no more sibling nodes to process, the history manager 56 determines whether the current node has a parent node (step 1516). If so, since the parent node has already been processed, the history manager 56 determines whether the parent node has any sibling nodes that need to be processed (step 1518). If the parent node has any sibling nodes that need to be processed, the history manager 56 sets the next sibling node of the parent node to be processed as the current node (step 1520). From this point, the process returns to step 1504 and is repeated. Returning to step 1516, if the current node does not have a parent node, the process returns to step 1500 and is repeated until there are no more base quadtree regions to process. Once there are no more base quadtree regions to process, the finished quadtree data structure is returned to the process of FIG. 11 such that the history manager 56 can then store the history objects for nodes in the quadtree data structure having at least one user (step 1522).

Figure 13A:
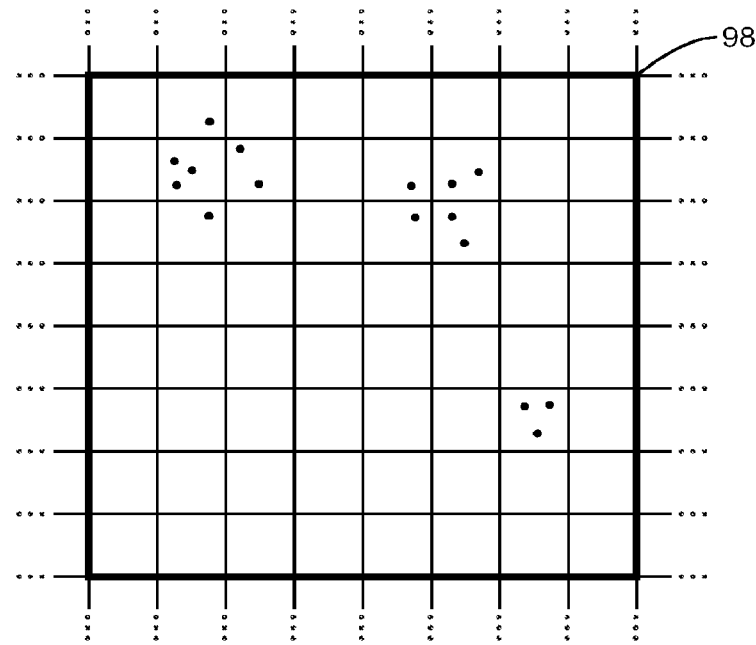
FIGS. 13A through 13E graphically illustrate the process of FIG. 12 for the generation of a quadtree data structure for one exemplary base quadtree region.
Figure 13B:
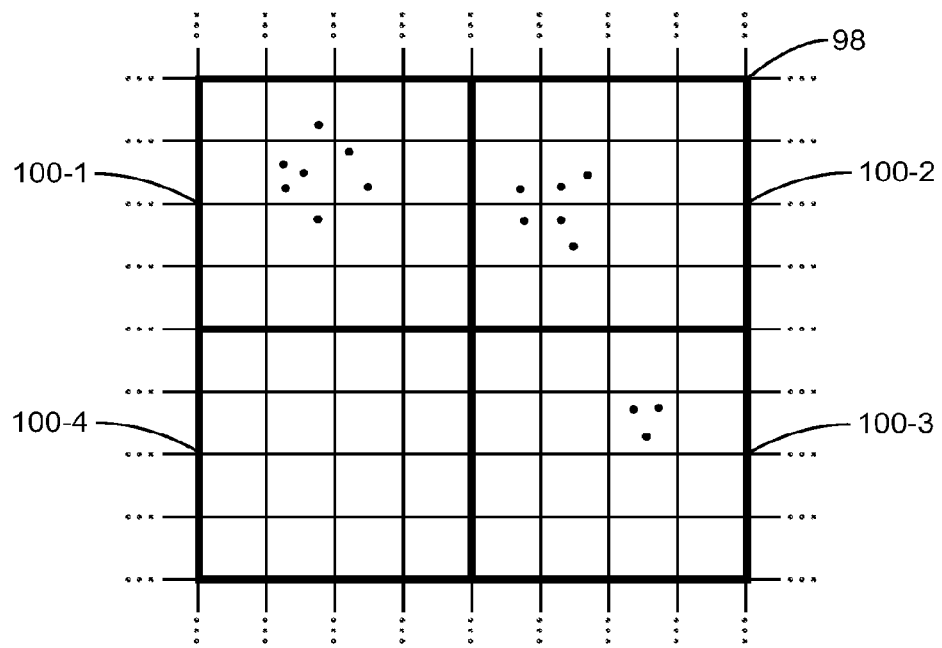

FIGS. 13A through 13E graphically illustrate the process of FIG. 12 for the generation of the quadtree data structure for one exemplary base quadtree region 98. FIG. 13A illustrates the base quadtree region 98. As illustrated, the base quadtree region 98 is an 8×8 square of location buckets, where each of the small squares represents a location bucket. First, the history manager 56 determines whether the number of users in the base quadtree region 98 is greater than the predetermined maximum number of users. In this example, the predetermined maximum number of users is 3. Since the number of users in the base quadtree region 98 is greater than 3, the history manager 56 divides the base quadtree region 98 into four child nodes 100-1 through 100-4, as illustrated in FIG. 13B.

Figure 13C:
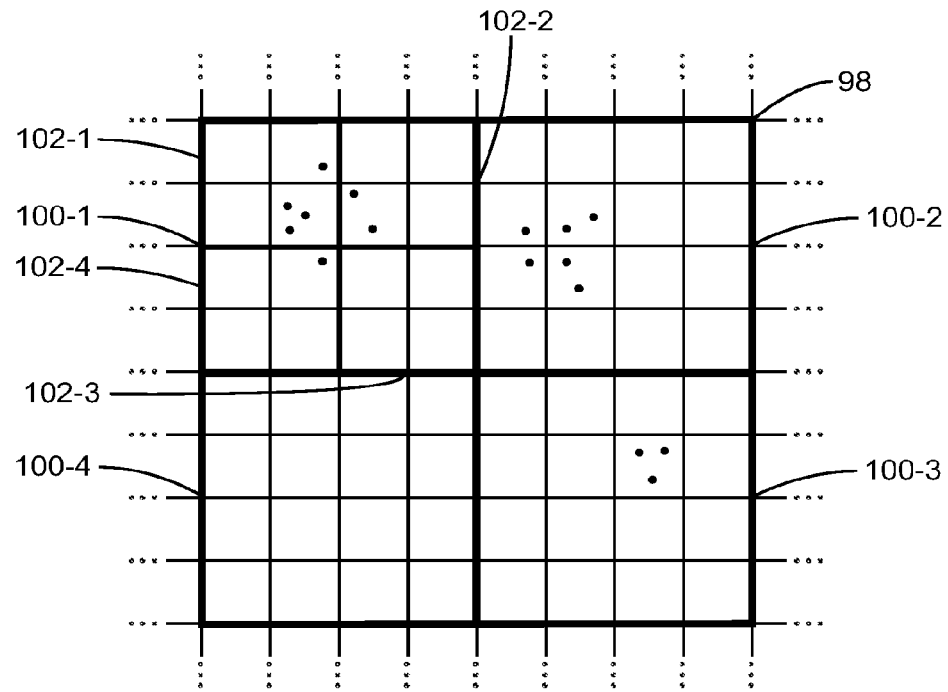
Figure 13D:
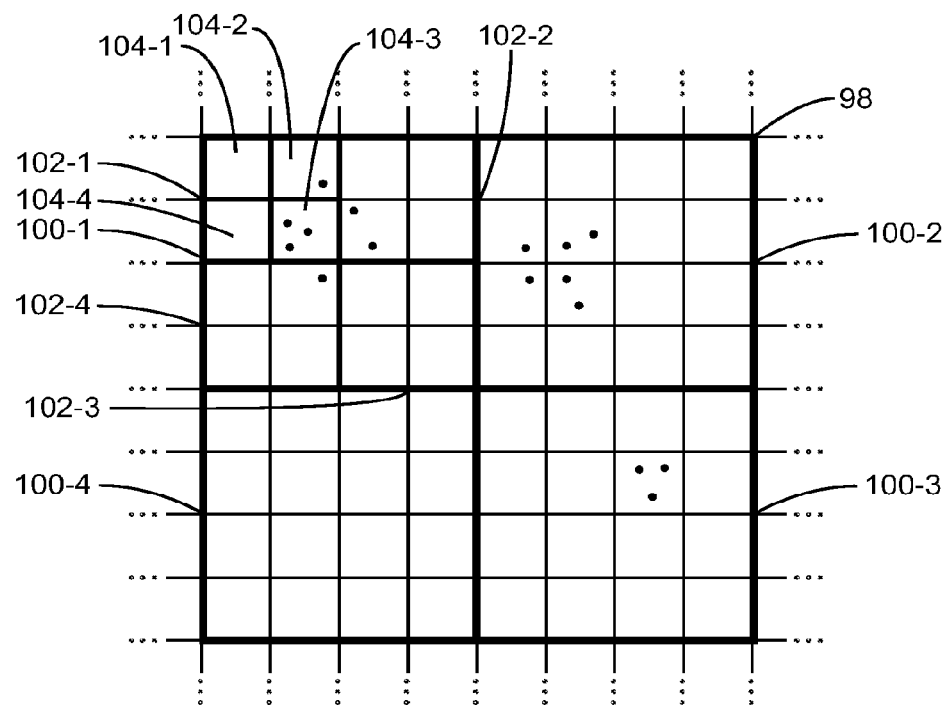

Next, the history manager 56 determines whether the number of users in the child node 100-1 is greater than the predetermined maximum, which again for this example is 3. Since the number of users in the child node 100-1 is greater than 3, the history manager 56 divides the child node 100-1 into four child nodes 102-1 through 102-4, as illustrated in FIG. 13C. The child nodes 102-1 through 102-4 are children of the child node 100-1. The history manager 56 then determines whether the number of users in the child node 102-1 is greater than the predetermined maximum number of users, which again is 3. Since there are more than 3 users in the child node 102-1, the history manager 56 further divides the child node 102-1 into four child nodes 104-1 through 104-N, as illustrated in FIG. 13D.

The history manager 56 then determines whether the number of users in the child node 104-1 is greater than the predetermined maximum number of users, which again is 3. Since the number of users in the child node 104-1 is not greater than the predetermined maximum number of users, the child node 104-1 is identified as a node for the finished quadtree data structure, and the history manager 56 proceeds to process the sibling nodes of the child node 104-1, which are the child nodes 104-2 through 104-4. Since the number of users in each of the child nodes 104-2 through 104-4 is less than the predetermined maximum number of users, the child nodes 104-2 through 104-4 are also identified as nodes for the finished quadtree data structure.

Once the history manager 56 has finished processing the child nodes 104-1 through 104-4, the history manager 56 identifies the parent node of the child nodes 104-1 through 104-4, which in this case is the child node 102-1. The history manager 56 then processes the sibling nodes of the child node 102-1, which are the child nodes 102-2 through 102-4. In this example, the number of users in each of the child nodes 102-2 through 102-4 is less than the predetermined maximum number of users. As such, the child nodes 102-2 through 102-4 are identified as nodes for the finished quadtree data structure.

Figure 13E:
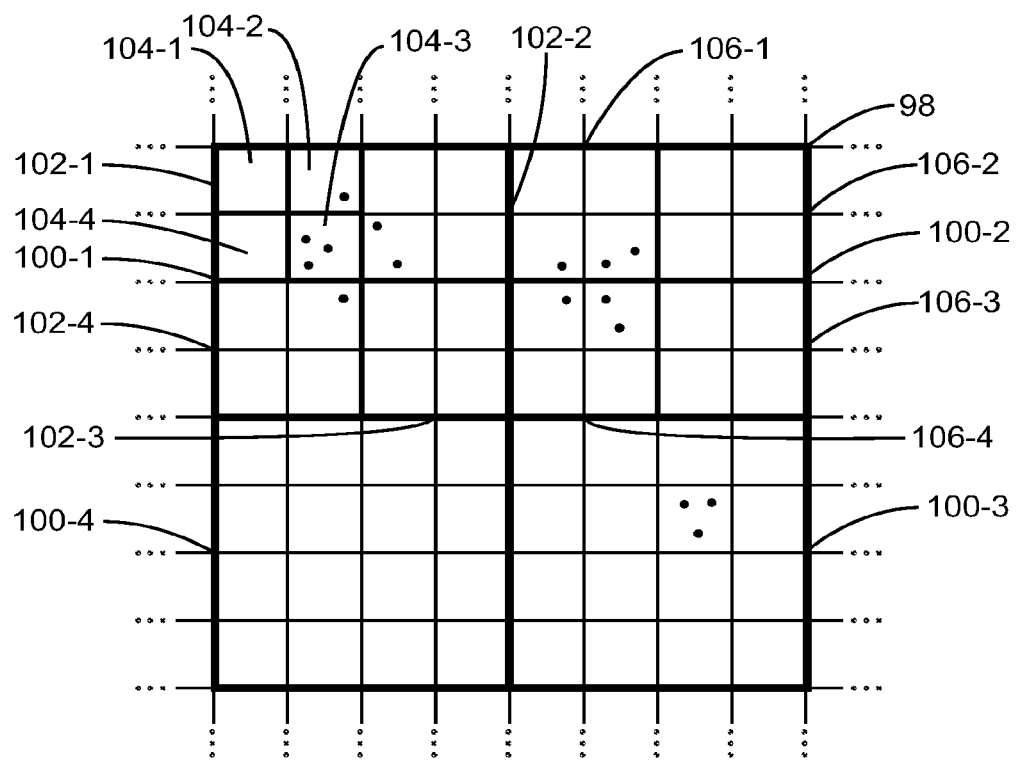

Once the history manager 56 has finished processing the child nodes 102-1 through 102-4, the history manager 56 identifies the parent node of the child nodes 102-1 through 102-4, which in this case is the child node 100-1. The history manager 56 then processes the sibling nodes of the child node 100-1, which are the child nodes 100-2 through 100-4. More specifically, the history manager 56 determines that the child node 100-2 includes more than the predetermined maximum number of users and, as such, divides the child node 100-2 into four child nodes 106-1 through 106-4, as illustrated in FIG. 13E. Because the number of users in each of the child nodes 106-1 through 106-4 is not greater than the predetermined maximum number of users, the child nodes 106-1 through 106-4 are identified as nodes for the finished quadtree data structure. Then, the history manager 56 proceeds to process the child nodes 100-3 and 100-4. Since the number of users in each of the child nodes 100-3 and 100-4 is not greater than the predetermined maximum number of users, the child nodes 100-3 and 100-4 are identified as nodes for the finished quadtree data structure. Thus, at completion, the quadtree data structure for the base quadtree region 98 includes the child nodes 104-1 through 104-4, the child nodes 102-2 through 102-4, the child nodes 106-1 through 106-4, and the child nodes 100-3 and 100-4, as illustrated in FIG. 13E.

As discussed above, the history manager 56 stores a history object for each of the nodes in the quadtree data structure including at least one user. As such, in this example, the history manager 56 stores history objects for the child nodes 104-2 and 104-3, the child nodes 102-2 and 102-4, the child nodes 106-1 and 106-4, and the child node 100-3. However, no history objects are stored for the nodes that do not have any users (i.e., the child nodes 104-1 and 104-4, the child node 102-3, the child nodes 106-2 and 106-3, and the child node 100-4).

Figure 14:
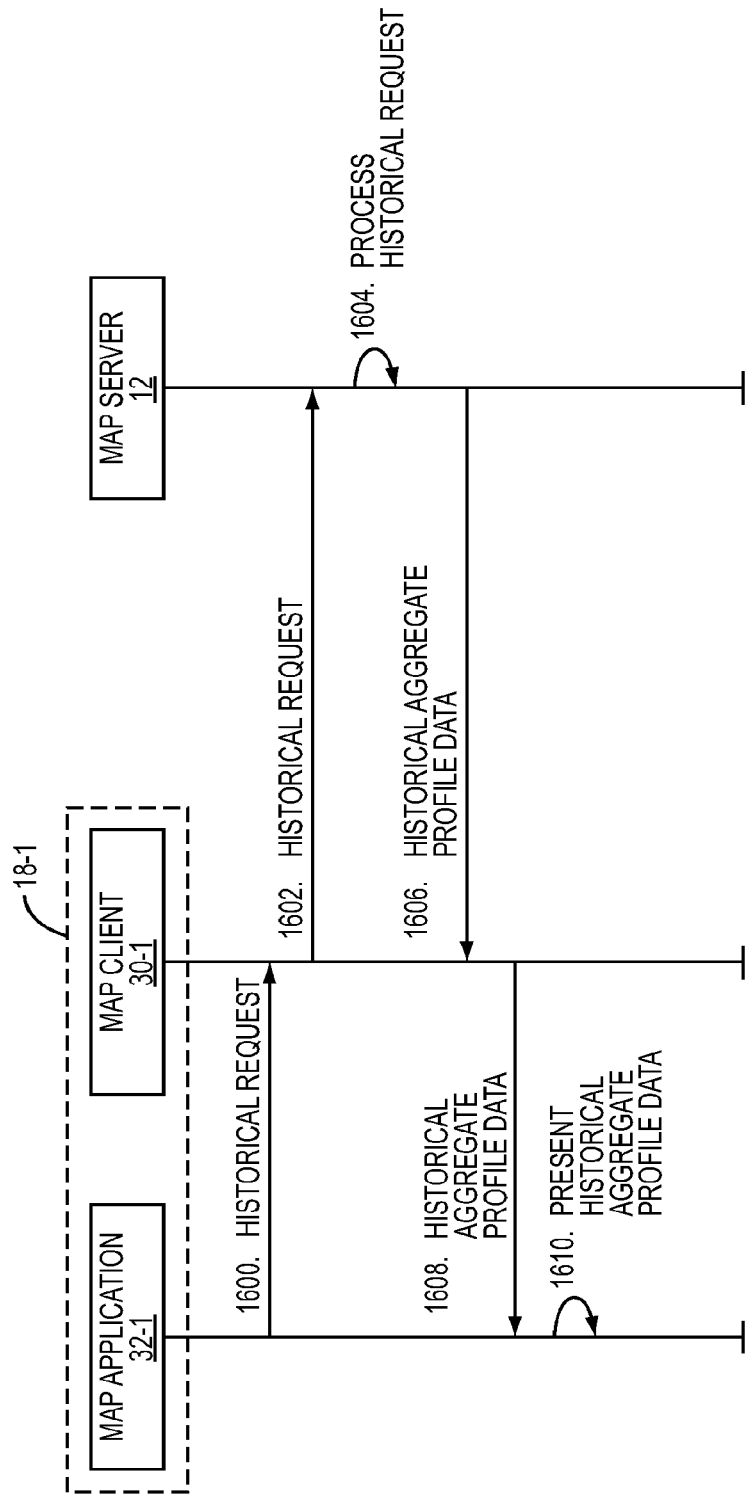
FIG. 14 illustrates the operation of the system of FIG. 1 wherein a mobile device is enabled to request and receive historical data from the MAP server according to one embodiment of the present disclosure.

FIG. 14 illustrates the operation of the system 10 of FIG. 1 wherein a mobile device is enabled to request and receive historical data from the MAP server 12 according to one embodiment of the present disclosure. As illustrated, in this embodiment, the MAP application 32-1 of the mobile device 18-1 sends a historical request to the MAP client 30-1 of the mobile device 18-1 (step 1600). In one embodiment, the historical request identifies either a POI or an AOI and a time window. A POI is a geographic point whereas an AOI is a geographic area. In one embodiment, the historical request is for a POI and a time window, where the POI is a POI corresponding to the current location of the user 20-1, a POI selected from a list of POIs defined by the user 20-1 of the mobile device 18-1, a POI selected from a list of POIs defined by the MAP application 32-1 or the MAP server 12, a POI selected by the user 20-1 from a map, a POI implicitly defined via a separate application (e.g., POI is implicitly defined as the location of the nearest Starbucks coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both.

In another embodiment, the historical request is for an AOI and a time window, where the AOI may be an AOI of a geographic area of a predefined shape and size centered at the current location of the user 20-1, an AOI selected from a list of AOIs defined by the user 20-1, an AOI selected from a list of AOIs defined by the MAP application 32-1 or the MAP server 12, an AOI selected by the user 20-1 from a map, an AOI implicitly defined via a separate application (e.g., AOI is implicitly defined as an area of a predefined shape and size centered at the location of the nearest Starbucks coffee house in response to the user 20-1 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 20-1, or both. Note that the POI or AOI of the historical request may be selected by the user 20-1 via the MAP application 32-1. In yet another embodiment, the MAP application 32-1 automatically uses the current location of the user 20-1 as the POI or as a center point for an AOI of a predefined shape and size.

The time window for the historical request may be relative to the current time. For example, the time window may be the last hour, the last day, the last week, the last month, or the like. Alternatively, the time window may be an arbitrary time window selected by the user 20-1 such as, for example, yesterday from 7 pm-9 pm, last Friday, last week, or the like. Note that while in this example the historical request includes a single POI or AOI and a single time window, the historical request may include multiple POIs or AOIs and/or multiple time windows.

In one embodiment, the historical request is made in response to user input from the user 20-1 of the mobile device 18-1. For instance, in one embodiment, the user 20-1 selects either a POI or an AOI and a time window and then instructs the MAP application 32-1 to make the historical request by, for example, selecting a corresponding button on a graphical user interface. In another embodiment, the historical request is made automatically in response to some event such as, for example, opening the MAP application 32-1.

Upon receiving the historical request from the MAP application 32-1, the MAP client 30-1 forwards the historical request to the MAP server 12 (step 1602). Note that the MAP client 30-1 may, in some cases, process the historical request from the MAP application 32-1 before forwarding the historical request to the MAP server 12. For example, if the historical request from the MAP application 32-1 is for multiple POIs/AOIs and/or for multiple time windows, the MAP client 30-1 may process the historical request from the MAP application 32-1 to produce multiple historical requests to be sent to the MAP server 12. For instance, a separate historical request may be produced for each POI/AOI and time window combination. However, for this discussion, the historical request is for a single POI or AOI for a single time window.

Upon receiving the historical request from the MAP client 30-1, the MAP server 12 processes the historical request (step 1604). More specifically, the historical request is processed by the history manager 56 of the MAP server 12. First, the history manager 56 obtains history objects that are relevant to the historical request from the datastore 64 of the MAP server 12. The relevant history objects are those recorded for locations relevant to the POI or AOI and the time window for the historical request. The history manager 56 then processes the relevant history objects to provide historical aggregate profile data for the POI or AOI in a time context and/or a geographic context. In this embodiment, the historical aggregate profile data is based on the user profiles of the anonymous user records in the relevant history objects as compared to the user profile of the user 20-1 or a select subset thereof. In another embodiment, the historical aggregate profile data is based on the user profiles of the anonymous user records in the relevant history objects as compared to a target user profile defined or otherwise specified by the user 20-1.

As discussed below in detail, for the time context, the history manager 56 divides the time window for the historical request into a number of time bands. Each time band is a fragment of the time window. Then, for each time band, the history manager 56 identifies a subset of the relevant history objects that are relevant to the time band (i.e., history objects recorded for time periods within the time band or that overlap the time band) and generates an aggregate profile for each of those history objects based on the user profiles of the anonymous user records in the history objects and the user profile, or a select subset of the user profile, of the user 20-1. Then, the history manager 56 averages or otherwise combines the aggregate profiles for the history objects relevant to the time band. The resulting data for the time bands forms historical aggregate profile data that is to be returned to the MAP client 30-1, as discussed below.

For the geographic context, the history manager 56 generates an average aggregate profile for each of a number of grids surrounding the POI or within the AOI. More specifically, history objects relevant to the POI or the AOI and the time window of the historical request are obtained. Then, the user profiles of the anonymous users in the relevant history objects are used to generate average aggregate profiles for a number of grids, or geographic regions, at or surrounding the POI or the AOI. These average aggregate profiles for the grids form historical aggregate profile data that is to be returned to the MAP client 30-1, as discussed below.

Once the MAP server 12 has processed the historical request, the MAP server 12 returns the resulting historical aggregate profile data to the MAP client 30-1 (step 1606). As discussed above, the historical aggregate profile data may be in a time context or a geographic context. In an alternative embodiment, the data returned to the MAP client 30-1 may be raw historical data. The raw historical data may be the relevant history objects or data from the relevant history objects such as, for example, the user records in the relevant history objects, the user profiles of the anonymous user records in the relevant history objects, or the like.

Upon receiving the historical aggregate profile data, the MAP client 30-1 passes the historical aggregate profile data to the MAP application 32-1 (step 1608). Note that in an alternative embodiment where the data returned by the MAP server 12 is raw historical data, the MAP client 30-1 may process the raw historical data to provide desired data. For example, the MAP client 30-1 may process the raw historical data in order to generate average aggregate profiles for time bands within the time window of the historical request and/or to generate average aggregate profiles for regions near the POI or within the AOI of the historical request in a manner similar to that described above. The MAP application 32-1 then presents the historical aggregate profile data to the user 20-1 (step 1610).

Figure 15A:
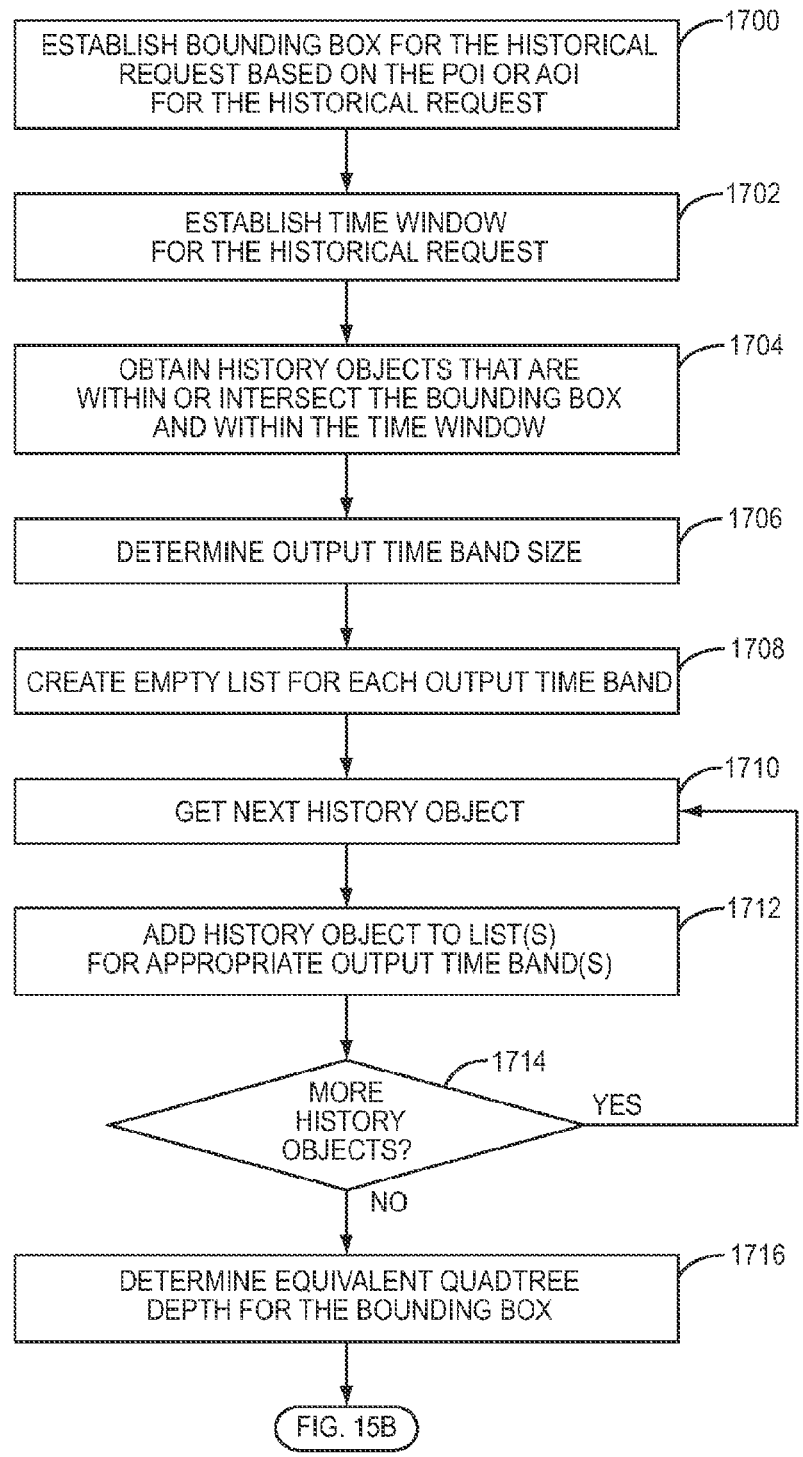
FIGS. 15A and 15B illustrate a flow chart for a process for generating historical data in a time context in response to a historical request from a mobile device according to one embodiment of the present disclosure.
Figure 15B:
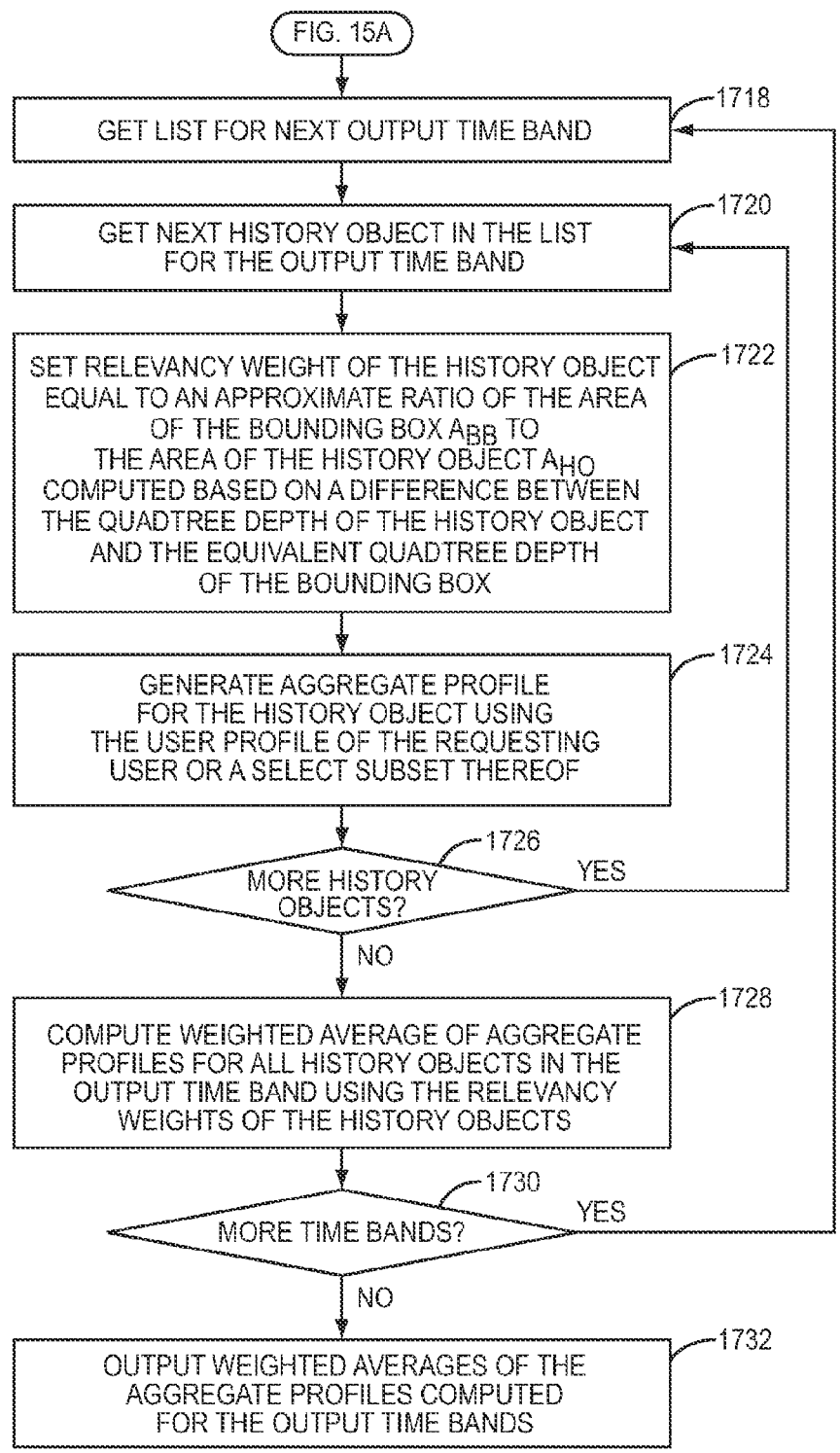

FIGS. 15A and 15B illustrate a flow chart for a process for generating historical aggregate profile data in a time context according to one embodiment of the present disclosure. First, upon receiving a historical request, the history manager 56 establishes a bounding box for the historical request based on the POI or the AOI for the historical request (step 1700). Note that while a bounding box is used in this example, other geographic shapes may be used to define a bounding region for the historical request (e.g., a bounding circle). In this embodiment, the historical request is from a mobile device of a requesting user, which in this example is the user 20-1. If the historical request is for a POI, the bounding box is a geographic region corresponding to or surrounding the POI. For example, the bounding box may be a square geographic region of a predefined size centered on the POI. If the historical request is for an AOI, the bounding box is the AOI. In addition to establishing the bounding box, the history manager 56 establishes a time window for the historical request (step 1702). For example, if the historical request is for the last week and the current date and time are Sep. 17, 2009 at 10:00 pm, the history manager 56 may generate the time window as Sep. 10, 2009 at 10:00 pm through Sep. 17, 2009 at 10:00 pm.

Next, the history manager 56 obtains history objects relevant to the bounding box and the time window for the historical request from the datastore 64 of the MAP server 12 (step 1704). The relevant history objects are history objects recorded for time periods within or intersecting the time window and for locations, or geographic areas, within or intersecting the bounding box for the historical request. The history manager 56 also determines an output time band size (step 1706). In one exemplary embodiment, the output time band size is $\frac{1}{100}^{th}$ of the amount of time from the start of the time window to the end of the time window for the historical request. For example, if the amount of time in the time window for the historical request is one week, the output time band size may be set to $\frac{1}{100}^{th}$ of a week, which is 1.68 hours or 1 hour and 41 minutes.

The history manager 56 then sorts the relevant history objects into the appropriate output time bands of the time window for the historical request. More specifically, in this embodiment, the history manager 56 creates an empty list for each of output time band of the time window (step 1708). Then, the history manager 56 gets the next history object from the history objects identified in step 1704 as being relevant to the historical request (step 1710) and adds that history object to the list(s) for the appropriate output time band(s) (step 1712). Note that if the history object is recorded for a time period that overlaps two or more of the output time bands, then the history object may be added to all of the output time bands to which the history object is relevant. The history manager 56 then determines whether there are more relevant history objects to sort into the output time bands (step 1714). If so, the process returns to step 1710 and is repeated until all of the relevant history objects have been sorted into the appropriate output time bands.

Once sorting is complete, the history manager 56 determines an equivalent depth of the bounding box ($D_{BB}$) within the quadtree data structures used to store the history objects (step 1716). More specifically, the area of the base quadtree region (e.g., the base quadtree region 98) is referred to as $A_{BASE}$. Then, at each depth of the quadtree, the area of the corresponding quadtree nodes is $(\frac{1}{4})^{D}*A_{BASE}$. In other words, the area of a child node is $\frac{1}{4}^{th}$ of the area of the parent node of that child node. The history manager 56 determines the equivalent depth of the bounding box ($D_{BB}$) by determining a quadtree depth at which the area of the corresponding quadtree nodes most closely matches an area of the bounding box ($A_{BB}$).

Note that equivalent quadtree depth of the bounding box ($D_{BB}$) determined in step 1716 is used below in order to efficiently determine the ratios of the area of the bounding box ($A_{BB}$) to areas of the relevant history objects ($A_{HO}$). However, in an alternative embodiment, the ratios of the area of the bounding box ($A_{BB}$) to the areas of the relevant history objects ($A_{HO}$) may be otherwise computed, in which case step 1716 would not be needed.

At this point, the process proceeds to FIG. 15B where the history manager 56 gets the list for the next output time band of the time window for the historical request (step 1718). The history manager 56 then gets the next history object in the list for the output time band (step 1720). Next, the history manager 56 sets a relevancy weight for the history object, where the relevancy weight is indicative of a relevancy of the history object to the bounding box (step 1722). For instance, a history object includes anonymized user profile data for a corresponding geographic area. If that geographic area is within or significantly overlaps the bounding box, then the history object will have a high relevancy weight. However, if the geographic area only overlaps the bounding box slightly, then the history object will have a low relevancy weight. In this embodiment, the relevancy weight for the history object is set to an approximate ratio of the area of the bounding box ($A_{BB}$) to an area of the history object ($A_{HO}$) computed based on a difference between the quadtree depth of the history object ($D_{HO}$) and the equivalent quadtree depth of the bounding box ($D_{EQ}$). The quadtree depth of the history object ($D_{HO}$) is stored in the history object. More specifically, in one embodiment, the relevancy weight of the history object is set according to the following:

$$\text{relevancy} = \frac{A_{BB}}{A_{HO}} \cong \left(\frac{1}{4}\right)^{D_{HO}-D_{BB}}, \text{ for } D_{HO} > D_{BB}, \text{ and}$$

$$\text{relevancy} = 1, \text{ for } D_{HO} \leq D_{BB}.$$

Next, the history manager 56 generates an aggregate profile for the history object using the user profile of the requesting user, which for this example is the user 20-1, or a select subset thereof (step 1724). Note that the requesting user 20-1 may be enabled to select a subset of his user profile to be compared to the user profiles of the anonymous user records in the history objects by, for example, selecting one or more desired profile categories. In order to generate the aggregate profile for the history object, the history manager 56 compares the user profile of the user 20-1, or the select subset thereof, to the user profiles of the anonymous user records stored in the history object. The resulting aggregate profile for the history object includes a number of user matches and a total number of users. In the embodiment where user profiles include lists of keywords for a number of profile categories, the number of user matches is the number of anonymous user records in the history object having user profiles that include at least one keyword that matches at least one keyword in the user profile of the user 20-1 or at least one keyword in the select subset of the user profile of the user 20-1. The total number of users is the total number of anonymous user records in the history object. In addition or alternatively, the aggregate profile for the history object may include a list of keywords from the user profile of the user 20-1 or the select subset of the user profile of the user 20-1 having at least one user match. Still further, the aggregate profile for the history object may include the number of user matches for each of the keywords from the user profile of the user 20-1 or the select subset of the user profile of the user 20-1 having at least one user match.

The history manager 56 then determines whether there are more history objects in the list for the output time band (step 1726). If so, the process returns to step 1720 and is repeated until all of the history objects in the list for the output time band have been processed. Once all of the history objects in the list for the output time band have been processed, the history manager 56 combines the aggregate profiles of the history objects in the output time band to provide a combined aggregate profile for the output time band. More specifically, in this embodiment, the history manager 56 computes a weighted average of the aggregate profiles for the history objects in the output time band using the relevancy weights of the history objects (step 1728). In one embodiment, the aggregate profile of each of the history objects includes the number of user matches for the history object and the total number of users for the history object. In this embodiment, the weighted average of the aggregate profiles of the history objects in the output time band (i.e., the average aggregate profile for the output time band) includes the weighted average of the number of user matches for all of the history objects in the output time band, which may be computed as:

$$\text{user\_matches}_{AVG} = \frac{\sum_{i=1}^{n} (\text{relevancy}_i \cdot \text{number\_of\_user\_matches}_i)}{\sum_{i=1}^{n} \text{relevancy}_i},$$

where $\text{relevancy}_i$ is the relevancy weight computed in step 1722 for the i-th history object, $\text{number\_of\_user\_matches}_i$ is the number of user matches from the aggregate profile of the i-th history object, and n is the number of history objects in the list for the output time band. In a similar manner, in this embodiment, the average aggregate profile for the output time band includes the weighted average of the total number of users for all of the history objects in the output time band, which may be computed as:

$$\text{total\_users}_{AVG} = \frac{\sum_{i=1}^{n} (\text{relevancy}_i \cdot \text{total\_user}_i)}{\sum_{i=1}^{n} \text{relevancy}_i},$$

where $\text{relevancy}_i$ is the relevancy weight computed in step 1722 for the i-th history object, $\text{total\_users}_i$ is the total number of users from the aggregate profile of the i-th history object, and n is the number of history objects in the list for the output time band. In addition or alternatively, the average aggregate profile for the output time band may include the weighted average of the ratio of user matches to total users for all of the history objects in the output time band, which may be computed as:

$$\frac{\text{user\_matches}}{\text{total\_users}}_{AVG} = \frac{\sum_{i=1}^{n} \left( \text{relevancy}_i \cdot \frac{\text{number\_of\_user\_matches}_i}{\text{total\_user}_i} \right)}{\sum_{i=1}^{n} \text{relevancy}_i},$$

where $\text{relevancy}_i$ is the relevancy weight computed in step 1722 for the i-th history object, $\text{number\_of\_user\_matches}_i$ is the number of user matches from the aggregate profile of the i-th history object, $\text{total\_users}_i$ is the total number of users from the aggregate profile of the i-th history object, and n is the number of history objects in the list for the output time band.

In addition or alternatively, if the aggregate profiles for the history objects in the output time band include the number of user matches for each keyword in the user profile of the user 20-1, or the select subset thereof, having at least one user match, the average aggregate profile for the output time band may include a weighted average of the number of user matches for each of those keywords, which may be computed as:

$$\text{user\_matches}_{KEYWORD\_j,AVG} = \frac{\sum_{i=1}^{n} (\text{relevancy}_i \cdot \text{number\_of\_user\_matches}_{KEYWORD\_j,i})}{\sum_{i=1}^{n} \text{relevancy}_i},$$

where $\text{relevancy}_i$ is the relevancy weight computed in step 1722 for the i-th history object, $\text{number\_of\_user\_matches}_{KEYWORD\_j,i}$ is the number of user matches for the j-th keyword for the i-th history object, and n is the number of history objects in the list for the output time band. In addition or alternatively, the average aggregate profile for the output time band may include the weighted average of the ratio of the user matches to total users for each keyword, which may be computed as:

$$\frac{\text{user\_matches}}{\text{total\_users}}_{KEYWORD\_j,AVG} = \frac{\sum_{i=1}^{n} \left( \text{relevancy}_i \cdot \frac{\text{number\_of\_user\_matches}_{KEYWORD\_j,i}}{\text{total\_user}_i} \right)}{\sum_{i=1}^{n} \text{relevancy}_i},$$

where $\text{relevancy}_i$ is the relevancy weight computed in step 1722 for the i-th history object, $\text{number\_of\_user\_matches}_{KEYWORD\_j,i}$ is the number of user matches for the j-th keyword for the i-th history object, $\text{total\_users}_i$ is the total number of users from the aggregate profile of the i-th history object, and n is the number of history objects in the list for the output time band.

Next, the history manager 56 determines whether there are more output time bands to process (step 1730). If so, the process returns to step 1718 and is repeated until the lists for all output time bands have been processed. Once all of the output time bands have been processed, the history manager 56 outputs the combined aggregate profiles for the output time bands. More specifically, in this embodiment, the history manager 56 outputs the weighted average aggregate profiles computed in step 1728 for the output time bands as the historical aggregate profile data to be returned to the mobile device 18-1 (step 1732).

Figure 16:
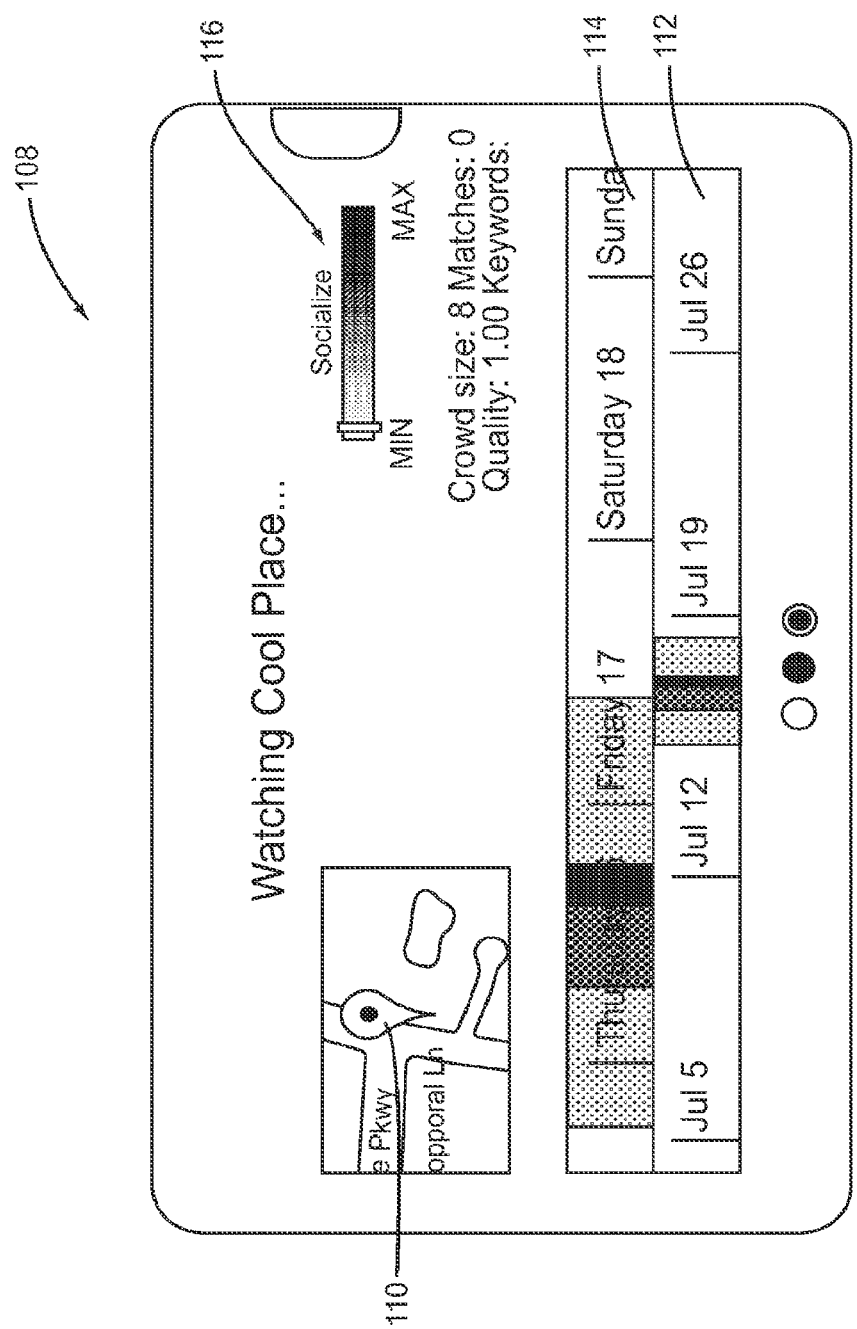
FIG. 16 is an exemplary Graphical User Interface (GUI) that may be provided by the MAP application of one of the mobile devices of FIG. 1 in order to present historical aggregate profile data in a time context according to one embodiment of the present disclosure.

FIG. 16 is an exemplary Graphical User Interface (GUI) 108 that may be provided by the MAP application 32-1 of the mobile device 18-1 (FIG. 1) in order to present historical aggregate profile data in a time context according to one embodiment of this disclosure. In operation, the MAP application 32-1 issues a historical request for a POI 110 in the manner described above. In response, the MAP server 12 uses the process of FIGS. 15A and 15B to generate historical aggregate profile data in response to the historical request in the time context. More specifically, the historical aggregate profile data includes an average aggregate profile for each of a number of output time bands within a time window established for the historical request. In this example, the time window is a four week period extending from the week of July $5^{th}$ to the week of July $26^{th}$.

Using the average aggregate profiles for the output time bands included in the historical aggregate profile data, the MAP application 32-1 generates a timeline 112 for the time window of the historical request. The timeline 112 is a graphical illustration of the average aggregate profiles for the output time bands. For example, if the average aggregate profile for each of the output time bands includes a weighted average of the number of user matches and a weighted average of the number of total users for the output time band, the timeline 112 may be indicative of the ratio of the weighted average of user matches to the weighted average of total users for each of the output time bands. In this example, the output time bands having a ratio of weighted average of user matches to weighted average of total users that is less than 0.25 are represented as having a low similarity, the output time bands having a ratio of weighted average of user matches to weighted average of total users that is in the range of 0.25-0.75 are represented as having varying degrees of intermediate similarity, and the output time bands having a ratio of weighted average of user matches to weighted average of total users that is greater than 0.75 are represented as having a high similarity. Note that output time bands for which there are no history objects may be grayed-out or otherwise indicated.

In addition, in this example, the GUI 108 also includes a second timeline 114 that zooms in on an area of the timeline 112 that includes the most activity or that includes the greatest number of output time bands having a high or medium similarity. Lastly, in this example, the GUI 108 includes an aggregate profile 116 for a crowd that is currently at the POI. Note that crowds and aggregate profiles for the crowds are discussed below in detail.

Figure 17A:
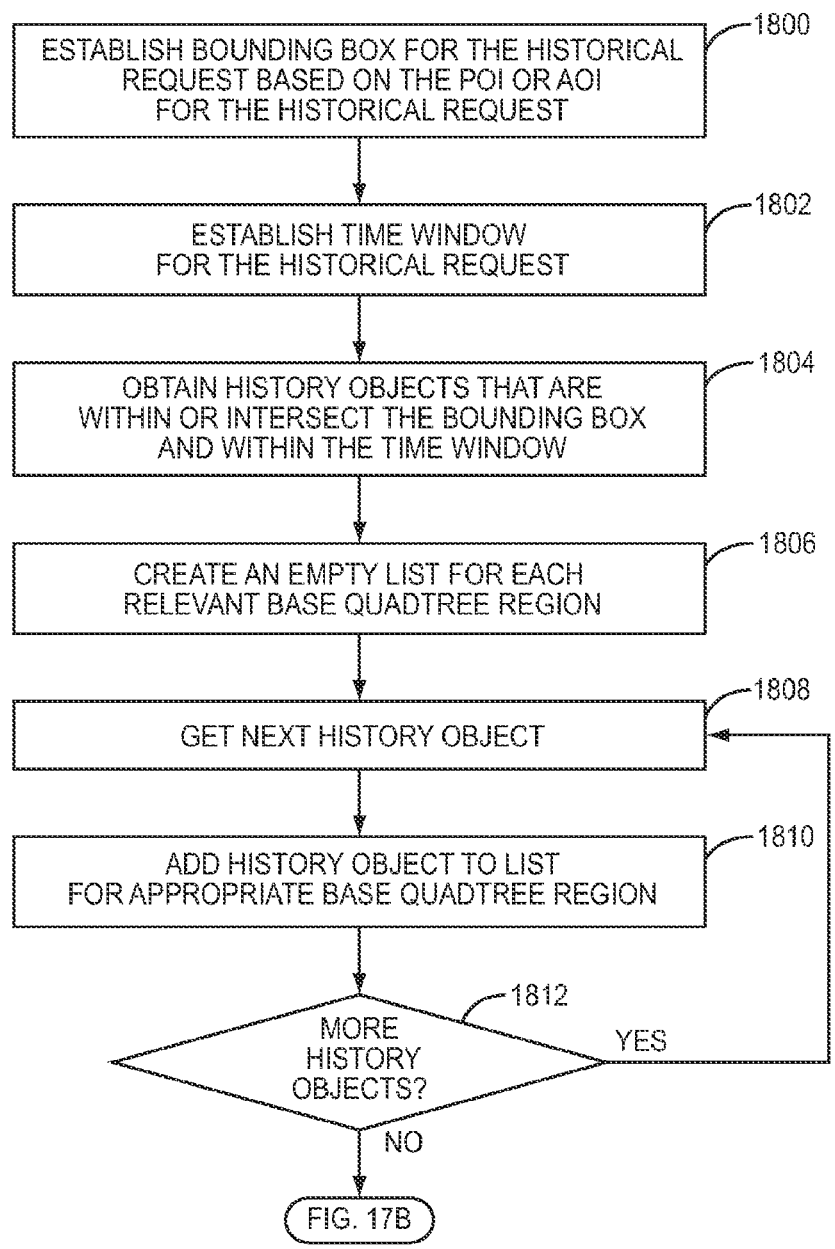
FIGS. 17A and 17B illustrate a flow chart for a process for generating historical data in a geographic context in response to a historical request from a mobile device according to one embodiment of the present disclosure.
Figure 17B:
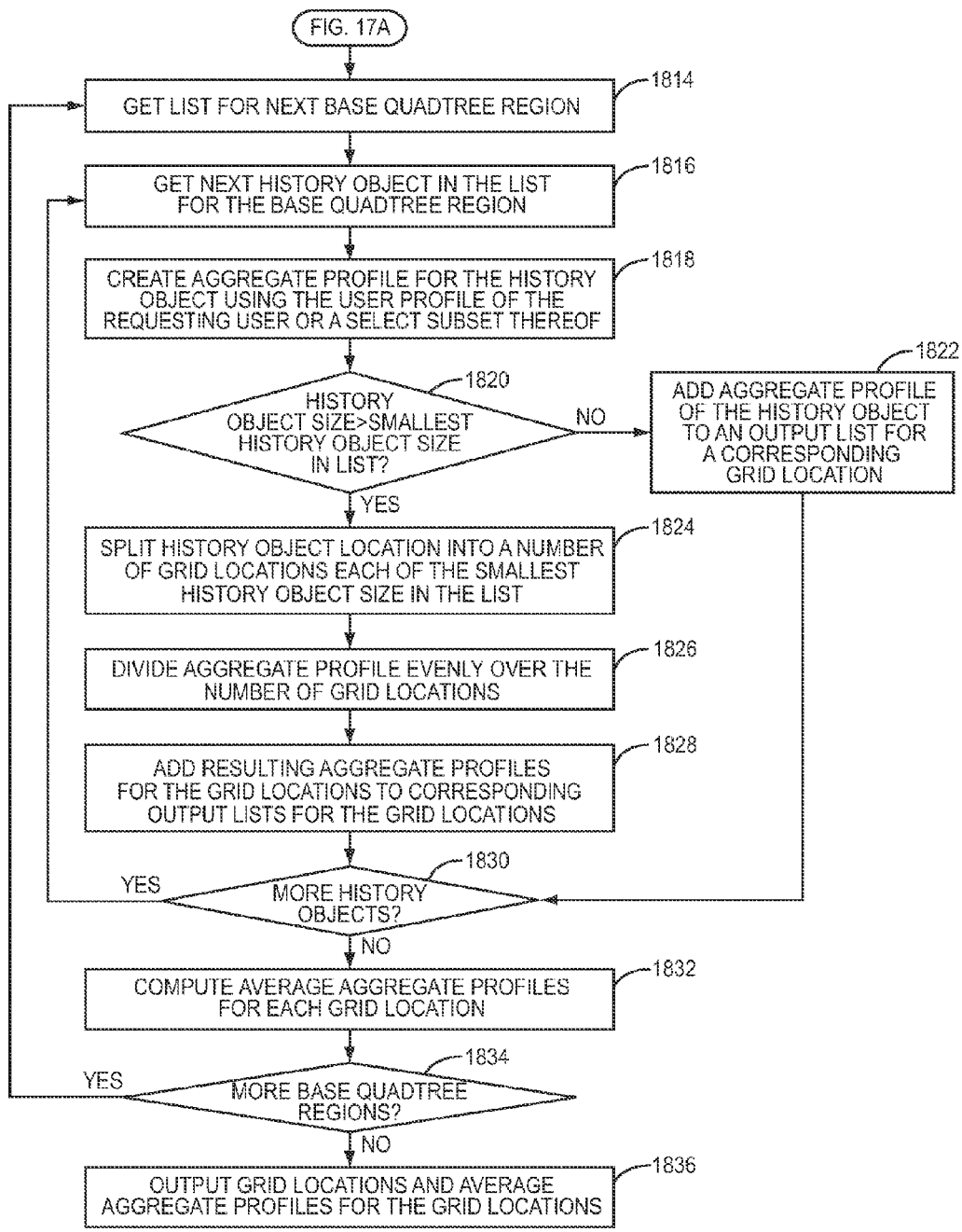

FIGS. 17A and 17B illustrate a flow chart of a process for generating historical aggregate profile data in a geographic context according to one embodiment of the present disclosure. First, upon receiving a historical request, the history manager 56 establishes a bounding box for the historical request based on the POI or the AOI for the historical request (step 1800). Note that while a bounding box is used in this example, other geographic shapes may be used to define a bounding region for the historical request (e.g., a bounding circle). In this embodiment, the historical request is from a mobile device of a requesting user, which in this example is the user 20-1. If the historical request is for a POI, the bounding box is a geographic region corresponding to or surrounding the POI. For example, the bounding box may be a square geographic region of a predefined size centered on the POI. If the historical request is for an AOI, the bounding box is the AOI. In addition to establishing the bounding box, the history manager 56 establishes a time window for the historical request (step 1802). For example, if the historical request is for the last week and the current date and time are Sep. 17, 2009 at 10:00 pm, the history manager 56 may generate the time window as Sep. 10, 2009 at 10:00 pm through Sep. 17, 2009 at 10:00 pm.

Next, the history manager 56 obtains history objects relevant to the bounding box and the time window of the historical request from the datastore 64 of the MAP server 12 (step 1804). The relevant history objects are history objects recorded for time periods within or intersecting the time window and for locations, or geographic areas, within or intersecting the bounding box for the historical request. The history manager 56 then sorts the relevant history objects into base quadtree regions. More specifically, in this embodiment, the history manager 56 creates an empty list for each relevant base quadtree region (step 1806). A relevant base quadtree region is a base quadtree region within which all or at least a portion of the bounding box is located. Therefore, for example, if a bounding box is located at the intersection of four base quadtree regions such that the bounding box overlaps a portion of each of the four base quadtree regions, then all four of the bounding boxes would be identified as relevant base quadtree regions. In contrast, if the bounding box is contained within a single base quadtree region, then that base quadtree region is the only relevant base quadtree region.

The history manager 56 then gets the next history object from the history objects identified in step 1804 as being relevant to the historical request (step 1808) and adds that history object to the list for the appropriate base quadtree region (step 1810). The history manager 56 then determines whether there are more relevant history objects to sort (step 1812). If so, the process returns to step 1808 and is repeated until all of the relevant history objects have been sorted into the appropriate base quadtree regions.

Once sorting is complete, the process proceeds to FIG. 17B. The following steps generally operate to divide each base quadtree region into a grid, where a size of each grid location is set to a smallest history record size of all the history objects sorted into the list for that base quadtree region. Using the history objects in the base quadtree region, aggregate profiles are generated for each of the grid locations covered by the history object. Then, a combined aggregate profile is generated for each grid location based on the aggregate profiles generated using the corresponding history objects.

More specifically, the history manager 56 gets the list for the next base quadtree region (step 1814). The history manager 56 then gets the next history object in the list for the base quadtree region (step 1816). Next, the history manager 56 creates an aggregate profile for the history object using the user profile of the requesting user, which in this example is the user 20-1, or a select subset of the user profile of the requesting user (step 1818). Note that the user 20-1 may be enabled to select a subset of his user profile to be used for aggregate profile creation by, for example, selecting one or more profile categories. In order to generate the aggregate profile for the history object, the history manager 56 compares the user profile of the user 20-1, or the select subset thereof, to the user profiles of the anonymous user records stored in the history object. The resulting aggregate profile for the history object includes a number of user matches and a total number of users. In the embodiment where user profiles include lists of keywords for a number of profile categories, the number of user matches is the number of anonymous user records in the history object having user profiles that include at least one keyword that matches at least one keyword in the user profile of the user 20-1 or at least one keyword in the select subset of the user profile of the user 20-1. The total number of users is the total number of anonymous user records in the history object.

Next, the history manager 56 determines whether a size of the history object is greater than the smallest history object size in the list of history objects for the base quadtree region (step 1820). If not, the aggregate profile for the history object is added to an output list for the corresponding grid location for the base quadtree region (step 1822) and the process proceeds to step 1830. If the size of the history object is greater than the smallest history object size, the history manager 56 splits the geographic area, or location, of the history object into a number of grid locations each of the smallest history object size of all the history objects in the list for the base quadtree region (step 1824). The history manager 56 then divides the aggregate profile of the history object evenly over the grid locations for the history object (step 1826) and adds resulting aggregate profiles for the grid locations to output lists for those grid locations (step 1828). For example, if the geographic area of the history object is split into four grid locations and the aggregate profile for the history object includes eight user matches and sixteen total users, then the aggregate profile is divided evenly over the four grid locations such that each of the four grid locations is given an aggregate profile of two user matches and four total users.

The history manager 56 then determines whether there are more history objects to process for the base quadtree region (step 1830). If so, the process returns to step 1816 and is repeated until all of the history objects for the base quadtree region are processed. At that point, for each grid location in the base quadtree region having at least one aggregate profile in its output list, the history manager 56 combines the aggregate profiles in the output list for the grid location to provide a combined aggregate profile for the grid location. More specifically, in this embodiment, the history manager 56 computes average aggregate profiles for the grid locations for the base quadtree region (step 1832). In one embodiment, for each grid location, the average aggregate profile for the grid location includes an average number of user matches and an average total number of users for all of the aggregate profiles in the output list for that grid location.

Next, the history manager 56 determines whether there are more relevant base quadtree regions to process (step 1834). If so, the process returns to step 1814 and is repeated until all of the relevant base quadtree regions have been processed. At that point, the history manager 56 outputs the grid locations and the average aggregate profiles for the grid locations in each of the relevant base quadtree regions (step 1836). The grid locations and their corresponding average aggregate profiles form the historical aggregate profile data that is returned to the mobile device 18-1 of the user 20-1 in response to the historical request.

Figure 18:
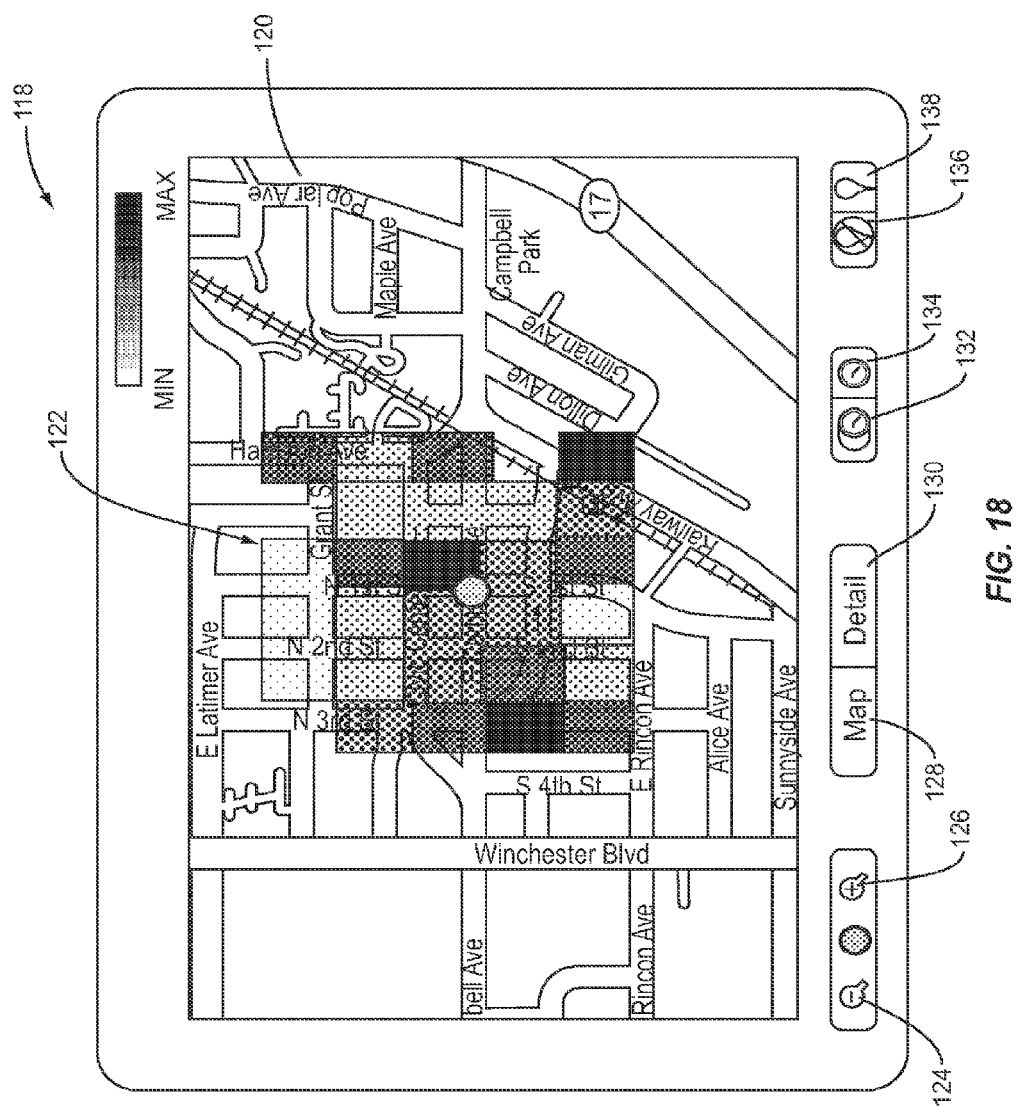
FIG. 18 illustrates an exemplary GUI that may be provided by the MAP application of one of the mobile devices of FIG. 1 to present historical data in the geographic context according to one embodiment of the present disclosure.

FIG. 18 illustrates an exemplary GUI 118 that may be provided by the MAP application 32-1 of the mobile device 18-1 (FIG. 1) to present historical aggregate profile data in the geographic context to the user 20-1 in response to a historical request. As illustrated, the GUI 118 includes a map 120 including a grid 122. The grid 122 provides graphical information indicative of aggregate profiles for grid locations returned by the MAP server 12 in response to a historical request. The GUI 118 also includes buttons 124 and 126 enabling the user 20-1 to zoom in or zoom out on the map 120, buttons 128 and 130 enabling the user 20-1 to toggle between the traditional map view as shown or a satellite map view, buttons 132 and 134 enabling the user 20-1 to switch between historical mode and a current mode (i.e., a view of current crowd data as discussed below in detail), and buttons 136 and 138 enabling the user 20-1 to hide or show POIs on the map 120.

It should be noted that while the aggregate profiles in FIGS. 15A through 18 are generated based on the user profile of the user 20-1 or a select subset of the user profile of the user 20-1, the aggregate profiles may alternatively be generated based on a target user profile defined or otherwise specified by the user 20-1. For example, the user 20-1 may define a target profile for a type of person with which the user 20-1 would like to interact. Then, by making a historical request with the target profile, the user 20-1 can learn whether people matching the target profile are historically located at a POI or an AOI.

Figure 19:
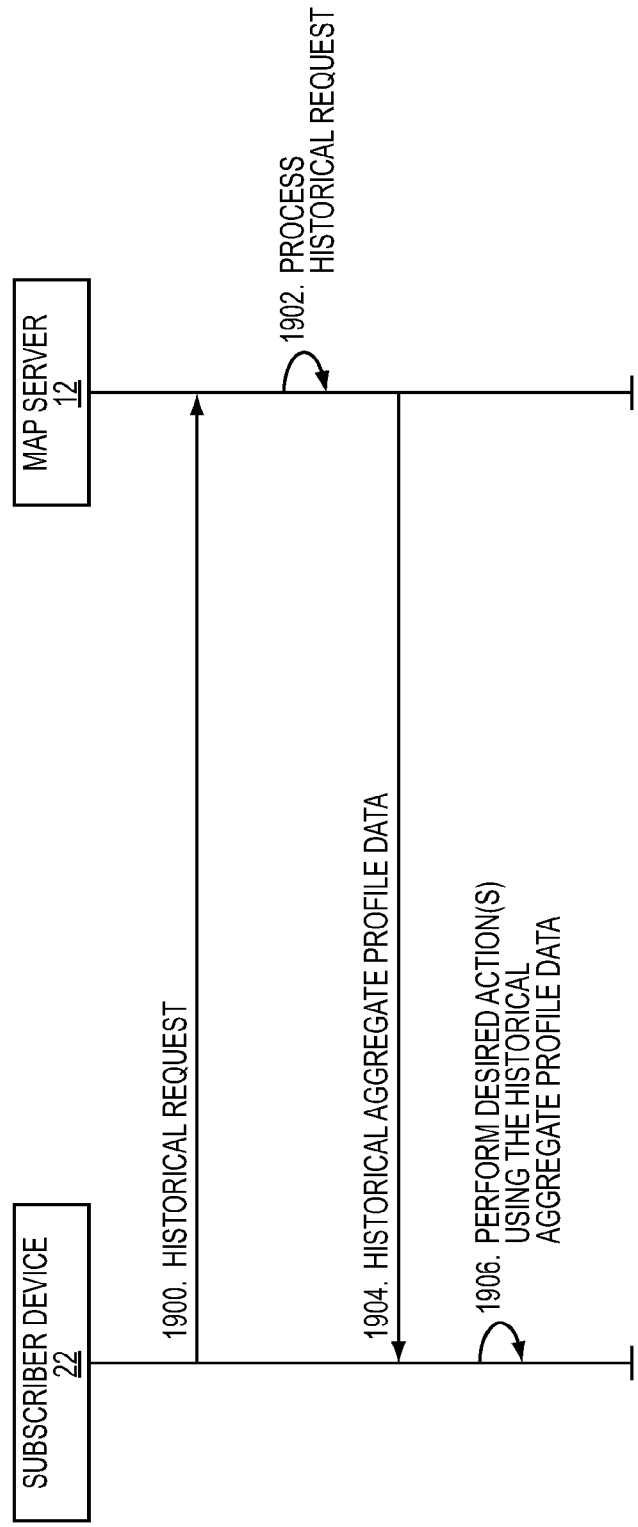
FIG. 19 illustrates the operation of the system of FIG. 1 wherein the subscriber device is enabled to request and receive historical data from the MAP server according to one embodiment of the present disclosure.

FIG. 19 illustrates the operation of the system 10 of FIG. 1 wherein the subscriber device 22 is enabled to request and receive historical aggregate profile data from the MAP server 12 according to one embodiment of the present disclosure. Note that, in a similar manner, the third-party service 26 may send historical requests to the MAP server 12. As illustrated, in this embodiment, the subscriber device 22 sends a historical request to the MAP server 12 (step 1900). The subscriber device 22 sends the historical request to the MAP server 12 via the web browser 38. In one embodiment, the historical request identifies either a POI or an AOI and a time window. The historical request may be made in response to user input from the subscriber 24 of the subscriber device 22 or made automatically in response to an event such as, for example, navigation to a website associated with a POI (e.g., navigation to a website of a restaurant).

Upon receiving the historical request, the MAP server 12 processes the historical request (step 1902). More specifically, as discussed above, the historical request is processed by the history manager 56 of the MAP server 12. First, the history manager 56 obtains history objects that are relevant to the historical request from the datastore 64 of the MAP server 12. The relevant history objects are those relevant to the POI or the AOI and the time window for the historical request. The history manager 56 then processes the relevant history objects to provide historical aggregate profile data for the POI or the AOI in a time context and/or a geographic context. In this embodiment, the historical aggregate profile data is based on comparisons of the user profiles of the anonymous user records in the relevant history objects to one another. In another embodiment, the aggregate profile data is based on comparisons of the user profiles of the anonymous user records in the relevant history objects and a target user profile.

Once the MAP server 12 has processed the historical request, the MAP server 12 returns the resulting historical aggregate profile data to the subscriber device 22 (step 1904). The historical aggregate profile data may be in the time context or the geographic context. In this embodiment where the historical aggregate profile data is to be presented via the web browser 38 of the subscriber device 22, the MAP server 12 formats the historical aggregate profile data in a suitable format before sending the historical aggregate profile data to the web browser 38 of the subscriber device 22. Upon receiving the historical aggregate profile data, the web browser 38 of the subscriber device 22 presents the historical aggregate profile data to the user 20-1 (step 1906).

Figure 20A:
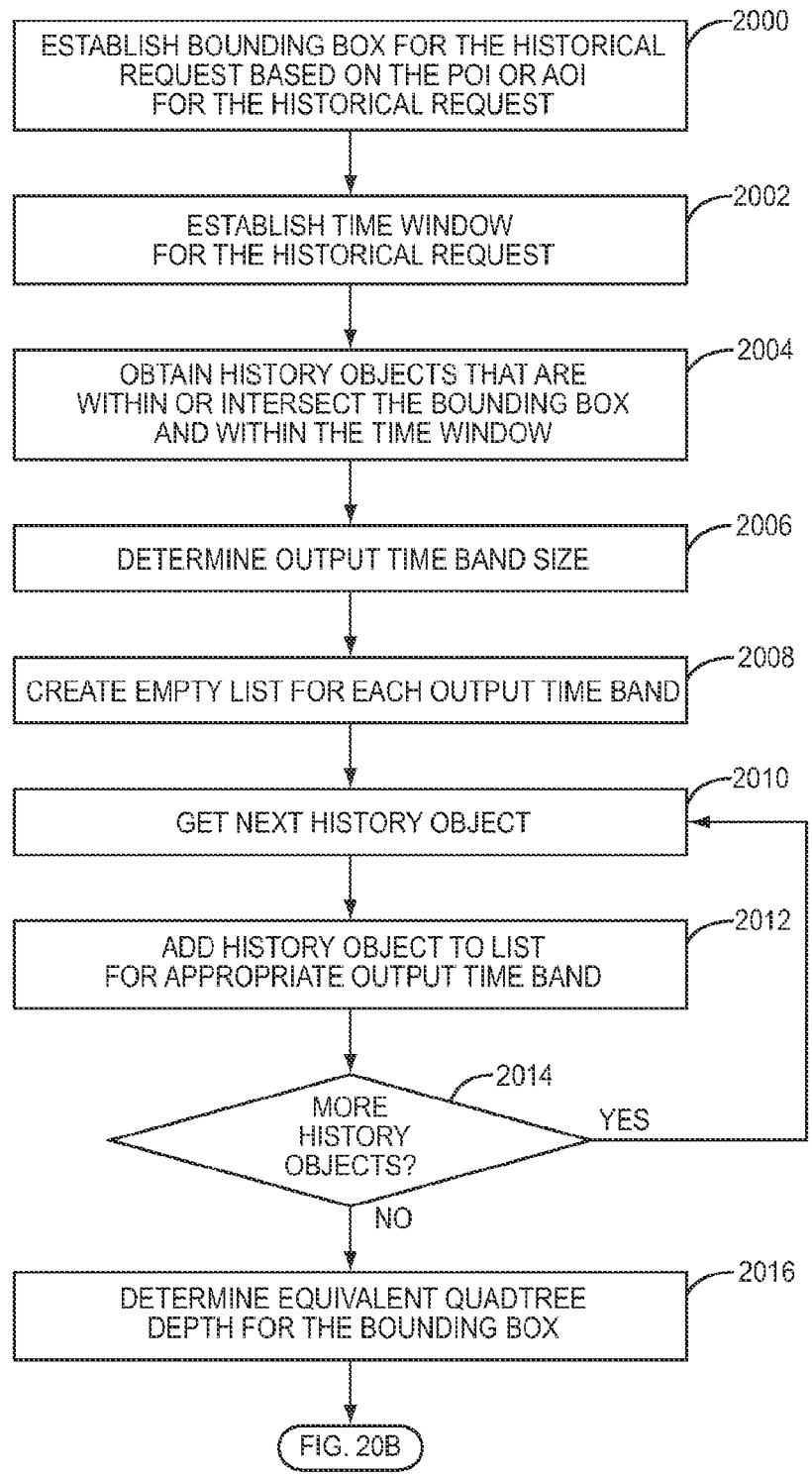
FIGS. 20A and 20B illustrate a process for generating historical data in a time context in response to a historical request from a subscriber device according to one embodiment of the present disclosure.
Figure 20B:
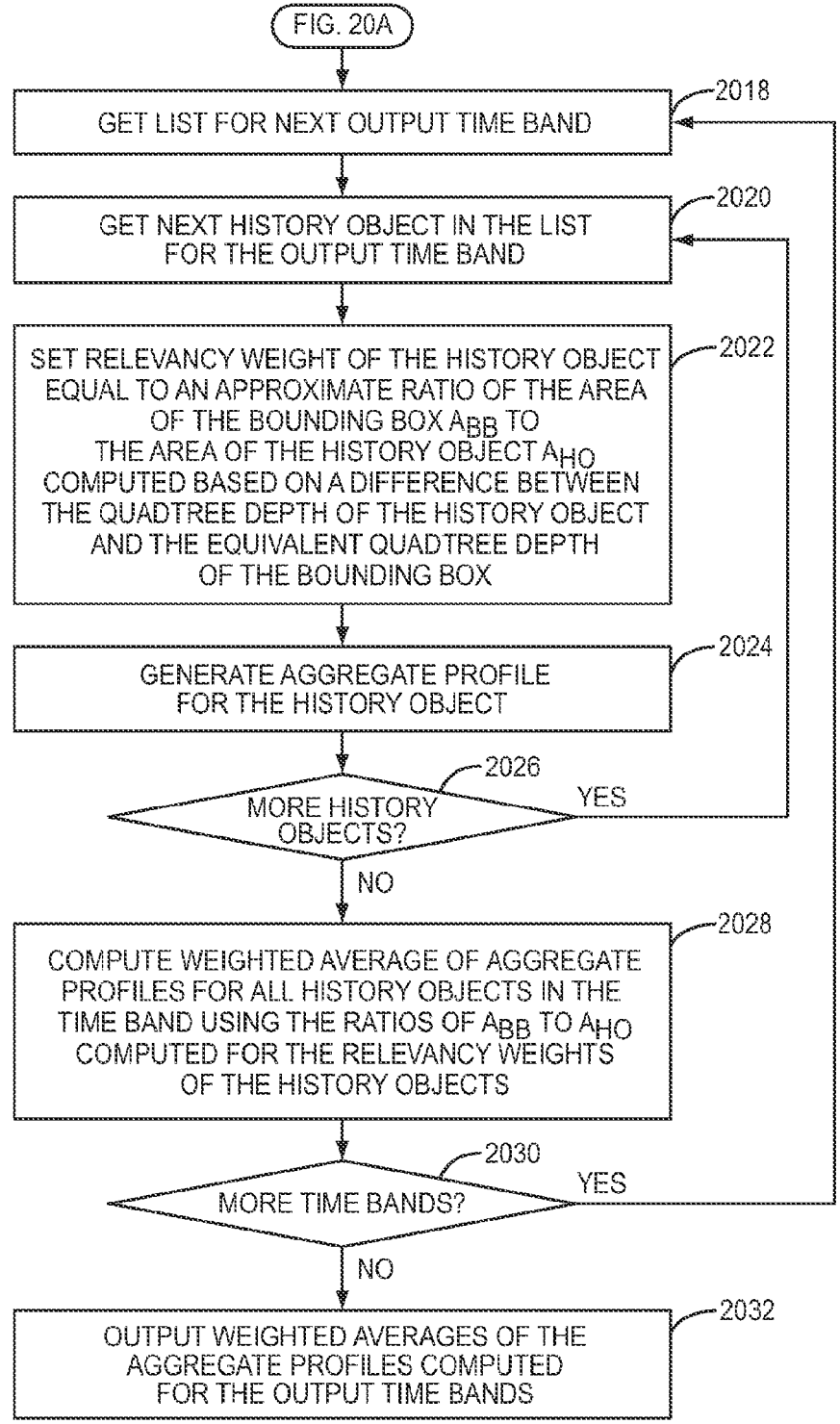

FIGS. 20A and 20B illustrate a process for generating historical aggregate profile data in a time context in response to a historical request from the subscriber 24 at the subscriber device 22 according to one embodiment of the present disclosure. The process of FIGS. 20A and 20B is substantially the same as that described above with respect to FIGS. 15A and 15B. More specifically, steps 2000 through 2022 are substantially the same as steps 1700 through 1722 of FIGS. 15A and 15B. Likewise, steps 2026 through 2032 are substantially the same as steps 1726 through 1732 of FIG. 15B. However, step 2024 of FIG. 20B is different from step 1724 of FIG. 15B with respect to the manner in which the aggregate profiles for the relevant history objects are computed.

More specifically, in this embodiment, since the historical request is from the subscriber 24, the aggregate profile for the history object is generated by comparing the user profiles of the anonymous user records in the history object to one another. In this embodiment, the aggregate profile for the history object includes an aggregate list of keywords from the user profiles of the anonymous user records, the number of occurrences of each of those keywords in the user profiles of the anonymous user records, and the total number of anonymous user records in the history object. As such, in step 2028, the weighted average of the aggregate profiles for the history objects in the output time band may provide an average aggregate profile including, for each keyword occurring in the aggregate profile of at least one of the history objects, a weighted average of the number of occurrences of the keyword. In addition, the average aggregate profile may include a weighted average of the total number of anonymous user records in the history objects. In addition or alternatively, the average aggregate profile may include, for each keyword, a weighted average of the number of occurrences of the keyword to the total number of anonymous user records.

Figure 21A:
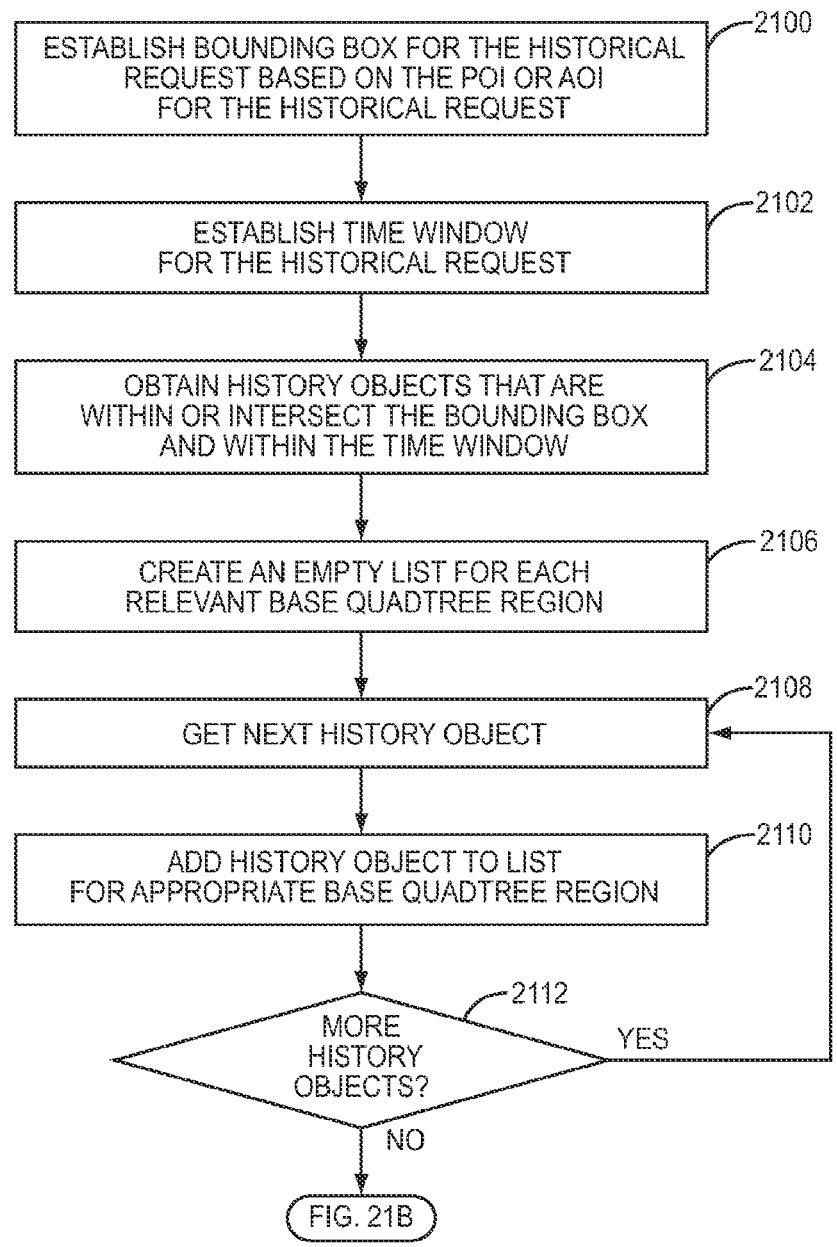
FIGS. 21A and 21B illustrate a process for generating historical data in a geographic context in response to a historical request from a subscriber device according to one embodiment of the present disclosure.
Figure 21B:
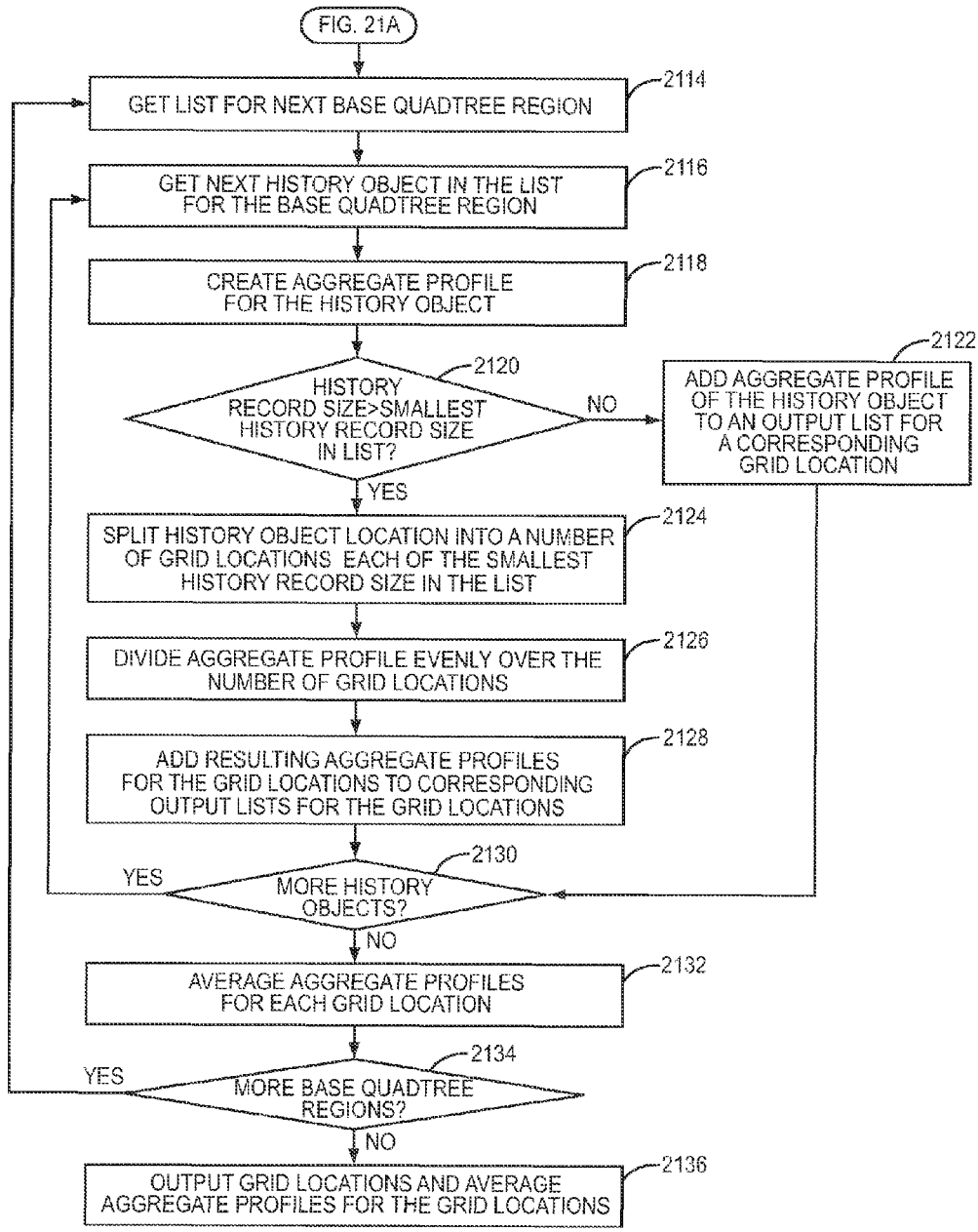

FIGS. 21A and 21B illustrate a process for generating historical aggregate profile data in a geographic context in response to a historical request from the subscriber 24 at the subscriber device 22 according to one embodiment of the present disclosure. The process of FIGS. 21A and 21B is substantially the same as that described above with respect to FIGS. 17A and 17B. More specifically, steps 2100 through 2116 and 2120 through 2136 are substantially the same as steps 1800 through 1816 and 1820 through 1836 of FIGS. 17A and 17B. However, step 2118 of FIG. 21B is different from step 1818 of FIG. 17B with respect to the manner in which the aggregate profiles for the history objects are computed.

More specifically, in this embodiment, since the historical request is from the subscriber 24, the aggregate profile for the history object is generated by comparing the user profiles of the anonymous user records in the history object to one another. In this embodiment, the aggregate profile for the history object includes an aggregate list of keywords from the user profiles of the anonymous user records, the number of occurrences of each of those keywords in the user profiles of the anonymous user records, and the total number of anonymous user records in the history object. As such, in step 2132, the weighted average of the aggregate profiles for the each of the grid locations may provide an average aggregate profile including, for each keyword, a weighted average of the number of occurrences of the keyword. In addition, the average aggregate profile for each grid location may include a weighted average of the total number of anonymous user records. In addition or alternatively, the average aggregate profile for each grid location may include, for each keyword, a weighted average of the number of occurrences of the keyword to the total number of anonymous user records.

Figure 22:
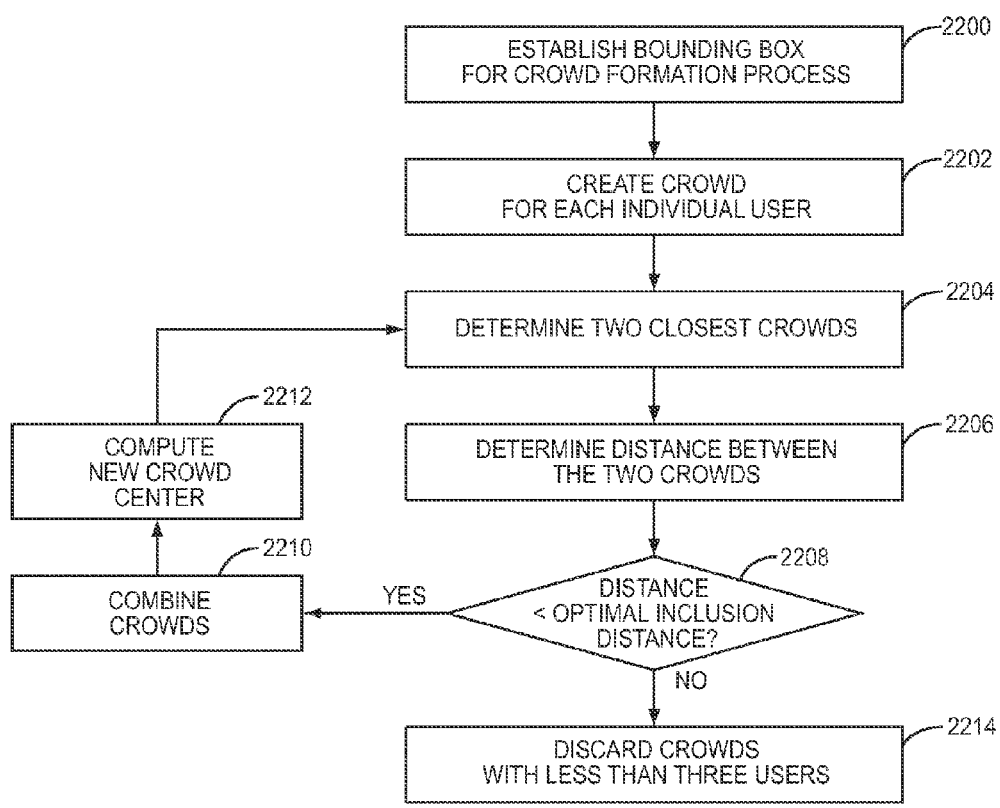
FIG. 22 is a flow chart for a spatial crowd formation process according to one embodiment of the present disclosure.

FIG. 22 begins a discussion of the operation of the crowd analyzer 58 to form crowds of users according to one embodiment of the present disclosure. Specifically, FIG. 22 is a flow chart for a spatial crowd formation process according to one embodiment of the present disclosure. Note that, in one embodiment, this process is performed in response to a request for crowd data for a POI or an AOI. In another embodiment, this process may be performed proactively by the crowd analyzer 58 as, for example, a background process.

First, the crowd analyzer 58 establishes a bounding box for the crowd formation process (step 2200). Note that while a bounding box is used in this example, other geographic shapes may be used to define a bounding region for the crowd formation process (e.g., a bounding circle). In one embodiment, if crowd formation is performed in response to a specific request, the bounding box is established based on the POI or the AOI of the request. If the request is for a POI, then the bounding box is a geographic area of a predetermined size centered at the POI. If the request is for an AOI, the bounding box is the AOI. Alternatively, if the crowd formation process is performed proactively, the bounding box is a bounding box of a predefined size.

The crowd analyzer 58 then creates a crowd for each individual user in the bounding box (step 2202). More specifically, the crowd analyzer 58 queries the datastore 64 of the MAP server 12 to identify users currently located within the bounding box. Then, a crowd of one user is created for each user currently located within the bounding box. Next, the crowd analyzer 58 determines the two closest crowds in the bounding box (step 2204) and determines a distance between the two crowds (step 2206). The distance between the two crowds is a distance between crowd centers of the two crowds. Note that the crowd center of a crowd of one is the current location of the user in the crowd. The crowd analyzer 58 then determines whether the distance between the two crowds is less than an optimal inclusion distance (step 2208). In this embodiment, the optimal inclusion distance is a predefined static distance. If the distance between the two crowds is less than the optimal inclusion distance, the crowd analyzer 58 combines the two crowds (step 2210) and computes a new crowd center for the resulting crowd (step 2212). The crowd center may be computed based on the current locations of the users in the crowd using a center of mass algorithm. At this point the process returns to step 2204 and is repeated until the distance between the two closest crowds is not less than the optimal inclusion distance. At that point, the crowd analyzer 58 discards any crowds with less than three users (step 2214). Note that throughout this disclosure crowds are only maintained if the crowds include three or more users. However, while three users is the preferred minimum number of users in a crowd, the present disclosure is not limited thereto. The minimum number of users in a crowd may be defined as any number greater than or equal to two users.

Figure 23A:
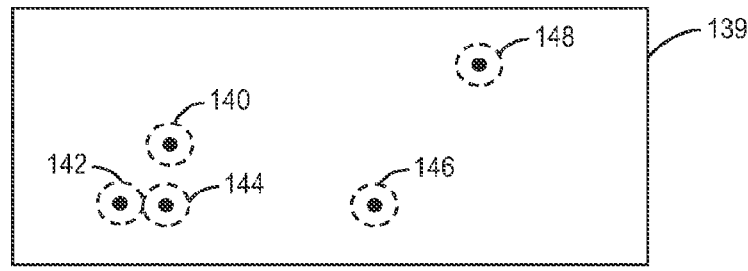
FIGS. 23A through 23D graphically illustrate the crowd formation process of FIG. 22 for an exemplary bounding box.
Figure 23B:
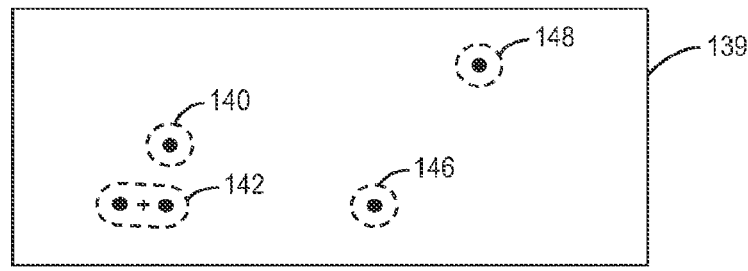
Figure 23C:
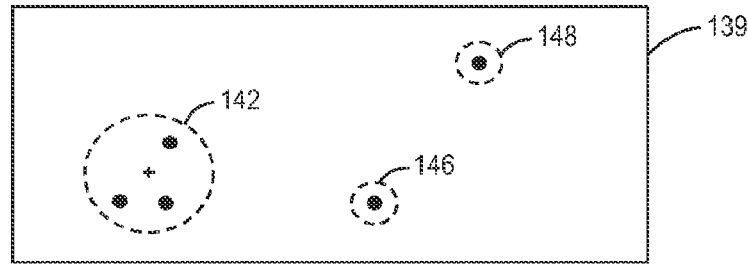
Figure 23D:
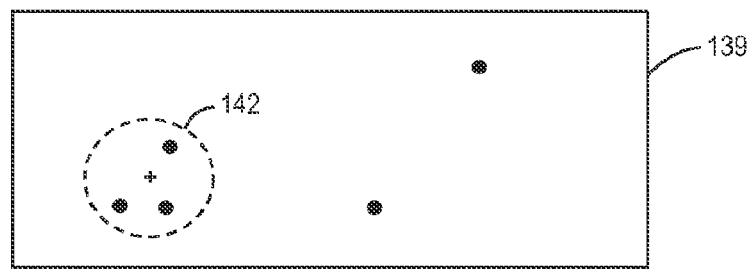

FIGS. 23A through 23D graphically illustrate the crowd formation process of FIG. 22 for an exemplary bounding box 139. In FIGS. 23A through 23D, crowds are noted by dashed circles, and the crowd centers are noted by crosshairs (+). As illustrated in FIG. 23A, initially, the crowd analyzer 58 creates crowds 140 through 148 for the users in the geographic area, where, at this point, each of the crowds 140 through 148 includes one user. The current locations of the users are the crowd centers of the crowds 140 through 148. Next, the crowd analyzer 58 determines the two closest crowds and a distance between the two closest crowds. In this example, at this point, the two closest crowds are crowds 142 and 144, and the distance between the two closest crowds 142 and 144 is less than the optimal inclusion distance. As such, the two closest crowds 142 and 144 are combined by merging crowd 144 into crowd 142, and a new crowd center (+) is computed for the crowd 142, as illustrated in FIG. 23B. Next, the crowd analyzer 58 again determines the two closest crowds, which are now crowds 140 and 142. The crowd analyzer 58 then determines a distance between the crowds 140 and 142. Since the distance is less than the optimal inclusion distance, the crowd analyzer 58 combines the two crowds 140 and 142 by merging the crowd 140 into the crowd 142, and a new crowd center (+) is computed for the crowd 142, as illustrated in FIG. 23C. At this point, there are no more crowds separated by less than the optimal inclusion distance. As such, the crowd analyzer 58 discards crowds having less than three users, which in this example are crowds 146 and 148. As a result, at the end of the crowd formation process, the crowd 142 has been formed with three users, as illustrated in FIG. 23D.

FIGS. 24A through 24D illustrate a flow chart for a spatial crowd formation process according to another embodiment of the present disclosure. In this embodiment, the spatial crowd formation process is triggered in response to receiving a location update for one of the users 20-1 through 20-N and is preferably repeated for each location update received for the users 20-1 through 20-N. As such, first, the crowd analyzer 58 receives a location update, or a new location, for a user (step 2300). Assume that, for this example, the location update is received for the user 20-1. In response, the crowd analyzer 58 retrieves an old location of the user 20-1, if any (step 2302). The old location is the current location of the user 20-1 prior to receiving the new location. The crowd analyzer 58 then creates a new bounding box of a predetermined size centered at the new location of the user 20-1 (step 2304) and an old bounding box of a predetermined size centered at the old location of the user 20-1, if any (step 2306). The predetermined size of the new and old bounding boxes may be any desired size. As one example, the predetermined size of the new and old bounding boxes is 40 meters by 40 meters. Note that if the user 20-1 does not have an old location (i.e., the location received in step 2300 is the first location received for the user 20-1), then the old bounding box is essentially null. Also note that while bounding "boxes" are used in this example, the bounding areas may be of any desired shape.

Next, the crowd analyzer 58 determines whether the new and old bounding boxes overlap (step 2308). If so, the crowd analyzer 58 creates a bounding box encompassing the new and old bounding boxes (step 2310). For example, if the new and old bounding boxes are 40×40 meter regions and a 1×1 meter square at the northeast corner of the new bounding box overlaps a 1×1 meter square at the southwest corner of the old bounding box, the crowd analyzer 58 may create a 79×79 meter square bounding box encompassing both the new and old bounding boxes.

The crowd analyzer 58 then determines the individual users and crowds relevant to the bounding box created in step 2310 (step 2312). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 2314). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 58 then creates a crowd for each individual user within the bounding box that is not already included in a crowd and sets the optimal inclusion distance for the crowds to the initial optimal inclusion distance (step 2316). At this point, the process proceeds to FIG. 24B where the crowd analyzer 58 analyzes the crowds relevant to the bounding box to determine whether any of the crowd members (i.e., users in the crowds) violate the optimal inclusion distance of their crowds (step 2318). Any crowd member that violates the optimal inclusion distance of his or her crowd is then removed from that crowd (step 2320). The crowd analyzer 58 then creates a crowd of one user for each of the users removed from their crowds in step 2320 and sets the optimal inclusion distance for the newly created crowds to the initial optimal inclusion distance (step 2322).

Next, the crowd analyzer 58 determines the two closest crowds for the bounding box (step 2324) and a distance between the two closest crowds (step 2326). The distance between the two closest crowds is the distance between the crowd centers of the two closest crowds. The crowd analyzer 58 then determines whether the distance between the two closest crowds is less than the optimal inclusion distance of a larger of the two closest crowds (step 2328). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is less than the optimal inclusion distance, the two closest crowds are combined or merged (step 2330), and a new crowd center for the resulting crowd is computed (step 2332). Again, a center of mass algorithm may be used to compute the crowd center of a crowd. In addition, a new optimal inclusion distance for the resulting crowd is computed (step 2334). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimal\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 2336). The maximum number of iterations is a predefined number that ensures that the crowd formation process does not indefinitely loop over steps 2318 through 2334 or loop over steps 2318 through 2334 more than a desired maximum number of times. If the maximum number of iterations has not been reached, the process returns to step 2318 and is repeated until either the distance between the two closest crowds is not less than the optimal inclusion distance of the larger crowd or the maximum number of iterations has been reached. At that point, the crowd analyzer 58 discards crowds with less than three users, or members (step 2338) and the process ends.

Figure 24A:
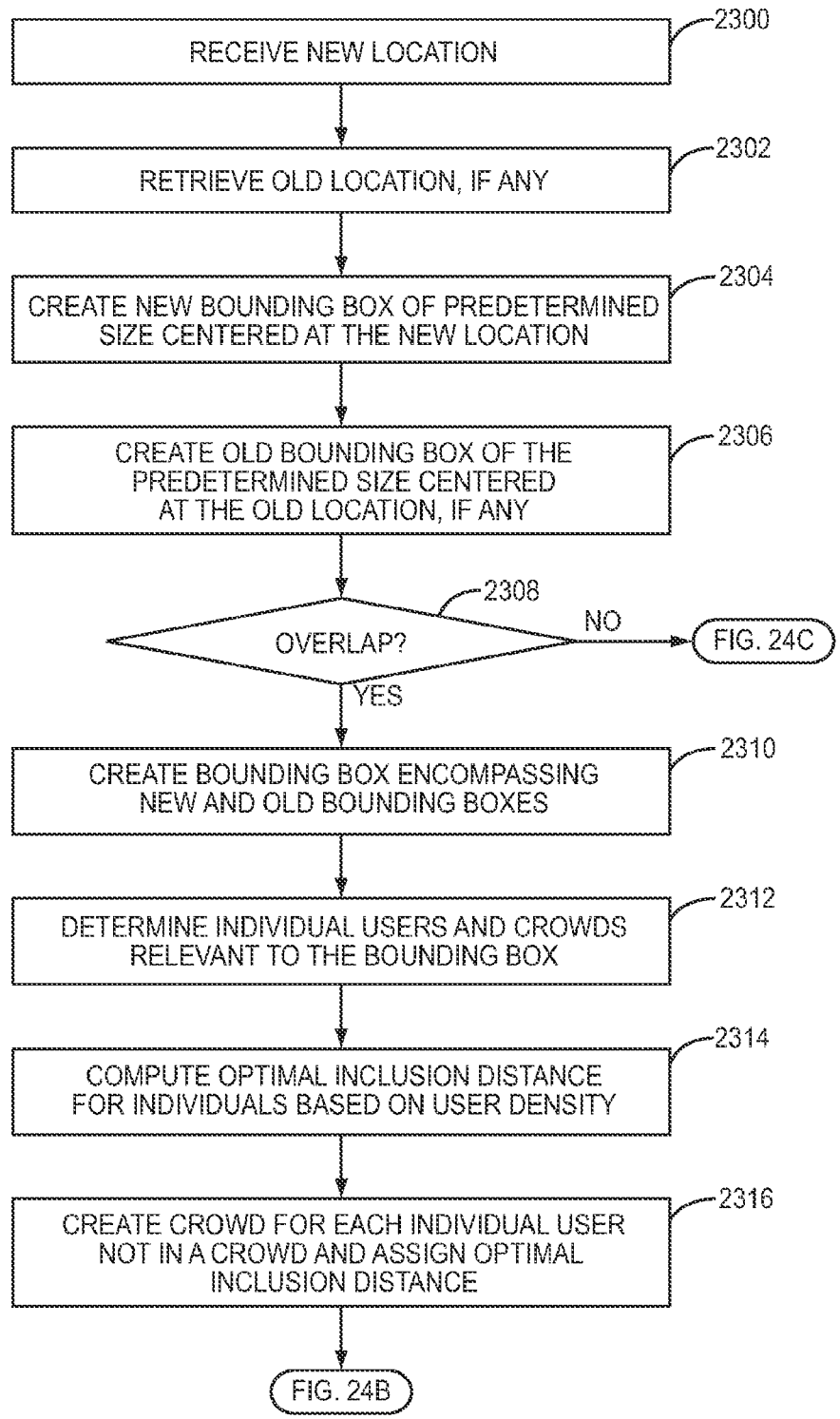
FIGS. 24A through 24D illustrate a flow chart for a spatial crowd formation process according to another embodiment of the present disclosure.
Figure 24B:
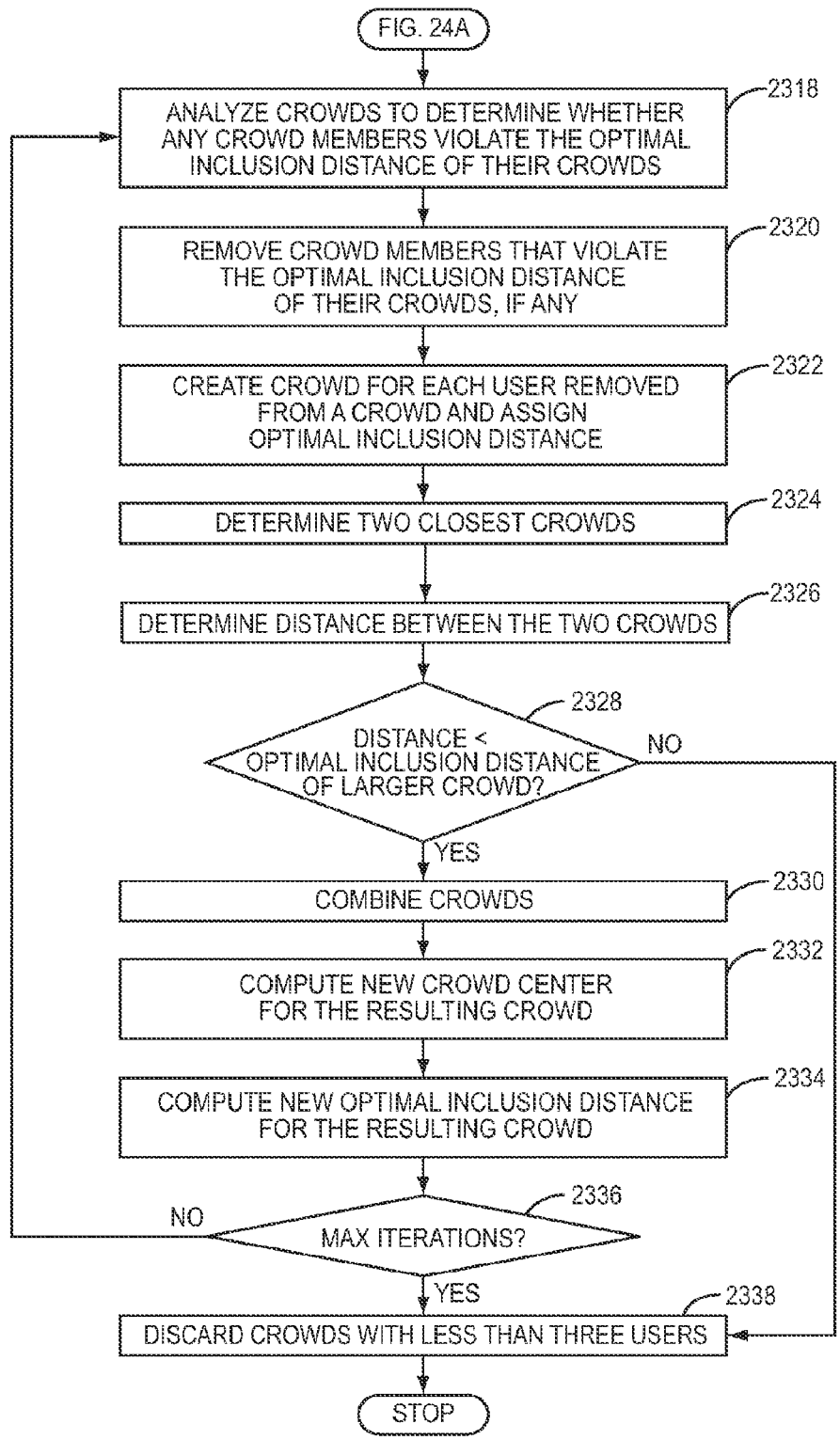
Figure 24C:
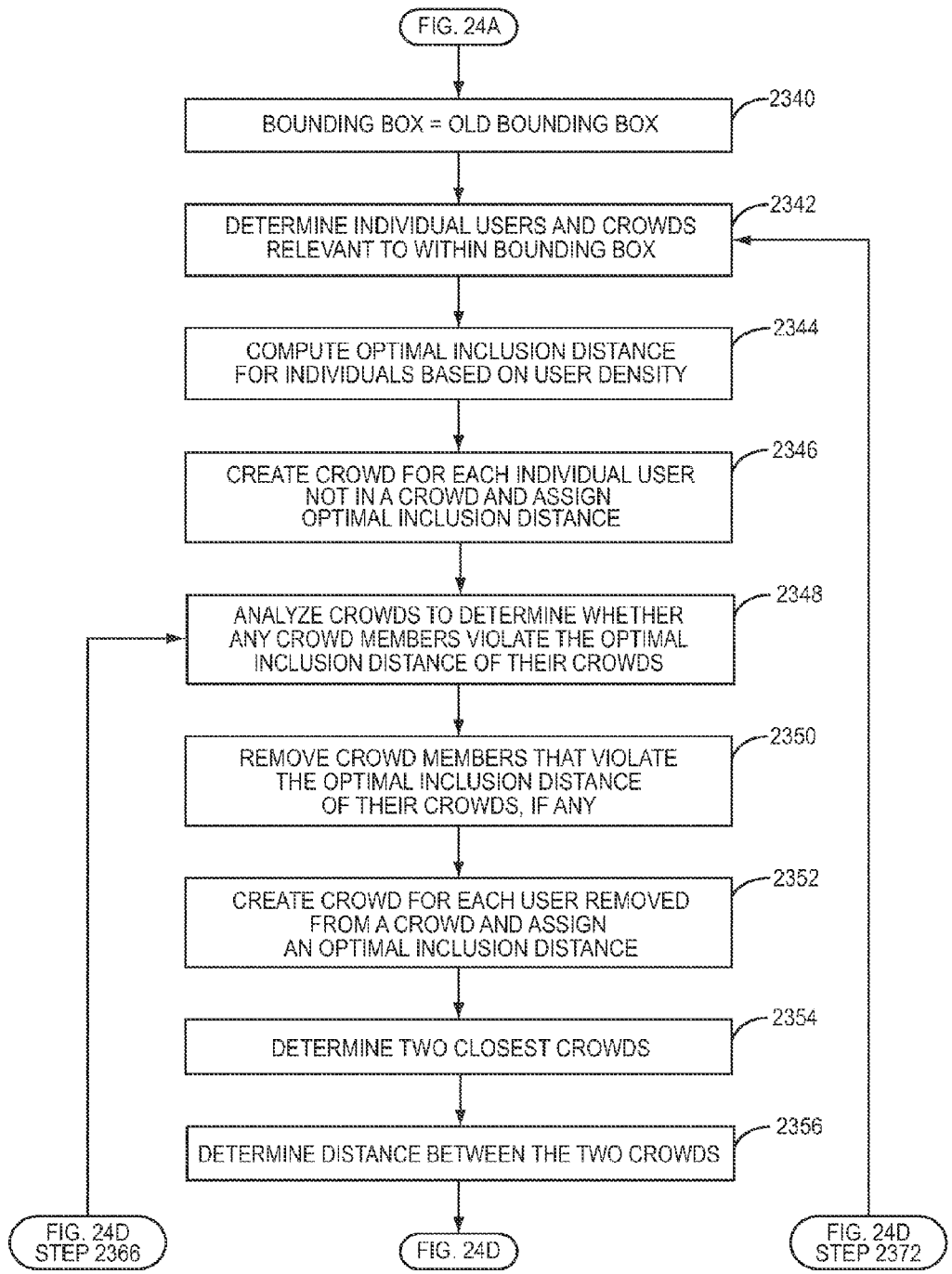
Figure 24D:
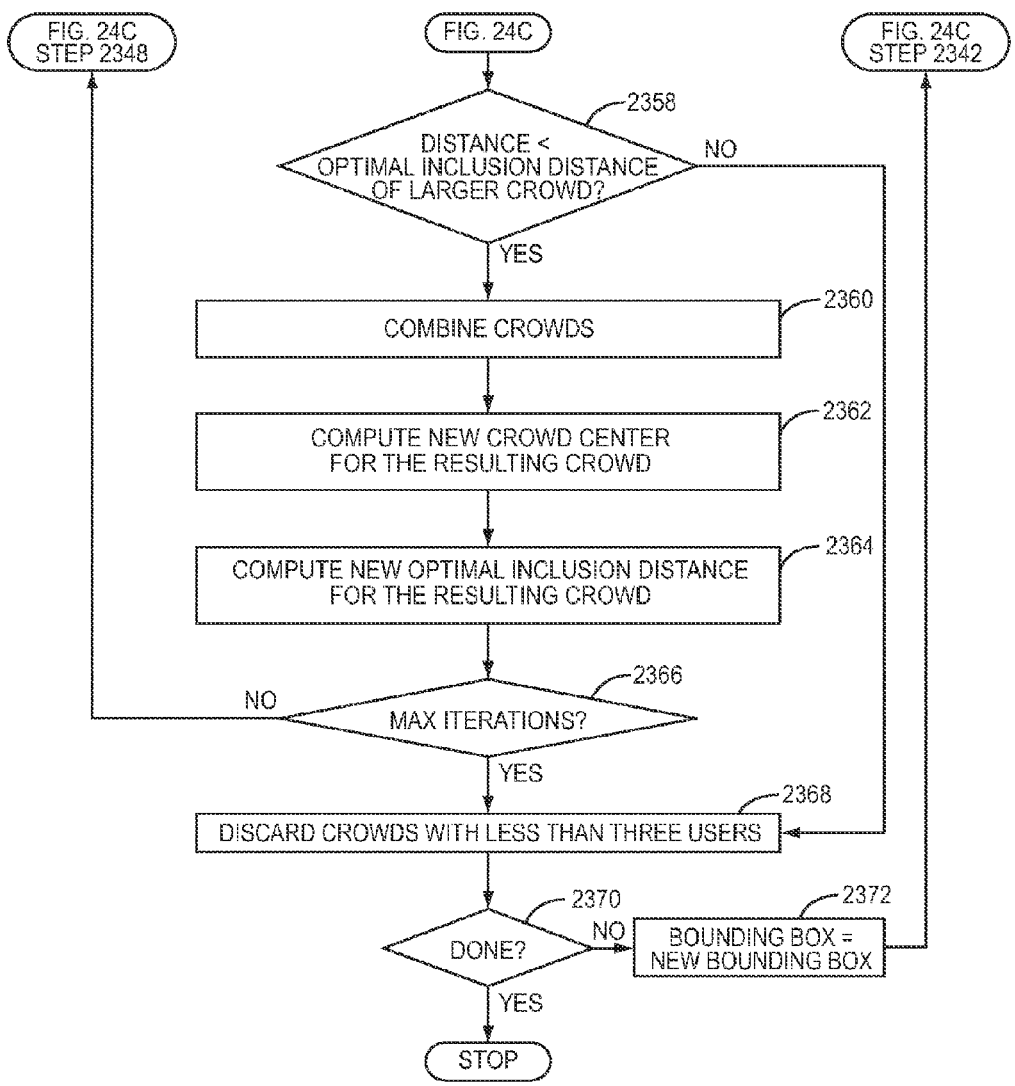

Returning to step 2308 in FIG. 24A, if the new and old bounding boxes do not overlap, the process proceeds to FIG. 24C and the bounding box to be processed is set to the old bounding box (step 2340). In general, the crowd analyzer 58 then processes the old bounding box in much the same manner as described above with respect to steps 2312 through 2338. More specifically, the crowd analyzer 58 determines the individual users and crowds relevant to the bounding box (step 2342). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 2344). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 58 then creates a crowd of one user for each individual user within the bounding box that is not already included in a crowd and sets the optimal inclusion distance for the crowds to the initial optimal inclusion distance (step 2346). At this point, the crowd analyzer 58 analyzes the crowds for the bounding box to determine whether any crowd members (i.e., users in the crowds) violate the optimal inclusion distance of their crowds (step 2348). Any crowd member that violates the optimal inclusion distance of his or her crowd is then removed from that crowd (step 2350). The crowd analyzer 58 then creates a crowd of one user for each of the users removed from their crowds in step 2350 and sets the optimal inclusion distance for the newly created crowds to the initial optimal inclusion distance (step 2352).

Next, the crowd analyzer 58 determines the two closest crowds in the bounding box (step 2354) and a distance between the two closest crowds (step 2356). The distance between the two closest crowds is the distance between the crowd centers of the two closest crowds. The crowd analyzer 58 then determines whether the distance between the two closest crowds is less than the optimal inclusion distance of a larger of the two closest crowds (step 2358). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is less than the optimal inclusion distance, the two closest crowds are combined or merged (step 2360), and a new crowd center for the resulting crowd is computed (step 2362). Again, a center of mass algorithm may be used to compute the crowd center of a crowd. In addition, a new optimal inclusion distance for the resulting crowd is computed (step 2364). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 2366). If the maximum number of iterations has not been reached, the process returns to step 2348 and is repeated until either the distance between the two closest crowds is not less than the optimal inclusion distance of the larger crowd or the maximum number of iterations has been reached. At that point, the crowd analyzer 58 discards crowds with less than three users, or members (step 2368). The crowd analyzer 58 then determines whether the crowd formation process for the new and old bounding boxes is done (step 2370). In other words, the crowd analyzer 58 determines whether both the new and old bounding boxes have been processed. If not, the bounding box is set to the new bounding box (step 2372), and the process returns to step 2342 and is repeated for the new bounding box. Once both the new and old bounding box have been processed, the crowd formation process ends.

Figure 25A:
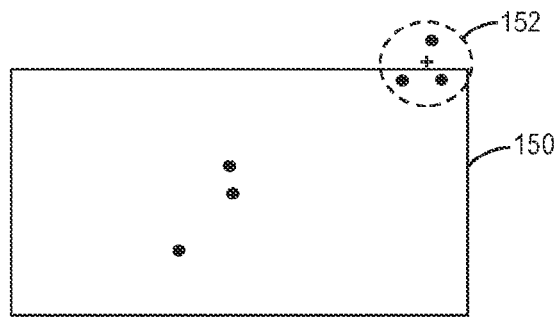
FIGS. 25A through 25D graphically illustrate the crowd formation process of FIGS. 24A through 24D for a scenario where the crowd formation process is triggered by a location update for a user having no old location.
Figure 25B:
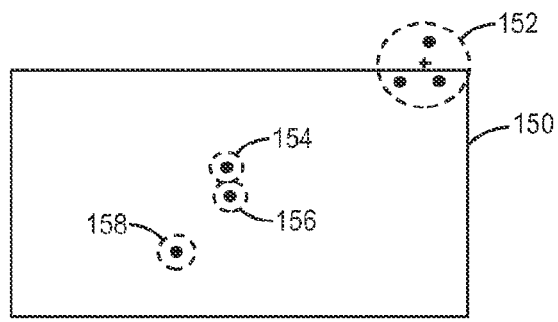

FIGS. 25A through 25D graphically illustrate the crowd formation process of FIGS. 24A through 24D for a scenario where the crowd formation process is triggered by a location update for a user having no old location. In this scenario, the crowd analyzer 58 creates a new bounding box 150 for the new location of the user, and the new bounding box 150 is set as the bounding box to be processed for crowd formation. Then, as illustrated in FIG. 25A, the crowd analyzer 58 identifies all individual users currently located within the bounding box 150 and all crowds located within or overlapping the bounding box. In this example, crowd 152 is an existing crowd relevant to the bounding box 150. Crowds are indicated by dashed circles, crowd centers are indicated by cross-hairs (+), and users are indicated as dots. Next, as illustrated in FIG. 25B, the crowd analyzer 58 creates crowds 154 through 158 of one user for the individual users, and the optional inclusion distances of the crowds 154 through 158 are set to the initial optimal inclusion distance. As discussed above, the initial optimal inclusion distance is computed by the crowd analyzer 58 based on a density of users within the bounding box 150.

Figure 25C:
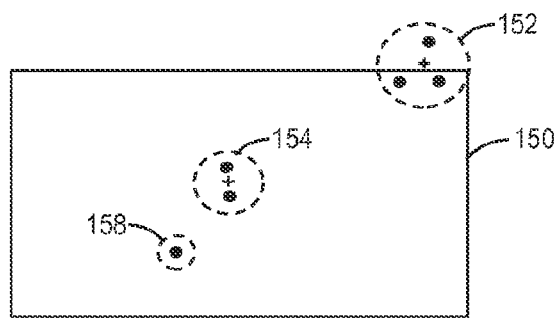
Figure 25D:
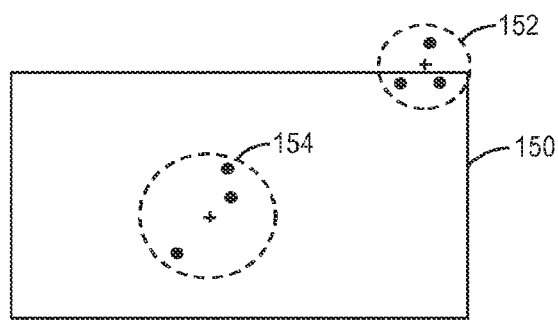

The crowd analyzer 58 then identifies the two closest crowds 154 and 156 in the bounding box 150 and determines a distance between the two closest crowds 154 and 156. In this example, the distance between the two closest crowds 154 and 156 is less than the optimal inclusion distance. As such, the two closest crowds 154 and 156 are merged and a new crowd center and new optimal inclusion distance are computed, as illustrated in FIG. 25C. The crowd analyzer 58 then repeats the process such that the two closest crowds 154 and 158 in the bounding box 150 are again merged, as illustrated in FIG. 23D. At this point, the distance between the two closest crowds 152 and 154 is greater than the appropriate optimal inclusion distance. As such, the crowd formation process is complete.

Figure 26A:
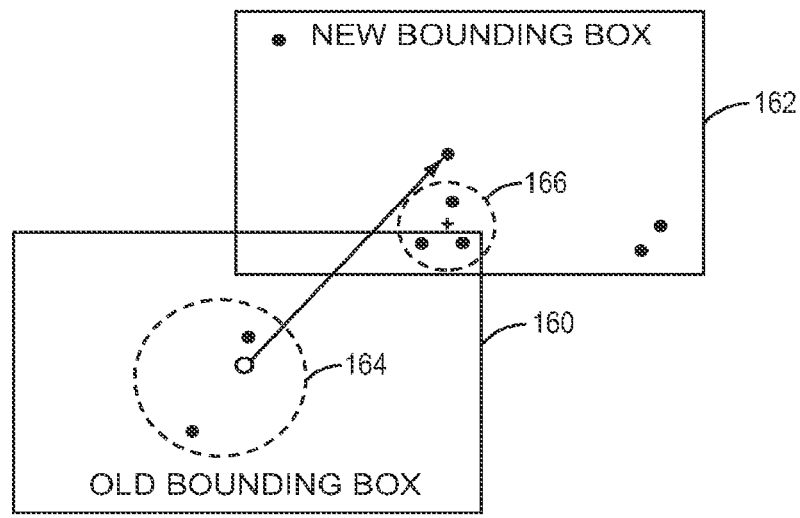
FIGS. 26A through 26F graphically illustrate the crowd formation process of FIGS. 24A through 24D for a scenario where the new and old bounding boxes overlap.

FIGS. 26A through 26F graphically illustrate the crowd formation process of FIGS. 24A through 24D for a scenario where the new and old bounding boxes overlap. As illustrated in FIG. 26A, a user moves from an old location to a new location, as indicated by an arrow. The crowd analyzer 58 receives a location update for the user giving the new location of the user. In response, the crowd analyzer 58 creates an old bounding box 160 for the old location of the user and a new bounding box 162 for the new location of the user. Crowd 164 exists in the old bounding box 160, and crowd 166 exists in the new bounding box 162.

Figure 26B:
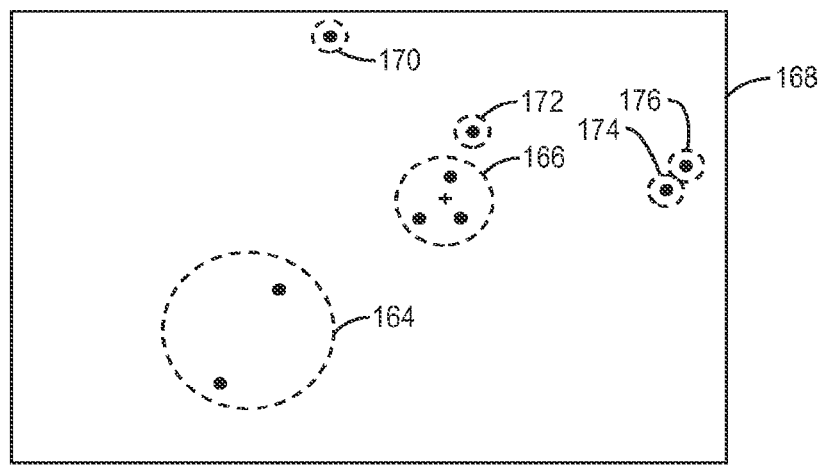

Since the old bounding box 160 and the new bounding box 162 overlap, the crowd analyzer 58 creates a bounding box 168 that encompasses both the old bounding box 160 and the new bounding box 162, as illustrated in FIG. 26B. In addition, the crowd analyzer 58 creates crowds 170 through 176 for individual users currently located within the bounding box 168. The optimal inclusion distances of the crowds 170 through 176 are set to the initial optimal inclusion distance computed by the crowd analyzer 58 based on the density of users in the bounding box 168.

Figure 26C:
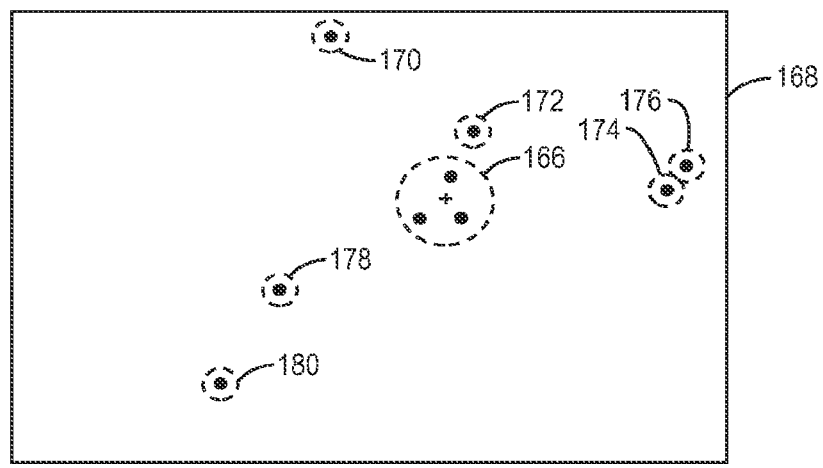

Next, the crowd analyzer 58 analyzes the crowds 164, 166, and 170 through 176 to determine whether any members of the crowds 164, 166, and 170 through 176 violate the optimal inclusion distances of the crowds 164, 166, and 170 through 176. In this example, as a result of the user leaving the crowd 164 and moving to his new location, both of the remaining members of the crowd 164 violate the optimal inclusion distance of the crowd 164. As such, the crowd analyzer 58 removes the remaining users from the crowd 164 and creates crowds 178 and 180 of one user each for those users, as illustrated in FIG. 26C.

Figure 26D:
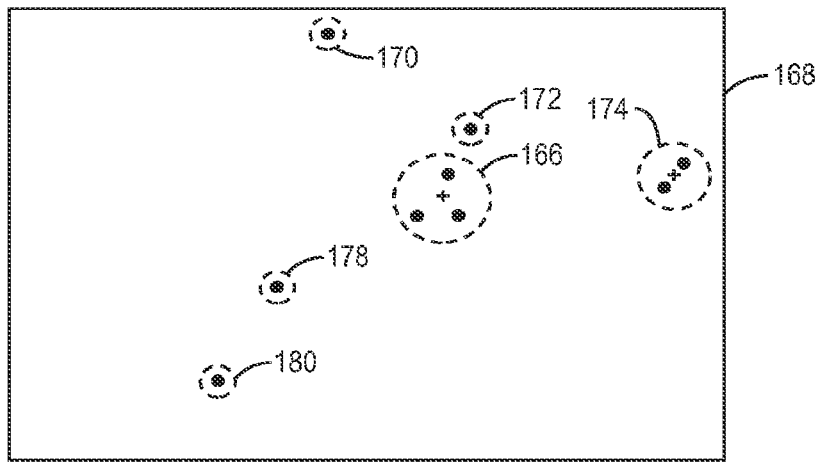

The crowd analyzer 58 then identifies the two closest crowds in the bounding box 168, which in this example are the crowds 174 and 176. Next, the crowd analyzer 58 computes a distance between the two crowds 174 and 176. In this example, the distance between the two crowds 174 and 176 is less than the initial optimal inclusion distance and, as such, the two crowds 174 and 176 are combined. In this example, crowds are combined by merging the smaller crowd into the larger crowd. Since the two crowds 174 and 176 are of the same size, the crowd analyzer 58 merges the crowd 176 into the crowd 174, as illustrated in FIG. 26D. A new crowd center and new optimal inclusion distance are then computed for the crowd 174.

Figure 26E:
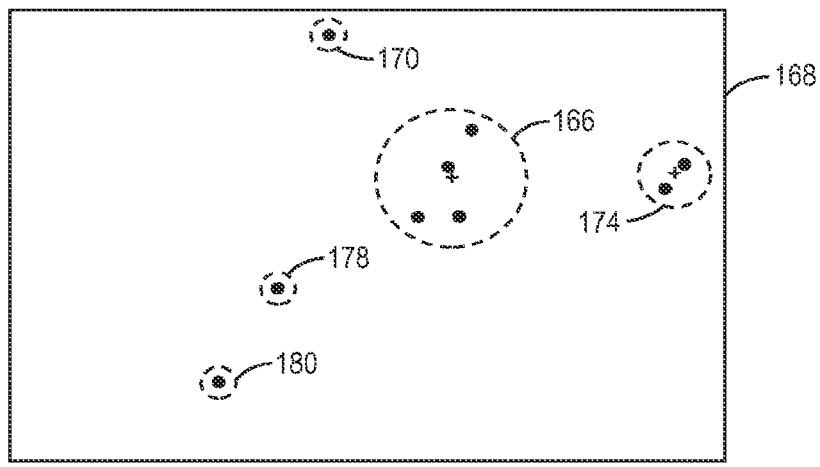
Figure 26F:
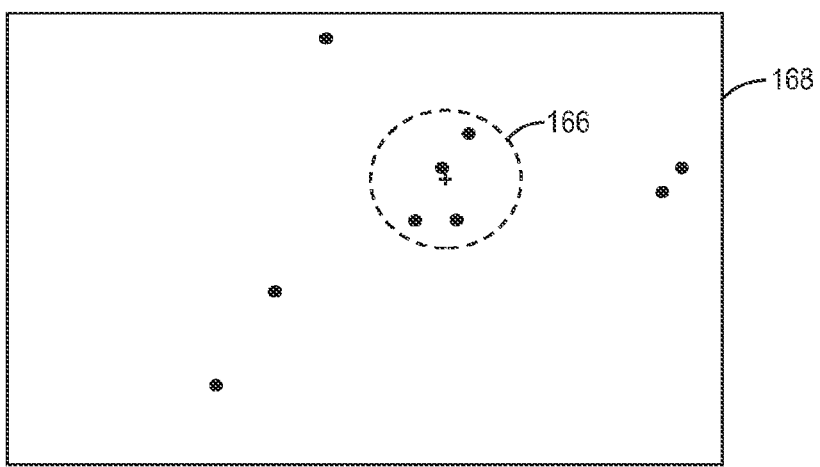

At this point, the crowd analyzer 58 repeats the process and determines that the crowds 166 and 172 are now the two closest crowds. In this example, the distance between the two crowds 166 and 172 is less than the optimal inclusion distance of the larger of the two crowds 166 and 172, which is the crowd 166. As such, the crowd 172 is merged into the crowd 166 and a new crowd center and optimal inclusion distance are computed for the crowd 166, as illustrated in FIG. 26E. At this point, there are no two crowds closer than the optimal inclusion distance of the larger of the two crowds. As such, the crowd analyzer 58 discards any crowds having less than three members, as illustrated in FIG. 26F. In this example, the crowds 170, 174, 178, and 180 have less than three members and are therefore removed. The crowd 166 has three or more members and, as such, is not removed. At this point, the crowd formation process is complete.

Figure 27A:
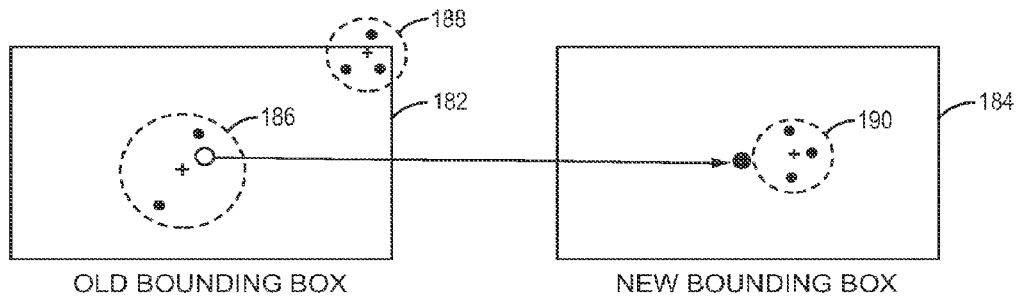
FIGS. 27A through 27E graphically illustrate the crowd formation process of FIGS. 24A through 24D in a scenario where the new and old bounding boxes do not overlap.

FIGS. 27A through 27E graphically illustrate the crowd formation process of FIGS. 24A through 24D in a scenario where the new and old bounding boxes do not overlap. As illustrated in FIG. 27A, in this example, the user moves from an old location to a new location. The crowd analyzer 58 creates an old bounding box 182 for the old location of the user and a new bounding box 184 for the new location of the user. Crowds 186 and 188 exist in the old bounding box 182, and crowd 190 exists in the new bounding box 184. In this example, since the old and new bounding boxes 182 and 184 do not overlap, the crowd analyzer 58 processes the old and new bounding boxes 182 and 184 separately.

Figure 27B:
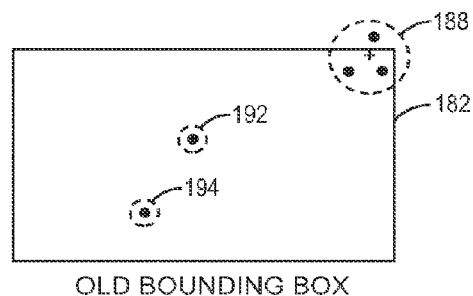
Figure 27C:
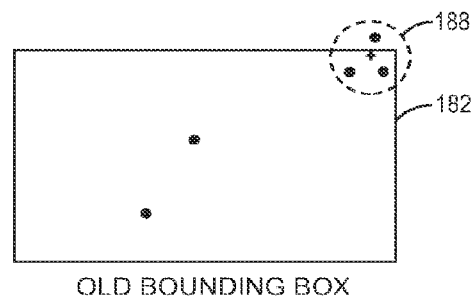

More specifically, as illustrated in FIG. 27B, as a result of the movement of the user from the old location to the new location, the remaining users in the crowd 186 no longer satisfy the optimal inclusion distance for the crowd 186. As such, the remaining users in the crowd 186 are removed from the crowd 186, and crowds 192 and 194 of one user each are created for the removed users as shown in FIG. 26C. In this example, no two crowds in the old bounding box 182 are close enough to be combined. As such, processing of the old bounding box 182 is complete, and the crowd analyzer 58 proceeds to process the new bounding box 184.

Figure 27D:
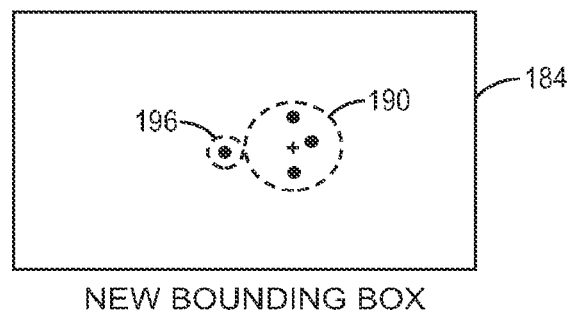
Figure 27E:
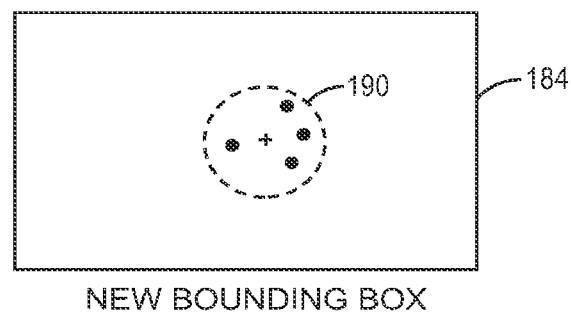

As illustrated in FIG. 27D, processing of the new bounding box 184 begins by the crowd analyzer 58 creating a crowd 196 of one user for the user. The crowd analyzer 58 then identifies the crowds 190 and 196 as the two closest crowds in the new bounding box 184 and determines a distance between the two crowds 190 and 196. In this example, the distance between the two crowds 190 and 196 is less than the optimal inclusion distance of the larger crowd, which is the crowd 190. As such, the crowd analyzer 58 combines the crowds 190 and 196 by merging the crowd 196 into the crowd 190, as illustrated in FIG. 27E. A new crowd center and new optimal inclusion distance are then computed for the crowd 190. At this point, the crowd formation process is complete.

Before proceeding, a variation of the spatial formation process discussed above with respect to FIGS. 24A through 24D, 25A through 25D, 26A through 26F, and 27A through 27E will be described. In this alternative embodiment, a location accuracy of the location update from the user received in step 2300 is considered. More specifically, in step 2300, the location update received by the MAP server 12 includes the updated location of the user 20-1 as well as a location accuracy for the location of the user 20-1, which may be expressed as, for example, a radius in meters from the location of the user 20-1. In the embodiment where the location of the user 20-1 is obtained from a GPS receiver of the mobile device 18-1, the location accuracy of the location of the user 20-1 may be provided by the GPS receiver or derived from data from the GPS receiver as well be appreciated by one having ordinary skill in the art.

Then, in steps 2302 and 2304, sizes of the new and old bounding boxes centered at the new and old locations of the user 20-1 are set as a function of the location accuracy of the new and old locations of the user 20-1. If the new location of the user 20-1 is inaccurate, then the new bounding box will be large. If the new location of the user 20-1 is accurate, then the new bounding box will be small. For example, the length and width of the new bounding box may be set to M times the location accuracy of the new location of the user 20-1, where the location accuracy is expressed as a radius in meters from the new location of the user 20-1. The number M may be any desired number. For example, the number M may be 5. In a similar manner, the location accuracy of the old location of the user 20-1 may be used to set the length and width of the old bounding box.

In addition, the location accuracy may be considered when computing the initial optimal inclusion distances used for crowds of one user in steps 2314 and 2344. As discussed above, the initial optimal inclusion distance is computed based on the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔. However, if the computed initial optimal inclusion distance is less than the location accuracy of the current location of the individual user in a crowd, then the location accuracy, rather than the computed value, is used for the initial optimal inclusion distance for that crowd. As such, as location accuracy decreases, crowds become larger and more inclusive. In contrast, as location accuracy increases, crowds become smaller and less inclusive. In other words, the granularity with which crowds are formed is a function of the location accuracy.

Likewise, when new optimal inclusion distances for crowds are recomputed in steps 2334 and 2364, location accuracy may also be considered. As discussed above, the new optimal inclusion distance may first be computed based on the following equation:

$$\text{average} = \frac{1}{n+1} \cdot \left( \text{initial\_optimal\_inclusion\_dist} + \sum_{i=1}^{n} d_i \right),$$

$$\text{optimial\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation. However, if the computed value for the new optimal inclusion distance is less than an average location accuracy of the users in the crowd, the average location accuracy of the users in the crowd, rather than the computed value, is used as the new optimal inclusion distance.

Figure 28:
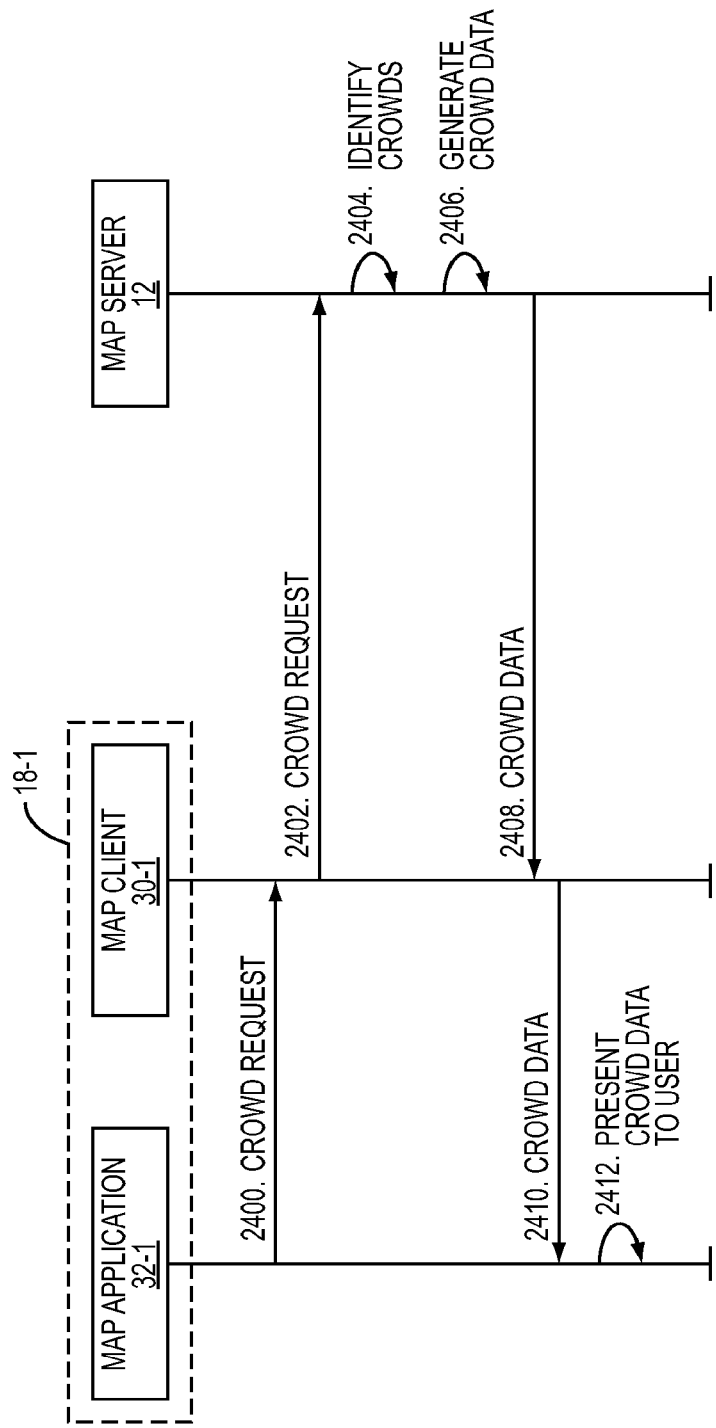
FIG. 28 illustrates the operation the system of FIG. 1 to enable the mobile devices to request crowd data for currently formed crowds according to one embodiment of the present disclosure.

FIG. 28 illustrates the operation the system 10 of FIG. 1 to enable the mobile devices 18-1 through 18-N to request crowd data for currently formed crowds according to one embodiment of the present disclosure. Note that while in this example the request is initiated by the MAP application 32-1 of the mobile device 18-1, this discussion is equally applicable to the MAP applications 32-2 through 32-N of the other mobile devices 18-2 through 18-N. In addition, in a similar manner, requests may be received from the third-party applications 34-1 through 34-N.

First, the MAP application 32-1 sends a crowd request to the MAP client 30-1 (step 2400). The crowd request is a request for crowd data for crowds currently formed near a specified POI or within a specified AOI. The crowd request may be initiated by the user 20-1 of the mobile device 18-1 via the MAP application 32-1 or may be initiated automatically by the MAP application 32-1 in response to an event such as, for example, start-up of the MAP application 32-1, movement of the user 20-1, or the like. In one embodiment, the crowd request is for a POI, where the POI is a POI corresponding to the current location of the user 20-1, a POI selected from a list of POIs defined by the user 20-1, a POI selected from a list of POIs defined by the MAP application 32-1 or the MAP server 12, a POI selected by the user 20-1 from a map, a POI implicitly defined via a separate application (e.g., POI is implicitly defined as the location of the nearest Starbucks coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both. Note that in some embodiments, the user 20-1 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 20-1, an AOI selected from a list of AOIs defined by the user 20-1, an AOI selected from a list of AOIs defined by the MAP application 32-1 or the MAP server 12, an AOI selected by the user 20-1 from a map, an AOI implicitly defined via a separate application (e.g., AOI is implicitly defined as an area of a predefined shape and size centered at the location of the nearest Starbucks coffee house in response to the user 20-1 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 20-1, or both. Note that in some embodiments, the user 20-1 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 20-1 via the MAP application 32-1. In yet another embodiment, the MAP application 32-1 automatically uses the current location of the user 20-1 as the POI or as a center point for an AOI of a predefined shape and size.

Upon receiving the crowd request, the MAP client 30-1 forwards the crowd request to the MAP server 12 (step 2402). Note that in some embodiments, the MAP client 30-1 may process the crowd request before forwarding the crowd request to the MAP server 12. For example, in some embodiments, the crowd request may include more than one POI or more than one AOI. As such, the MAP client 30-1 may generate a separate crowd request for each POI or each AOI.

In response to receiving the crowd request from the MAP client 30-1, the MAP server 12 identifies one or more crowds relevant to the crowd request (step 2404). More specifically, in one embodiment, the crowd analyzer 58 performs a crowd formation process such as that described above in FIG. 22 to form one or more crowds relevant to the POI or the AOI of the crowd request. In another embodiment, the crowd analyzer 58 proactively forms crowds using a process such as that described above in FIGS. 24A through 24D and stores corresponding crowd records in the datastore 64 of the MAP server 12. Then, rather than forming the relevant crowds in response to the crowd request, the crowd analyzer 58 queries the datastore 64 to identify the crowds that are relevant to the crowd request. The crowds relevant to the crowd request may be those crowds within or intersecting a bounding region, such as a bounding box, for the crowd request. If the crowd request is for a POI, the bounding region is a geographic region of a predefined shape and size centered at the POI. If the crowd request is for an AOI, the bounding region is the AOI.

Once the crowd analyzer 58 has identified the crowds relevant to the crowd request, the MAP server 12 generates crowd data for the identified crowds (step 2406). As discussed below in detail, the crowd data for the identified crowds may include aggregate profiles for the crowds, information characterizing the crowds, or both. In addition, the crowd data may include spatial information defining the locations of the crowds, the number of users in the crowds, the amount of time the crowds have been located at or near the POI or within the AOI of the crowd request, or the like. The MAP server 12 then returns the crowd data to the MAP client 30-1 (step 2408).

Upon receiving the crowd data, the MAP client 30-1 forwards the crowd data to the MAP application 32-1 (step 2410). Note that in some embodiments the MAP client 30-1 may process the crowd data before sending the crowd data to the MAP application 32-1. The MAP application 32-1 then presents the crowd data to the user 20-1 (step 2412). The manner in which the crowd data is presented depends on the particular implementation of the MAP application 32-1. In one embodiment, the crowd data is overlaid upon a map. For example, the crowds may be represented by corresponding indicators overlaid on a map. The user 20-1 may then select a crowd in order to view additional crowd data regarding that crowd such as, for example, the aggregate profile of that crowd, characteristics of that crowd, or the like.

Note that in one embodiment, the MAP application 32-1 may operate to roll-up the aggregate profiles for multiple crowds into a rolled-up aggregate profile for those crowds. The rolled-up aggregate profile may be the average of the aggregate profiles of the crowds. For example, the MAP application 32-1 may roll-up the aggregate profiles for multiple crowds at a POI and present the rolled-up aggregate profile for the multiple crowds at the POI to the user 20-1. In a similar manner, the MAP application 32-1 may provide a rolled-up aggregate profile for an AOI. In another embodiment, the MAP server 12 may roll-up crowds for a POI or an AOI and provide the rolled-up aggregate profile in addition to or as an alternative to the aggregate profiles for the individual crowds.

Figure 29A:
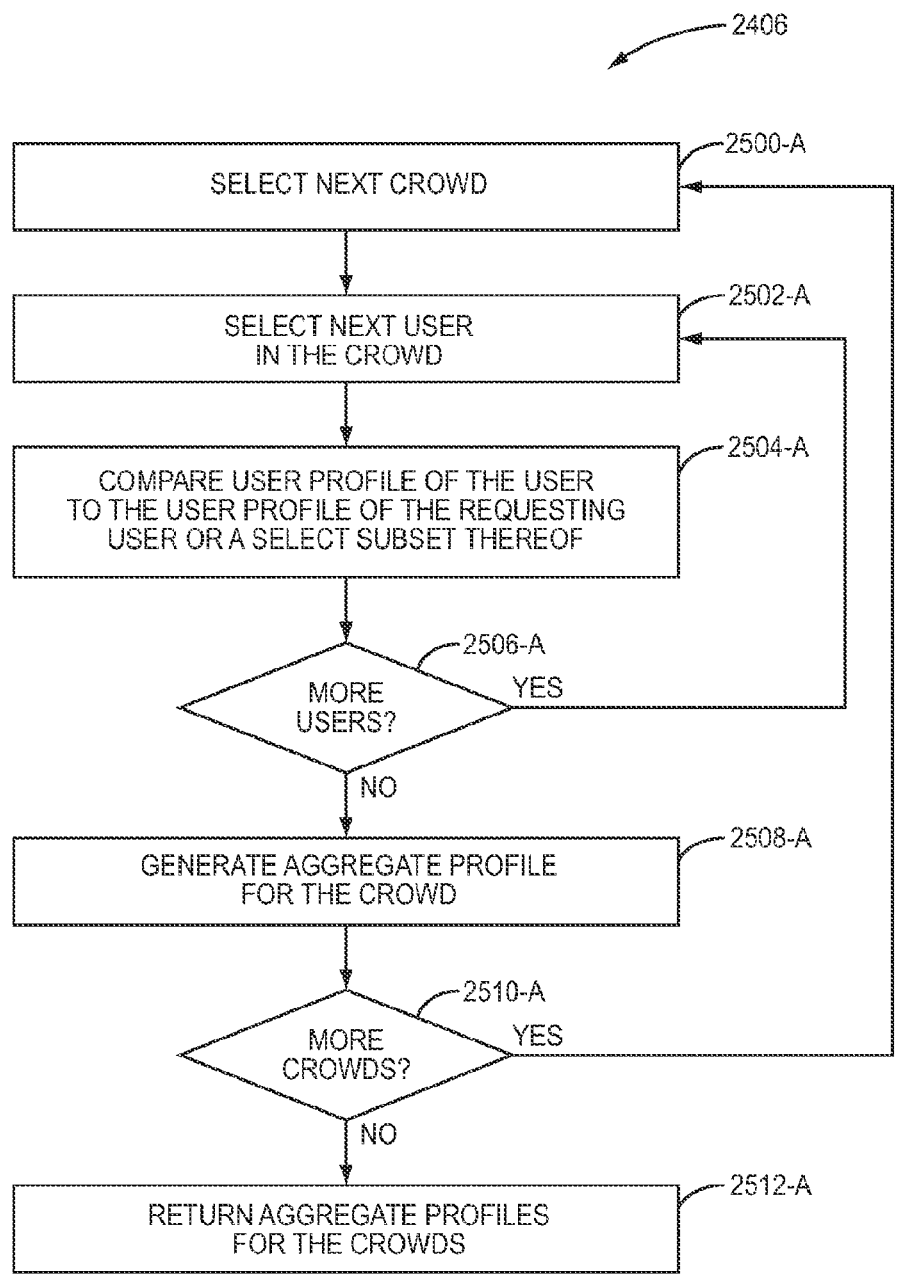
FIG. 29A is a flow chart for a process for generating aggregate profiles for crowds identified in response to a crowd request from a mobile device according to one embodiment of the present disclosure.

FIG. 29A is a flow chart illustrating step 2406 of FIG. 28 in more detail according to one embodiment of the present disclosure. In this embodiment, the crowd data returned by the MAP server 12 includes aggregate profiles for the crowds identified for the POI or the AOI. In this embodiment, upon receiving the crowd request, the MAP server 12 triggers the crowd analyzer 58 to identify crowds relevant to the current request, and then passes the identified crowds to the aggregation engine 60 in order to generate aggregate profiles for the identified crowds.

More specifically, after the crowd analyzer 58 has identified the crowds relevant to the current request, the identified crowds are passed to the aggregation engine 60. The aggregation engine 60 selects a next crowd to process, which for the first iteration is the first crowd (step 2500-A). The aggregation engine 60 then selects the next user in the crowd (step 2502-A). Next, the aggregation engine 60 compares the user profile of the user in the crowd to the user profile of the requesting user, which for this example is the user 20-1 of the mobile device 18-1, or a select subset of the user profile of the requesting user (step 2504-A). In some embodiments, the user 20-1 may be enabled to select a subset of his user profile to be used for generation of the aggregate profile. For example, in the embodiment where user profiles are expressed as keywords in a number of profile categories, the user 20-1 may select one or more of the profile categories to be used for aggregate profile generation. When comparing the user profile of the user in the crowd to the user profile of the user 20-1, the aggregation engine 60 identifies matches between the user profile of the user in the crowd and the user profile of the user 20-1 or the select subset of the user profile of the user 20-1. In one embodiment, the user profiles are expressed as keywords in a number of profile categories. The aggregation engine 60 may then make a list of keywords from the user profile of the user in the crowd that match keywords in user profile of the user 20-1 or the select subset of the user profile of the user 20-1.

Next, the aggregation engine 60 determines whether there are more users in the crowd (step 2506-A). If so, the process returns to step 2502-A and is repeated for the next user in the crowd. Once all of the users in the crowd have been processed, the aggregation engine 60 generates an aggregate profile for the crowd based on data resulting from the comparisons of the user profiles of the users in the crowd to the user profile of the user 20-1 or the select subset of the user profile of the user 20-1 (step 2508-A). In an alternative embodiment, the aggregation engine 60 generates an aggregate profile for the crowd based on data resulting from the comparisons of the user profiles of the users in the crowd to a target user profile defined or otherwise specified by the user 20-1. In one embodiment, the data resulting from the comparisons is a list of matching keywords for each of the users in the crowd. The aggregate profile may then include a number of user matches over all keywords and/or a ratio of the number of user matches over all keywords to the number of users in the crowd. The number of user matches over all keywords is a number of users in the crowd having at least one keyword in their user profile that matches a keyword in the user profile of the user 20-1 or the select subset of the user profile of the user 20-1. The aggregate profile may additionally or alternatively include, for each keyword in the user profile of the user 20-1 or the select subset of the user profile of the user 20-1, a number of user matches for the keyword or a ratio of the number of user matches for the keyword to the number of users in the crowd. Note that keywords in the user profile of the user 20-1 or the select subset of the user profile of the user 20-1 that have no user matches may be excluded from the aggregate profile. In addition, the aggregate profile for the crowd may include a total number of users in the crowd.

The aggregate profile for the crowd may additionally or alternatively include a match strength that is indicative of a degree of similarity between the user profiles of the users in the crowd and the user profile of the user 20-1. The match strength may be computed as a ratio of the number of user matches to the total number of users in the crowd. Alternatively, the match strength may be computed as a function of the number of user matches per keyword and keyword weights assigned to the keywords. The keyword weights may be assigned by the user 20-1.

Once the aggregate profile of the crowd is generated, the aggregation engine 60 determines whether there are more crowds to process (step 2510-A). If so, the process returns to step 2500-A and is repeated for the next crowd. Once aggregate profiles have been generated for all of the crowds relevant to the current request, the aggregate profiles for the crowds are returned (step 2512-A). More specifically, the aggregate profiles are included in the crowd data returned to the MAP client 30-1 in response to the current request.

Note that in some embodiments the user 20-1 is enabled to activate a "nearby POIs" feature. If this feature is enabled, the crowds identified by the crowd analyzer 58 and processed by the aggregation engine 60 to produce corresponding aggregate profiles may also include crowds located at or near any nearby POIs. The nearby POIs may be POIs predefined by the user 20-1, the MAP application 32-1, and/or the MAP server 12 that are within a predefined distance from the POI or the AOI of the current request.

Figure 29B:
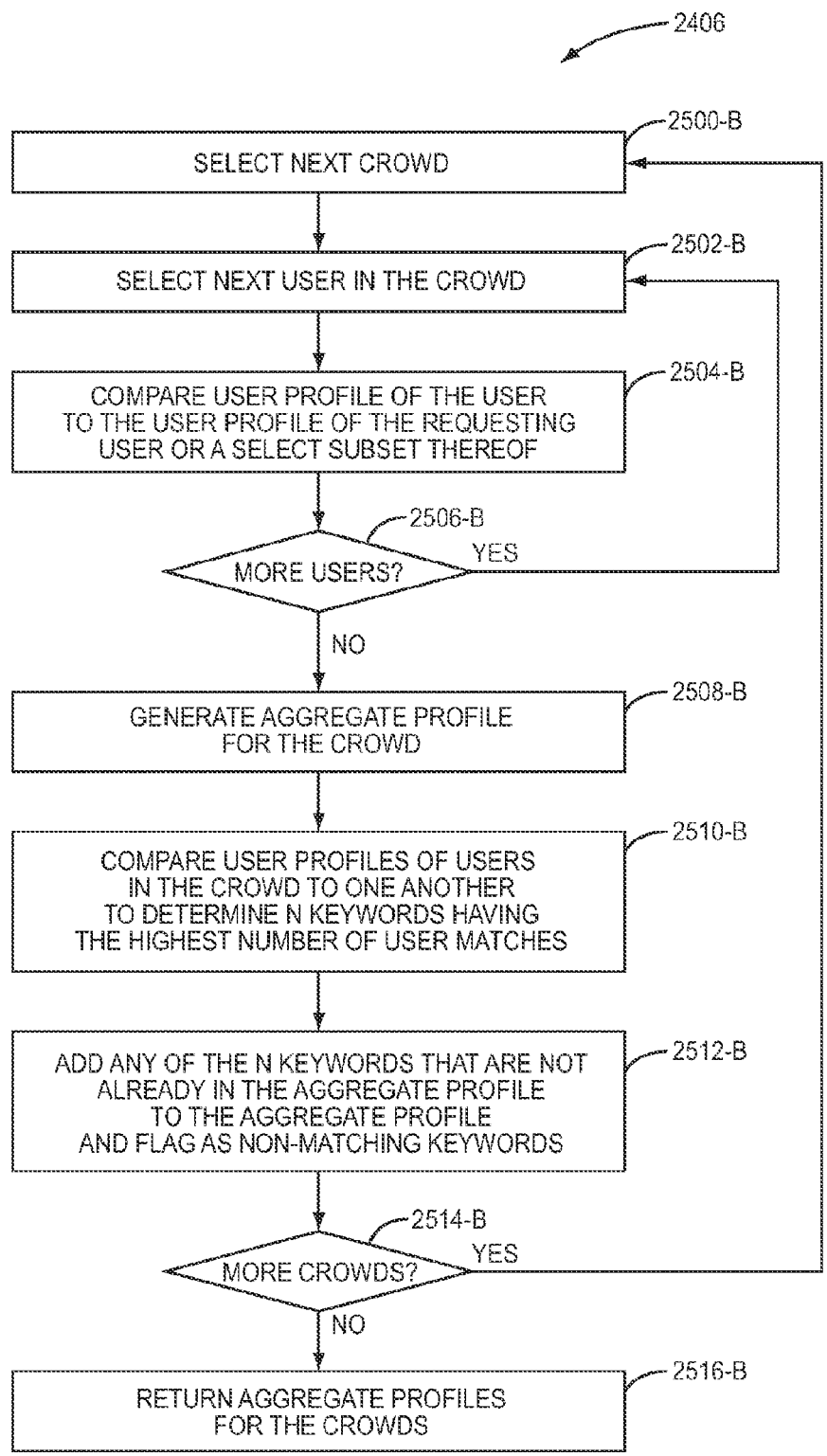
FIG. 29B is a flow chart for a process for generating aggregate profiles for crowds identified in response to a crowd request from a mobile device according to another embodiment of the present disclosure.

FIG. 29B is a flow chart illustrating step 2406 of FIG. 28 in more detail according to another embodiment of the present disclosure. In this embodiment, the crowd data returned by the MAP server 12 includes aggregate profiles for the crowds identified for the POI or the AOI. In this embodiment, upon receiving the crowd request, the MAP server 12 triggers the crowd analyzer 58 to identify crowds relevant to the current request, and then passes the identified crowds to the aggregation engine 60 in order to generate aggregate profiles for the identified crowds.

More specifically, after the crowd analyzer 58 has identified the crowds relevant to the current request, the identified crowds are passed to the aggregation engine 60. The aggregation engine 60 selects a next crowd to process, which for the first iteration is the first crowd (step 2500-B). The aggregation engine 60 then selects the next user in the crowd (step 2502-B). Next, the aggregation engine 60 compares the user profile of the user in the crowd to the user profile of the requesting user, which for this example is the user 20-1 of the mobile device 18-1, or a select subset of the user profile of the requesting user (step 2504-B). In some embodiments, the user 20-1 may be enabled to select a subset of his user profile to be used for generation of the aggregate profile. For example, in the embodiment where user profiles are expressed as keywords in a number of profile categories, the user 20-1 may select one or more of the profile categories to be used for aggregate profile generation. When comparing the user profile of the user in the crowd to the user profile of the user 20-1, the aggregation engine 60 identifies matches between the user profile of the user in the crowd and the user profile of the user 20-1 or the select subset of the user profile of the user 20-1. In this embodiment, the user profiles are expressed as keywords in a number of profile categories. The aggregation engine 60 may then make a list of keywords from the user profile of the user in the crowd that match keywords in user profile of the user 20-1 or the select subset of the user profile of the user 20-1.

Next, the aggregation engine 60 determines whether there are more users in the crowd (step 2506-B). If so, the process returns to step 2502-B and is repeated for the next user in the crowd. Once all of the users in the crowd have been processed, the aggregation engine 60 generates an aggregate profile for the crowd based on data resulting from the comparisons of the user profiles of the users in the crowd to the user profile of the user 20-1 or the select subset of the user profile of the user 20-1 (step 2508-B). In an alternative embodiment, the aggregation engine 60 generates an aggregate profile for the crowd based on data resulting from the comparisons of the user profiles of the users in the crowd to a target user profile defined or otherwise specified by the user 20-1. In this embodiment, the data resulting from the comparisons is a list of matching keywords for each of the users in the crowd. The aggregate profile may then include a number of user matches over all keywords and/or a ratio of the number of user matches over all keywords to the number of users in the crowd. The number of user matches over all keywords is a number of users in the crowd having at least one keyword in their user profile that matches a keyword in the user profile of the user 20-1 or the select subset of the user profile of the user 20-1. The aggregate profile may additionally or alternatively include, for each keyword in the user profile of the user 20-1 or the select subset of the user profile of the user 20-1, a number of user matches for the keyword or a ratio of the number of user matches for the keyword to the number of users in the crowd. Note that keywords in the user profile of the user 20-1 or the select subset of the user profile of the user 20-1 that have no user matches may be excluded from the aggregate profile. In addition, the aggregate profile for the crowd may include a total number of users in the crowd.

The aggregate profile for the crowd may additionally or alternatively include a match strength that is indicative of a degree of similarity between the user profiles of the users in the crowd and the user profile of the user 20-1. The match strength may be computed as a ratio of the number of user matches to the total number of users in the crowd. Alternatively, the match strength may be computed as a function of the number of user matches per keyword and keyword weights assigned to the keywords. The keyword weights may be assigned by the user 20-1.

Once the aggregate profile of the crowd is generated, in this embodiment, the aggregation engine 60 compares the user profiles of the users in the crowd to one another to determine N keywords having the highest number of user matches among the users in the crowd (step 2510-B). Here, N may be, for example, five. The aggregation engine 60 then adds any of the N keywords that are not already in the aggregate profile to the aggregate profile and flags those keywords as non-matching keywords (step 2512-B). These keywords are flagged as non-matching because they do not match any of the keywords in the user profile, or select subset thereof, of the user 20-1. The non-matching keywords are preferably differentiated from the matching keywords in the aggregate profile when presented to the user 20-1. The non-matching keywords are particularly beneficial where there are few or no matching keywords between the user profile of the user 20-1 and the user profiles of the users in the crowd. In this situation, the non-matching keywords would allow the user 20-1 to gain some understanding of the interests of the users in the crowd.

Next, the aggregation engine 60 determines whether there are more crowds to process (step 2514-B). If so, the process returns to step 2500-B and is repeated for the next crowd. Once aggregate profiles have been generated for all of the crowds relevant to the current request, the aggregate profiles for the crowds are returned (step 2516-B). More specifically, the aggregate profiles are included in the crowd data returned to the MAP client 30-1 in response to the current request.

Note that in some embodiments the user 20-1 is enabled to activate a "nearby POIs" feature. If this feature is enabled, the crowds identified by the crowd analyzer 58 and processed by the aggregation engine 60 to produce corresponding aggregate profiles may also include crowds located at or near any nearby POIs. The nearby POIs may be POIs predefined by the user 20-1, the MAP application 32-1, and/or the MAP server 12 that are within a predefined distance from the POI or the AOI of the current request.

Figure 30:
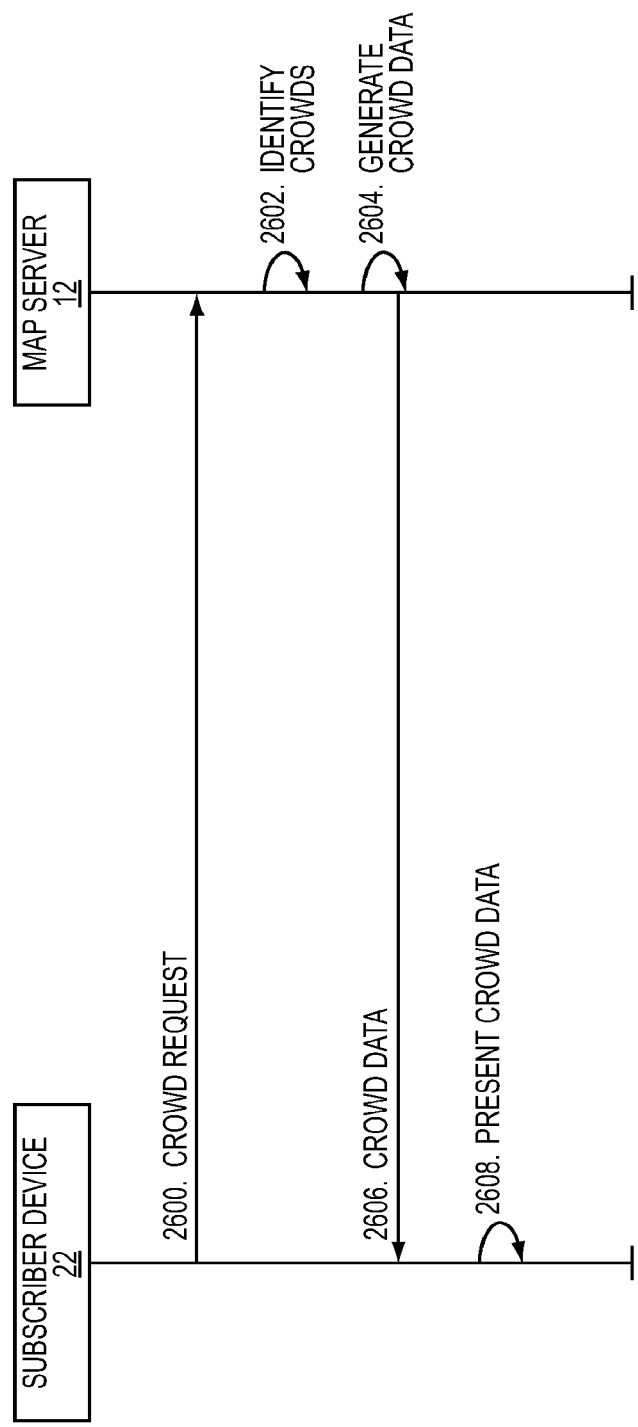
FIG. 30 illustrates the operation of the system of FIG. 1 to enable a subscriber device to request crowd data for current crowds according to one embodiment of the present disclosure.

FIG. 30 illustrates the operation of the system 10 of FIG. 1 to enable the subscriber device 22 to request information regarding current crowds according to one embodiment of the present disclosure. First, subscriber device 22 sends a crowd request to the MAP client 30-1 (step 2600). The crowd request is a request for current crowds at a specified POI or AOI. The crowd request may be initiated by the subscriber 24 at the subscriber device 22 via the web browser 38 or a custom application enabled to access the MAP server 12. Preferably, the subscriber 24 is enabled to identify the POI or the AOI for the crowd request by, for example, selecting the POI or the AOI on a map, selecting a crowd center of an existing crowd as a POI, selecting a crowd location of an existing crowd as a center of an AOI, selecting the POI or the AOI from a predefined list of POIs and/or AOIs, or the like. The predefined list of POIs and/or AOIs may be defined by, for example, the subscriber 24 and/or the MAP server 12.

In response to receiving the crowd request from the subscriber device 22, the MAP server 12 identifies one or more crowds relevant to the crowd request (step 2602). More specifically, in one embodiment, the crowd analyzer 58 performs a crowd formation process such as that described above in FIG. 22 to form one or more crowds relevant to the POI or the AOI of the crowd request. In another embodiment, the crowd analyzer 58 proactively forms crowds using a process such as that described above in FIGS. 24A through 24C and stores corresponding crowd records in the datastore 64 of the MAP server 12. Then, rather than forming the relevant crowds in response to the crowd request, the crowd analyzer 58 queries the datastore 64 to identify the crowds that are relevant to the crowd request. The crowds relevant to the crowd request may be those crowds within or overlapping a bounding region, such as a bounding box, for the crowd request. If the crowd request is for a POI, the bounding region is a geographic region of a predefined shape and size centered at the POI. If the crowd request is for an AOI, the bounding region is the AOI.

Once the crowd analyzer 58 has identified the crowds relevant to the crowd request, the MAP server 12 generates crowd data for the identified crowds (step 2604). The crowd data for the identified crowds may include aggregate profiles for the crowds, information characterizing the crowds, or both. In addition, the crowd data may include the locations of the crowds, the number of users in the crowds, the amount of time the crowds have been located at or near the POI or within the AOI, or the like. The MAP server 12 then returns the crowd data to the MAP client 30-1 (step 2606). In the embodiment where the subscriber 24 accesses the MAP server 12 via the web browser 38 at the subscriber device 22, the MAP server 12 formats the crowd data into a suitable web format before sending the crowd data to the subscriber device 22. The manner in which the crowd data is formatted depends on the particular implementation. In one embodiment, the crowd data is overlaid upon a map. For example, in one embodiment, the MAP server 12 may provide the crowd data to the subscriber device 22 via one or more web pages. Using the one or more web pages, crowd indicators representative of the locations of the crowds may be overlaid on a map. The subscriber 24 may then select a crowd in order to view additional crowd data regarding that crowd such as, for example, the aggregate profile of that crowd, characteristics of that crowd, or the like. Upon receiving the crowd data, the subscriber device 22 presents the crowd data to the subscriber 24 (step 2608). Note that in one embodiment, the MAP server 12 may roll-up the aggregate profiles for multiple crowds at a POI or in an AOI to provide a rolled-up aggregate profile that may be returned in addition to or as an alternative to the aggregate profiles of the individual crowds.

It should be noted that in some embodiments, the subscriber 24 may be enabled to specify filtering criteria via the web browser 38 or a custom application for interacting with the MAP server 12. For example, the subscriber 24 may specify filtering criteria regarding types of crowds in which the subscriber 24 is or is not interested. For instance, the crowd data may be presented to the subscriber 24 via one or more web pages that enable the subscriber 24 to select a filtering feature. In response, a list of keywords appearing in the user profiles of the crowds identified as being relevant to the current request may be presented to the subscriber 24. The subscriber 24 may then specify one or more keywords from the list such that crowds having users with user profiles that do not include any of the specified keywords are filtered, or removed, and are therefore not considered when generating the crowd data in response to a crowd request.

Figure 31:
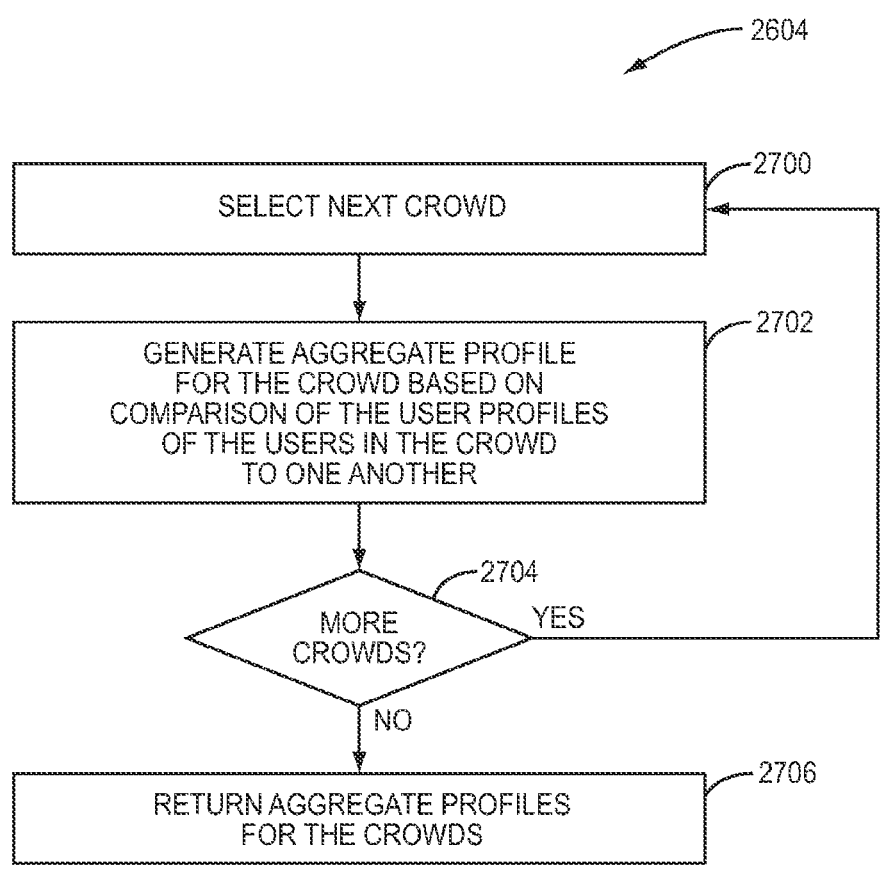
FIG. 31 is a flow chart for a process for generating aggregate profiles for crowds identified for a crowd request in response to a crowd request from a subscriber device according to one embodiment of the present disclosure.

FIG. 31 is a flow chart illustrating step 2604 of FIG. 30 in more detail according to one embodiment of the present disclosure. In this embodiment, the crowd data returned by the MAP server 12 includes aggregate profiles for the crowds identified for the POI or the AOI. In this embodiment, upon receiving the crowd request, the MAP server 12 triggers the crowd analyzer 58 to identify crowds relevant to the crowd request, and then passes the identified crowds to the aggregation engine 60 in order to generate aggregate profiles for the identified crowds.

More specifically, after the crowd analyzer 58 has identified the crowds relevant to the crowd request, the identified crowds are passed to the aggregation engine 60. The aggregation engine 60 selects a next crowd to process, which for the first iteration is the first crowd (step 2700). The aggregation engine 60 then generates an aggregate profile for the crowd based on a comparison of the user profiles of the users in the crowd to one another (step 2702). Note that in an alternative embodiment, the aggregation engine 60 then generates an aggregate profile for the crowd based on a comparison of the user profiles of the users in the crowd to a target user profile defined by the subscriber 24.

In one embodiment, in order to generate the aggregate profile for the crowd, the user profiles are expressed as keywords for each of a number of profile categories. Then, the aggregation engine 60 may determine an aggregate list of keywords for the crowd. The aggregate list of keywords is a list of all keywords appearing in the user profiles of the users in the crowd. The aggregate profile for the crowd may then include a number of user matches for each keyword in the aggregate list of keywords for the crowd. The number of user matches for a keyword is the number of users in the crowd having a user profile that includes that keyword. The aggregate profile may include the number of user matches for all keywords in the aggregate list of keywords for the crowd or the number of user matches for keywords in the aggregate list of keywords for the crowd having more than a predefined number of user matches (e.g., more than 1 user match). The aggregate profile may also include the number of users in the crowd. In addition or alternatively, the aggregate profile may include, for each keyword in the aggregate list or each keyword in the aggregate list having more than a predefined number of user matches, a ratio of the number of user matches for the keyword to the number of users in the crowd.

Once the aggregate profile of the crowd is generated, the aggregation engine 60 determines whether there are more crowds to process (step 2704). If so, the process returns to step 2700 and is repeated for the next crowd. Once aggregate profiles have been generated for all of the crowds relevant to the crowd request, the aggregate profiles for the crowds are returned (step 2706). Note that in some embodiments the subscriber 24 is enabled to activate a "nearby POIs" feature. If this feature is enabled, the crowds identified by the crowd analyzer 58 and processed by the aggregation engine 60 to produce corresponding aggregate profiles may also include crowds located at or near any nearby POIs. The nearby POIs may be POIs predefined by the subscriber 24 and/or the MAP server 12 that are within a predefined distance from the POI or the AOI of the crowd request.

Figure 32A:
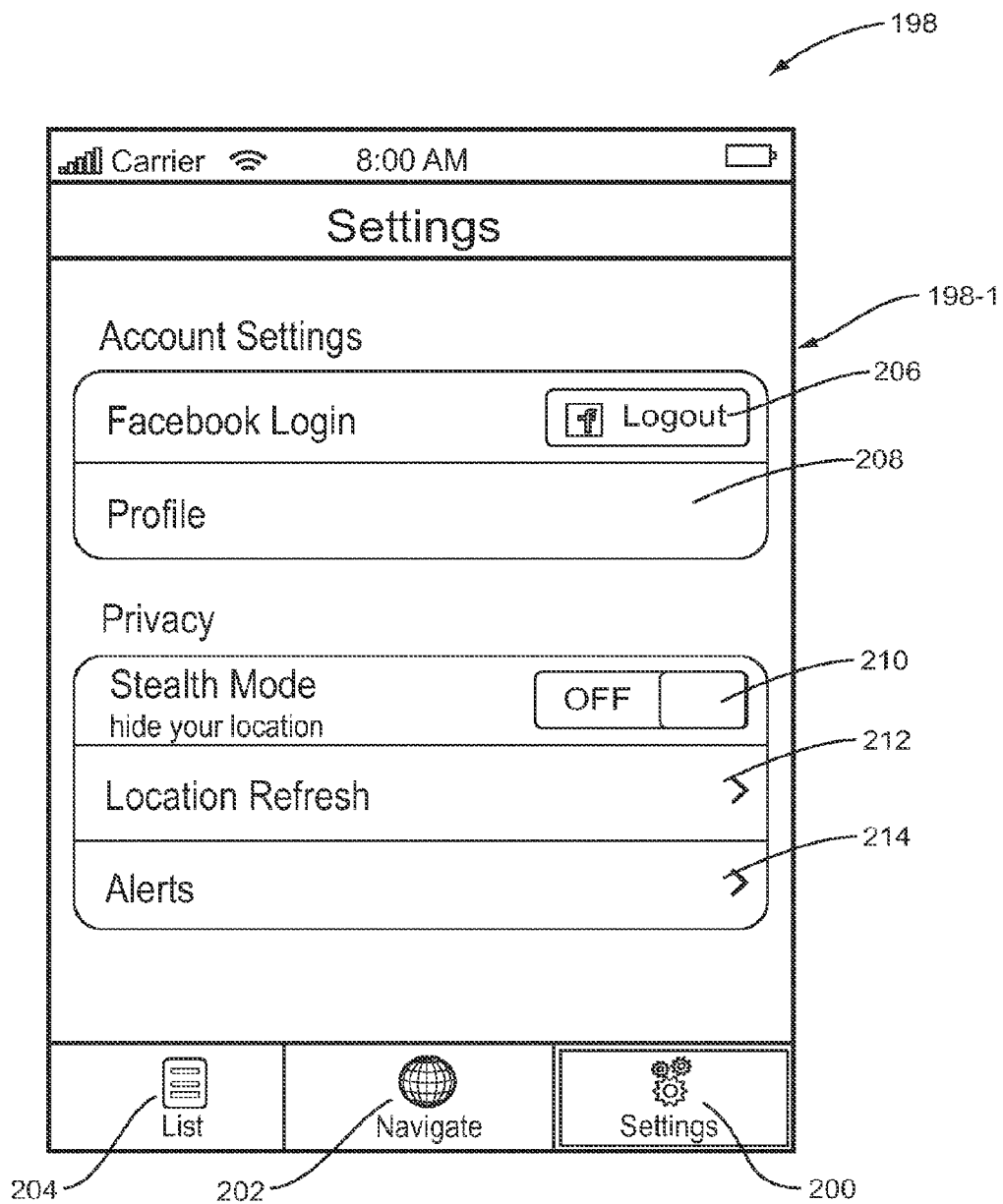
FIGS. 32A through 32E illustrate a GUI for an exemplary embodiment of the MAP application of one of the mobile devices of FIG. 1 according to one embodiment of the present disclosure.

FIGS. 32A through 32E illustrate a GUI 198 for an exemplary embodiment of the MAP application 32-1 of the mobile device 18-1 (FIG. 1). As illustrated in FIG. 32A, the GUI 198 includes a settings screen 198-1 that is presented in response to selection of a corresponding settings button 200 by the user 20-1. A navigation button 202 may be selected to view a map and perform navigation functions such as obtaining directions to a desired location. A list button 204 enables the user 20-1 to view a list of friends, crowds, POIs, and AOIs, as discussed below. Regarding the settings displayed in the settings screen 198-1 of the GUI 198, the user 20-1 is enabled to provide his Facebook® login information which, as described above, enables the user profile of the user 20-1 to be obtained from the Facebook® social networking service. In this example, the user 20-1 has already been logged in to Facebook. As such, the user 20-1 may logout of Facebook by selecting a logout button 206. In addition, by selecting a profile setting 208, the user 20-1 is enabled to view his profile and select one or more profile categories to be used for aggregate profile generation.

The settings screen 198-1 also enables the user 20-1 to configure a number of privacy settings. Namely, the settings screen 198-1 enables the user 20-1 to set a stealth mode switch 210 to either an on position or an off position. When the stealth mode switch 210 is in the on position, the location of the user 20-1 is not reported to the friends of the user 20-1. However, the location of the user 20-1 is still reported for use by the MAP server 12. The privacy settings also include a location refresh setting 212 that enables the user 20-1 to configure how often location updates are to be sent by the MAP application 32-1. Lastly, the settings screen 198-1 includes an alerts setting 214 that enables the user 20-1 to configure one or more alerts. As discussed below, an alert can be tied to a particular POI or AOI such that the user 20-1 is alerted, or notified, when a crowd at the particular POI or AOI satisfies one or more specified criteria. Alternatively, an alert can be tied to a particular crowd such that the user 20-1 is alerted, or notified, when the crowd satisfies one or more specified criteria.

Figure 32B:
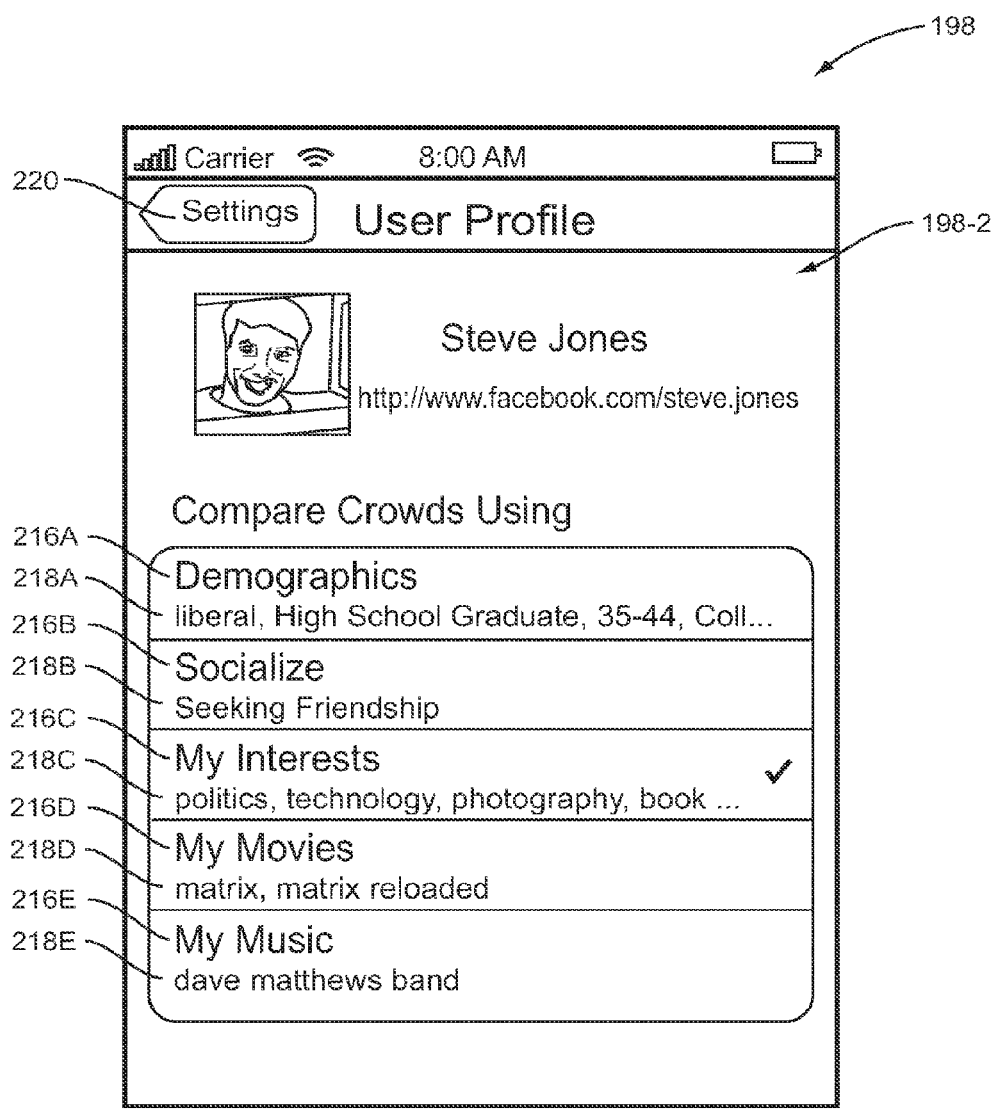

Returning to the profile setting 208, if the user 20-1 selects the profile setting 208, a user profile screen 198-2 is presented to the user 20-1 via the GUI 198, as illustrated in FIG. 32B. The user profile screen 198-2 shows a number of profile categories 216A through 216E and corresponding lists of keywords 218A through 218E, which form the user profile of the user 20-1. The user 20-1 is enabled to select one or more of the profile categories 216A through 216E to be used for aggregate profile generation (i.e., comparison to user profiles for history objects and crowds to create corresponding aggregate profiles for the user 20-1). In this example, the user 20-1 has selected his "My Interests" profile category 216C, where the corresponding list of keywords 218C define general interests of the user 20-1. In the user profile screen 198-2, the user 20-1 can return to the settings screen 198-1 by selecting a settings button 220.

Figure 32C:
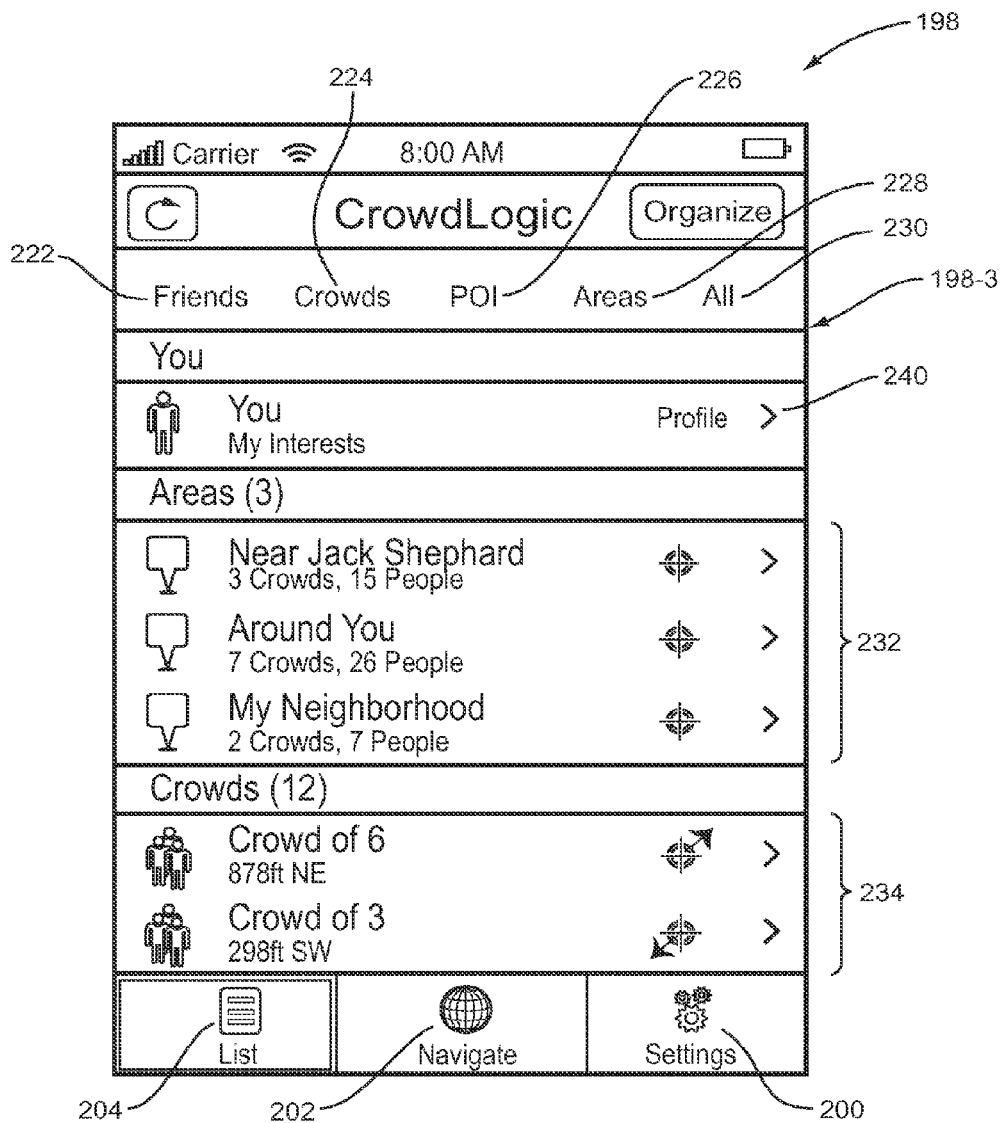
Figure 32D:
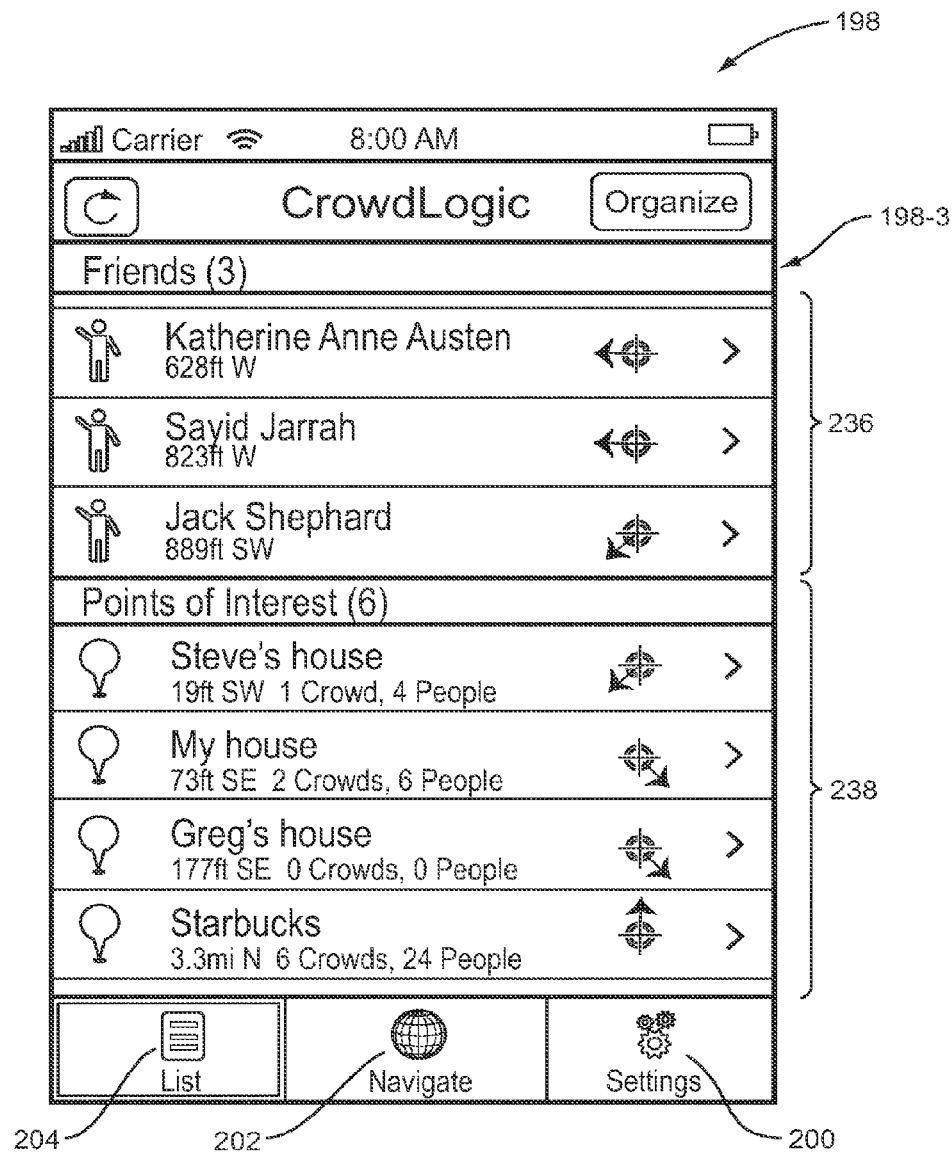

FIGS. 32C and 32D illustrate a list screen 198-3 that is presented to the user 20-1 via the GUI 198 in response to selecting the list button 204. The list screen 198-3 includes a friends button 222, a crowds button 224, a POI button 226, an areas button 228, and an all button 230. The list screen 198-3 enables the user 20-1 to view a list of his friends by selecting the friends button 222, a list of crowds at POIs or within AOIs of the user 20-1 by selecting the crowds button 224, a list of POIs of the user 20-1 by selecting the POI button 226, or a list of AOIs of the user 20-1 by selecting the areas button 228. In addition, the list screen 198-3 enables the user 20-1 to view a list that includes the friends of the user, the crowds at POIs or within AOIs of the user 20-1, the POIs of the user 20-1, and the AOIs of the user 20-1 by selecting the all button 230.

In this example, the user 20-1 has selected the all button 230. As such, the list screen 198-3 presents an AOI list 232 that includes a number of AOIs previously defined by the user 20-1. Note that each of the AOIs may be a static AOI defining a static geographic area or a dynamic AOI that is defined relative to a dynamic location such as a location of a friend of the user 20-1. For instance, in this example, the "Near Jack Shephard" AOI is a geographic area of a defined shape and size that is centered at the current location of the user's friend Jack Shephard. Note that in one embodiment, persons whose current locations may be used for dynamic AOIs are limited to the friends of the user 20-1. The user 20-1 may select an AOI from the AOI list 232 in order to view crowd data for the AOI. For example, by selecting the My Neighborhood AOI, the GUI 198 may present a map including the My Neighborhood AOI. Crowds relevant to the My Neighborhood AOI are presented on the map. The user 20-1 may then select a desired crowd in order to view detailed information regarding that crowd such as, for example, the aggregate profile of the crowd, characteristics of the crowd, or both.

The list screen 198-3 also presents a crowds list 234 that includes a number of crowds that are at the POIs or within the AOIs of the user 20-1. In this example, there are twelve crowds. The GUI 198 enables the user 20-1 to select a crowd from the crowds list 234 in order to view additional information regarding the crowd. For example, by selecting the Crowd of 6, the user 20-1 may be presented with a map showing the current location of the Crowd of 6 and detailed information regarding the Crowd of 6 such as, for example, the aggregate profile of the Crowd of 6, characteristics of the Crowd of 6, or both.

The list screen 198-3 also includes a friends list 236, as illustrated in FIG. 32D. The user 20-1 may select a friend from the friends list 236 in order to view crowds nearby that friend. In other words, the current locations of the friends of the user 20-1 are treated as temporary or dynamic POIs such that crowd data for current locations of the friends of the user 20-1 is obtained from the MAP server 12. In addition, the user 20-1 may choose to define an AOI centered at the current location of a friend to create a dynamic AOI, as discussed above. The friends list 236 also presents the current location of the friends of the user 20-1 relative to the current location of the user 20-1.

The list screen 198-3 also includes a POI list 238 that includes a number of POIs of the user 20-1. The user 20-1 may select a POI from the POI list 238 in order to view crowd data for the POI. For example, by selecting the Steve's house POI, the GUI 198 may present a map including the Steve's house POI. Crowds at or near the Steve's house POI are presented on the map. The user 20-1 may then select a desired crowd in order to view detailed information regarding that crowd such as, for example, the aggregate profile of the crowd, characteristics of the crowd, or both. Lastly, returning to FIG. 32C, the list screen 198-3 includes a You item 240 that may be selected by the user 20-1 to access the user profile screen 198-2 (FIG. 32B).

Figure 32E:
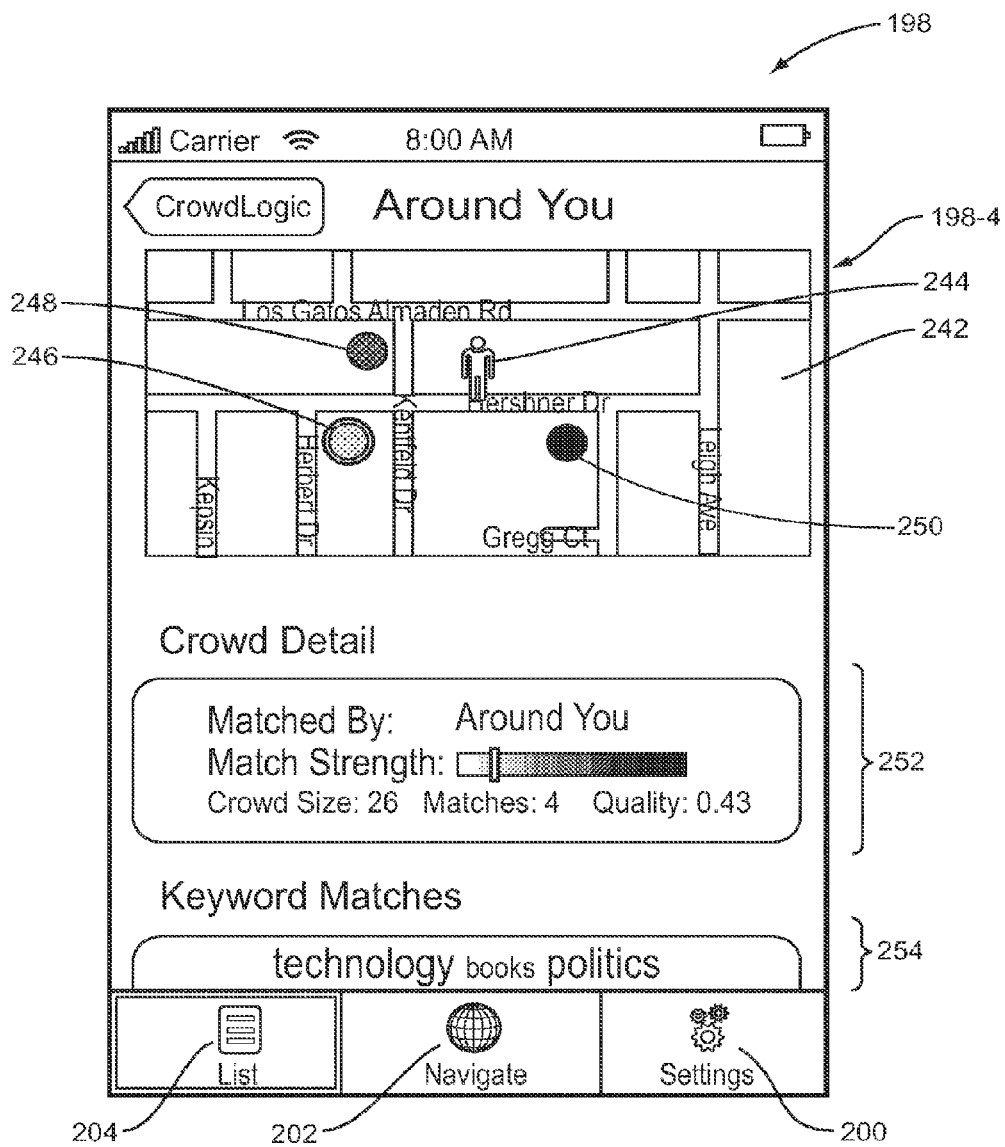

FIG. 32E is a crowd data display screen 198-4 presented by the GUI 198. In this example, the user 20-1 has selected the Around You AOI from the AOI list 232 (FIG. 32C). As a result, the GUI 198 presents the crowd data display screen 198-4 for the Around You AOI. The crowd data display screen 198-4 includes a map area 242. In this example, the current location of the user 20-1 is used as the center of the Around You AOI. The current location of the user 20-1 is represented in the map area 242 by a corresponding indicator 244. Crowds in the Around You AOI are represented in the map area by crowd indicators 246 through 250. In this embodiment, the crowd indictors 246 through 250 show the locations of the crowds as well as match strengths for the crowds. The locations of the crowds are included in the crowd data. The match strengths for the crowds may be included in the aggregate profiles for the crowds or may be determined based on the aggregate profiles for the crowds. In this embodiment, the match strength of a crowd is computed as a ratio of the number of user matches over all keywords to the number of users in the crowd. A ratio of one results in a highest match strength, and a ratio of zero results in a lowest match strength.

Using the GUI 198, the user 20-1 is enabled to select a particular crowd in the map area 242 to view more detailed information for that crowd in a crowd detail area 252 of the crowd data display screen 198-4. In this example, the user 20-1 has selected the crowd indicator 246. As a result, more detailed information for the crowd represented by the crowd indicator 246 is presented in the crowd detail area 252. The more detailed information for the crowd is from the crowd data for the crowd or derived from the crowd data for the crowd. In this example, the aggregate profile of the crowd is used to derive the match strength for the crowd, and the match strength is presented in the crowd detail area 252. In addition, the crowd size and number of user matches over all keywords are obtained from the aggregate profile for the crowd and presented in the crowd detail area 252. In this example, a quality factor for the crowd is also presented. As discussed below in detail, the quality factor of the crowd may be an average of a quality or confidence of the current locations of the users in the crowd. Still further, the crowd data display screen 198-4 includes a keyword matches area 254 for presenting keyword matches for the selected crowd. In this example, a font size of the keywords in the keyword matches area 254 reflects the number of user matches for that keyword. Therefore, in this example, the number of user matches for the keyword "technology" is greater than the number of user matches for the keyword "books."

Figure 33A:
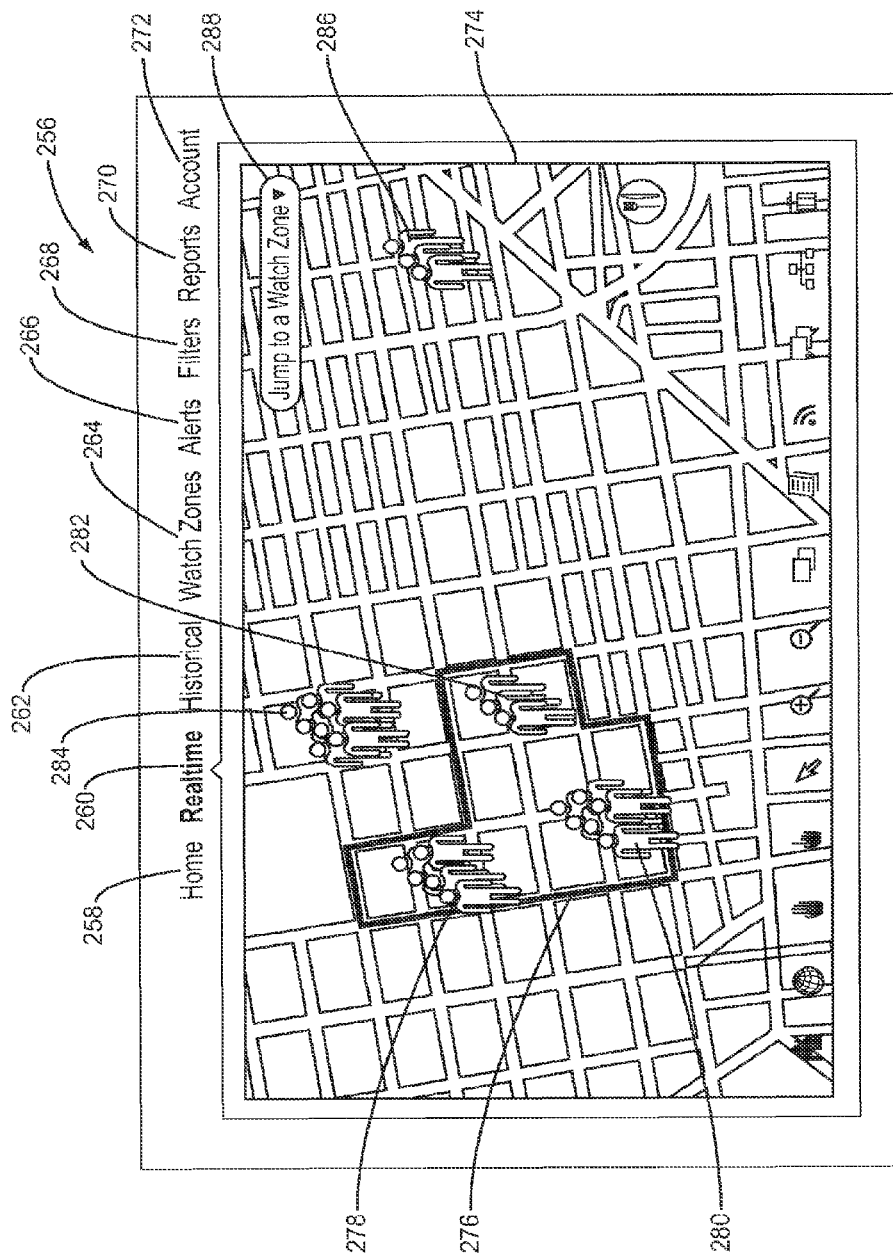
FIGS. 33A through 33C illustrate an exemplary web interface provided by the MAP server and presented to the subscriber at the subscriber device according to one embodiment of the present disclosure.
Figure 33B:
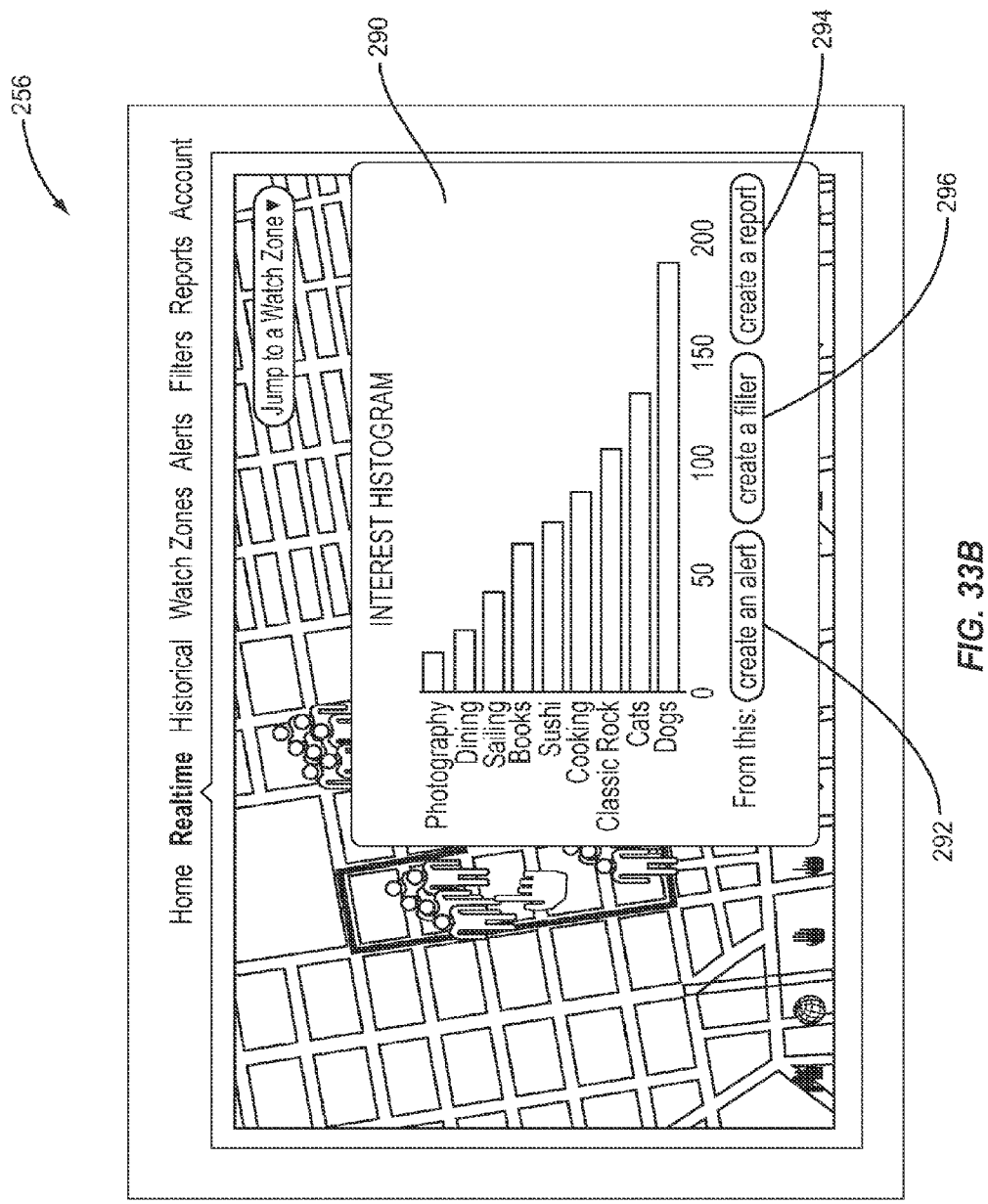
Figure 33C:
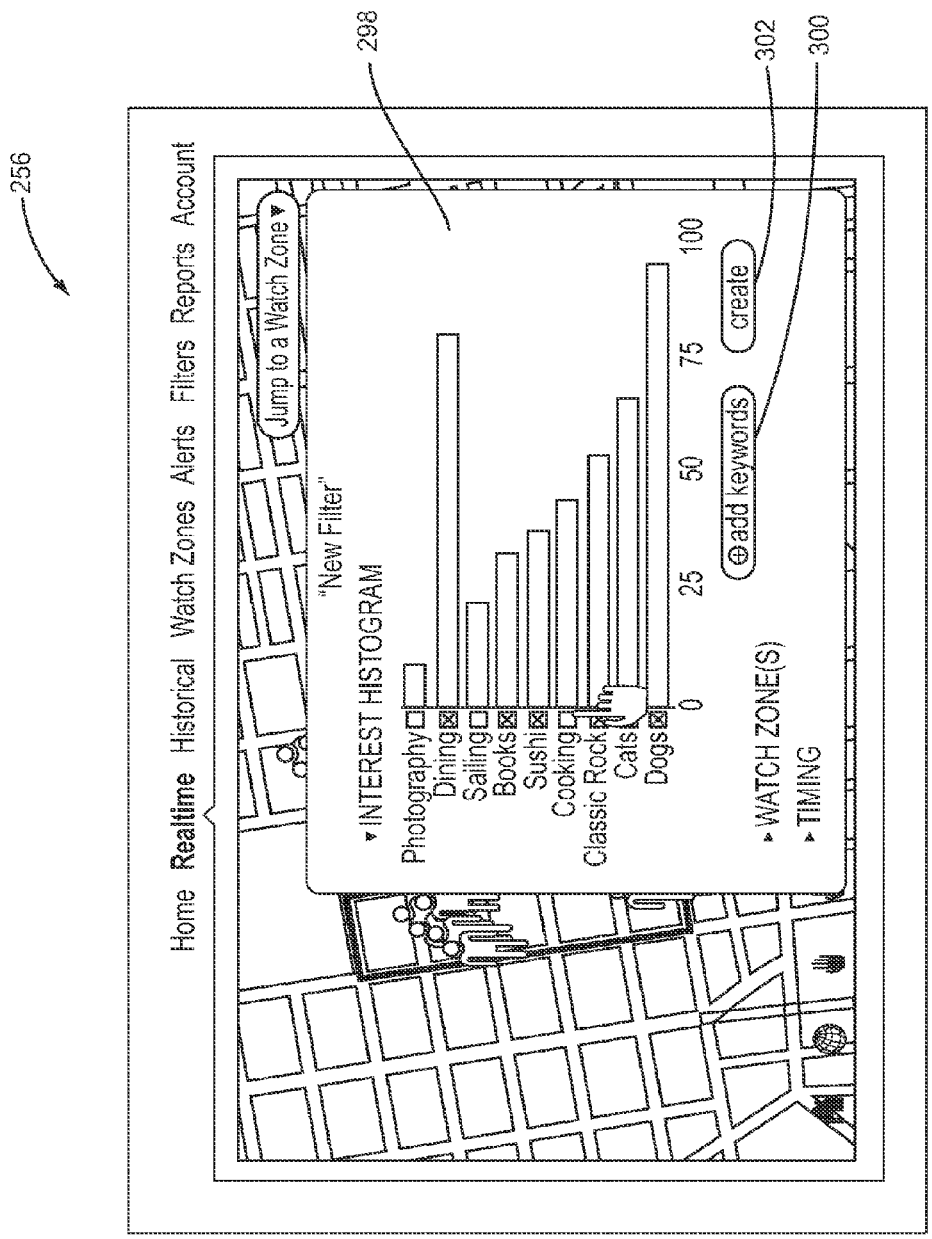

FIGS. 33A through 33C illustrate an exemplary web interface 256 provided by the MAP server 12 and presented to the subscriber 24 at the subscriber device 22. The web interface 256 includes a number of tabs 258 through 272, namely, a home tab 258, a realtime tab 260, a historical tab 262, a watch zones tab 264, an alerts tab 266, a filters tab 268, a reports tab 270, and an account tab 272. The home tab 258 enables the subscriber 24 to view a home screen. The home screen may include any desired information such as, for example, a link to a Frequently Asked Question (FAQ) page, instructions on how to use the web interface 256, or the like. The realtime tab 260 enables the subscriber to view realtime crowd data for POIs and/or AOIs of the subscriber 24. The historical tab 262 enables the subscriber 24 to view historical data for a POI or an AOI in a time context and/or a geographic context in the manner described above. The watch zones tab 264 enables the subscriber 24 to select POIs and/or AOIs of interest to the subscriber 24. The alerts tab 266 enables the subscriber 24 to configure one or more alerts. The filters tab 268 enables the subscriber 24 to configure filters and/or select filters to be applied to the crowd data in the realtime or historical view. The reports tab 270 enables the subscriber 24 to access reports previously generated for crowds of interest, POIs, and/or AOIs. Lastly, the account tab 272 enables the subscriber 24 to manage the subscriber's account.

More specifically, FIG. 33A illustrates the web interface 256 when the realtime tab 260 has been selected by the subscriber 24. When the realtime tab 260 is selected, the web interface 256 presents a map area 274 that shows an AOI 276 and a number of crowds 278 through 282 currently located within the AOI 276. In addition, in this exemplary embodiment, crowds 284 and 286 that are outside the AOI 276 are also illustrated. The crowds 284 and 286 are crowds located at other POIs or within other AOIs of the subscriber 24 that are not currently being viewed by the subscriber 24. The subscriber 24 may view another POI or AOI by selecting the desired POI or AOI from a list presented in response to selection of a button 288. In this example, POIs and AOIs are generically referred to as watch zones.

In this example, the subscriber 24 selects the crowd 278. In response, the web interface 256 presents an aggregate profile window 290 to the subscriber 24, as illustrated in FIG. 33B. The aggregate profile window 290 presents an aggregate profile of the crowd 278, where in this embodiment the aggregate profile is in the form of an interest histogram showing the number of user matches in the crowd 278 for each of a number of keywords. The subscriber 24 may be enabled to create an alert for the crowd 278 by selecting a create an alert button 292. In response, the subscriber 24 may be enabled to utilize the keywords in the aggregate profile window 290 to create an alert. For example, the subscriber 24 may create an alert such that the subscriber 24 is notified when the number of user matches for the keyword "Sushi" in the crowd 278 reaches one hundred. The subscriber 24 may also be enabled to create a report for the crowd 278 by selecting a create a report button 294. The report may, for example, include details about the crowd 278 such as, for example, the location of the crowd 278, the size of the crowd 278, the aggregate profile of the crowd 278, the current time and date, or the like, where the report may be saved or printed by the subscriber 24.

In addition, the subscriber 24 may be enabled to create a filter by selecting a create a filter button 296. In response to selecting the create a filter button 296, a new filter screen 298 is presented to the subscriber 24, as illustrated in FIG. 33C. The subscriber 24 may then select keywords from the interest histogram for the crowd 278 to be used for the filter. In addition, the subscriber 24 may be enabled to add new keywords to the filter by selecting an add keywords button 300. Once the subscriber 24 has configured the filter, the subscriber 24 is enabled to create the filter by selecting a create button 302. Once the filter is created, the filter may be used to filter crowds for any AOI or POI of the subscriber 24.

FIGS. 34 through 45 describe the operation of the crowd analyzer 58 of the MAP server 12 to characterize crowds according to another embodiment of the present disclosure. More specifically, the crowd analyzer 58 may determine a degree-of-fragmentation, best and worst case average DOS, and/or a degree of bidirectionality for crowds. This information may then be included in crowd data for those crowds returned to the mobile devices 18-1 through 18-N and/or the subscriber device 22. In addition or alternatively, the data characterizing crowds may be used to filter crowds. For example, a filter may be applied such that crowds having a worst-case average DOS greater than a defined threshold are not presented to a user/subscriber. The filtering may be performed by the MAP server 12 before returning crowd data to the requesting device (i.e., one of the mobile devices 18-1 through 18-N, the subscriber device 22, or a device hosting the third-party service 26). Alternatively, the filtering may be performed by the mobile devices 18-1 through 18-N, the subscriber device 22, or a device hosting the third-party service 26.

Figure 34:
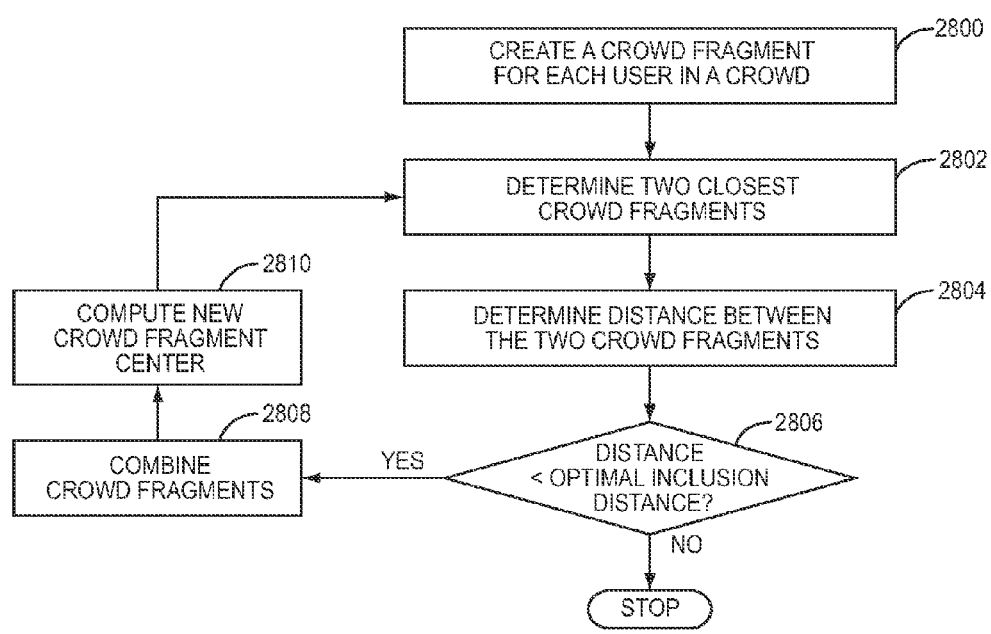
FIG. 34 is a flow chart illustrating a spatial crowd fragmentation process according to one embodiment of the present disclosure.

FIG. 34 is a flow chart illustrating a spatial crowd fragmentation process according to one embodiment of the present disclosure. This process is similar to the spatial crowd formation process discussed above with respect to FIG. 22. First, the crowd analyzer 58 creates a crowd fragment of one user for each user in a crowd (step 2800). Note that this spatial crowd fragmentation process may be performed reactively in response to a current request for crowd data for a POI or an AOI or performed proactively. Next, the crowd analyzer 58 determines the two closest crowd fragments in the crowd (step 2802) and a distance between the two closest crowd fragments (step 2804). The distance between the two closest crowd fragments is the distance between the crowd fragment centers of the two closest crowd fragments. The crowd fragment center for a crowd fragment having only one user is the current location of that one user.

The crowd analyzer 58 then determines whether the distance between the two closest crowd fragments is less than an optimal inclusion distance for a crowd fragment (step 2806). In one embodiment, the optimal inclusion distance for a crowd fragment is a predefined static value. In another embodiment, the optimal inclusion distance of the crowd may vary. For example, if the spatial crowd formation process of FIGS. 24A through 24D is used for proactive crowd formation, then the optimal inclusion distance for the crowd may vary. As such, the optimal inclusion distance for a crowd fragment within the crowd may be defined as a fraction of the optimal inclusion distance of the crowd such that the optimal inclusion distance for a crowd fragment within the crowd varies along with the optimal inclusion distance for the crowd itself.

If the distance between the two closest crowd fragments is less than the optimal inclusion distance for a crowd fragment, then the two closest crowd fragments are combined (step 2808) and a new crowd fragment center is computed for the resulting crowd fragment (step 2810). The crowd fragment center may be computed using, for example, a center of mass algorithm. At this point the process returns to step 2802 and is repeated. Once the two closest crowd fragments in the crowd are separated by more than the optimal inclusion distance for a crowd fragment, the process ends. At this point, the crowd analyzer 58 has created the crowd fragments or defined the crowd fragments for the crowd. The crowd analyzer 58 may then represent the degree of fragmentation of the crowd based on the number of crowd fragments in the crowd and, optionally, an average number of users per crowd fragment. The degree of fragmentation of the crowd may be included in the crowd data returned to the requesting device in response to a crowd request for a POI or an AOI to which the crowd is relevant.

Figure 35A:
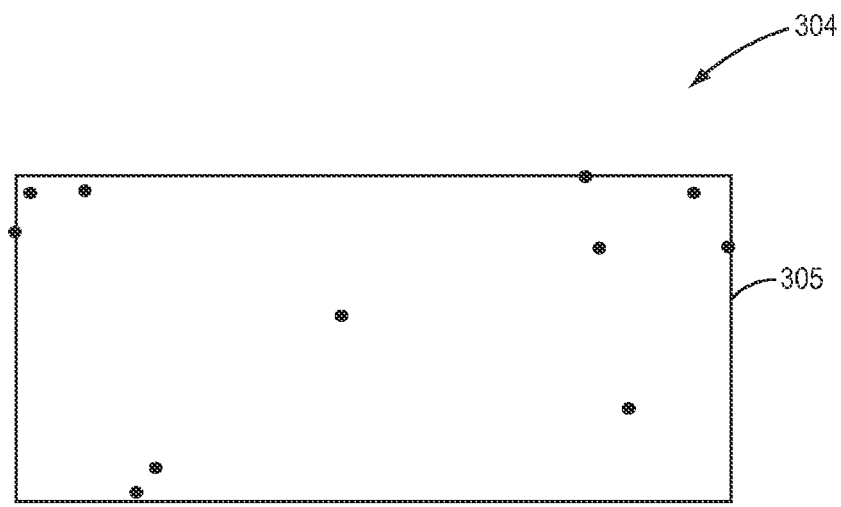
FIGS. 35A and 35B graphically illustrate the spatial crowd fragmentation process of FIG. 34 for an exemplary crowd.
Figure 35B:
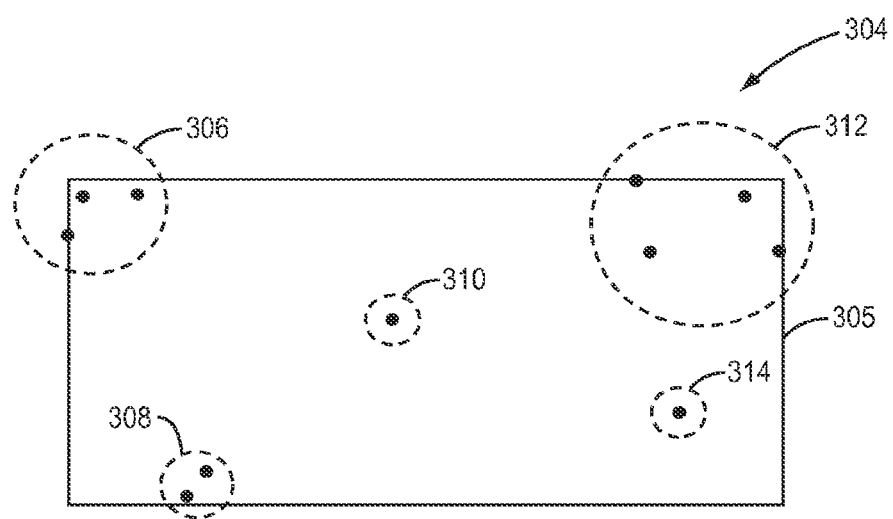

FIGS. 35A and 35B graphically illustrate the spatial crowd fragmentation process of FIG. 34 for an exemplary crowd 304 having bounding box 305. FIG. 35A illustrates the crowd 304 before spatial crowd fragmentation. FIG. 35B illustrates the crowd 304 after spatial crowd fragmentation. As illustrated, after spatial crowd fragmentation, the crowd 304 includes a number of crowd fragments 306 through 314. As such, the crowd 304 has a degree of fragmentation of five crowd fragments with an average of approximately 2 users per crowd fragment. Thus, the crowd 304 has a moderately high degree of fragmentation. The highest degree of fragmentation for the crowd 304 would be to have eleven crowd fragments with an average of one user per crowd fragment. The lowest degree of fragmentation for the crowd 304 would be to have one crowd fragment with an average of eleven users per crowd fragment.

Figure 36:
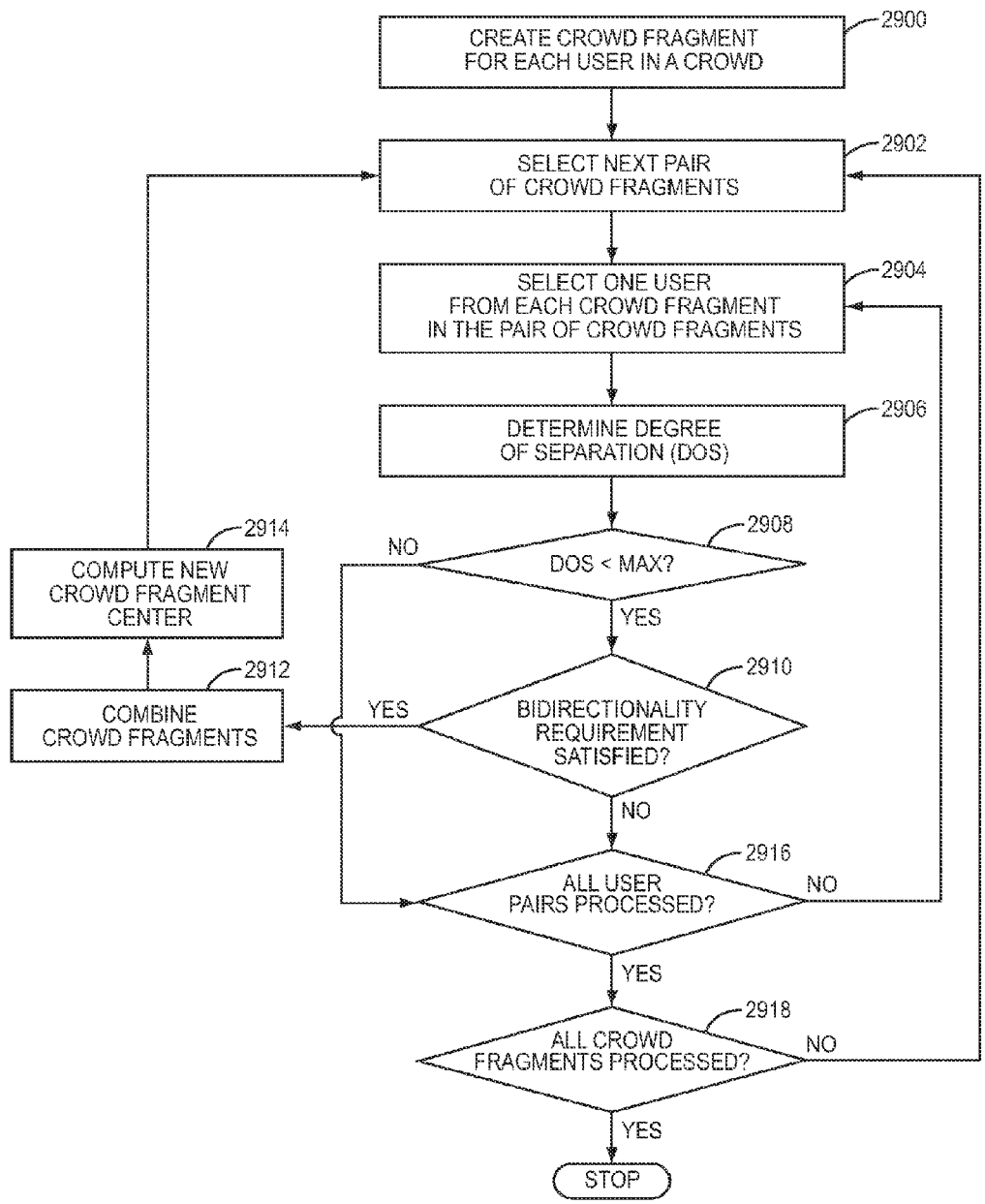
FIG. 36 illustrates a connectivity-based crowd fragmentation process according to one embodiment of the present disclosure.

FIG. 36 illustrates a connectivity-based crowd fragmentation process according to one embodiment of the present disclosure. First, the crowd analyzer 58 creates a crowd fragment for each user in the crowd (step 2900). Note that this connectivity-based crowd fragmentation process may be performed reactively in response to a current request for crowd data for a POI or an AOI or performed proactively. Next, the crowd analyzer 58 selects a next pair of crowd fragments in the crowd (step 2902) and then selects one user from each of those crowd fragments (step 2904). The crowd analyzer 58 then determines a DOS between the users from the pair of crowd fragments (step 2906). More specifically, as will be appreciated by one of ordinary skill in the art, DOS is a measure of the degree to which the two users are related in a social network (e.g., the Facebook® social network, the MySpace® social network, or the LinkedIN® social network). The two users have a DOS of one if one of the users is a friend of the other user, a DOS of two if one of the users is a friend of a friend of the other user, a DOS of three if one of the users is a friend of a friend of a friend of the other user, etc. If the two users are not related in a social network or have an unknown DOS, the DOS for the two users is set to a value equal to or greater than the maximum DOS for a crowd fragment.

The crowd analyzer 58 then determines whether the DOS between the two users is less than a predefined maximum DOS for a crowd fragment (step 2908). For example, the predefined maximum DOS may be three. However, other maximum DOS values may be used to achieve the desired crowd fragmentation. If the DOS between the two users is not less than the predefined maximum DOS, the process proceeds to step 2916. If the DOS between the two users is less than the predefined maximum DOS, the crowd analyzer 58 determines whether a bidirectionality requirement is satisfied (step 2910). The bidirectionality requirement specifies whether the relationship between the two users must be bidirectional (i.e., the first user must directly or indirectly know the second user and the second user must directly or indirectly know the first user). Bidirectionality may or may not be required depending on the particular embodiment. If the two users satisfy the bidirectionality requirement, the crowd analyzer 58 combines the pair of crowd fragments (step 2912) and computes a new crowd fragment center for the resulting crowd fragment (step 2914). The process then returns to step 2902 and is repeated for a next pair of crowd fragments. If the two users do not satisfy the bidirectionality requirement, the process proceeds to step 2916.

At this point, whether proceeding from step 2908 or step 2910, the crowd analyzer 58 determines whether all user pairs from the two crowd fragments have been processed (step 2916). If not, the process returns to step 2904 and is repeated for a new pair of users from the two crowd fragments. If all user pairs from the two crowd fragments have been processed, the crowd analyzer 58 then determines whether all crowd fragments have been processed (step 2918). If not, the process returns to step 2902 and is repeated until all crowd fragments have been processed. Once this process is complete, the crowd analyzer 58 has determined the number of crowd fragments in the crowd. The degree of fragmentation of the crowd may then be provided as the number of crowd fragments and the average number of users per crowd fragment.

Figure 37A:
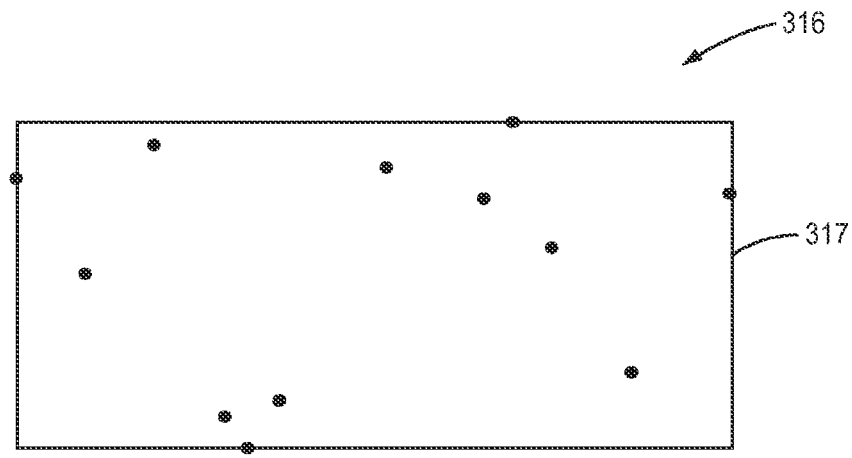
FIGS. 37A and 37B graphically illustrate the connectivity-based crowd fragmentation process of FIG. 36 for an exemplary crowd.
Figure 37B:
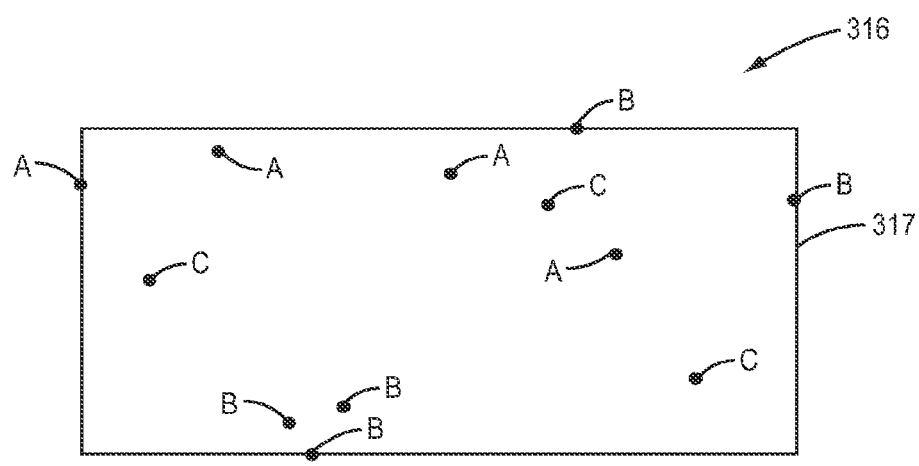

FIGS. 37A and 37B graphically illustrate the connectivity-based crowd fragmentation process of FIG. 36. FIG. 37A illustrates a crowd 316 having a number of users and a bounding box 317. FIG. 37B illustrates the crowd 316 after the connectivity-based crowd fragmentation process has been performed. As illustrated, there are three crowd fragments resulting from the connectivity-based crowd fragmentation process. Namely, crowd fragment A has four users marked as "A," crowd fragment B has five users marked as "B," and crowd fragment C has three users marked as "C." As illustrated, the users in a particular crowd fragment may not be close to one another spatially since, in this embodiment, there is no spatial requirement for users of the crowd fragment other than that the users of the crowd fragment are in the same crowd.

Figure 38:
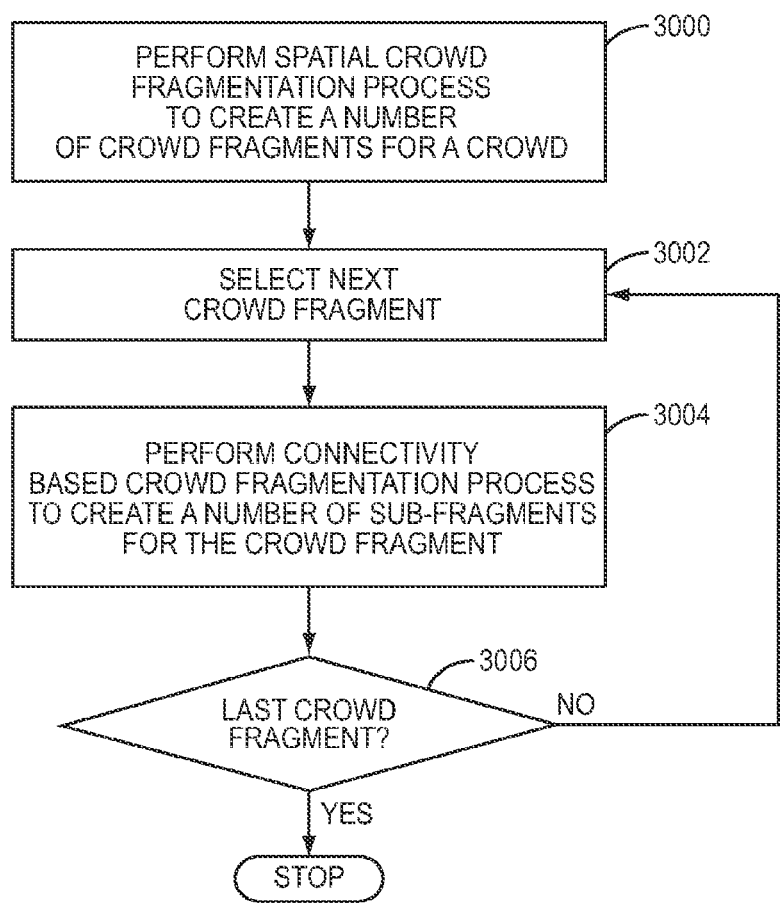
FIG. 38 is a flow chart illustrating a recursive crowd fragmentation that uses both spatial crowd formation and connectivity-based crowd formation according to one embodiment of the present disclosure.

FIG. 38 is a flow chart illustrating a recursive crowd fragmentation process that uses both spatial crowd fragmentation and connectivity-based crowd fragmentation according to one embodiment of the present disclosure. First, the crowd analyzer 58 performs a spatial crowd fragmentation process to create a number of crowd fragments for a crowd (step 3000). The spatial crowd fragmentation process may be the spatial crowd fragmentation process of FIG. 34. The crowd analyzer 58 then selects a next crowd fragment of the crowd fragments created for the crowd (step 3002). Next, the crowd analyzer 58 performs a connectivity-based crowd fragmentation process to create a number of sub-fragments for the crowd fragment of the crowd (step 3004). The connectivity-based crowd fragmentation process may be the connectivity-based crowd fragmentation process of FIG. 36. The crowd analyzer 58 then determines whether the last crowd fragment of the crowd has been processed (step 3006). If not, the process returns to step 3002 and is repeated until the last crowd fragment of the crowd has been processed. At that point, the process is complete. The degree of fragmentation for the crowd may then include the number of sub-fragments and average number of users per sub-fragment for each crowd fragment.

Figure 39:
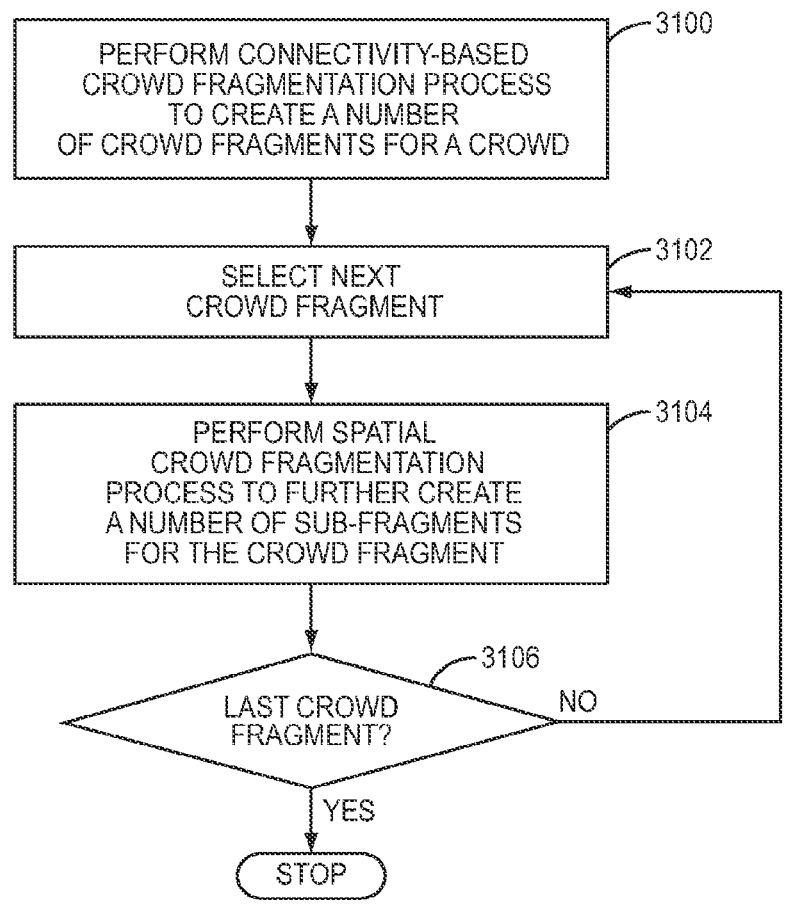
FIG. 39 is a flow chart illustrating a recursive crowd fragmentation that uses both spatial crowd formation and connectivity-based crowd formation according to another embodiment of the present disclosure.

FIG. 39 is a flow chart illustrating a recursive crowd fragmentation process that uses both spatial crowd fragmentation and connectivity-based crowd fragmentation according to another embodiment of the present disclosure. First, the crowd analyzer 58 performs a connectivity-based crowd fragmentation process to create a number of crowd fragments for a crowd (step 3100). The connectivity-based crowd fragmentation process may be the connectivity-based crowd fragmentation process of FIG. 36. The crowd analyzer 58 then selects a next crowd fragment of the crowd fragments created for the crowd (step 3102). Next, the crowd analyzer 58 performs a spatial crowd fragmentation process to create a number of sub-fragments for the crowd fragment of the crowd (step 3104). The spatial crowd fragmentation process may be the spatial crowd fragmentation process of FIG. 34. The crowd analyzer 58 then determines whether the last crowd fragment of the crowd has been processed (step 3106). If not, the process returns to step 3102 and is repeated until the last crowd fragment of the crowd has been processed. At that point, the process is complete. The degree of fragmentation for the crowd may then include the number of sub-fragments and average number of users per sub-fragment for each crowd fragment.

Figure 40A:
FIGS. 40A and 40B illustrate an exemplary graphical representation of the degree of fragmentation for a crowd according to one embodiment of the present disclosure.
Figure 40B:
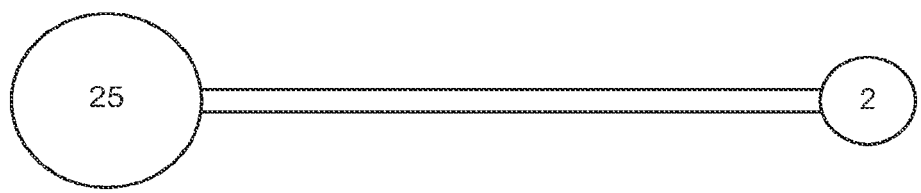

FIGS. 40A and 40B illustrate an exemplary graphical representation of the degree of fragmentation for a crowd. This exemplary graphical representation may be presented by the MAP application 32-1 based on corresponding crowd data provided by the MAP server 12 in response to a crowd request or presented by the MAP server 12 to the subscriber 24 via the web browser 38 of the subscriber device 22. FIG. 40A illustrates a graphical representation of the degree of fragmentation for a crowd having two crowd fragments with an average of twenty-five users per crowd fragment. FIG. 40B illustrates a graphical representation of the degree of fragmentation for a crowd having twenty-five crowd fragments with an average of two users per crowd fragment.

Figure 41:
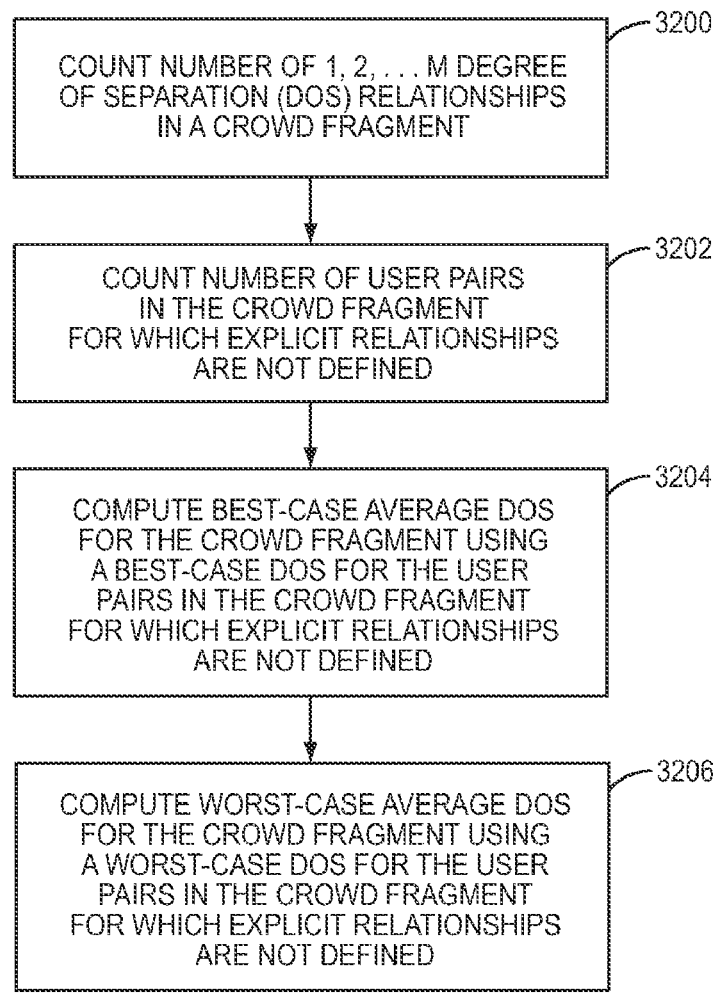
FIG. 41 is a flow chart for a process for determining a best-case and worst-case average degree of separation (DOS) for a crowd fragment of a crowd according to one embodiment of the present disclosure.

FIG. 41 is a flow chart for a process for determining a best-case and worst-case average DOS for a crowd fragment of a crowd according to one embodiment of the present disclosure. The crowd analyzer 58 counts the number of 1 DOS, 2 DOS, ..., M DOS relationships in a crowd fragment (step 3200) and the number of user pairs in the crowd fragment for which explicit relationships are not defined or known (step 3202). More specifically, for each pair of users in the crowd fragment, the crowd analyzer 58 determines the DOS between the pair of users if the DOS between the pair of user is known or determines that the DOS between the pair of users is not defined or known if the DOS between the pair of users is in fact not defined or known. Based on these determinations, the crowd analyzer 58 counts the number of user pairs having a DOS of 1, the number of user pairs having a DOS of 2, etc. In addition, the crowd analyzer 58 counts the number of user pairs for which no relationship is defined or known.

The crowd analyzer 58 then computes a best-case average DOS for the crowd fragment using a best-case DOS for the user pairs in the crowd fragment for which explicit relationships are not defined (step 3204). In this embodiment, the best-case average DOS is 1. The best-case average DOS may computed as:

$$AverageDOS_{BestCase} = \frac{\sum_{i=1}^{M}(i \cdot DOS\_count_i) + DOS_{BestCase} \cdot Num\_Unknown}{\sum_{i=1}^{M}(DOS\_count_i) + Num\_Unknown},$$

where $AverageDOS_{Bestcase}$ is the best-case average DOS for the crowd fragment, $DOS\_count_i$ is the number of user pairs for the ith DOS, $DOS_{Bestcase}$ is the best-case DOS, and Num_Unknown is the number of user pairs for which a relationship is not defined or is unknown.

The crowd analyzer 58 also computes the worst-case average DOS for the crowd fragment using a worst-case DOS for the user pairs in the crowd fragment for which explicit relationships are not defined (step 3206). In this embodiment, the worst-case DOS is a greatest possible DOS that the crowd analyzer 58 considers, which may be, for example, a DOS of greater than or equal to 7. For instance, the worst-case DOS may be 10. However, other values for the worst-case DOS may be used. The worst-case average DOS may computed as:

$$AverageDOS_{WorstCase} = \frac{\sum_{i=1}^{M}(i \cdot DOS\_count_i) + DOS_{WorstCase} \cdot Num\_Unknown}{\sum_{i=1}^{M}(DOS\_count_i) + Num\_Unknown},$$

where $AverageDOS_{WorstCase}$ is the worst-case average DOS for the crowd fragment, $DOS\_count_i$ is the number of user pairs for the ith DOS, $DOS_{WorstCase}$ is the worst-case DOS, and Num_Unknown is the number of user pairs for which a relationship is not defined or is unknown.

Figure 42:
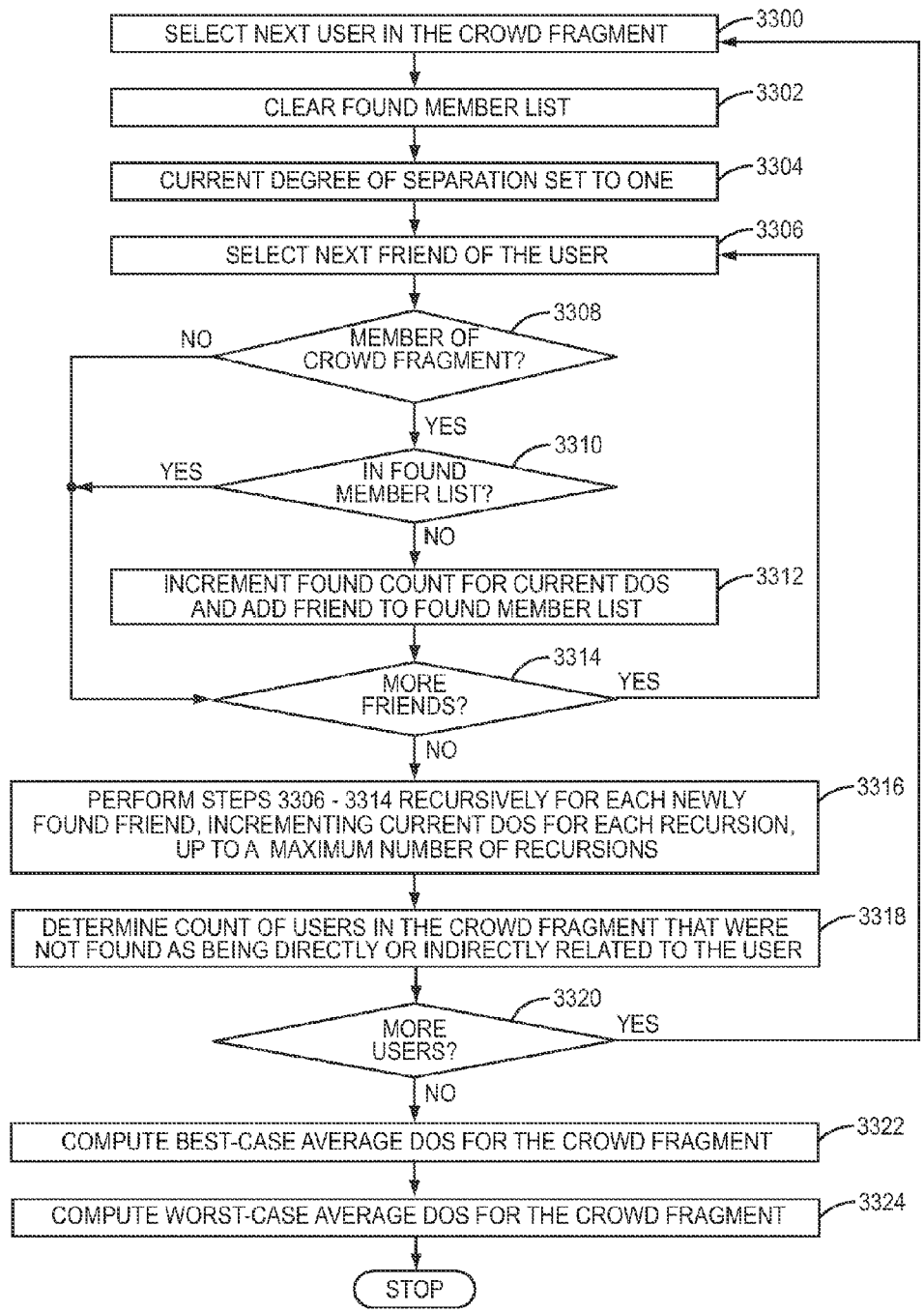
FIG. 42 is a more detailed flow chart illustrating the process for determining a best-case and worst-case average DOS for a crowd fragment according to one embodiment of the present disclosure.

FIG. 42 is a more detailed flow chart illustrating the process for determining a best-case and worst-case average DOS for a crowd fragment according to one embodiment of the present disclosure. First, the crowd analyzer 58 selects the next user in the crowd fragment, which for the first iteration is the first user in the crowd fragment (step 3300), and clears a found member list (step 3302). The crowd analyzer 58 then sets a current DOS to one (step 3304). Next, the crowd analyzer 58 selects a next friend of the user (step 3306). Note that, in one embodiment, information identifying the friends of the user are obtained from the one or more profile servers 14 along with the user profile of the user. The crowd analyzer 58 then determines whether the friend of the user is also a member of the crowd fragment (step 3308). If not, the process proceeds to step 3314. If the friend is also a member of the crowd fragment, the crowd analyzer 58 determines whether the friend is already in the found member list (step 3310). If so, the process proceeds to step 3314. If the friend is also a member of the crowd fragment and is not already in the found member list, the crowd analyzer 58 increments a found count for the current DOS and adds the friend to the found member list (step 3312). At this point, whether proceeding from step 3308 or step 3310, the crowd analyzer 58 then determines whether the user has more friends to process (step 3314). If so, the process returns to step 3306 and is repeated for the next friend of the user.

Once all of the friends of the user have been processed, the crowd analyzer 58 performs steps 3306 through 3314 recursively for each newly found friend, incrementing the current DOS for each recursion, up to a maximum number of recursions (step 3316). Newly found friends are friends added to the found member list in the iteration or recursion of steps 3306 through 3314 just completed. In more general terms, steps 3306 through 3316 operate to find friends of the user selected in step 3300 that are also members of the crowd fragment and increment the found count for a DOS of 1 for each of the found friends of the user. Then, for each friend of the user that was found to also be a member of the crowd fragment, the crowd analyzer 58 finds friends of that friend of the user that are also members of the crowd fragment and increments the found count for a DOS of 2 for each of the found friends of the friend of the user. The process continues in this manner to count the number of user relationships between the user selected in step 3300 and other members in the crowd fragment up to the Mth DOS.

Next, the crowd analyzer 58 determines a count of users in the crowd fragment that were not found as being directly or indirectly related to the user selected in step 3300 (step 3318). More specifically, by looking at the found member list and the total number of users in the crowd fragment, the crowd analyzer 58 is enabled to determine the count of users in the crowd fragment that were not found as being directly or indirectly related to the user.

At this point, the crowd analyzer 58 determines whether there are more users in the crowd fragment to process (step 3320). If so, the process returns to step 3300 and is repeated for the next user in the crowd fragment. Once all of the users in the crowd fragment have been processed, the crowd analyzer 58 computes a best-case average DOS for the crowd fragment (step 3322). Again, in one embodiment, the best-case average DOS for the crowd fragment is computed as:

$$AverageDOS_{BestCase} = \frac{\sum_{i=1}^{M}(i \cdot found\_count_{DOSi}) + DOS_{BestCase} \cdot Num\_Unknown}{\sum_{i=1}^{M}(found\_count_{DOSi}) + Num\_Unknown},$$

where $AverageDOS_{Bestcase}$ is the best-case average DOS for the crowd fragment, $found\_count_{Dosi}$ is the found count for the ith DOS, $DOS_{Bestcase}$ is the best-case DOS which may be set to, for example, 1, and Num_Unknown is the total count of user pairs in the crowd fragment that were not found as being directly or indirectly related.

In addition, the crowd analyzer 58 computes a worst-case average DOS for the crowd fragment (step 3324). Again, in one embodiment, the worst-case average DOS for the crowd fragment is computed as:

$$AverageDOS_{WorstCase} = \frac{\sum_{i=1}^{M}(i \cdot found\_count_{DOSi}) + DOS_{WorstCase} \cdot Num\_Unknown}{\sum_{i=1}^{M}(found\_count_{DOSi}) + Num\_Unknown},$$

where $AverageDOS_{WorstCase}$ is the worst-case average DOS for the crowd fragment, $found\_count_{Dosi}$ is the found count for the ith DOS, $DOS_{WorstCase}$ is the worst-case DOS which may be set to, for example, 10, and Num_Unknown is the total count of user pairs in the crowd fragment that were not found as being directly or indirectly related. At this point the process is complete and the best-case and worst-case average DOS for the crowd fragment may be returned as part of the crowd data for the corresponding crowd. It should be noted that while the processes of FIGS. 41 and 42 were described above as being performed on a crowd fragment, the same processes may be performed on a crowd in order to determine a best-case and worst-case average DOS for the crowd.

Figure 43A:
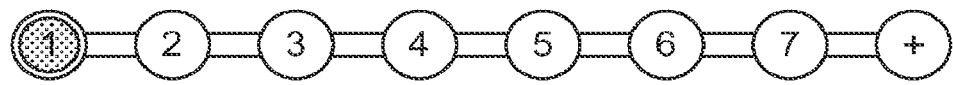
FIGS. 43A through 43D illustrate an exemplary graphical representation of the best-case and worst-case average DOS for a crowd fragment according to one embodiment of the present disclosure.
Figure 43B:
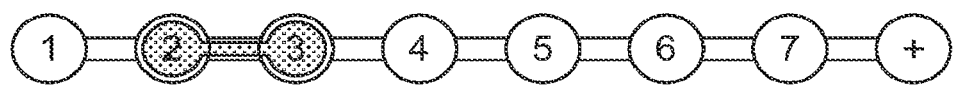
Figure 43C:
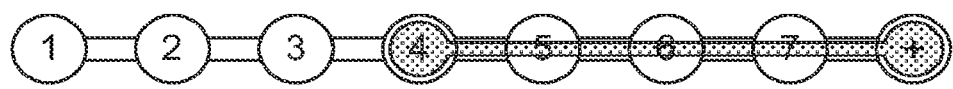
Figure 43D:
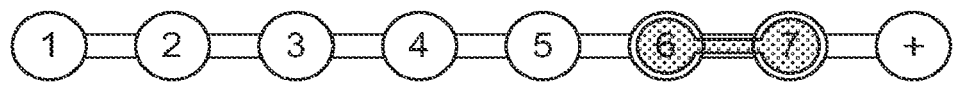

FIGS. 43A through 43D illustrate an exemplary graphical representation of the best-case and worst-case average DOS for a crowd fragment according to one embodiment of the present disclosure. Such graphical representations may be presented to the mobile users 20-1 through 20-N by the MAP applications 32-1 through 32-N or presented to the subscriber 24 by the MAP server 12 via the web browser 38 at the subscriber device 22 based on data included in the crowd data for corresponding crowds. FIG. 43A illustrates the graphical representation for a crowd fragment wherein all users in the crowd fragment are friends with one another. As such, both the best-case and worst-case average DOS for the crowd fragment are 1. FIG. 43B illustrates the graphical representation for a crowd fragment wherein the best-case average DOS is 2 and the worst-case average DOS is 3. FIG. 43C illustrates the graphical representation for a crowd fragment wherein the best-case average DOS is 4 and the worst-case average DOS is greater than 7. Lastly, FIG. 43D illustrates the graphical representation for a crowd fragment wherein the best-case average DOS is 6 and the worst-case average DOS is 7. Again, while in these examples the graphical representations are for the best-case and worst-case average DOS for a crowd fragment, best-case and worst-case average DOS for a crowd may additionally or alternatively be computed by the MAP server 12 and presented to the users 20-1 through 20-N or the subscriber 24.

Figure 44:
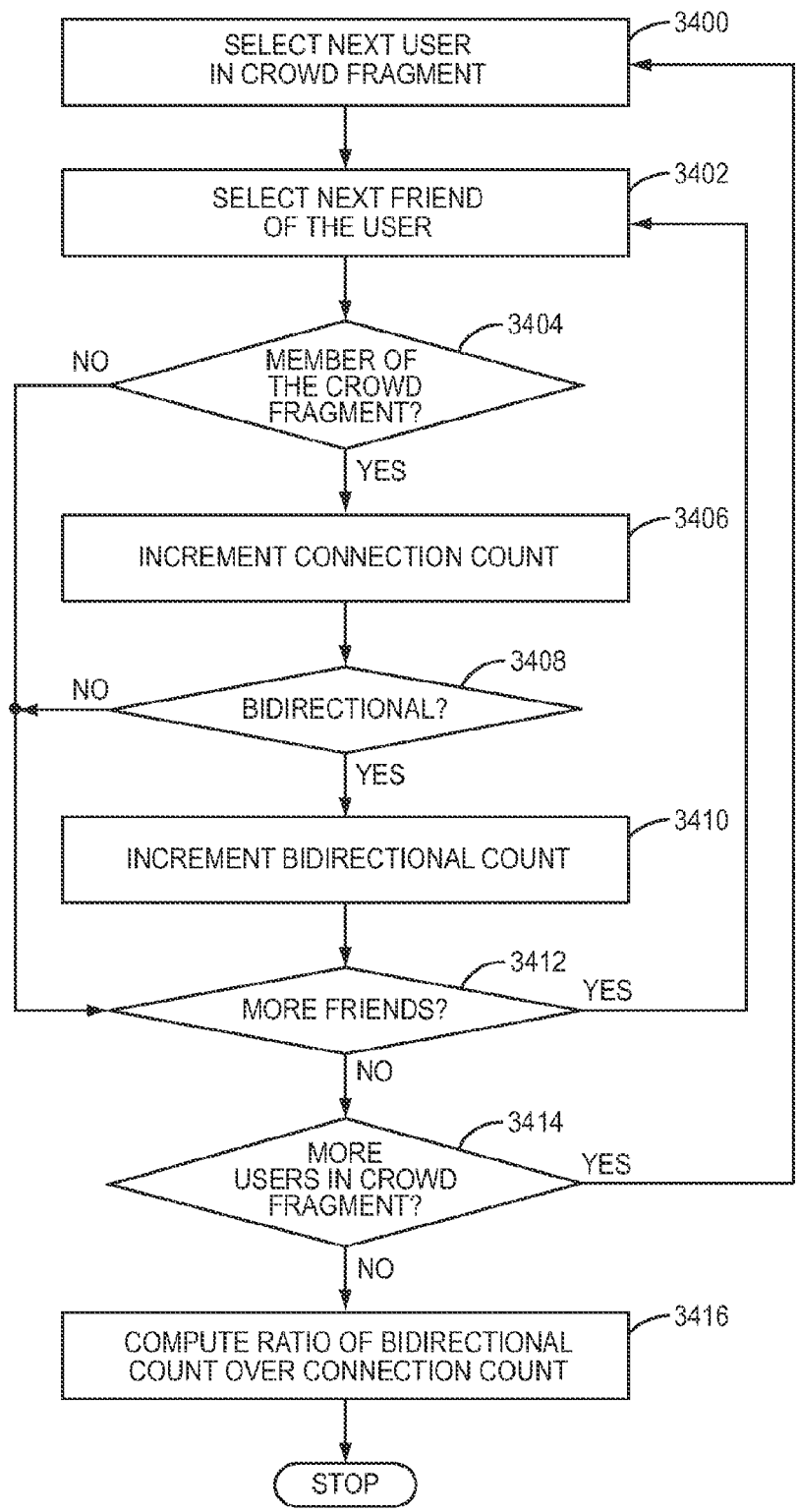
FIG. 44 is a flow chart for a process of determining a degree of bidirectionality of relationships between users in a crowd fragment according to one embodiment of the present disclosure.

FIG. 44 is a flow chart for a process of determining a degree of bidirectionality of relationships between users in a crowd fragment according to one embodiment of the present disclosure. Note, however, that this same process may be used to determine a degree of bidirectionality of relationships between users in a crowd. First, the crowd analyzer 58 selects the next user in a crowd fragment, which for the first iteration is the first user in the crowd fragment (step 3400). The crowd analyzer 58 then selects the next friend of the user (step 3402). Again, note that friends of the users 20-1 through 20-N may have been previously been obtained from the one or more profile servers 14 along with the user profiles of the users 20-1 through 20-N and provided to the MAP server 12. The crowd analyzer 58 then determines whether the friend of the user is a member of the crowd fragment (step 3404). If not, the process proceeds to step 3412. If the friend of the user is a member of the crowd fragment, the crowd analyzer 58 increments a connection count (step 3406). In addition, the crowd analyzer 58 determines whether the relationship between the user and the friend is bidirectional (step 3408). In other words, the crowd analyzer 58 determines whether the user is also a friend of that friend. If not, the process proceeds to step 3412. If so, the crowd analyzer 58 increments a bidirectional count (step 3410).

At this point, whether proceeding from step 3404, step 3408, or step 3410, the crowd analyzer 58 determines whether the user has more friends to process (step 3412). If so, the process returns to step 3402 and is repeated for the next friend of the user. Once all of the friends of the user have been processed, the crowd analyzer 58 determines whether there are more users in the crowd fragment (step 3414). If so, the process returns to step 3400 and is repeated for the next user in the crowd fragment. Once steps 3402 through 3412 have been performed for all of the users in the crowd fragment, the crowd analyzer 58 computes a ratio of the bidirectional count (i.e., the number of bidirectional friend relationships) over the connection count (i.e., the number of unidirectional and bidirectional friend relationships) for the crowd fragment (step 3416). At this point, the process ends. In this embodiment, the ratio of the bidirectionality count to the connection count reflects the degree of bidirectionality of friendship relationships for the crowd fragment and may be returned to the requesting user or subscriber in the crowd data for the corresponding crowd.

Figure 45A:
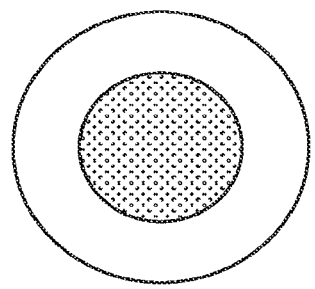
FIGS. 45A through 45C illustrate an exemplary graphical representation of the degree of bidirectionality of friendship relationships for a crowd fragment according to one embodiment of the present disclosure.
Figure 45B:
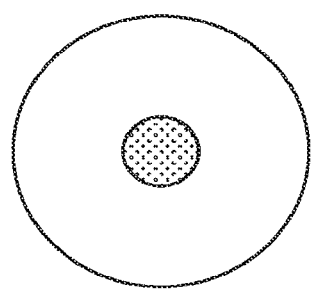
Figure 45C:
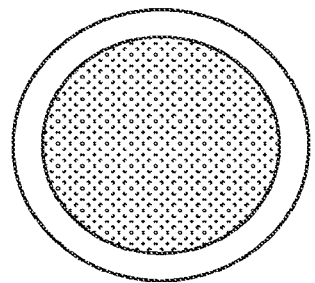

FIGS. 45A through 45C illustrate an exemplary graphical representation of the degree of bidirectionality of friendship relationships for a crowd fragment according to one embodiment of the present disclosure. Note that this graphical representation may also be used to present the degree of bidirectionality of friendship relationships for a crowd. FIG. 45A illustrates the graphical representation for a crowd having a ratio of bidirectional friend relationships to total friend relationships of approximately 0.5. FIG. 45B illustrates the graphical representation for a crowd having a ratio of bidirectional friend relationships to total friend relationships of approximately 0.2. FIG. 45C illustrates the graphical representation for a crowd having a ratio of bidirectional friend relationships to total friend relationships of approximately 0.95. Graphical representations such as those in FIGS. 45A through 45C may be presented to the mobile users 20-1 through 20-N by the MAP applications 32-1 through 32-N or presented to the subscriber 24 by the MAP server 12 via the web browser 38 at the subscriber device 22 based on data included in the crowd data for corresponding crowds.

FIGS. 46 through 51 describe embodiments of the present disclosure where confidence levels for the current locations of users in a crowd are determined and utilized to provide a quality level for the aggregate profile for the crowd and/or confidence levels for individual keywords included in the aggregate profile for the crowd. In general, in many implementations, the current locations of the users 20-1 through 20-N are not updated instantaneously or even substantially instantaneously. There are many reasons why the current locations of the users 20-1 through 20-N are not and possibly cannot be updated instantaneously. For example, battery life and performance limitations, non-continuous network connectivity, platform limitations such as the inability to run applications in the background, and security architectures (e.g., J2ME MIDP2.0 security architecture) may all limit the ability of the mobile devices 18-1 through 18-N to provide continuous location updates to the MAP server 12. As a result, the users 20-1 through 20-N may move from their current locations stored by the MAP server 12 well before corresponding location updates are received by the MAP server 12. For instance, if the user 20-1 turns the mobile device 18-1 off, then the mobile device 18-1 is unable to send location updates for the user 20-1. As such, the current location stored for the user 20-1 at the MAP server 12 will no longer be accurate if the user 20-1 moves to a new location while the mobile device 18-1 is off.

Figure 46:
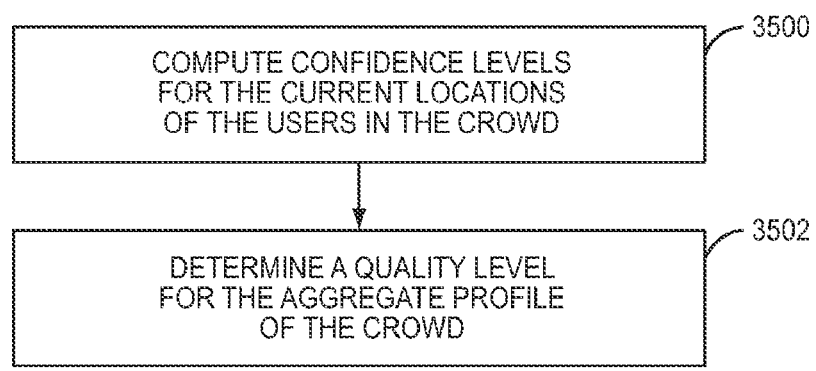
FIG. 46 is a flow chart for a process for generating a quality level for an aggregate profile for a crowd according to one embodiment of the present disclosure.

FIGS. 46 through 51 describe embodiments where the contribution of the user profiles of the users 20-1 through 20-N to aggregate profiles of corresponding crowds is modified based on an amount of time that has expired since receiving location updates for the users 20-1 through 20-N. More specifically, FIG. 46 is a flow chart for a process for generating a quality level for an aggregate profile for a crowd according to one embodiment of the present disclosure. As discussed above, the crowd analyzer 58 of the MAP server 12 creates an aggregate profile for one or more crowds relevant to a POI or an AOI in response to a crowd request from a requestor (i.e., one of the users 20-1 through 20-N, the subscriber 24, or the third-party service 26). Depending on the particular embodiment, the aggregate profile may be generated based on comparisons of the user profiles of the users in the crowd to a user profile or a select subset of the user profile of a requesting user (e.g., one of the users 20-1 through 20-N for which the aggregate profile is generated), comparisons of the user profiles of the users in the crowd to a target user profile, or comparisons of the user profiles of the users in the crowd to one another. Using the following process, the crowd analyzer 58 can generate a quality level for the aggregate profile for one or more such crowds. Note that the quality level for the aggregate profile of a crowd may also be viewed as a quality level for the crowd itself particularly where a spatial crowd formation process has been used to form the crowd.

First, the crowd analyzer 58 of the MAP server 12 computes confidence levels for the current locations of the users in the crowd (step 3500). In one embodiment, the confidence level for the current location of a user ranges from 0 to 1, where the confidence level is set to 1 when the current location is updated and then linearly decreases to 0 over some desired period of time. As such, the confidence level of the current location of a user may be computed based on the following equation:

$$CL_{LOCATION} = -\Delta t \cdot DR + CL_{LOCATION,PREVIOUS},$$

where $CL_{LOCATION}$ is the confidence level of the current location of the user, $\Delta t$ is an amount of time that has elapsed since the confidence level of the current location of the user was last computed, DR is a predefined decrease rate or rate at which the confidence level is to decrease over time, and $CL_{LOCATION,PREVIOUS}$ is the previous confidence level of the current location of the user. The decrease rate (DR) is preferably selected such that the confidence level (CL) of the current location of the user will decrease from 1 to 0 over a desired amount of time. Note that the decrease rate (DR) may be defined separately for each user or may be the same for all users. If defined separately, the decrease rate (DR) for a user may be defined once and re-used or defined on a case-by-case basis based on the user's current and past locations, profile, history, or the like. The desired amount of time may be any desired amount of time such as, but not limited to, a desired number of hours. As an example, the desired amount of time may be 12 hours, and the corresponding decrease rate (DR) is $\frac{1}{12}$ if time is measured in hours and $1/(12 \times 60 \times 60 \times 1000)$ if time is measures in milliseconds. Note that the MAP server 12 stores the confidence level (CL) of the user, a timestamp indicating when the confidence level (CL) was computed, and optionally a timestamp indicating when the current location of the user was last updated. This information may be stored in the user record for the user. Alternatively, only the timestamp of the last location update is stored in the user record for the user. If the initial confidence level (CL) varies per user, the initial confidence level (CL) is also stored in the user record. The current confidence level (CL) is determined whenever it is needed by retrieving the last location update timestamp from the user record, determining an amount of elapsed time between the current time and the time of the last location update, and calculating the new confidence level based on the decrease rate (DR) and the initial confidence level (CL).

Also note that while the confidence levels of the current locations of the users in the crowd are computed using a linear algorithm in the exemplary embodiment described above, nonlinear algorithms may alternatively be used.

When computing the confidence levels for the current locations of the users in the crowds, the crowd analyzer 58 may also consider location confidence events. Note that timestamps of such location confidence events and the location confidence events themselves may also be stored to enable correct calculation of the confidence levels. The location confidence events may include negative location confidence events such as, but not limited to, the passing of a known closing time of a business (e.g., restaurant, bar, shopping mall, etc.) at which a user is located or movement of a crowd with which a user has a high affinity. The location confidence events may additionally or alternatively include positive location confidence events such as, but not limited to, frequent interaction with the corresponding MAP application by the user. Frequent interaction with the MAP application by the user may be indicated by reception of frequent location updates for the user. Note that, in addition to or as an alternative to using location confidence events, other information such as location profiles, event information (e.g., live music event, open-mic night, etc.), current as past crowd histories, or the like may be used when computing the confidence levels for the current locations of the users in the crowds.

The manner in which the crowd analyzer 58 handles positive and/or negative location confidence events when computing the confidence levels of the users in the crowd may vary. In one embodiment, in response to detecting a negative location confidence event with respect to a user, the crowd analyzer 58 may increase the decrease rate (DR) used to compute the confidence level (CL) of the current location of the user. Similarly, in response to detecting a positive location confidence event with respect to a user, the crowd analyzer 58 may decrease the decrease rate (DR) used to compute the confidence level (CL) of the current location of the user or replace the decrease rate (DR) with an increase rate such that the confidence level of the user increases in response to the location confidence event or while the location confidence event continues (e.g., increase while the user frequently interacts with the MAP application).

In another embodiment, in response to detecting a negative location confidence event with respect to a user, the crowd analyzer 58 may decrease the confidence level (CL) of the current location of the user by a predefined amount. For example, if the negative location event is the passing of a closing time of a business at which the user is located, the crowd analyzer 58 may decrease the confidence level (CL) of the user to zero. Similarly, in response to detecting a positive location confidence event with respect to a user, the crowd analyzer 58 may increase the confidence level (CL) of the current location of the user by a predefined amount. For example, in response to detecting that the user is frequently interacting with the MAP application at his mobile device, the crowd analyzer 58 may increase the confidence level (CL) of the current location of the user by 0.1.

Once the confidence levels of the current locations of the users in the crowd are computed, the crowd analyzer 58 determines a quality level for the aggregate profile of the crowd (step 3502). In one embodiment, the quality level for the crowd is computed as an average of the confidence levels of the current locations of the users in the crowd. The quality level of the aggregate profile may then be provided along with the aggregate profile in the crowd data for the crowd returned to the requestor.

Figure 47:
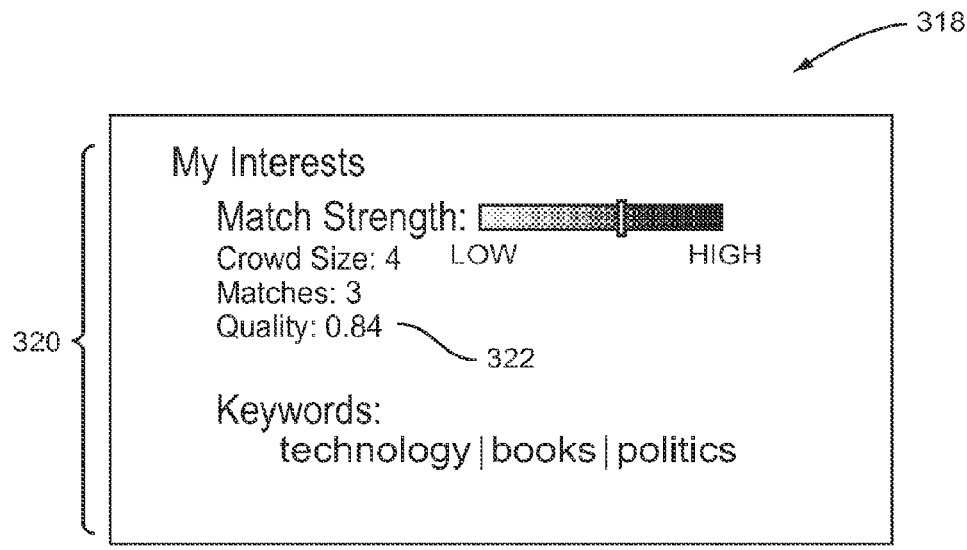
FIG. 47 illustrates an exemplary GUI for presenting an aggregate profile for a crowd and a quality level of the aggregate profile generated using the process of FIG. 46 according to one embodiment of the present disclosure.
Figure 48:
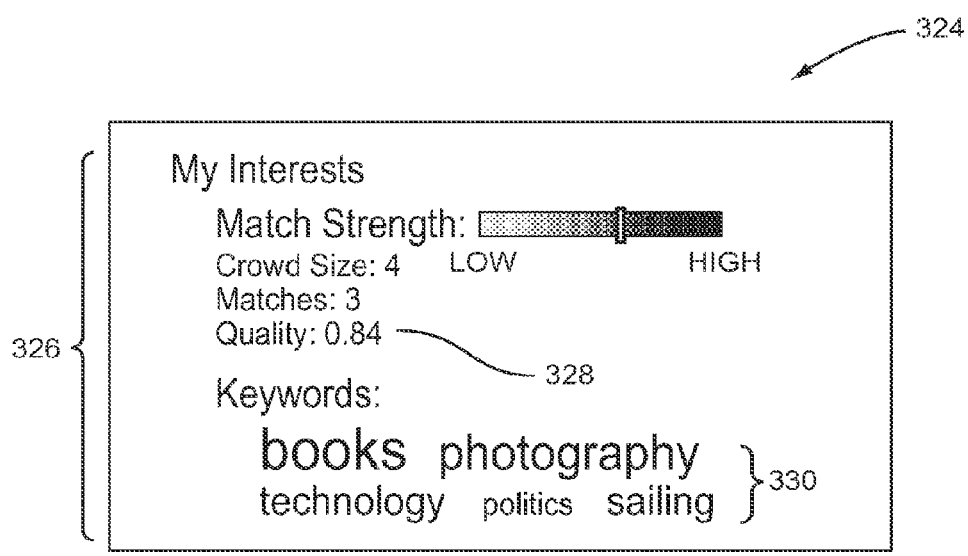
FIG. 48 illustrates another exemplary GUI for presenting an aggregate profile for a crowd and a quality level of the aggregate profile generated using the process of FIG. 46 according to another embodiment of the present disclosure.

FIG. 47 illustrates an exemplary GUI 318 for presenting an aggregate profile 320 for a crowd and a quality level 322 of the aggregate profile 320 generated using the process of FIG. 46 according to one embodiment of the present disclosure. FIG. 48 illustrates another exemplary GUI 324 for presenting an aggregate profile 326 for a crowd and a quality level 328 of the aggregate profile 326 generated using the process of FIG. 46 according to one embodiment of the present disclosure. However, in the GUI 324, the aggregate profile 326 also indicates a relative number of user matches for each of a number of keywords in the aggregate profile 326. More specifically, in a keyword area 330 of the GUI 324, the sizes of the keywords indicate the relative number of user matches for the keywords. Therefore, in this example, the keyword "books" has a larger number of user matches that the keyword "politics," as indicated by the size, or font size, of the two keywords in the keyword area 330 of the GUI 324.

Figure 49:
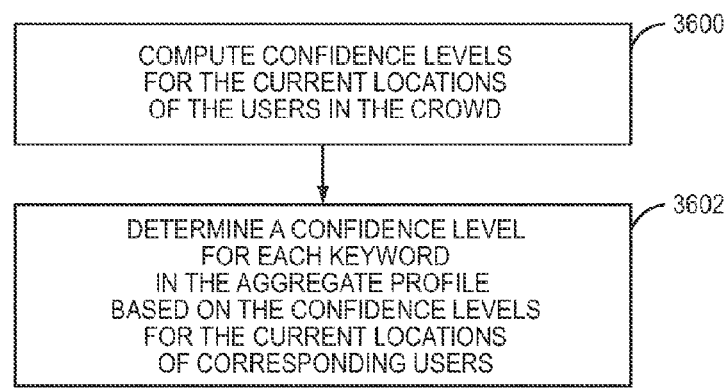
FIG. 49 illustrates a flow chart for a process for generating confidence factors for keywords included in an aggregate profile for a crowd based on confidence levels for current locations of users in the crowd according to one embodiment of the present disclosure.

FIG. 49 illustrates a flow chart for a process for generating confidence factors for keywords included in an aggregate profile for a crowd based on confidence levels for current locations of users in the crowd according to one embodiment of the present disclosure. As discussed above, the crowd analyzer 58 creates an aggregate profile for one or more crowds relevant to a POI or an AOI in response to a crowd request from a requestor (i.e., one of the users 20-1 through 20-N, the subscriber 24, or the third-party service 26). Depending on the particular embodiment, the aggregate profile may be generated based on comparisons of the user profiles of the users in the crowd to a user profile or a select subset of the user profile of a requesting user (e.g., one of the users 20-1 through 20-N for which the aggregate profile is generated), comparisons of the user profiles of the users in the crowd to a target user profile, or comparisons of the user profiles of the users in the crowd to one another. As also discussed above, in one embodiment, the aggregate profile for a crowd includes a number of user matches for each of a number of keywords and/or a ratio of the number of user matches to the total number of users in the crowd for each of a number of keywords.

In order to generate confidence factors for each keyword in an aggregate profile for a crowd, the crowd analyzer 58 of the MAP server 12 computes confidence levels for the current locations of the users in the crowd (step 3600). The confidence levels for the current locations of the users may be computed as discussed above with respect to step 3500 of FIG. 46. In general, the confidence levels for the current locations of the users may be computed based on an amount of time since the current location of the user was last updated, location confidence events, or both. Once the confidence levels of the current locations of the users in the crowd are computed, the crowd analyzer 58 determines a confidence level for each keyword in the aggregate profile of the crowd based on the confidence levels for the current locations of the corresponding users (step 3602). In one embodiment, for each keyword, the confidence level for the keyword is computed as an average of the confidence levels of the current locations of the users in the crowd having user profiles including the keyword. In other words, for each keyword, there are a number of user matches. The confidence levels of the current locations of the users corresponding to the user matches for the keyword are averaged to provide the confidence level for the keyword.

Figure 50:
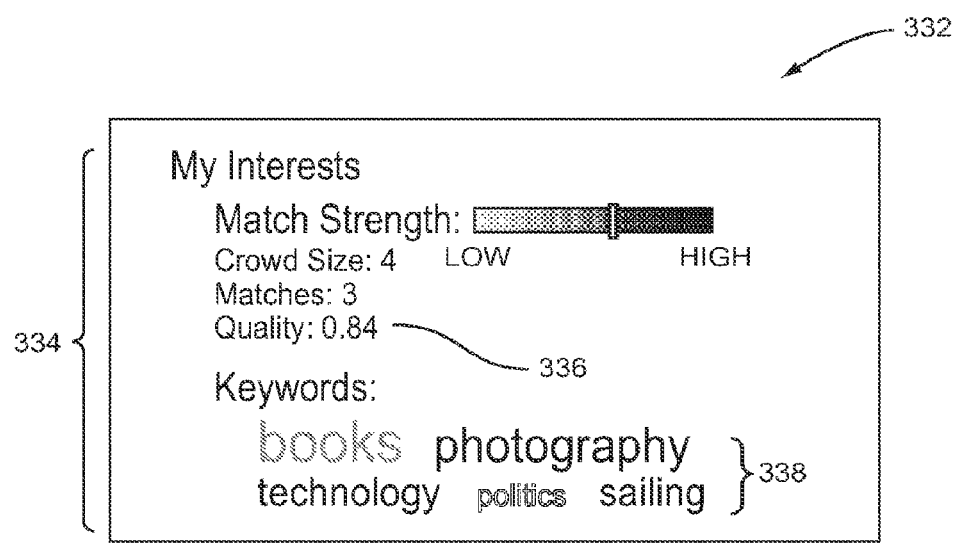
FIG. 50 illustrates an exemplary GUI for presenting an aggregate profile for a crowd including an indication of a confidence level for each of a number of keywords in the aggregate profile according to one embodiment of the present disclosure.

FIG. 50 illustrates an exemplary GUI 332 for presenting an aggregate profile 334 for a crowd including an indication of a confidence level for each of a number of keywords in the aggregate profile 334 according to one embodiment of the present disclosure. More specifically, in this embodiment, the aggregate profile 334 includes a quality level 336 of the aggregate profile 334 generated using the process of FIG. 46. However, the quality level 336 of the aggregate profile 334 is optional. The GUI 332 includes a keyword area 338 that graphically illustrates the keywords in the aggregate profile 334 and the confidence levels of the keywords. In this embodiment, the confidence levels of the keywords are graphically indicated via opacity of the keywords in the keyword area 338. The lighter the text of the keyword, the lesser the confidence level of the keyword. Conversely, the darker the text of the keyword, the greater the confidence level of the keyword. Thus, in this example, the confidence level for the keyword "books" is greater than the confidence level of the keyword "politics," and the confidence level of the keyword "photography" is greater than the confidence levels of the keywords "books" and "politics." In addition, in this embodiment, the size of the keywords in the keyword area 338 is indicative of the number of user matches for the keywords, as discussed above with respect to FIG. 48. Note that in an alternative embodiment, the size of the keywords in the keyword area 338 may be indicative of the confidence levels of the keywords rather than the number of user matches for the keywords.

Figure 51:
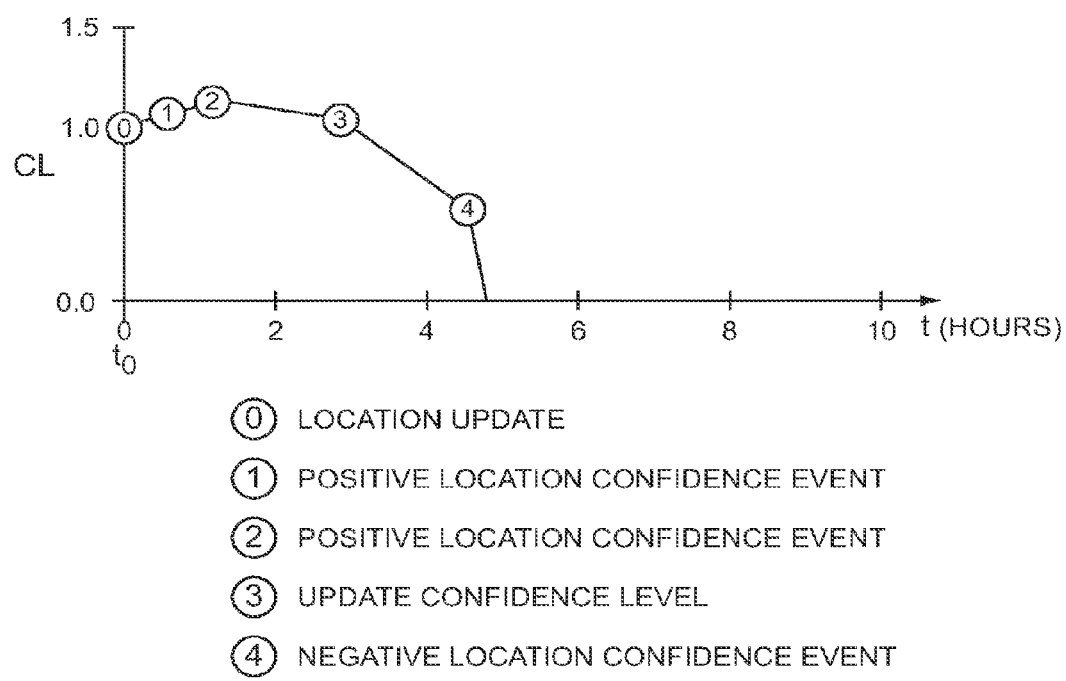
FIG. 51 graphically illustrates modification of the confidence level of the current location of a user according to one embodiment of the present disclosure.

FIG. 51 graphically illustrates modification of the confidence level of the current location of a user according to one embodiment of the present disclosure. As illustrated, at time 0, a location update for the user is received by the MAP server 12 and, as such, the confidence level of the current location of the user is set to 1. At time 1, a positive location confidence event is detected. This positive location confidence event may be detected when, for example, the crowd analyzer 58 is generating an aggregate profile for a crowd in which the user is included and the user has been frequently interacting with the MAP application of his mobile device. As a result of the positive location confidence event, in this embodiment, the confidence level for the current location of the user at time 1 is computed using an increase rate (i.e., a positive rate of change) rather than a decrease rate (DR). As such, the confidence level of the current location of the user increases from time 0 to time 1 as shown. Alternatively, in response to the positive location confidence event, the confidence level for the current location of the user at time 1 may be increased by a predefined amount such as, for example, 0.1 points. Next, at time 2, another positive location confidence event is detected. As a result of this second positive location confidence event, in this embodiment, the increase rate is further increased, and the confidence level for the current location of the user at time 2 is computed using the new increase rate. As such, the confidence level of the current location of the user further increases from time 1 to time 2. Alternatively, in response to the positive location confidence event, the confidence level for the current location of the user at time 2 may be further increased by the predefined amount such as, for example, 0.1 points.

At time 3, the confidence level of the current location of the user is updated. The confidence level of the current location of the user may be updated by the crowd analyzer 58 before generating an aggregate profile for a crowd in which the user is included. In this example, since a location confidence event is not detected at time 3, the confidence level for the current location of the user is computed based on the previous confidence level computed at time 3 and a predefined decrease rate. As such, the confidence level for the current location of the user at time 3 is less than the confidence level for the current location of the user at time 2.

At time 4, a negative location confidence event is detected. As a result, in this example, the decrease rate is increased, and the confidence level for the current location of the user at time 4 is computed based on the new decrease rate. As such, the confidence level for the current location of the user at time 4 is less than the confidence level for the current location of the user at time 3. Based on the new decrease rate, the confidence level for the current location of the user continues to decrease until reaching 0 at approximately 4.5 hours after time 0. Alternatively, in response to the negative location confidence event, the confidence level for the current location of the user at time 4 may be decreased by a predefined amount in addition to or as an alternative to decreasing the confidence level by an amount determined by the amount of time that has elapsed between time 3 and time 4 and the decrease rate.

Figure 52:
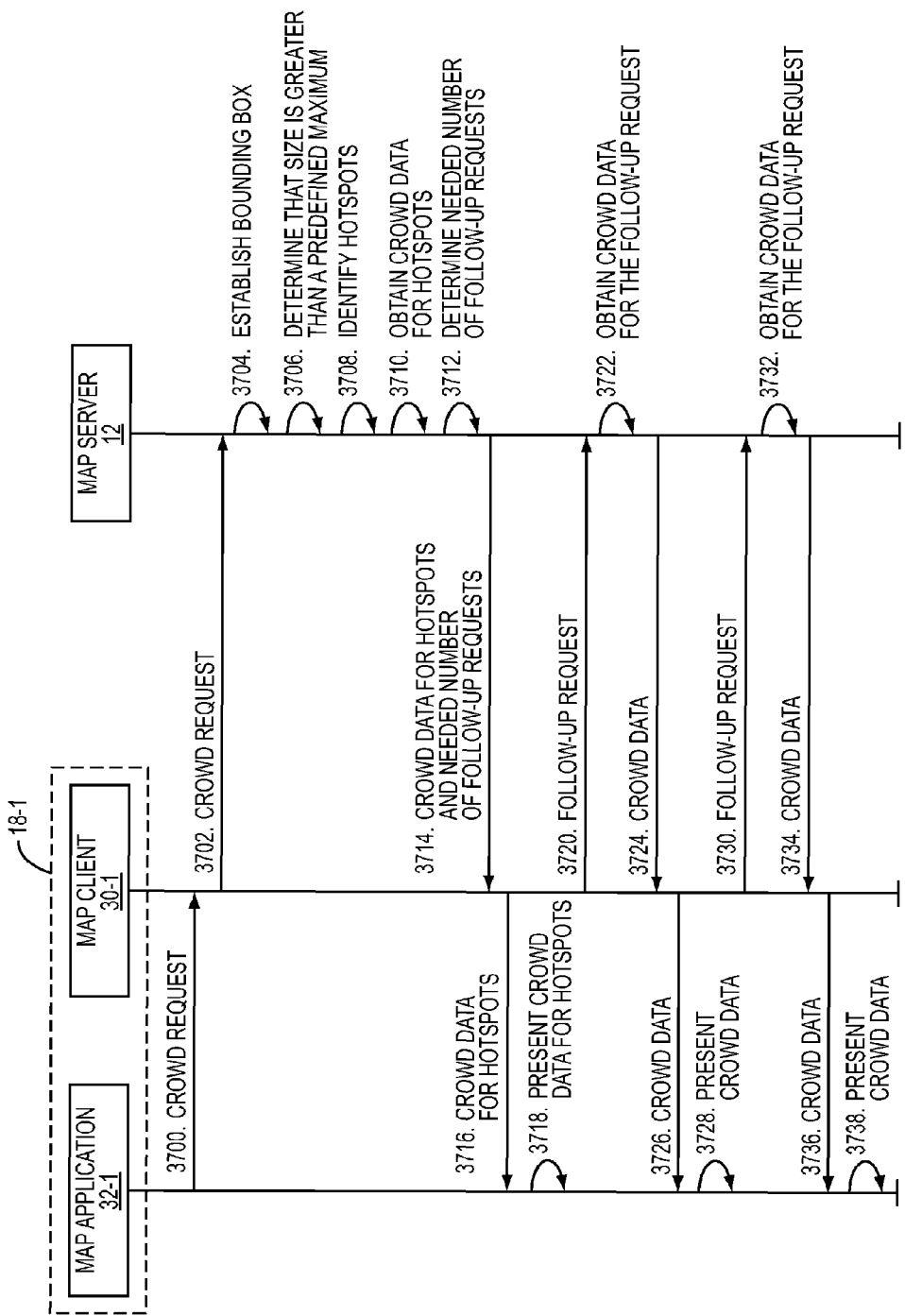
FIG. 52 illustrates the operation of the system of FIG. 1 to perform a process for efficiently handling requests for crowd data for large geographic areas according to one embodiment of the present disclosure.

FIG. 52 illustrates the operation of the system 10 of FIG. 1 to perform a process for efficiently handling requests for crowd data for large geographic areas according to one embodiment of the present disclosure. As illustrated, the MAP application 32-1 of the mobile device 18-1 sends a crowd request to the MAP client 30-1 (step 3700). Next, the MAP client 30-1 sends the crowd request to the MAP server 12 (step 3702). In response to receiving the crowd request, the MAP server 12 establishes a bounding box for the request (step 3704). Note that while a bounding box is referred to herein, a bounding region of any desired shape may be used. In one embodiment, the crowd request is a request for crowd data for a POI such that the bounding box is a geographic region of a predefined size centered at the POI. In another embodiment, the crowd request is a request for crowd data for an AOI such that the bounding box is a geographic region corresponding to the AOI.

The MAP server 12, and more specifically the crowd analyzer 58, then determines whether a size of the bounding box is greater than a predefined maximum size (step 3706). While not illustrated, if the size of the bounding box is not greater than the predefined maximum size, the crowd analyzer 58 identifies crowds relevant to the bounding box, obtains crowd data for the crowds, and returns the crowd data to the MAP client 30-1 in the manner described above. However, in this embodiment, the size of the bounding box is greater than the predefined maximum size. As such, the crowd analyzer 58 identifies one or more hotspots within the bounding box (step 3708). More specifically, the MAP server 12 maintains a list of hotspots, and the one or more hotspots within the bounding box are selected from the list of hotspots. In general, a hotspot is a geographic point (e.g., latitude and longitude coordinates, a physical address, or the like) where a significant number of crowds have historically been located and/or where a significant number of crowds are currently located.

In one embodiment, the MAP server 12, and more specifically the crowd analyzer 58, monitors crowds over time and identifies geographic points near which a significant number of crowds are typically located as hotspots. In another embodiment, hotspots may be defined by the users 20-1 through 20-N in a collaborative process. For example, the users 20-1 through 20-N may be enabled to nominate geographic points (e.g., POIs, latitude and longitude coordinates, a street address, or the like) as hotspots. Once a geographic point, or substantially the same geographic point, receives a predefined minimum number of nominations, the geographic point is defined as a hotspot. The geographic point may remain a hotspot permanently. Alternatively, the geographic point may be removed as a hotspot if one or more removal criteria are satisfied such as, for example, receiving a predefined threshold number of nominations for removal as a hotspot over a defined amount of time. In yet another embodiment, persons or entities may pay a fee to have desired geographic points listed as hotspots. For example, a business owner may pay a fee to have the MAP server 12 list the physical location of his or her business as a hotspot.

Once the hotspots within the bounding box for the request are identified, the crowd analyzer 58 obtains crowd data for the hotspots (step 3710). More specifically, in one embodiment, the crowd analyzer 58 establishes initial request regions of a predefined shape and size centered at the hotspots. The initial request regions are preferably an optimal shape and size. Using the initial request regions centered at the hotspots, the crowd analyzer 58 identifies crowds relevant to the initial request regions centered at the hotspots. As discussed above, the crowd analyzer 58 may identify the crowds by performing a spatial crowd formation process in response to the request. Alternatively, the crowds may be formed proactively and corresponding crowd records may be stored in the datastore 64 of the MAP server 12. In this case, the crowd analyzer 58 identifies the crowds relevant to the initial request regions centered at the hotspots by querying the datastore 64 of the MAP server 12. The crowd analyzer 58 then obtains crowd data for the identified crowds. As discussed above, the identified crowds may be passed to the aggregation engine 60, which may then generate aggregate profiles for the crowds. In addition or alternatively, the crowd analyzer 58 may determine characteristics of the crowds such as, for example, degree of fragmentation, best-case and worst-case average DOS, degree of bidirectionality, or the like.

In addition, the crowd analyzer 58 determines a needed number of follow-up requests to be performed by the MAP client 30-1 in order to obtain crowd data for the rest of the bounding box established for the crowd request (step 3712). In one embodiment, follow-up requests are used to obtain crowd data for a series of one or more outwardly radiating, concentric request regions around each of the hotspots. Each request region is a geographic region. Each follow-up request is for a corresponding one of the series of outwardly radiating, concentric request regions around the hotspots. The number of needed follow-up requests depends on the number of hotspots in the bounding box, the size of the outwardly radiating, concentric request regions for the follow-up requests, and the size of the bounding box. The crowd analyzer 58 of the MAP server 12 then sends the crowd data for the hotspots and the needed number of follow-up requests to the MAP client 30-1 (step 3714). The MAP client 30-1 then sends the crowd data for the hotspots to the MAP application 32-1 (step 3716), and the MAP application 32-1 presents the crowd data for the hotspots to the user 20-1 (step 3718).

In addition to providing the crowd data for the hotspots to the MAP application 32-1, the MAP client 30-1 sends a follow-up request to the MAP server 12 (step 3720). In response, the crowd analyzer 58 of the MAP server 12 obtains crowd data for the follow-up request (step 3722). More specifically, the crowd analyzer 58 identifies the request regions for the follow-up request. The crowd analyzer 58 then identifies crowds relevant to the request regions for the follow-up request and obtains crowd data for the identified crowds. Note that any redundant crowd data may be eliminated by carefully structuring the request regions to prevent overlapping of bounding regions from the same follow-up request. Alternatively, either the crowds or the resulting crowd data may be filtered at the MAP server 12 or the MAP client 30-1 to remove redundant crowds or crowd data. The crowd analyzer 58 of the MAP server 12 then sends the crowd data for the follow-up request to the MAP client 30-1 (step 3724). The MAP client 30-1 then sends the crowd data for the follow-up request to the MAP application 32-1 (step 3726), and the MAP application 32-1 presents the crowd data to the user 20-1 (step 3728).

In this embodiment, the needed number of follow-up requests is greater than one. As such, the MAP client 30-1 sends a second follow-up request to the MAP server 12 (step 3730). In response, the crowd analyzer 58 of the MAP server 12 obtains crowd data for the second follow-up request (step 3732). More specifically, the crowd analyzer 58 identifies the request regions for the follow-up request. The crowd analyzer 58 then identifies crowds that are relevant to the request regions for the follow-up request and obtains crowd data for the identified crowds. Again, note that any redundant crowd data may be eliminated by carefully structuring the request regions to prevent overlapping of request regions from the same follow-up request or previous follow-up requests. Alternatively, either the crowds or the resulting crowd data may be filtered at the MAP server 12 or the MAP client 30-1 to remove redundant crowds or crowd data. The crowd analyzer 58 of the MAP server 12 then sends the crowd data for the follow-up request to the MAP client 30-1 (step 3734). The MAP client 30-1 then sends the crowd data for the follow-up request to the MAP application 32-1 (step 3736), and the MAP application 32-1 presents the crowd data to the user 20-1 (step 3738). This process continues until crowd data for all of the follow-up requests has been obtained or until the process is otherwise terminated. For example, the process may be otherwise terminated if the user 20-1 initiates a crowd request for a different POI or AOI, if the user 20-1 deactivates the MAP application 32-1, or the like.

Figure 53A:
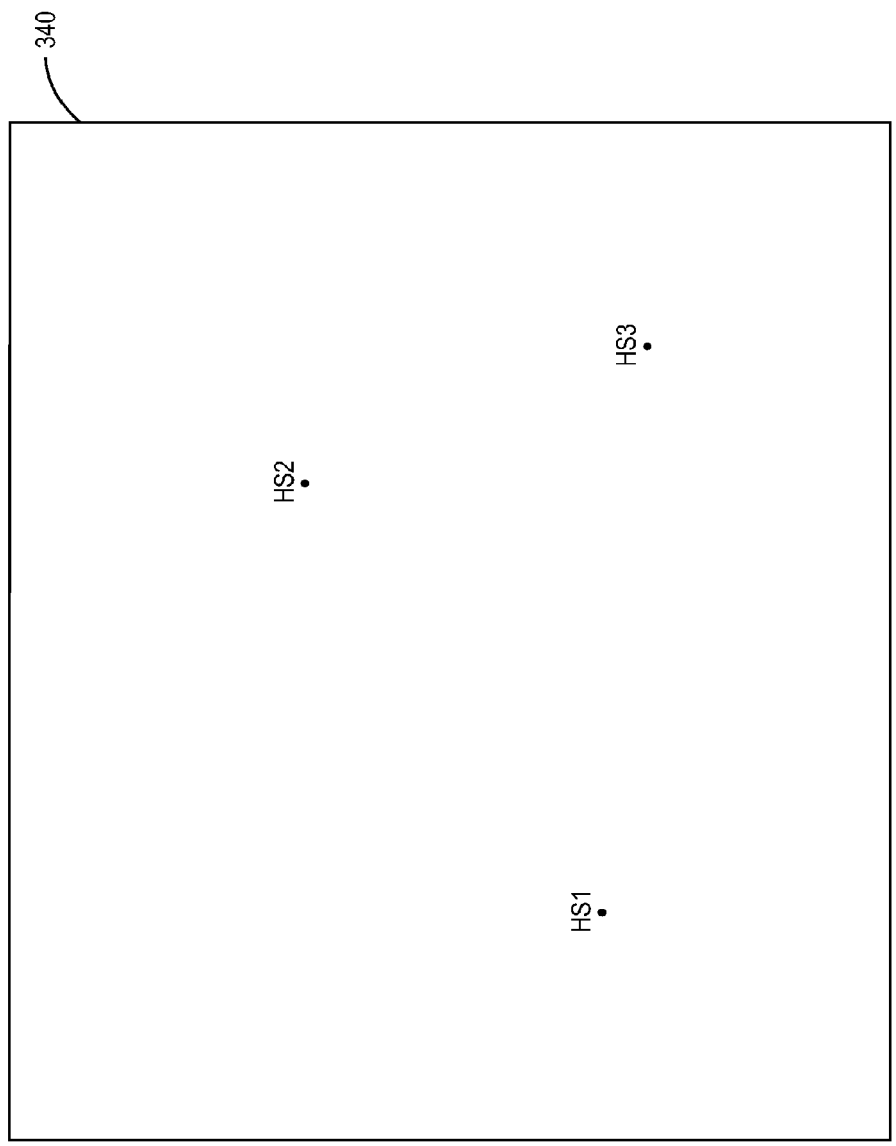
FIGS. 53A through 53E illustrate an exemplary series of outwardly radiating, concentric geographic regions for a number of hotspots identified for a bounding region established by the MAP server in response to a request for crowd data according to one embodiment of the present disclosure.
Figure 53B:
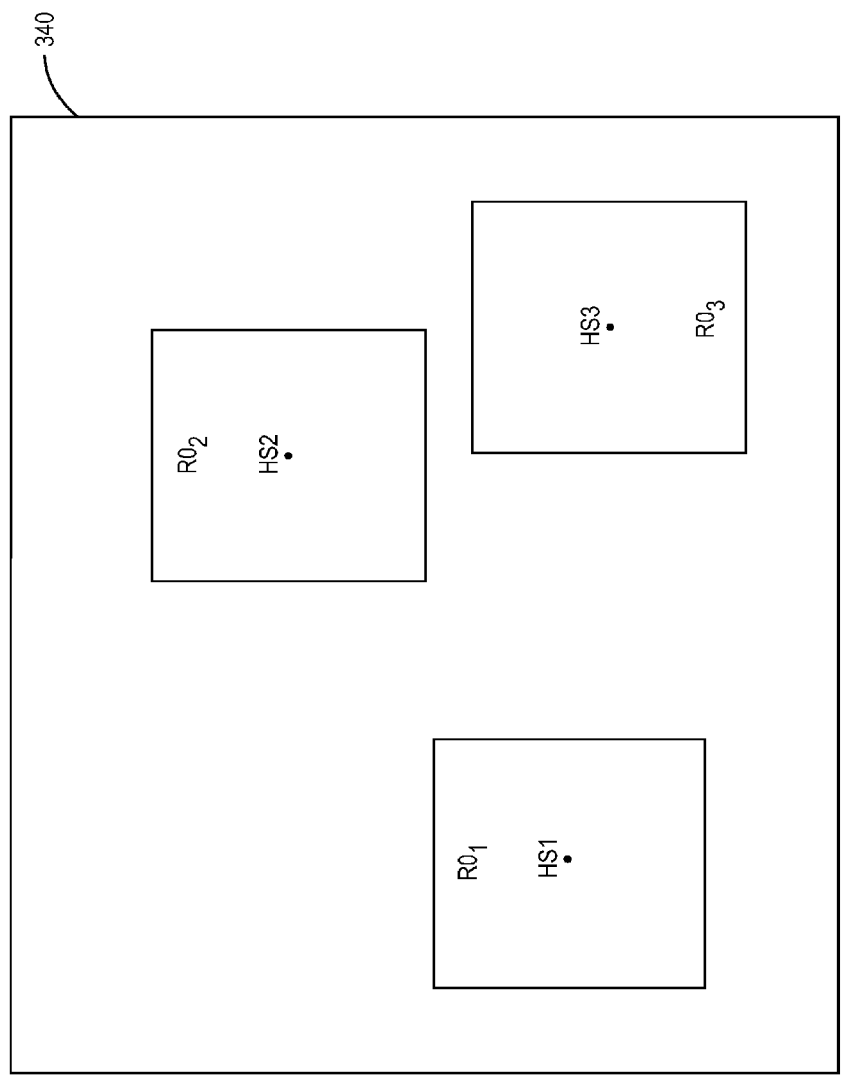

FIGS. 53A through 53E illustrate an exemplary series of outwardly radiating, concentric geographic regions for a number of hotspots HS1 through HS3 identified for a bounding box 340 established by the MAP server 12 in response to a crowd request. FIG. 53A illustrates the bounding box 340 established for the request and the hotspots HS1 through HS3 identified within the bounding box 340. FIG. 53B illustrates initial request regions $R0_1$ through $R0_3$ established for the hotspots HS1 through HS3, respectively. As discussed above, the crowd analyzer 58 identifies crowds relevant to the initial request regions $R0_1$ through $R0_3$, obtains crowd data for the identified crowds, and returns the crowd data to the MAP client 30-1. In addition, the crowd analyzer 58 determines the needed number of follow-up requests for the bounding box 340. The needed number of follow-up requests for the bounding box 340 may vary depending on the size of the bounding box 340, the size of the initial and follow-up request regions, and the number of hotspots in the bounding box 340. In this example, the needed number of follow-up requests is nine.

Figure 53C:
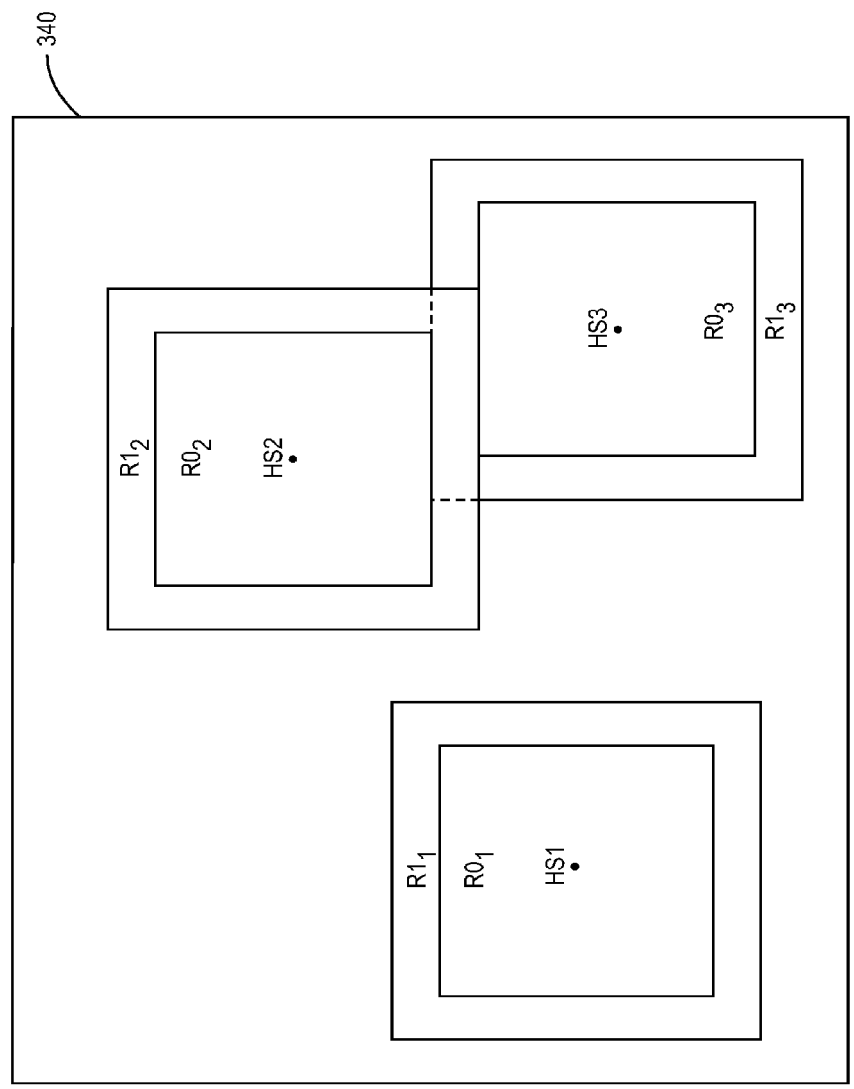

FIG. 53C illustrates first request regions $R1_1$ through $R1_3$ for the hotspots HS1 through HS3, respectively, for a first follow-up request. Note that, in this exemplary example, a portion of the first request region $R1_3$ for the third hotspot HS3 overlaps the first request region $R1_2$ for the second hotspot HS2. Thus, in order to prevent duplicate, or redundant, crowds and crowd data, filtering may be applied. Alternatively, the first request region $R1_3$ of the third hotspot HS3 may be modified to exclude the portion that overlaps the first request region $R1_2$ of the second hotspot HS2. This redundancy may alternatively be addressed by querying the datastore 64 with a mathematical union of the first request regions $R1_1$ through $R1_3$. When the crowd analyzer 58 receives the first follow-up request, the crowd analyzer 58 identifies crowds relevant to the first request regions $R1_1$ through $R1_3$, obtains crowd data for the identified crowds, and returns the crowd data to the MAP client 30-1.

Figure 53D:
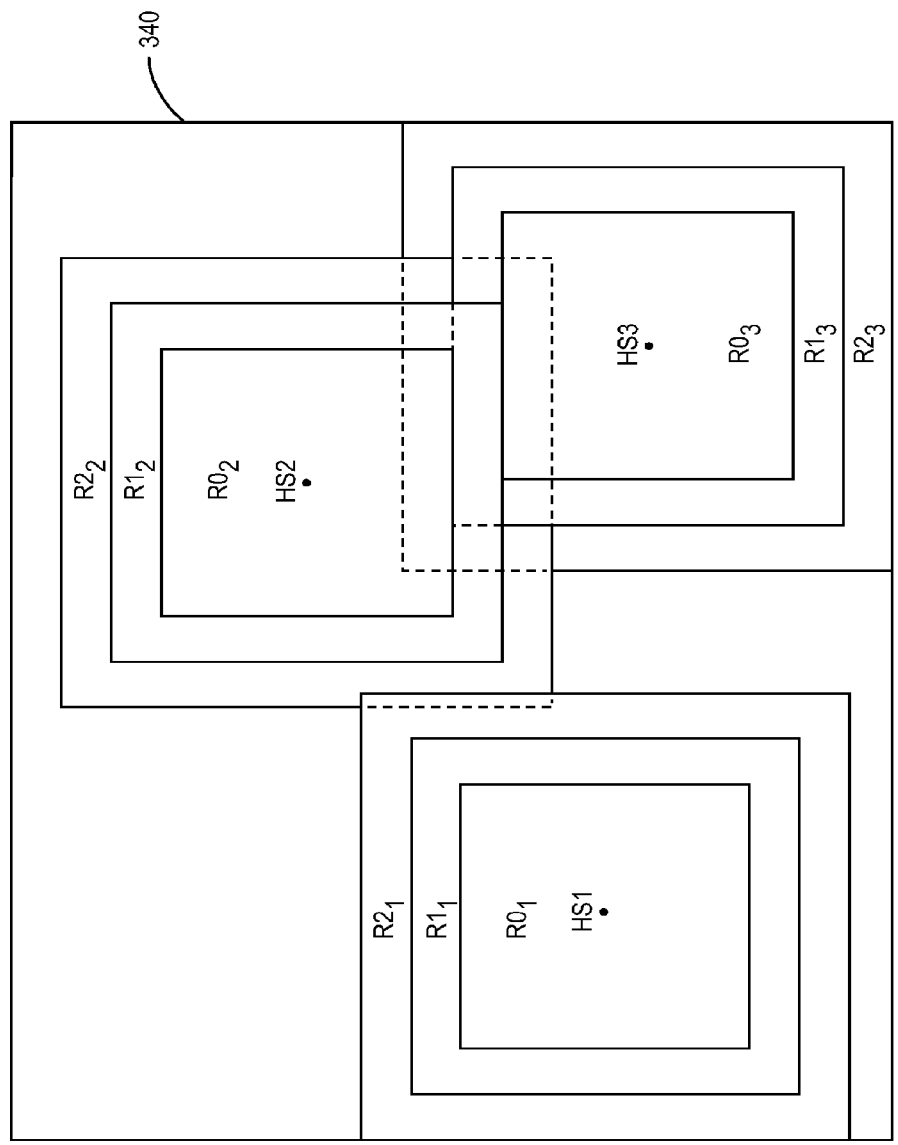
Figure 53E:
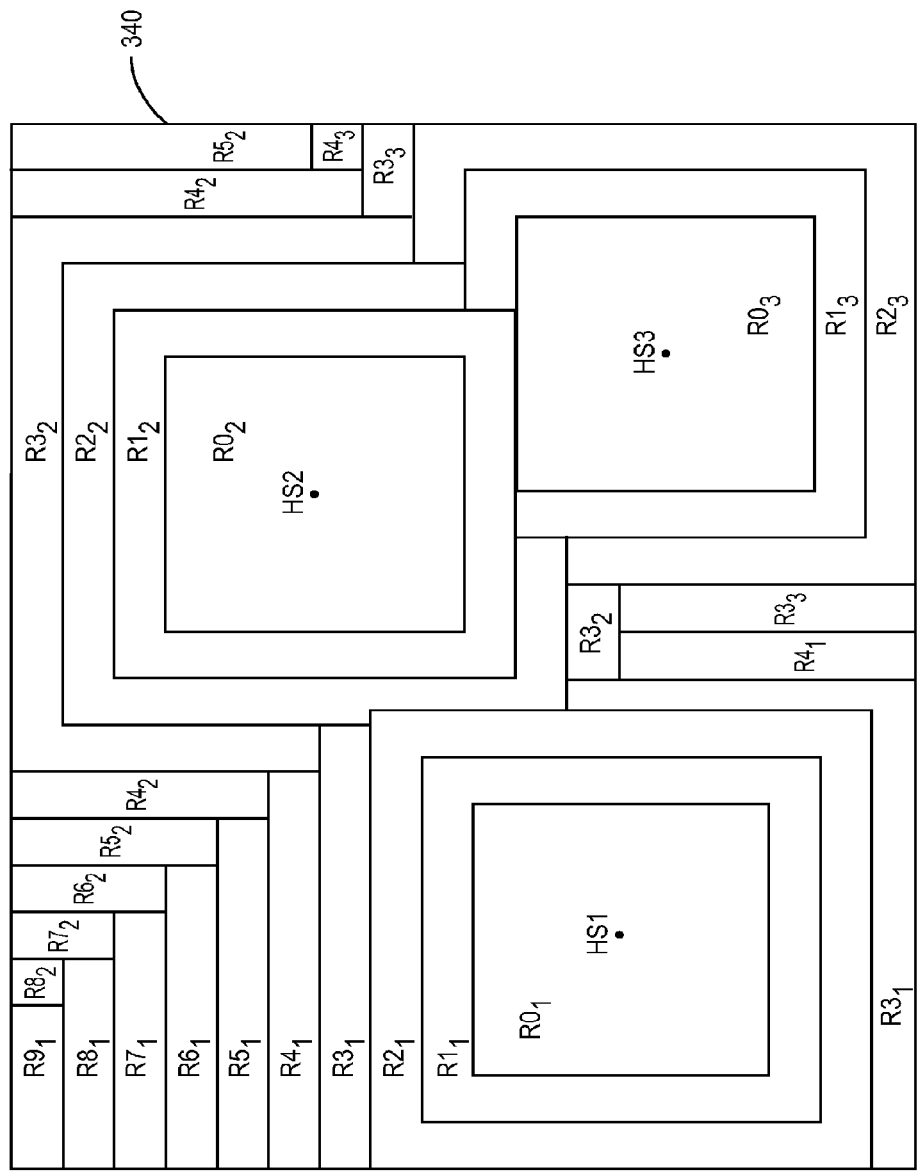

FIG. 53D illustrates second request regions $R2_1$ through $R2_3$ for the hotspots HS1 through HS3, respectively, for a second follow-up request. Note that, in this exemplary embodiment, the second request region $R2_2$ of the second hotspot HS2 overlaps the second request region $R2_1$ of the first hotspot HS1 and the second request region $R2_3$ of the third hotspot HS3 overlaps the initial, first, and second request regions $R0_2$, $R1_2$, and $R2_2$ of the second hotspot HS2. Thus, in order to prevent duplicate, or redundant, crowds and crowd data, filtering may be applied. Alternatively, the second request region $R2_2$ of the second hotspot HS2 may be modified to exclude the portion that overlaps the second request region $R2_1$ of the first hotspot HS1. Likewise, the second request region $R2_3$ of the third hotspot HS3 may be modified to exclude the portion that overlaps the initial, first, and second request regions $R0_2$, $R1_2$, and $R2_2$ of the second hotspot HS2. This redundancy may alternatively be addressed by querying the datastore 64 with a mathematical union of the second request regions $R2_1$ through $R2_3$ and then filtering to remove crowds that are duplicates from previous queries made to the datastore 64 for the initial and first request regions $R0_1$ through $R0_3$ and $R1_1$ through $R1_3$. When the crowd analyzer 58 receives the second follow-up request, the crowd analyzer 58 identifies crowds relevant to the second request regions $R2_1$ through $R2_3$, obtains crowd data for the identified crowds, and returns the crowd data to the MAP client 30-1. This process continues for a number of additional follow-up requests until the crowd data is returned for all of the bounding box 340, as illustrated in FIG. 53E. Note that in FIG. 53E, dashed lines for overlapping request regions have been omitted for clarity.

Figure 54:
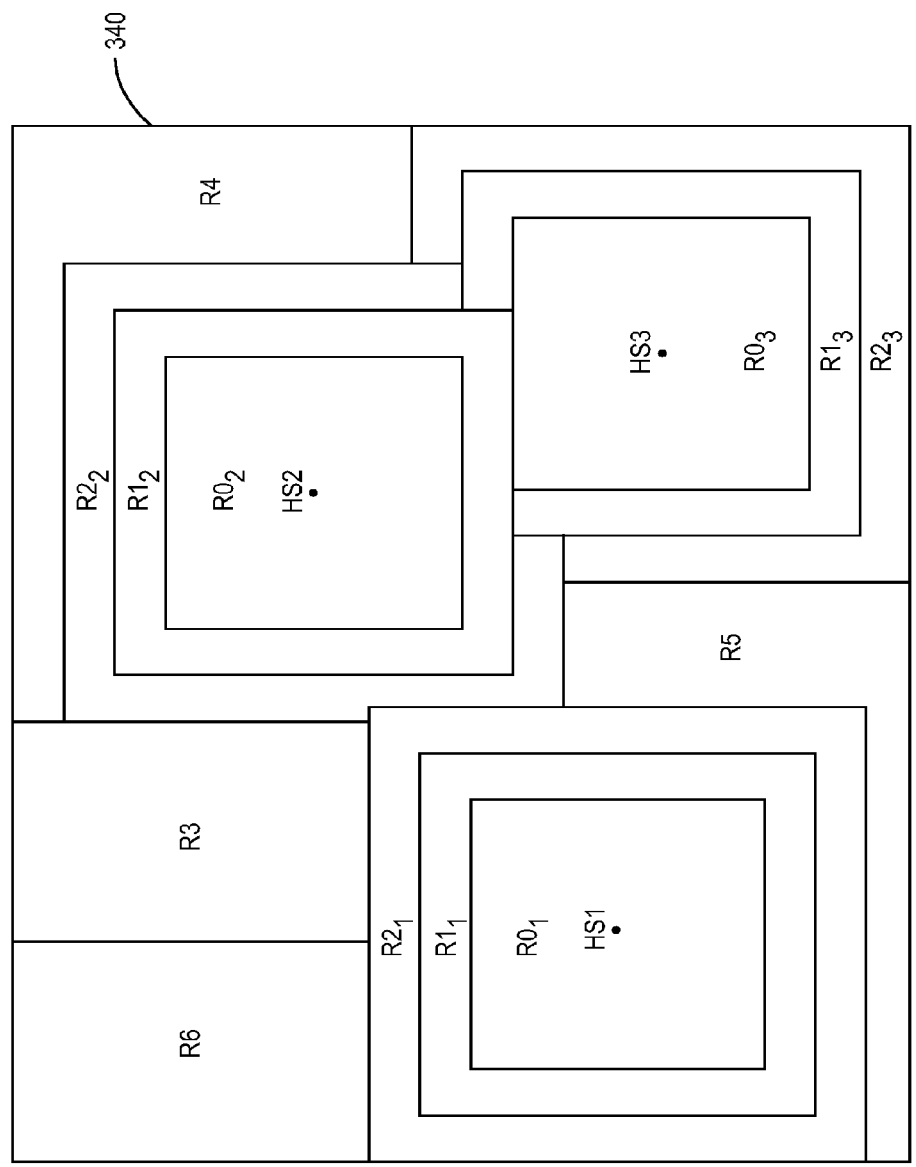
FIG. 54 graphically illustrates one exemplary variation to the follow-up request regions illustrated in FIGS. 53A through 53E.

FIG. 54 graphically illustrates one exemplary variation to the follow-up request regions illustrated in FIGS. 53A through 53E. In this embodiment, once there is a substantial amount of overlap between the follow-up regions for the hotspots HS1 through HS3, the crowd analyzer 58 may establish follow-up regions that are no longer outwardly radiating, concentric regions around the hotspots HS1 through HS3. More specifically, in this example, the second request regions $R2_1$ through $R2_3$ for the second follow-up request have a substantial amount of overlap. As such, request regions R3 through R6 for subsequent follow-up requests are provided such that the remaining portion of the bounding box 340 is quickly and efficiently filled-in. Sizes of the request regions R3 through R6 are preferably an optimal size or approximately an optimal size for querying the datastore 64 of the MAP server 12 for relevant crowds.

The discussion above with respect to FIGS. 52 through 54 provides a process for handling a request for crowd data for a large geographic area by first focusing on hotspots within the large geographic area and then progressing outwardly from those hotspots to progressively provide crowd data for the large geographic area to the requestor. In another embodiment, a request for a large geographic area may be handled by first focusing on locations within the large geographic area such as locations of friends of the requestor and/or POIs previously defined or selected by the requestor and then progressing outwardly from those locations until crowd data for the large geographic area is returned to the requestor. These other locations may be used in addition to or as an alternative to hotspots. These other locations may be used in the same manner described above with respect to hotspots in order to divide a request for a large geographic area into an initial request and a number of follow-up requests.

In yet another embodiment, when a request for crowd data for a large geographic area is received by the MAP server 12, crowds within the large geographic area may be identified and corresponding crowd data is obtained. The MAP server 12 may then first return the crowd data for crowds satisfying predefined criteria. For example, the MAP server 12 may return the crowd data for the crowds according to match strength between the user profiles of the users in the crowd and the user profile of the requesting user, a select portion of the user profile of the requesting user, or a target profile defined or otherwise specified by the requesting user. In this manner, the most relevant crowd data may be returned to the requesting user first.

It should be noted that while the process described above with respect to FIGS. 52 through 54 focuses on a request from one of the mobile devices 18-1 through 18-N, a similar process may be used internally at the MAP server 12 to process requests for crowd data for large geographic areas from the subscriber device 22 and/or the third-party service 26. For example, upon receiving a request for crowd data for a large geographic area from the subscriber device 22 via the web browser 38, the MAP server 12 may first obtain and return crowd data for one or more hotspots within the large geographic area and then progressively return crowd data for outwardly radiating, concentric areas around the hotspots.

FIGS. 55 through 61 describe aspects of an embodiment of the present disclosure wherein the crowd analyzer 58 of the MAP server 12 provides a crowd tracking feature. In general, over time, the crowd analyzer 58 creates a number of crowd snapshots for each crowd. In addition, in order to accurately track the crowds, the crowd analyzer 58 captures crowd mergers, captures crowd splits, and re-establishes crowds, as discussed below in detail.

Figure 55:
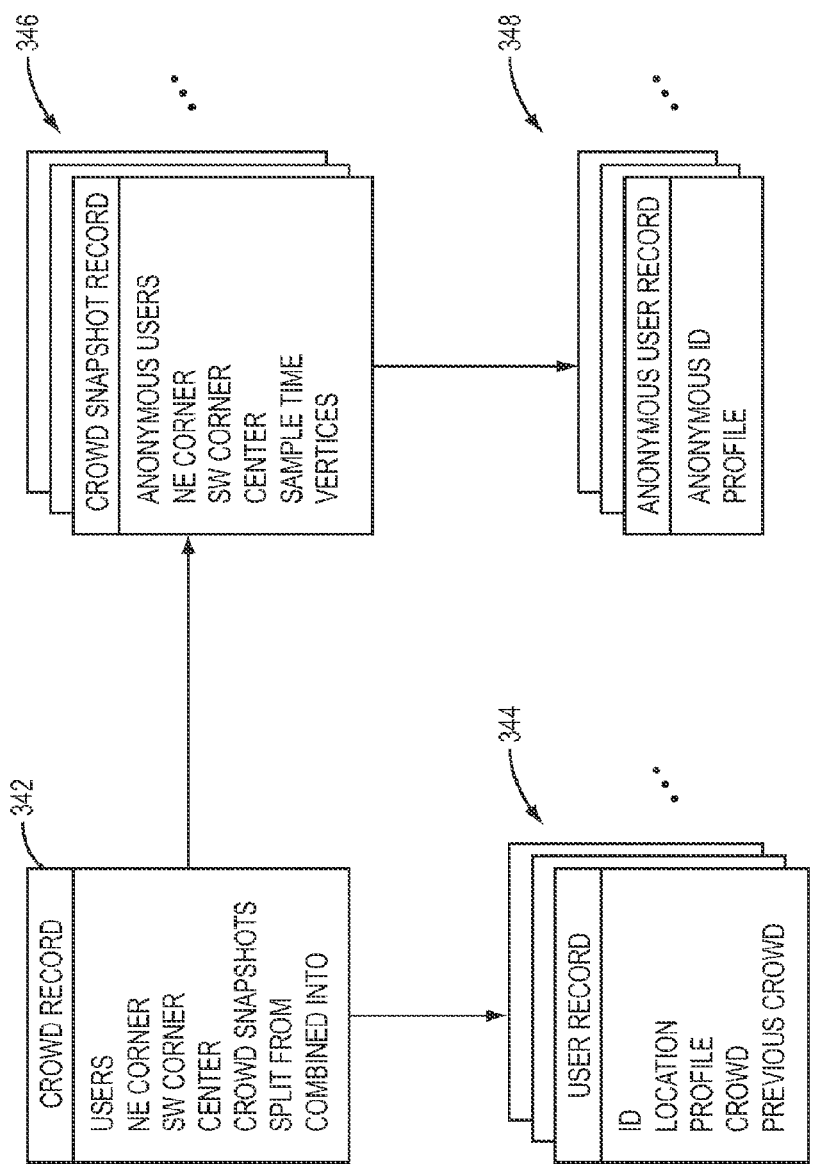
FIG. 55 illustrates exemplary data records that may be used to represent crowds, users, crowd snapshots, and anonymous users according to one embodiment of the present disclosure.

FIG. 55 illustrates exemplary data records that may be used to represent crowds, users, crowd snapshots, and anonymous users according to one embodiment of the present disclosure. As illustrated, for each crowd created by the crowd analyzer 58 of the MAP server 12 (i.e., each crowd created that has three or more users), a corresponding crowd record 342 is created and stored in the datastore 64 of the MAP server 12. The crowd record 342 for a crowd includes a users field, a North-East (NE) corner field, a South-West (SW) corner field, a center field, a crowd snapshots field, a split from field, and a combined into field. The users field stores a set or list of user records 344 corresponding to a subset of the users 20-1 through 20-N that are currently in the crowd. The NE corner field stores a location corresponding to a NE corner of a bounding box for the crowd. The NE corner may be defined by latitude and longitude coordinates and optionally an altitude. Similarly, the SW corner field stores a location of a SW corner of the bounding box for the crowd. Like the NE corner, the SW corner may be defined by latitude and longitude coordinates and optionally an altitude. Together, the NE corner and the SW corner define a bounding box for the crowd, where the edges of the bounding box pass through the current locations of the outermost users in the crowd. The center field stores a location corresponding to a center of the crowd. The center of the crowd may be defined by latitude and longitude coordinates and optionally an altitude. Together, the NE corner, the SW corner, and the center of the crowd form spatial information defining the location of the crowd. Note, however, that the spatial information defining the location of the crowd may include additional or alternative information depending on the particular implementation. The crowd snapshots field stores a list of crowd snapshot records 346 corresponding to crowd snapshots for the crowd. As discussed below in detail, the split from field may be used to store a reference to a crowd record corresponding to another crowd from which the crowd split, and the combined into field may be used to store a reference to a crowd record corresponding to another crowd into which the crowd has been merged.

Each of the user records 344 includes an ID field, a location field, a profile field, a crowd field, and a previous crowd field. The ID field stores a unique ID for one of the users 20-1 through 20-N for which the user record 344 is stored. The location field stores the current location of the user, which may be defined by latitude and longitude coordinates and optionally an altitude. The profile field stores the user profile of the user, which may be defined as a list of keywords for one or more profile categories. The crowd field is used to store a reference to a crowd record of a crowd of which the user is currently a member. The previous crowd field may be used to store a reference to a crowd record of a crowd of which the user was previously a member.

Each of the crowd snapshot records 346 includes an anonymous users field, a NE corner field, a SW corner field, a center field, a sample time field, and a vertices field. The anonymous users field stores a set or list of anonymous user records 348, which are anonymized versions of user records for the users that are in the crowd at a time the crowd snapshot was created. The NE corner field stores a location corresponding to a NE corner of a bounding box for the crowd at the time the crowd snapshot was created. The NE corner may be defined by latitude and longitude coordinates and optionally an altitude. Similarly, the SW corner field stores a location of a SW corner of the bounding box for the crowd at the time the crowd snapshot was created. Like the NE corner, the SW corner may be defined by latitude and longitude coordinates and optionally an altitude. The center field stores a location corresponding to a center of the crowd at the time the crowd snapshot was created. The center of the crowd may be defined by latitude and longitude coordinates and optionally an altitude. Together, the NE corner, the SW corner, and the center of the crowd form spatial information defining the location of the crowd at the time the crowd snapshot was created. Note, however, that the spatial information defining the location of the crowd at the time the crowd snapshot was created may include additional or alternative information depending on the particular implementation. The sample time field stores a timestamp indicating a time at which the crowd snapshot was created. The timestamp preferably includes a date and a time of day at which the crowd snapshot was created. The vertices field stores locations of users in the crowd at the time the crowd snapshot was created that define an actual outer boundary of the crowd (e.g., as a polygon) at the time the crowd snapshot was created. Note that the actual outer boundary of a crowd may be used to show the location of the crowd when displayed to a user.

Each of the anonymous user records 348 includes an anonymous ID field and a profile field. The anonymous ID field stores an anonymous user ID, which is preferably a unique user ID that is not tied, or linked, back to any of the users 20-1 through 20-N and particularly not tied back to the user or the user record for which the anonymous user record 348 has been created. In one embodiment, the anonymous user records 348 for a crowd snapshot record 346 are anonymized versions of the user records 344 of the users in the crowd at the time the crowd snapshot was created. The manner in which the user records 344 are anonymized to create the anonymous user records 348 may be the same as that described above with respect to maintaining a historical record of anonymized user profile data according to location. The profile field stores the anonymized user profile of the anonymous user, which may be defined as a list of keywords for one or more profile categories.

FIGS. 56A through 56D illustrate one embodiment of a spatial crowd formation process that may be used to enable the crowd tracking feature. This spatial crowd formation process is similar to that described above with respect to FIGS. 24A through 24D. In this embodiment, the spatial crowd formation process is triggered in response to receiving a location update for one of the users 20-1 through 20-N and is preferably repeated for each location update received for the users 20-1 through 20-N. As such, first, the crowd analyzer 58 receives a location update, or a new location, for a user (step 3800). In response, the crowd analyzer 58 retrieves an old location of the user, if any (step 3802). The old location is the current location of the user prior to receiving the new location of the user. The crowd analyzer 58 then creates a new bounding box of a predetermined size centered at the new location of the user (step 3804) and an old bounding box of a predetermined size centered at the old location of the user, if any (step 3806). The predetermined size of the new and old bounding boxes may be any desired size. As one example, the predetermined size of the new and old bounding boxes is 40 meters by 40 meters. Note that if the user does not have an old location (i.e., the location received in step 3800 is the first location received for the user), then the old bounding box is essentially null. Also note that while bounding "boxes" are used in this example, the bounding regions may be of any desired shape.

Next, the crowd analyzer 58 determines whether the new and old bounding boxes overlap (step 3808). If so, the crowd analyzer 58 creates a bounding box encompassing the new and old bounding boxes (step 3810). For example, if the new and old bounding boxes are 40×40 meter regions and a 1×1 meter square at the northeast corner of the new bounding box overlaps a 1×1 meter square at the southwest corner of the old bounding box, the crowd analyzer 58 may create a 79×79 meter square bounding box encompassing both the new and old bounding boxes.

The crowd analyzer 58 then determines the individual users and crowds relevant to the bounding box created in step 3810 (step 3812). Note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box established in step 3810. In order to determine the relevant crowds, the crowd analyzer 58 queries the datastore 64 of the MAP server 12 to obtain crowd records for crowds that are within or overlap the bounding box established in step 3810. The individual users relevant to the bounding box are users that are currently located within the bounding box and are not already members of a crowd. In order to identify the relevant individual users, the crowd analyzer 58 queries the datastore 64 of the MAP server 12 for user records of users that are currently located in the bounding box created in step 3810 and are not already members of a crowd. Next, the crowd analyzer 58 computes an optimal inclusion distance for individual users based on user density within the bounding box (step 3814). The optimal inclusion distance may be computed as described above with respect to step 2314 of FIG. 24A.

The crowd analyzer 58 then creates a crowd of one user for each individual user within the bounding box established in step 3810 that is not already included in a crowd and sets the optimal inclusion distance for those crowds to the initial optimal inclusion distance (step 3816). The crowds created for the individual users are temporary crowds created for purposes of performing the crowd formation process. At this point, the process proceeds to FIG. 56B where the crowd analyzer 58 analyzes the crowds in the bounding box established in step 3810 to determine whether any of the crowd members (i.e., users in the crowds) violate the optimal inclusion distance of their crowds (step 3818). Any crowd member that violates the optimal inclusion distance of his or her crowd is then removed from that crowd and the previous crowd fields in the corresponding user records are set (step 3820). More specifically, in this embodiment, a member is removed from a crowd by removing the user record of the member from the set or list of user records in the crowd record of the crowd and setting the previous crowd stored in the user record of the user to the crowd from which the member has been removed. The crowd analyzer 58 then creates a crowd of one user for each of the users removed from their crowds in step 3820 and sets the optimal inclusion distance for the newly created crowds to the initial optimal inclusion distance (step 3822).

Next, the crowd analyzer 58 determines the two closest crowds in the bounding box (step 3824) and a distance between the two closest crowds (step 3826). The distance between the two closest crowds is the distance between the crowd centers of the two closest crowds, which are stored in the crowd records for the two closest crowds. The crowd analyzer 58 then determines whether the distance between the two closest crowds is less than the optimal inclusion distance of a larger of the two closest crowds (step 3828). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the crowds. As another alternative, if the two closest crowds are of the same size, the crowd analyzer 58 may compare the distance between the two closest crowds to an average of the optimal inclusion distances of the two crowds.

If the distance between the two closest crowds is greater than the optimal inclusion distance, the process proceeds to step 3840. However, if the distance between the two closest crowds is less than the optimal inclusion distance, the two crowds are merged (step 3830). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 58 sets the previous crowd fields of the user records in the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 58 removes the non-surviving crowd (step 3832). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 64. However, the crowd snapshots for the non-surviving crowd are still available via the crowd record for the non-surviving crowd. In contrast, if the non-surviving crowd is a temporary crowd, the crowd analyzer 58 may remove the crowd by deleting the corresponding crowd record.

The crowd analyzer 58 also computes a new crowd center for the surviving crowd (step 3834). Again, a center of mass algorithm may be used to compute the crowd center of a crowd. In addition, a new optimal inclusion distance for the surviving crowd is computed (step 3836). In one embodiment, the new optimal inclusion distance for the surviving crowd is computed in the manner described above with respect to step 2334 of FIG. 24B.

At this point, the crowd analyzer 58 determines whether a maximum number of iterations have been performed (step 3838). The maximum number of iterations is a predefined number that ensures that the crowd formation process does not indefinitely loop over steps 3818 through 3836 or loop over steps 3818 through 3836 more than a desired maximum number of times. If the maximum number of iterations has not been reached, the process returns to step 3818 and is repeated until either the distance between the two closest crowds is not less than the optimal inclusion distance of the larger crowd or the maximum number of iterations has been reached. At that point, the crowd analyzer 58 removes crowds with less than three users, or members (step 3840) and the process ends. As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 64. However, the crowd snapshots for the crowd are still available via the crowd record for the crowd. In contrast, if the crowd is a temporary crowd, the crowd analyzer 58 may remove the crowd by deleting the corresponding crowd record. In this manner, crowds having less than three members are removed in order to maintain privacy of individuals as well as groups of two users (e.g., a couple).

Figure 56A:
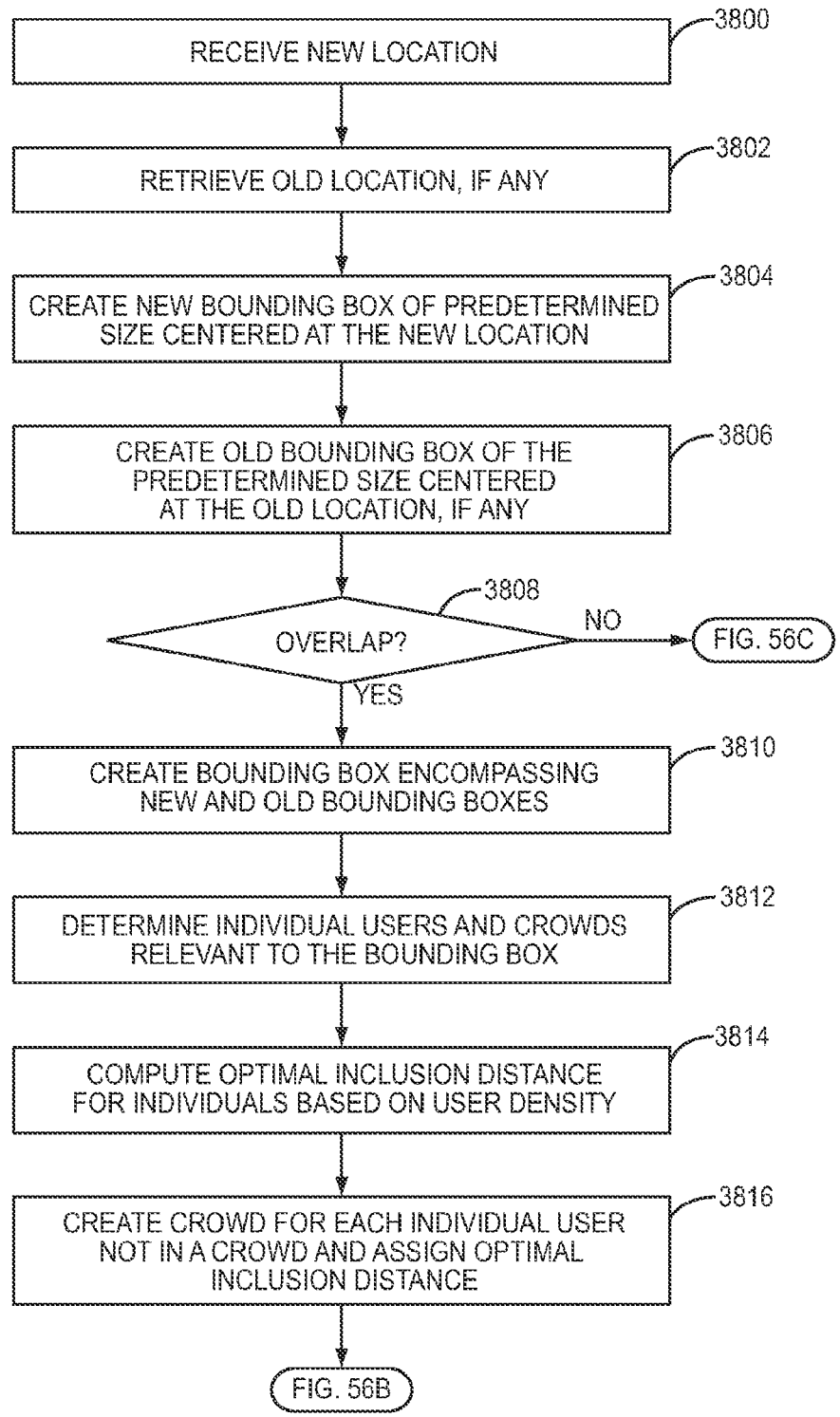
FIGS. 56A through 56D illustrate one embodiment of a spatial crowd formation process that may be used to enable crowd tracking according to one embodiment of the present disclosure.
Figure 56B:
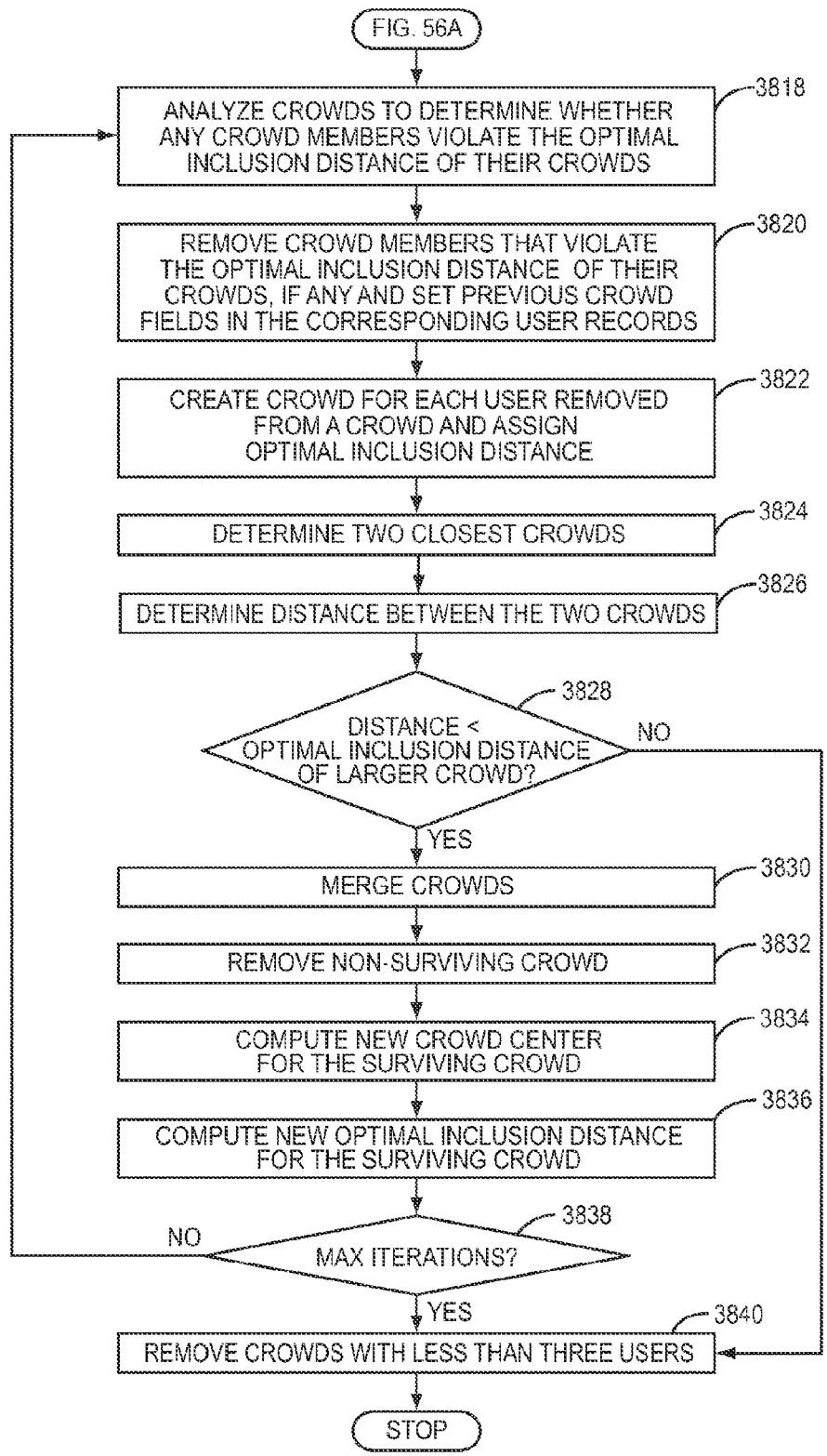
Figure 56C:
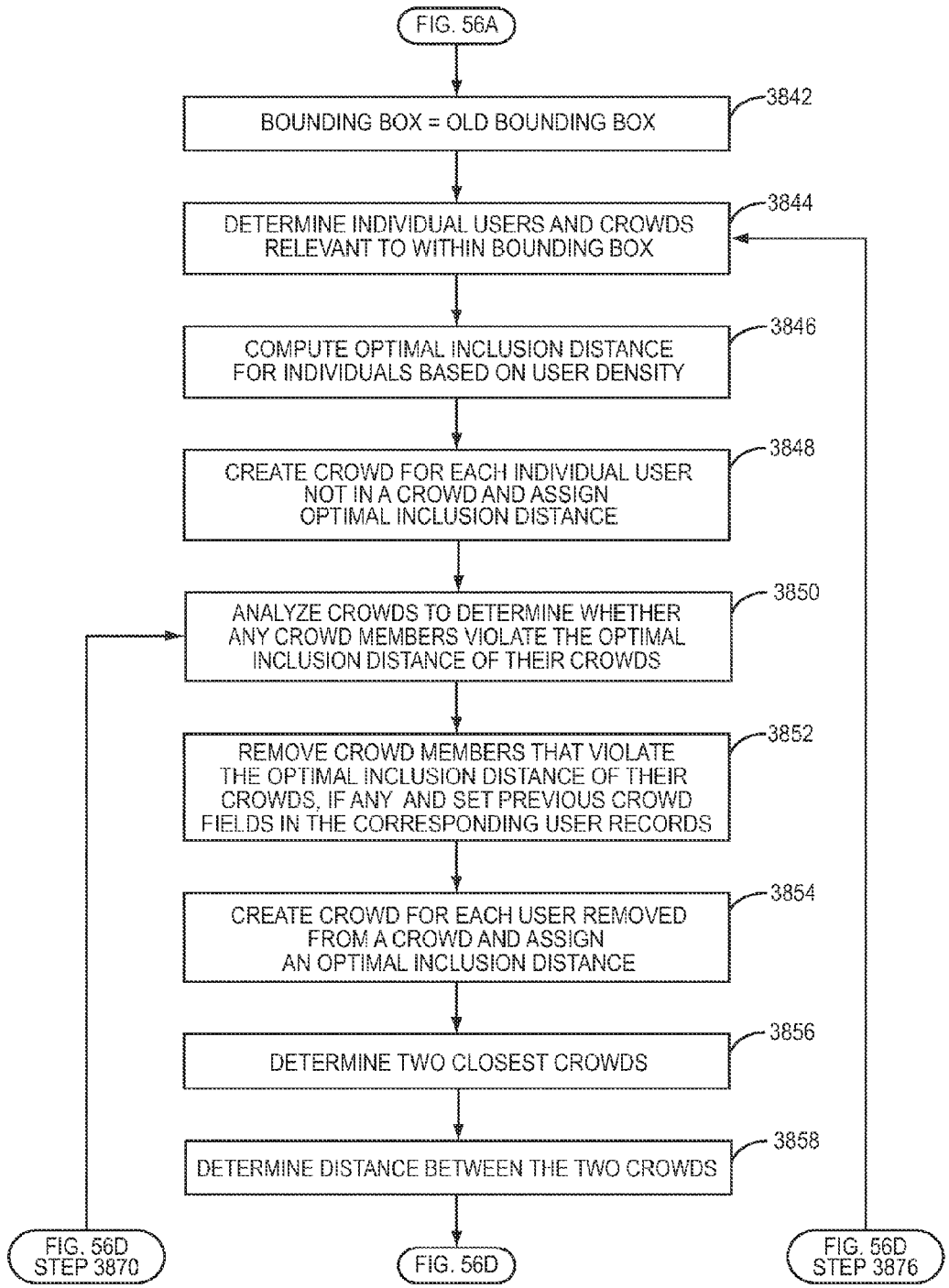
Figure 56D:
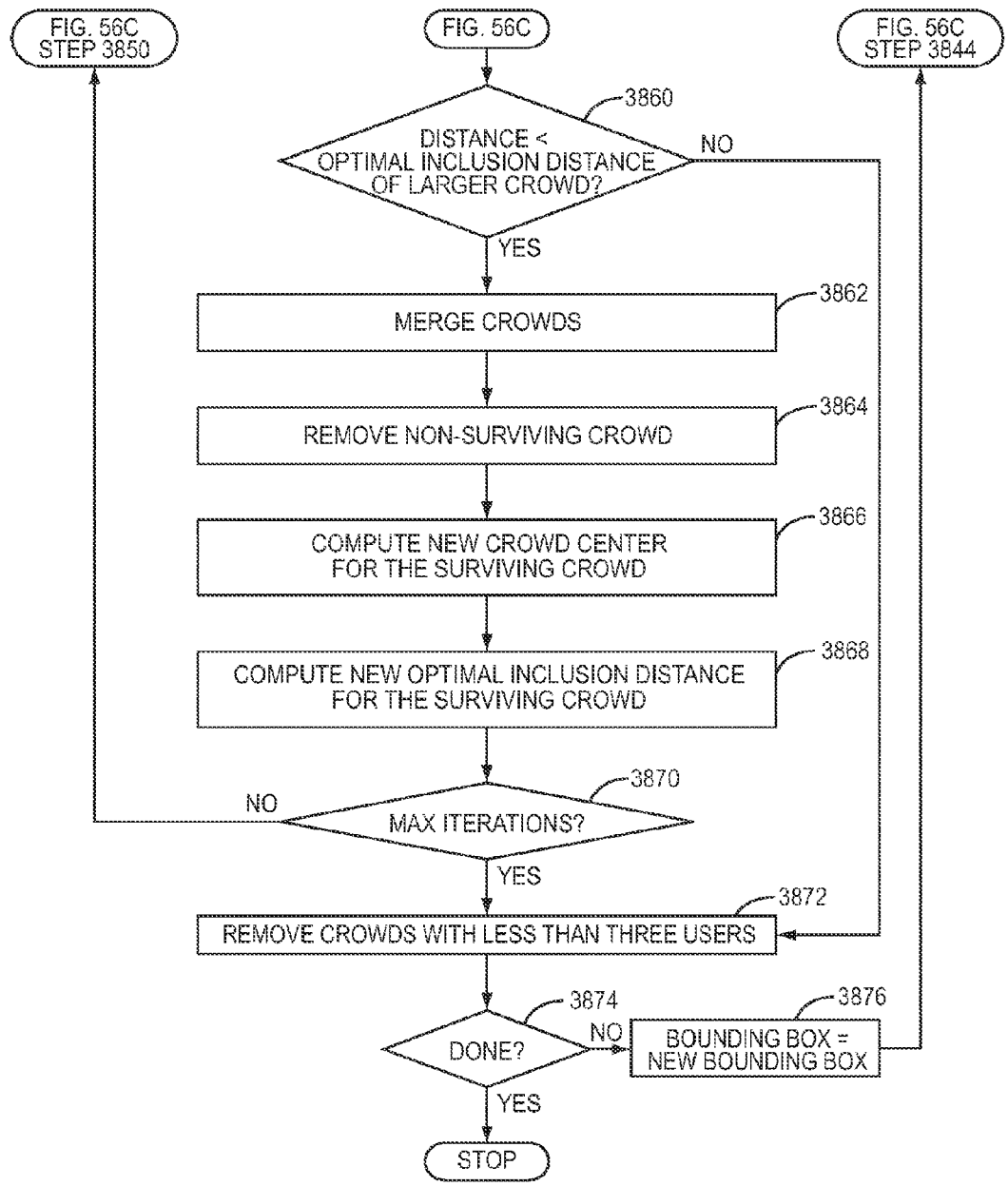

Returning to step 3808 in FIG. 56A, if the new and old bounding boxes do not overlap, the process proceeds to FIG. 56C and the bounding box to be processed is set to the old bounding box (step 3842). In general, the crowd analyzer 58 then processes the old bounding box in much that same manner as described above with respect to steps 3812 through 3840. More specifically, the crowd analyzer 58 determines the individual users and crowds relevant to the bounding box (step 3844). Again, note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box. The individual users relevant to the bounding box are users that are currently located within the bounding box and are not already members of a crowd. Next, the crowd analyzer 58 computes an optimal inclusion distance for individual users based on user density within the bounding box (step 3846). The optimal inclusion distance may be computed as described above with respect to step 2344 of FIG. 24C.

The crowd analyzer 58 then creates a crowd of one user for each individual user within the bounding box that is not already included in a crowd and sets the optimal inclusion distance for the crowds to the initial optimal inclusion distance (step 3848). The crowds created for the individual users are temporary crowds created for purposes of performing the crowd formation process. At this point, the crowd analyzer 58 analyzes the crowds in the bounding box to determine whether any crowd members (i.e., users in the crowds) violate the optimal inclusion distance of their crowds (step 3850). Any crowd member that violates the optimal inclusion distance of his or her crowd is then removed from that crowd and the previous crowd fields in the corresponding user records are set (step 3852). More specifically, in this embodiment, a member is removed from a crowd by removing the user record of the member from the set or list of user records in the crowd record of the crowd and setting the previous crowd stored in the user record of the user to the crowd from which the member has been removed. The crowd analyzer 58 then creates a crowd for each of the users removed from their crowds in step 3852 and sets the optimal inclusion distance for the newly created crowds to the initial optimal inclusion distance (step 3854).

Next, the crowd analyzer 58 determines the two closest crowds in the bounding box (step 3856) and a distance between the two closest crowds (step 3858). The distance between the two closest crowds is the distance between the crowd centers of the two closest crowds. The crowd analyzer 58 then determines whether the distance between the two closest crowds is less than the optimal inclusion distance of a larger of the two closest crowds (step 3860). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is greater than the optimal inclusion distance, the process proceeds to step 3872. However, if the distance between the two closest crowds is less than the optimal inclusion distance, the two crowds are merged (step 3862). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 58 sets the previous crowd fields of the set or list of user records from the non-surviving crowd to a reference to the crowd record of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the user records from the set or list of user records from the crowd record of the non-surviving crowd to the set or list of user records in the crowd record of the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) of the user(s) in the non-surviving crowd are not set to a reference to the crowd record of the non-surviving crowd. Similarly, the crowd record of the temporary record may not have a merged into field, but, if it does, the merged into field is not set to a reference to the surviving crowd.

Next, the crowd analyzer 58 removes the non-surviving crowd (step 3864). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the NE corner field, the SW corner field, and the center field of the crowd record of the non-surviving crowd. In this manner, the spatial information for the non-surviving crowd is removed from the corresponding crowd record such that the non-surviving or removed crowd will no longer be found in response to spatial-based queries on the datastore 64. However, the crowd snapshots for the non-surviving crowd are still available via the crowd record for the non-surviving crowd. In contrast, if the non-surviving crowd is a temporary crowd, the crowd analyzer 58 may remove the crowd by deleting the corresponding crowd record.

The crowd analyzer 58 also computes a new crowd center for the surviving crowd (step 3866). Again, a center of mass algorithm may be used to compute the crowd center of a crowd. In addition, a new optimal inclusion distance for the surviving crowd is computed (step 3868). In one embodiment, the new optimal inclusion distance for the surviving crowd is computed in the manner described above with respect to step 2364 of FIG. 24D.

At this point, the crowd analyzer 58 determines whether a maximum number of iterations have been performed (step 3870). If the maximum number of iterations has not been reached, the process returns to step 3850 and is repeated until either the distance between the two closest crowds is not less than the optimal inclusion distance of the larger crowd or the maximum number of iterations has been reached. At that point, the crowd analyzer 58 removes crowds with less than three users, or members (step 3872). As discussed above, in this embodiment, the manner in which a crowd is removed depends on whether the crowd is a pre-existing crowd or a temporary crowd. If the crowd is a pre-existing crowd, a removal process is performed by removing or nulling the users field, the NE corner field, the SW corner field, and the center field of the crowd record of the crowd. In this manner, the spatial information for the crowd is removed from the corresponding crowd record such that the crowd will no longer be found in response to spatial-based queries on the datastore 64. However, the crowd snapshots for the crowd are still available via the crowd record for the crowd. In contrast, if the crowd is a temporary crowd, the crowd analyzer 58 may remove the crowd by deleting the corresponding crowd record. In this manner, crowds having less than three members are removed in order to maintain privacy of individuals as well as groups of two users (e.g., a couple).

The crowd analyzer 58 then determines whether the crowd formation process for the new and old bounding boxes is done (step 3874). In other words, the crowd analyzer 58 determines whether both the new and old bounding boxes have been processed. If not, the bounding box is set to the new bounding box (step 3876), and the process returns to step 3844 and is repeated for the new bounding box. Once both the new and old bounding boxes have been processed, the crowd formation process ends.

Figure 57:
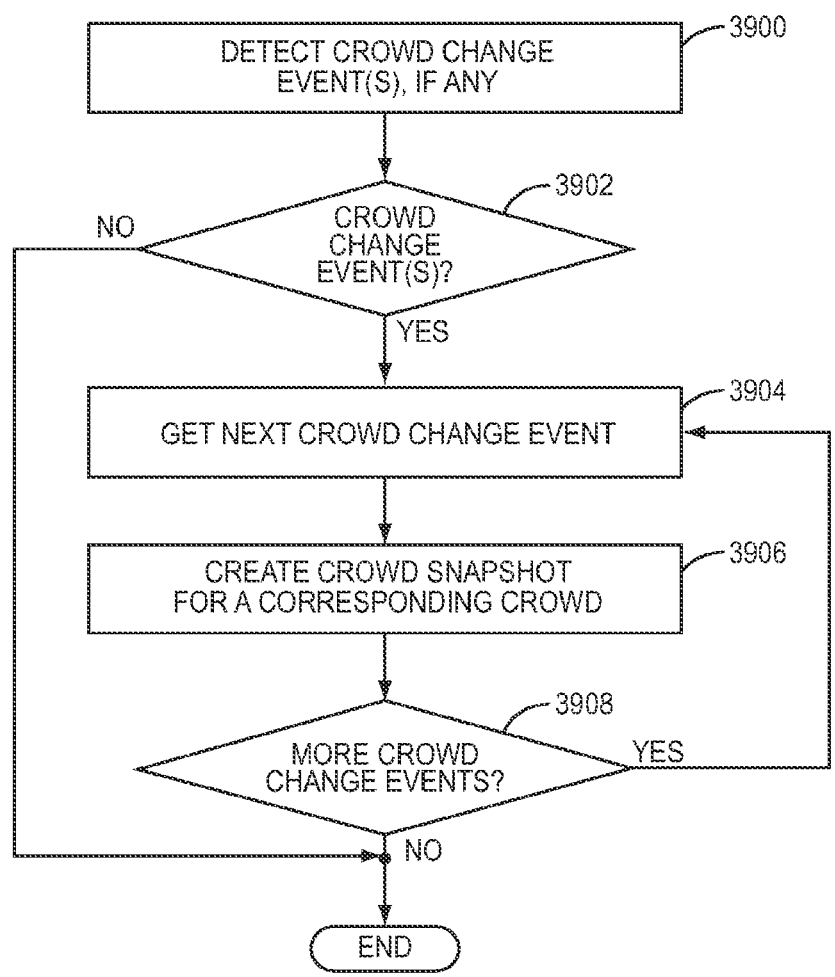
FIG. 57 illustrates a process for creating crowd snapshots according to one embodiment of the present disclosure.

FIG. 57 illustrates a process for creating crowd snapshots according to one embodiment of the present disclosure. In this embodiment, after the spatial crowd formation process of FIGS. 56A through 56D is performed in response to a location update for a user, the crowd analyzer 58 detects crowd change events, if any, for the relevant crowds (step 3900). The relevant crowds are pre-existing crowds that are within the bounding region(s) processed during the spatial crowd formation process in response to the location update for the user. The crowd analyzer 58 may detect crowd change events by comparing the crowd records of the relevant crowds before and after performing the spatial crowd formation process in response to the location update for the user. The crowd change events may be a change in the users in the crowd, a change to a location of one of the users within the crowd, or a change in the spatial information for the crowd (e.g., the NE corner, the SW corner, or the crowd center). Note that if multiple crowd change events are detected for a single crowd, then those crowd change events are preferably consolidated into a single crowd change event.

Next, the crowd analyzer 58 determines whether there are any crowd change events (step 3902). If not, the process ends. Otherwise, the crowd analyzer 58 gets the next crowd change event (step 3904) and generates a crowd snapshot for a corresponding crowd (step 3906). More specifically, the crowd change event identifies a crowd record stored for a crowd for which the crowd change event was detected. A crowd snapshot is then created for that crowd by creating a new crowd snapshot record for the crowd and adding the new crowd snapshot to the list of crowd snapshots stored in the crowd record for the crowd. The crowd snapshot record includes a set or list of anonymized user records, which are an anonymized version of the user records for the users in the crowd at the current time. In addition, the crowd snapshot record includes the NE corner, the SW corner, and the center of the crowd at the current time as well as a timestamp defining the current time as the sample time at which the crowd snapshot record was created. Lastly, locations of users in the crowd that define the outer boundary of the crowd at the current time are stored in the crowd snapshot record as the vertices of the crowd. After creating the crowd snapshot, the crowd analyzer 58 determines whether there are any more crowd change events (step 3908). If so, the process returns to step 3904 and is repeated for the next crowd change event. Once all of the crowd change events are processed, the process ends.

Figure 58:
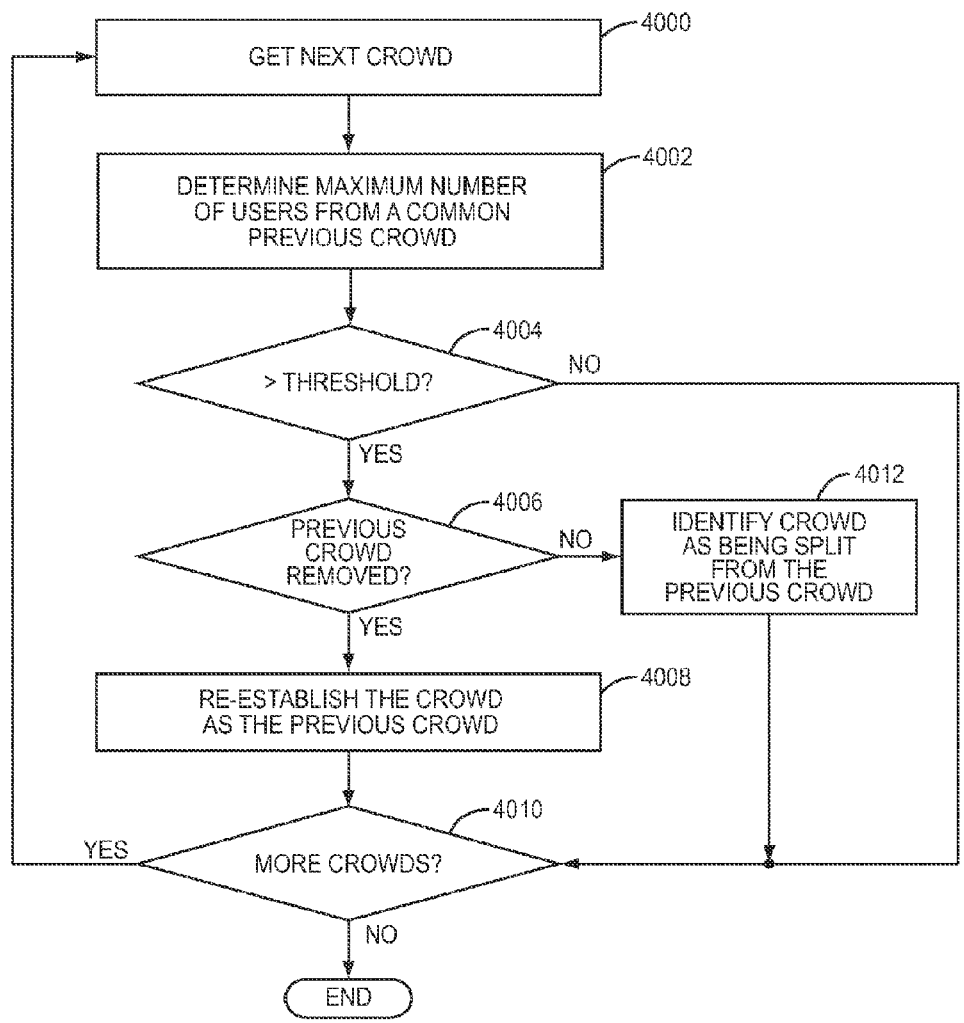
FIG. 58 illustrates a process that may be used to re-establish crowds and detect crowd splits according to one embodiment of the present disclosure.

FIG. 58 illustrates a process that may be used to re-establish crowds and detect crowd splits according to one embodiment of the present disclosure. In general, in order to accurately track a crowd, it is preferable to enable crowds that have been removed to be re-established in the future. For example, a crowd may be removed as a result of users in the crowd deactivating their MAP applications (or powering down their mobile devices). If those users then move together to a different location and then reactivate their MAP applications (or power on their mobile devices), it is preferable for the resulting crowd to be identified as the same crowd that was previously removed. In other words, it is desirable to re-establish the crowd. In addition, in order to accurately track a crowd, it is desirable to capture when the crowd splits into two or more crowds.

Accordingly, in this embodiment, the spatial crowd formation process of FIGS. 56A through 56D is performed in response to a location update for a user. The crowd analyzer 58 then gets a next relevant crowd (step 4000). The relevant crowds are pre-existing and new crowds that are within the bounding region(s) processed during the spatial crowd formation process in response to the location update for the user. Note that, for the first iteration, the next relevant crowd is the first relevant crowd. The crowd analyzer 58 then determines a maximum number of users in the crowd from a common previous crowd (step 4002). More specifically, the crowd analyzer 58 examines the previous crowd fields of the user records of all of the users in the crowd to identify users from a common previous crowd. For each previous crowd found in the user records of the users in the crowd, the crowd analyzer 58 counts the number of users in the crowd that are from that previous crowd. The crowd analyzer 58 then selects the previous crowd having the highest number of users, and determines that the number of users counted for the selected previous crowd is the maximum number of users in the crowd from a common previous crowd.

The crowd analyzer 58 then determines whether the maximum number of users in the crowd from a common previous crowd is greater than a predefined threshold number of users (step 4004). In an alternative embodiment, rather than determining the maximum number of users from a common previous crowd and comparing that number to a predefined threshold number of users, a maximum percentage of users in the crowd from a common previous crowd may be determined and compared to a predefined threshold percentage. If the maximum number of users in the crowd from a common previous crowd is not greater than the predefined threshold number of users, the process proceeds to step 4010. Otherwise, the crowd analyzer 58 determines whether the common previous crowd has been removed (step 4006). If so, then the crowd is re-established as the common previous crowd (step 4008). More specifically, in this embodiment, the crowd is re-established as the common previous crowd by storing the set or list of user records, the NE corner, the SW corner, and the center from the crowd record of the crowd in the crowd record of the common previous crowd. The crowd record for the crowd may then deleted. In addition, the previous crowd fields of the users from the common previous crowd may be set to null or otherwise cleared. Once the common previous crowd is re-established, the crowd analyzer 58 determines whether there are more relevant crowds to process (step 4010). If so, the process returns to step 4000 and is repeated until all relevant crowds are processed.

Returning to step 4006, if the common previous crowd has not been removed, the crowd analyzer 58 identifies the crowd as being split from the common previous crowd (step 4012). More specifically, in this embodiment, the crowd analyzer 58 stores a reference to the crowd record of the common previous crowd in the split from field of the crowd record of the crowd. At this point, the crowd analyzer 58 then determines whether there are more relevant crowds to process (step 4010). If so, the process returns to step 4000 and is repeated until all relevant crowds are processed, at which time the process ends.

Figure 59:
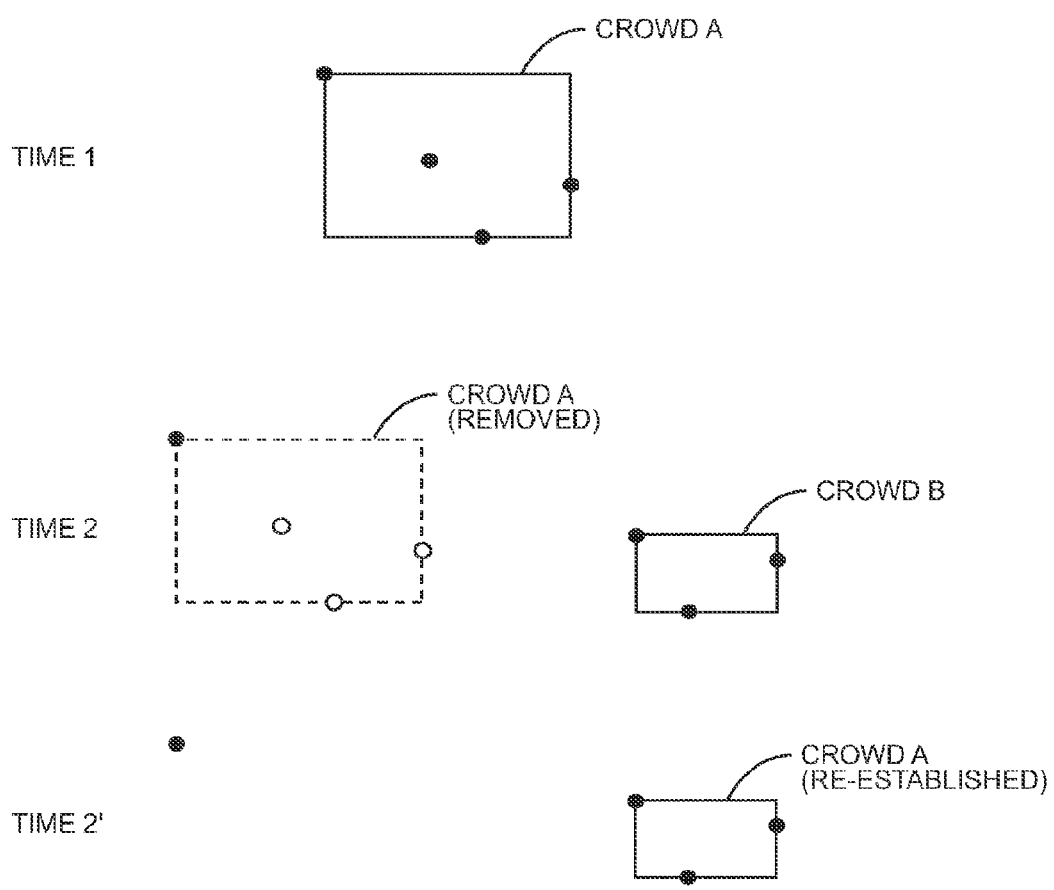
FIG. 59 graphically illustrates the process of re-establishing a crowd for an exemplary crowd according to one embodiment of the present disclosure.

FIG. 59 graphically illustrates the process of re-establishing a crowd for an exemplary crowd according to one embodiment of the present disclosure. As illustrated, at TIME 1, CROWD A has been formed and a corresponding crowd record has been created and stored. Between TIME 1 and TIME 2, three users from CROWD A have moved, thereby resulting in the removal of those three users from CROWD A as well as the removal of CROWD A. Again, CROWD A has been removed by removing the set or list of user records and spatial information from the crowd record for CROWD A. At TIME 2, a new crowd, CROWD B, has been formed for the three users that were previously in CROWD A. As such, the previous crowd fields for the three users now in CROWD B indicate that the three users are from CROWD A. Using the process of FIG. 58, the crowd analyzer 58 determines that the three users in CROWD B have a common previous crowd, namely, CROWD A. As a result, the crowd analyzer 58 re-establishes CROWD B as CROWD A, as shown at TIME 2'.

Figure 60:
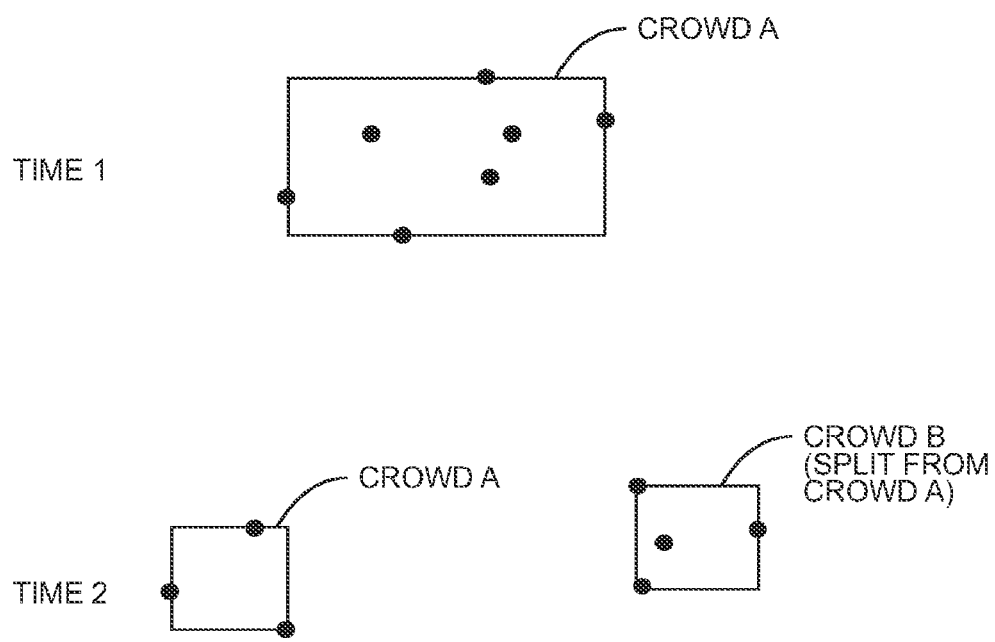
FIG. 60 graphically illustrates the process for capturing a crowd split for an exemplary crowd according to one embodiment of the present disclosure.

FIG. 60 graphically illustrates the process for capturing a crowd split for an exemplary crowd according to one embodiment of the present disclosure. As illustrated, at TIME 1, CROWD A has been formed and a corresponding crowd record has been created and stored. Between TIME 1 and TIME 2, four users from CROWD A have separated from the other three users of CROWD A. As a result, a new crowd, CROWD B, has been formed at TIME 2 for the four users from CROWD A. Using the process of FIG. 58, the crowd analyzer 58 determines that the four users in CROWD B are all from CROWD A and therefore identifies CROWD B as being split from CROWD A.

Figure 61:
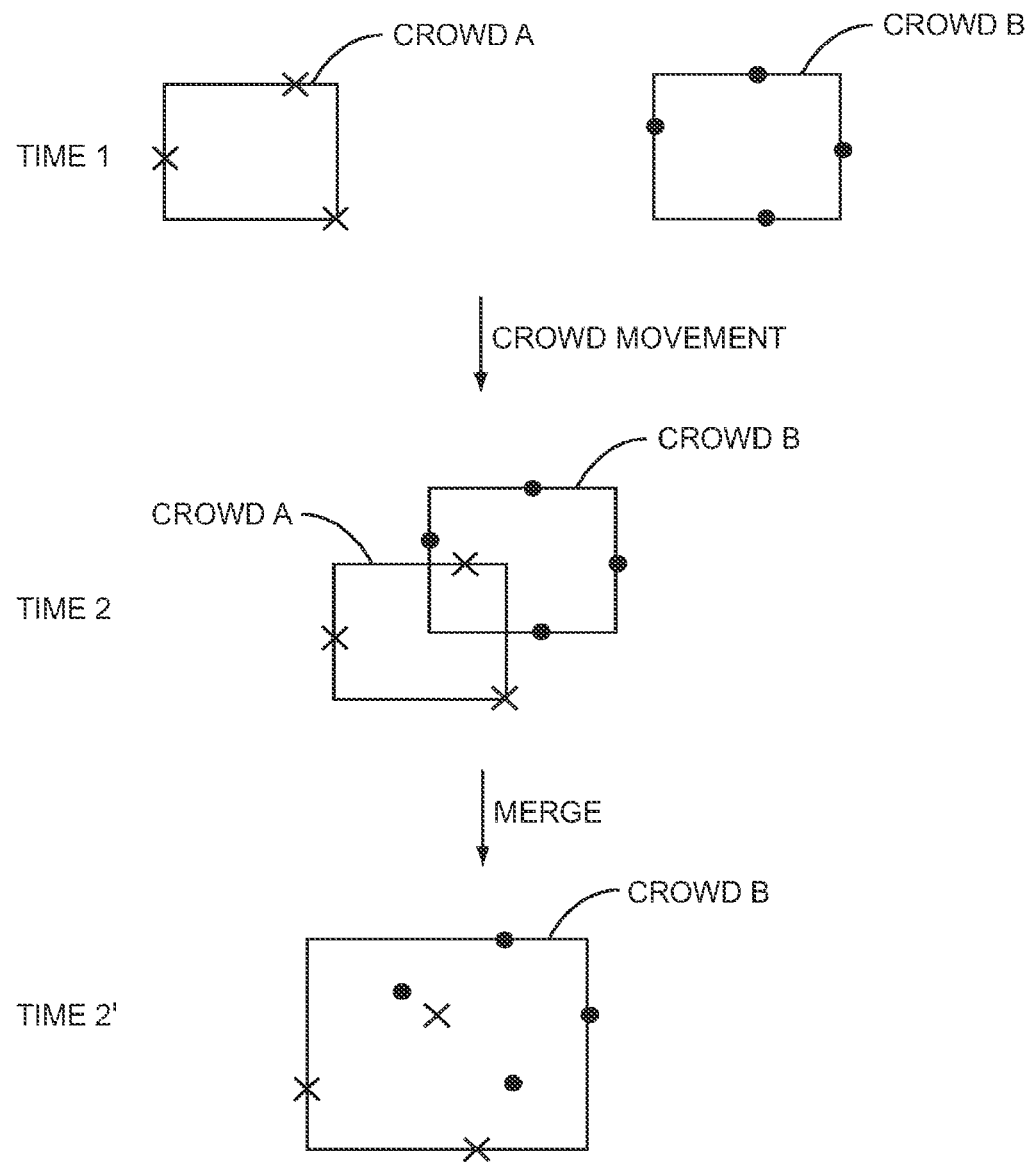
FIG. 61 graphically illustrates the merging of two exemplary pre-existing crowds according to one embodiment of the present disclosure.

FIG. 61 graphically illustrates the merging of two exemplary pre-existing crowds according to one embodiment of the present disclosure. As discussed above, the merger of crowds is performed during the spatial crowd formation process of FIGS. 56A through 56D. As illustrated, at TIME 1, CROWD A and CROWD B have been formed and corresponding crowd records have been created and stored. Between TIME 1 and TIME 2, CROWD A and CROWD B move close to one another such that the distance between CROWD A and CROWD B is less than the optimal inclusion distance(s) at TIME 2. As such, the crowd analyzer 58 merges CROWD A into CROWD B at TIME 2'. As part of the merger, CROWD A is removed, and the merged into field of the crowd record for CROWD A is set to a reference to the crowd record for CROWD B. In addition, the previous crowd fields in the user records of the user from CROWD A are set to a reference to the crowd record of CROWD A.

Figure 62:
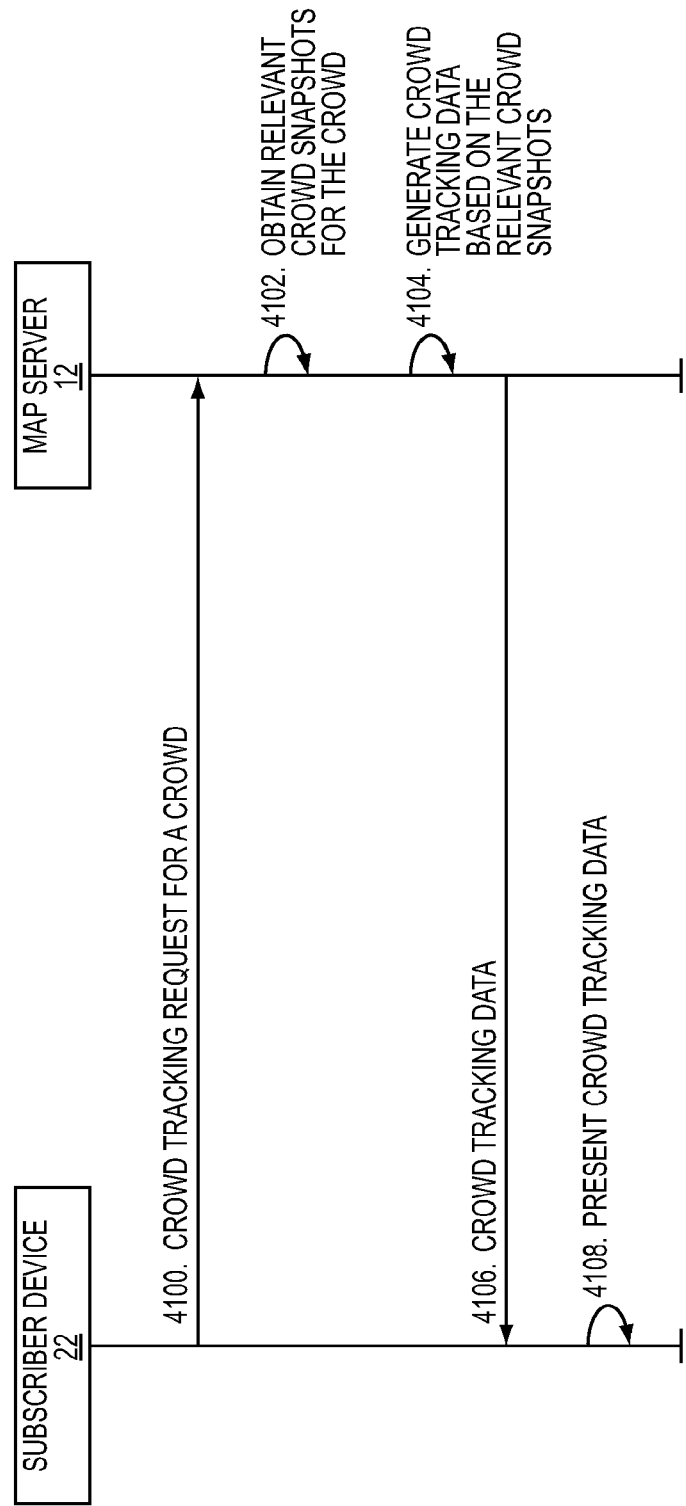
FIG. 62 illustrates the operation of the MAP server of FIG. 1 to serve a request for crowd tracking data for a crowd according to one embodiment of the present disclosure.

FIG. 62 illustrates the operation of the MAP server 12 of FIG. 1 to serve a request for crowd tracking data for a crowd according to one embodiment of the present disclosure. First, the subscriber device 22 sends a crowd tracking data request for a crowd to the MAP server 12 (step 4100). Note that access to crowd tracking data is preferably a subscription service only available to subscribers, such as the subscriber 24 at the subscriber device 22, for a subscription fee. The crowd tracking data request identifies a particular crowd. For example, in one embodiment, the crowd data for a number of crowds near a POI or within an AOI is presented to the subscriber 24 at the subscriber device 22 in the manner described above. The subscriber 24 may then select one of those crowds and initiate a request for crowd tracking data for the selected crowd. In response, the subscriber device 22 sends the crowd tracking data request for the selected crowd to the MAP server 12.

In response to receiving the crowd tracking data request, the MAP server 12, and more specifically the crowd analyzer 58, obtains relevant crowd snapshots for the crowd (step 4102). In one embodiment, the crowd tracking data request is a general crowd tracking data request for the crowd. As such, the relevant crowd snapshots are all crowd snapshots for the crowd. In another embodiment, the crowd tracking data request may include one or more criteria to be used to identify the relevant crowd snapshots. The one or more criteria may include time-based criteria such that only those crowd snapshots for the crowd that satisfy the time-based criteria are identified as the relevant crowd snapshots. For example, the time-based criteria may define a range of dates such as Oct. 1, 2009 through Oct. 8, 2009 or define a range of times within a particular day such as 5 pm through 9 pm on Oct. 1, 2009. The one or more criteria may additionally or alternatively include user-based criteria such that only those crowd snapshots including anonymous users satisfying the user-based criteria are identified as the relevant crowd snapshots. For example, the user-based criteria may include one or more interests and a minimum number or percentage of users such that only those crowd snapshots including at least the minimum number or percentage of anonymous users having the one or more interests are identified as the relevant crowd snapshots. Note that by using user-based criteria, the subscriber 24 is enabled to track sub-crowds within a crowd.

Next, the crowd analyzer 58 of the MAP server 12 generates crowd tracking data for the crowd based on the relevant crowd snapshots (step 4104). The crowd tracking data includes data indicative of the location of the crowd over time, which can be determined based on the spatial information and sample times from the relevant crowd snapshots. In addition, the crowd tracking data may include an aggregate profile for the crowd for each of the relevant crowd snapshots or at least some of the relevant crowd snapshots, an average aggregate profile for all of the relevant crowd snapshots, an average aggregate profile for a subset of the relevant crowd snapshots, or average aggregate profiles for a number of subsets of the relevant crowd snapshots. For example, the relevant crowd snapshots may be divided into a number of time bands such that at least some of the time bands include multiple relevant crowd snapshots. An average crowd snapshot may then be created for each of the time bands. The crowd analyzer 58 may utilize the aggregation engine 60 to obtain an aggregate profile for a crowd snapshot based on the interests of the anonymous users in the crowd snapshot. More specifically, in a manner similar to that described above, an aggregate profile for a crowd snapshot may be computed by comparing the interests of the anonymous users to one another or by comparing the interests of the anonymous users to a target profile. The crowd tracking data may also contain other information derived from the relevant crowd snapshots such as, for example, the number of users in the relevant crowd snapshots, crowd characteristics for the crowd for the relevant crowd snapshots, or the like.

The crowd analyzer 58 returns the crowd tracking data for the crowd to the subscriber device 22 (step 4106). Note that in the embodiment where the subscriber device 22 interacts with the MAP server 12 via the web browser 38, the MAP server 12 returns the crowd tracking data to the subscriber device 22 in a format suitable for use by the web browser 38. For example, the crowd tracking data may be returned via a web page including a map, wherein indicators of the location of the crowd over time as defined by the relevant crowd snapshots may be overlaid upon the map. The subscriber 24 may then be enabled to select one of those indicators to view additional information regarding the crowd at that time such as, for example, an aggregate profile of a corresponding crowd snapshot of the crowd. Once the crowd tracking data is received at the subscriber device 22, the crowd tracking data is presented to the subscriber 24 (step 4108).

In addition to enabling an entity, such as the subscriber 24, to track crowds, the crowd snapshots of crowds may also be used to provide additional metrics about the crowds. These metrics may be included in the crowd data generated for the crowds and returned to the users 20-1 through 20-N, the subscriber 24, or the third-party service 26. For example, a quality factor for a crowd may be provided as a function of a duration of time that the crowd has existed. The duration of time that the crowd has existed can be determined from the crowd snapshots for the crowd. For instance, a crowd may have a high quality if the crowd has existed (not been removed) for a duration of two or more hours, a low quality if the crowd has existed for a duration of less than five minutes, or one of various intermediate degrees of quality if the crowd has existed for a duration of between five minutes and two hours. Note that when determining whether to remove a user from a crowd, the quality of the crowd may be used to relax or stretch the optimal inclusion distance for the crowd with respect to user removal. This relaxation or stretching of the optimal inclusion distance with respect to user removal may then retract to its original value after or over a desired period of time. The retracting period may also be a function of the quality of the crowd. In this manner, if a crowd has existed for a long period of time, the MAP server 12 will be more lenient when determining whether to remove a user from that crowd because the crowd is stable and the user will likely move back to within the optimal inclusion distance from the center of the crowd.

As another example, the crowd snapshots of a crowd may be used to compute a motility of the crowd based on how much area the crowd covers over time. For instance, the distance that the crowd has traveled over a period of time may be determined based on the crowd centers stored in the crowd snapshots for the crowd during that period of time. The total distance traveled over the period of time can be provided as the motility of the crowd. The motility of the crowd may additionally or alternatively consider a speed at which the crowd moves over a period of time.

Figure 63:
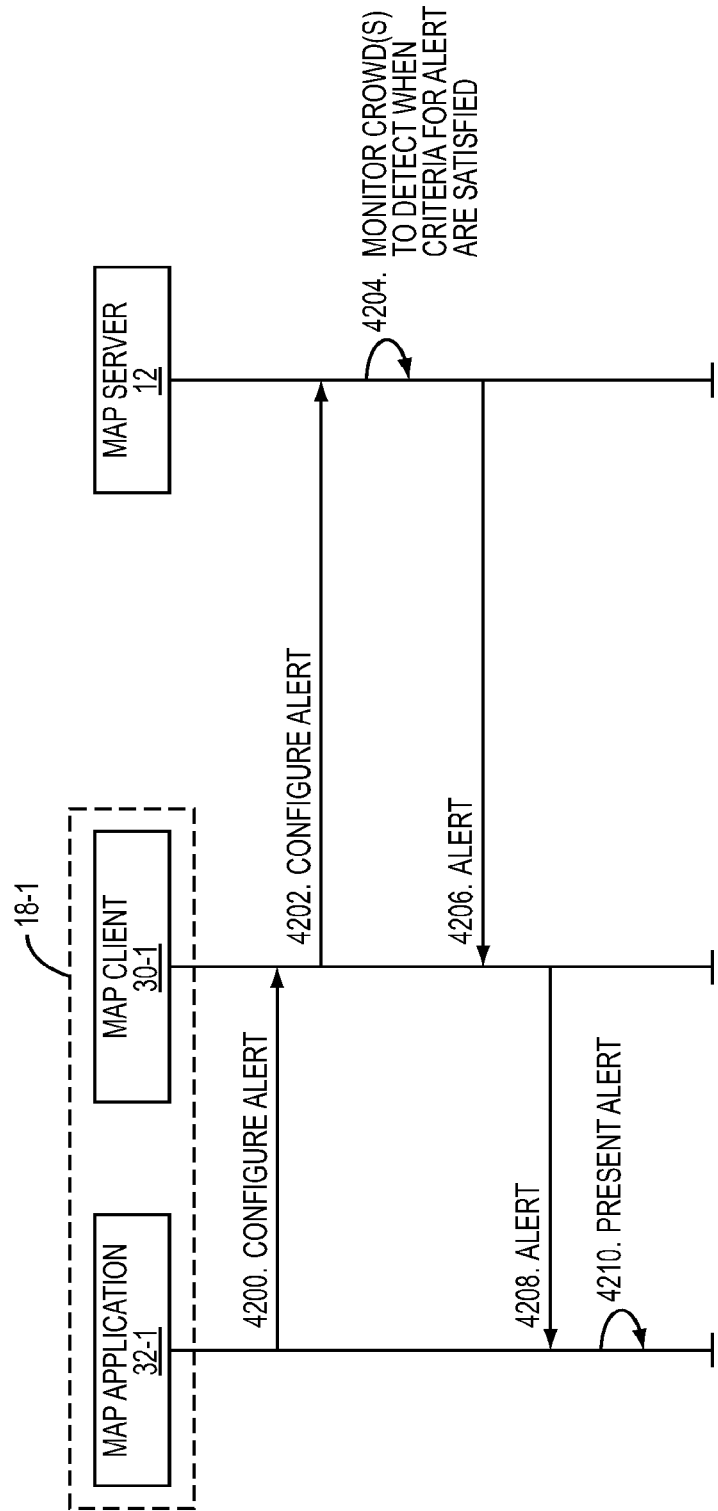
FIG. 63 illustrates the operation of the MAP server of FIG. 1 to enable alerts according to one embodiment of the present disclosure.

FIG. 63 illustrates the operation of the MAP server 12 to enable alerts according to one embodiment of the present disclosure. In this embodiment, the MAP client 30-1 of the mobile device 18-1 interacts with the MAP server 12 via the MAP client 30-1 to configure an alert (steps 4200 and 4202). More specifically, in this embodiment, the user 20-1 interacts with the MAP application 32-1 to provide input defining a desired alert. In one embodiment, the alert may be configured such that the user 20-1 is alerted when a particular crowd meets one or more criteria specified by the user 20-1 or when one or more crowds relevant to a POI or an AOI meet one or more criteria specified by the user 20-1. The one or more criteria may be based on the aggregate profile of the relevant crowd(s), the characteristics of the relevant crowd(s), the quality of the relevant crowd(s), or a combination thereof. For example, the one or more criteria specified for the alert may include an aggregate profile based criterion such that the user 20-1 is alerted when the aggregate profile of the crowd specified by the user 20-1 satisfies the aggregate profile based criterion or when the aggregate profile of one or more crowds relevant to the POI or the AOI specified by the user 20-1 satisfies the aggregate profile based criterion. The aggregate profile based criterion may be that a minimum match strength for the aggregate profile of the crowd as compared to the user profile of the user 20-1.

As another example, the one or more criteria for the alert may include one or more user-based criteria such as, for example, a criterion stating that the user 20-1 is to be alerted when a defined minimum number of users in the crowd have a specified interest. As yet another example, the one or more criterion for the alert may include a criterion stating that the user 20-1 is to be alerted when a crowd having at least a specified number of users is at or near a specified POI or AOI or when a specified crowd has at least a specified number of users.

Once the alert is configured, the MAP server 12 monitors the crowd specified for the alert or crowds relevant to the POI or the AOI specified for the alert to detect when the one or more criteria for the alert are satisfied (step 4204). Once the one or more criteria for the alert are satisfied, the alert is triggered such that the MAP server 12 sends the alert to the MAP client 30-1, which in turn sends the alert to the MAP application 32-1 (steps 4206 and 4208). The MAP application 32-1 then presents the alert to the user 20-1 (step 4210). The alert may be presented as, for example, a visual alert or an audible alert.

Figure 64:
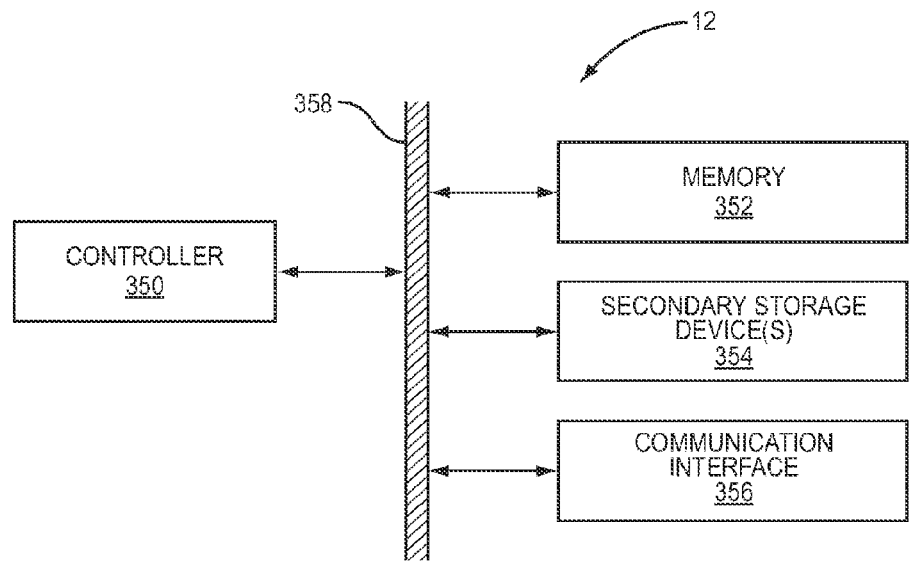
FIG. 64 is a block diagram of the MAP server of FIG. 1 according to one embodiment of the present disclosure.

FIG. 64 is a block diagram of the MAP server 12 according to one embodiment of the present disclosure. As illustrated, the MAP server 12 includes a controller 350 connected to memory 352, one or more secondary storage devices 354, and a communication interface 356 by a bus 358 or similar mechanism. The controller 350 is a microprocessor, digital Application Specific Integrated Circuit (ASIC), Field Programmable Gate Array (FPGA), or the like. In this embodiment, the controller 350 is a microprocessor, and the application layer 40, the business logic layer 42, and the object mapping layer 62 (FIG. 2) are implemented in software and stored in the memory 352 for execution by the controller 350. Further, the datastore 64 (FIG. 2) may be implemented in the one or more secondary storage devices 354. The secondary storage devices 354 are digital data storage devices such as, for example, one or more hard disk drives. The communication interface 356 is a wired or wireless communication interface that communicatively couples the MAP server 12 to the network 28 (FIG. 1). For example, the communication interface 356 may be an Ethernet interface, local wireless interface such as a wireless interface operating according to one of the suite of IEEE 802.11 standards, or the like.

Figure 65:
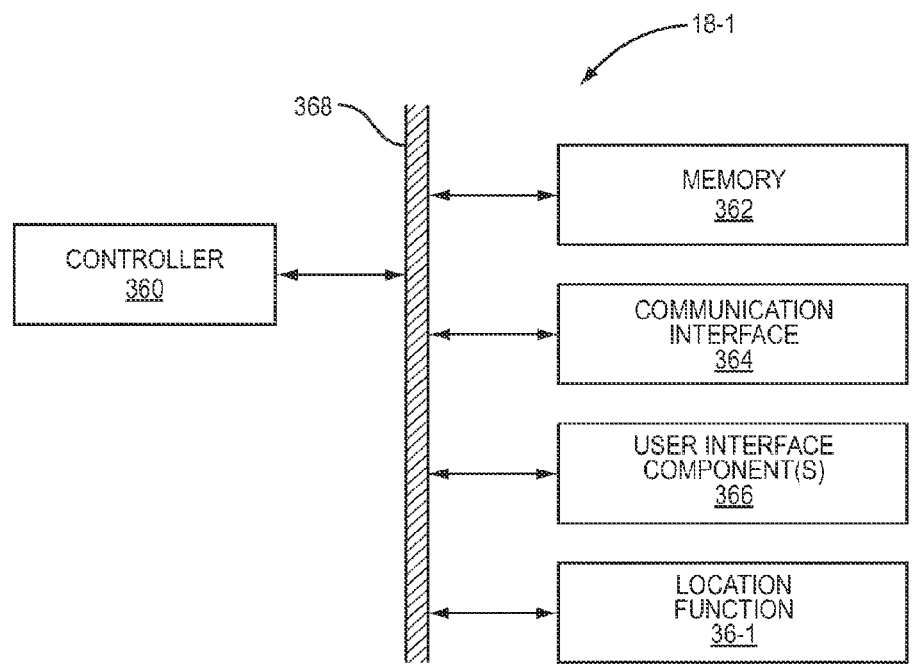
FIG. 65 is a block diagram of one of the mobile devices of FIG. 1 according to one embodiment of the present disclosure.

FIG. 65 is a block diagram of the mobile device 18-1 according to one embodiment of the present disclosure. This discussion is equally applicable to the other mobile devices 18-2 through 18-N. As illustrated, the mobile device 18-1 includes a controller 360 connected to memory 362, a communication interface 364, one or more user interface components 366, and the location function 36-1 by a bus 368 or similar mechanism. The controller 360 is a microprocessor, digital ASIC, FPGA, or the like. In this embodiment, the controller 360 is a microprocessor, and the MAP client 30-1, the MAP application 32-1, and the third-party applications 34-1 are implemented in software and stored in the memory 362 for execution by the controller 360. In this embodiment, the location function 36-1 is a hardware component such as, for example, a GPS receiver. The communication interface 364 is a wireless communication interface that communicatively couples the mobile device 18-1 to the network 28 (FIG. 1). For example, the communication interface 364 may be a local wireless interface such as a wireless interface operating according to one of the suite of IEEE 802.11 standards, a mobile communications interface such as a cellular telecommunications interface, or the like. The one or more user interface components 366 include, for example, a touchscreen, a display, one or more user input components (e.g., a keypad), a speaker, or the like, or any combination thereof.

Figure 66:
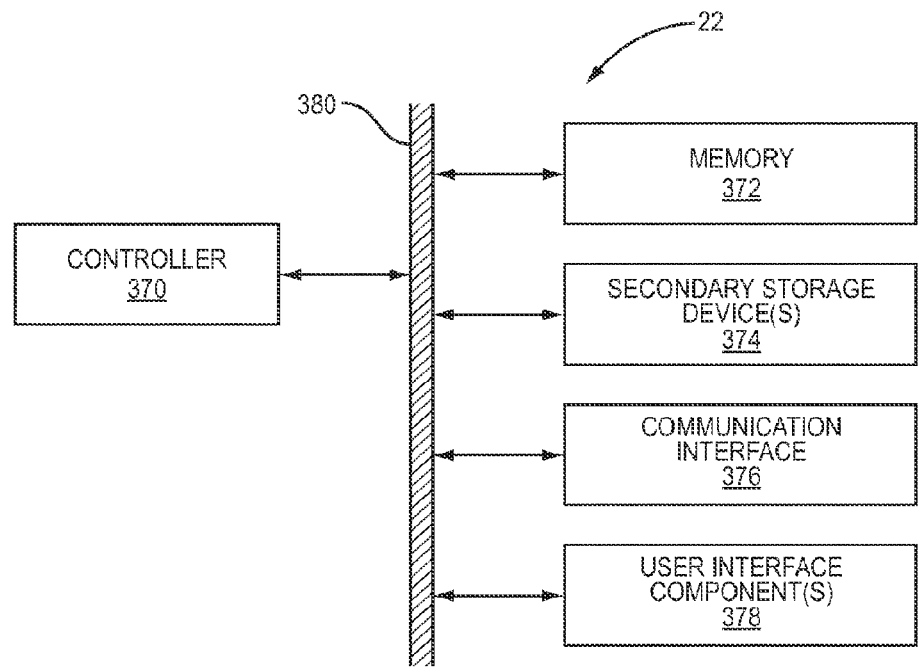
FIG. 66 is a block diagram of the subscriber device of FIG. 1 according to one embodiment of the present disclosure.

FIG. 66 is a block diagram of the subscriber device 22 according to one embodiment of the present disclosure. As illustrated, the subscriber device 22 includes a controller 370 connected to memory 372, one or more secondary storage devices 374, a communication interface 376, and one or more user interface components 378 by a bus 380 or similar mechanism. The controller 370 is a microprocessor, digital ASIC, FPGA, or the like. In this embodiment, the controller 370 is a microprocessor, and the web browser 38 (FIG. 1) is implemented in software and stored in the memory 372 for execution by the controller 370. The one or more secondary storage devices 374 are digital storage devices such as, for example, one or more hard disk drives. The communication interface 376 is a wired or wireless communication interface that communicatively couples the subscriber device 22 to the network 28 (FIG. 1). For example, the communication interface 376 may be an Ethernet interface, local wireless interface such as a wireless interface operating according to one of the suite of IEEE 802.11 standards, a mobile communications interface such as a cellular telecommunications interface, or the like. The one or more user interface components 378 include, for example, a touchscreen, a display, one or more user input components (e.g., a keypad), a speaker, or the like, or any combination thereof.

Figure 67:
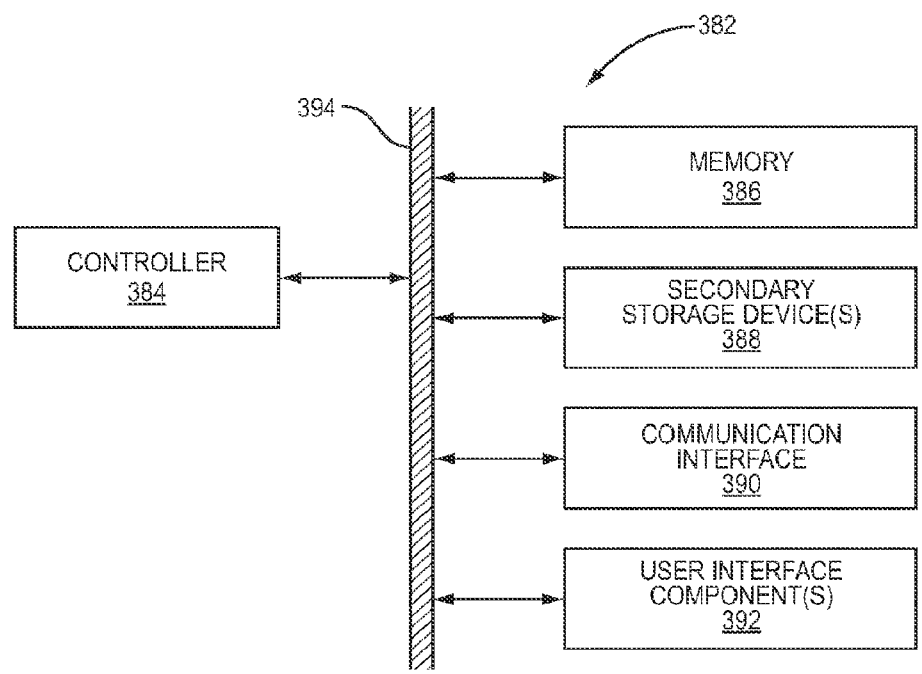
FIG. 67 is a block diagram of a computing device operating to host the third-party service of FIG. 1 according to one embodiment of the present disclosure.

FIG. 67 is a block diagram of a computing device 382 operating to host the third-party service 26 according to one embodiment of the present disclosure. The computing device 382 may be, for example, a physical server. As illustrated, the computing device 382 includes a controller 384 connected to memory 386, one or more secondary storage devices 388, a communication interface 390, and one or more user interface components 392 by a bus 394 or similar mechanism. The controller 384 is a microprocessor, digital ASIC, FPGA, or the like. In this embodiment, the controller 384 is a microprocessor, and the third-party service 26 is implemented in software and stored in the memory 386 for execution by the controller 384. The one or more secondary storage devices 388 are digital storage devices such as, for example, one or more hard disk drives. The communication interface 390 is a wired or wireless communication interface that communicatively couples the computing device 382 to the network 28 (FIG. 1). For example, the communication interface 390 may be an Ethernet interface, local wireless interface such as a wireless interface operating according to one of the suite of IEEE 802.11 standards, a mobile communications interface such as a cellular telecommunications interface, or the like. The one or more user interface components 392 include, for example, a touchscreen, a display, one or more user input components (e.g., a keypad), a speaker, or the like, or any combination thereof.

Those skilled in the art will recognize improvements and modifications to the embodiments of the present invention. All such improvements and modifications are considered within the scope of the concepts disclosed herein and the claims that follow.

What is claimed is:

1. A method of operation of a server computer, comprising:
    obtaining, by the server computer, current locations of a plurality of users of a plurality of mobile devices each of the plurality of users being a user of a corresponding one of the plurality of mobile devices;
    forming, by the server computer, a crowd including a number of users from the plurality of users based on the current locations of the number of users, wherein forming the crowd comprises using a spatial crowd formation process based on an optimal inclusion distance that is a function of density of users of the plurality of users within a bounding region for the spatial crowd formation process, the optimal inclusion distance subject to change as the crowd is formed;
    generating, by the server computer, crowd data regarding the crowd, the crowd data comprising an aggregate profile for the crowd; and
    providing, by the server computer, access to the crowd data in response to receiving a request for the crowd data.

2. The method of claim 1 wherein generating the crowd data regarding the crowd comprises generating the aggregate profile for the crowd based on a comparison of user profiles of the number of users in the crowd and a user profile associated with a requestor for which the aggregate profile for the crowd is generated.

3. The method of claim 2 wherein the user profiles of the number of users in the crowd and the user profile associated with the requestor each comprises one or more keywords, and generating the aggregate profile for the crowd based on the comparison of the user profiles of the number of users in the crowd and the user profile associated with the requestor comprises:
    for each user of the number of users in the crowd, performing a comparison of the one or more keywords in the user profile of the user in the crowd to the one or more keywords in the user profile associated with the requestor to identify matching keywords; and
    based on the comparisons, generating the aggregate profile such that the aggregate profile includes at least one of a group consisting of: a number of user matches over all keywords which identify a number of the number of users having user profiles that include at least one keyword that matches a keyword in the user profile associated with the requestor, a number of user matches for each of one or more keywords from the user profile associated with the requestor, a ratio of the number of user matches over all keywords to a total number of users in the crowd, and a ratio of user matches to the total number of users for each of one or more keywords from the user profile associated with the requestor.

4. The method of claim 2 wherein the requestor is one of the plurality of users, and the user profile associated with the requestor is one of a group consisting of: a user profile of the one of the plurality of users, a select subset of a user profile of the one of the plurality of users, and a target user profile.

5. The method of claim 1 wherein generating the crowd data regarding the crowd comprises generating the aggregate profile for the crowd based on a comparison of user profiles of the number of users in the crowd to one another.

6. The method of claim 5 wherein the user profiles of the number of users in the crowd each comprise one or more keywords, and generating the aggregate profile for the crowd based on the comparison of the user profiles of the number of users in the crowd to one another comprises generating the aggregate profile such that the aggregate profile includes at least one of a group consisting of: a number of user matches for each of one or more keywords from the user profiles of the number of users in the crowd and a ratio of user matches to a total number of users for each of one or more keywords from the user profiles of the number of users in the crowd.

7. The method of claim 1 wherein generating the crowd data regarding the crowd comprises generating data identifying a degree of fragmentation of the crowd such that the crowd data comprises the data identifying the degree of fragmentation of the crowd.

8. The method of claim 7 wherein the data identifying the degree of fragmentation of the crowd comprises at least one of a group consisting of: a number of crowd fragments in the crowd and an average number of users per crowd fragment in the crowd.

9. The method of claim 7 wherein generating the data identifying the degree of fragmentation of the crowd comprises dividing the crowd into one or more crowd fragments using a spatial crowd fragmentation process.

10. The method of claim 9 wherein dividing the crowd into the one or more crowd fragments using the spatial crowd fragmentation process comprises:
creating a crowd fragment for each user in the crowd;
identifying two closest crowd fragments;
determining a distance between the two closest crowd fragments;
determining whether the distance between the two closest crowd fragments is less than the optimal inclusion distance for a crowd fragment;
combining the two closest crowd fragments if the distance between the two closest crowd fragments is less than the optimal inclusion distance for a crowd fragment; and
repeating the steps of identifying two closest crowd fragments, determining a distance between the two closest crowd fragments, determining whether the distance between the two closest crowd fragments is less than the optimal inclusion distance for a crowd fragment, and combining the two closest crowd fragments.

11. The method of claim 7 wherein generating the data identifying the degree of fragmentation of the crowd comprises dividing the crowd into one or more crowd fragments using a connectivity-based crowd fragmentation process.

12. The method of claim 11 wherein dividing the crowd into the one or more crowd fragments using the connectivity-based crowd fragmentation process comprises:
creating a crowd fragment for each user in the crowd;
identifying a pair of crowd fragments having a pair of users including a first user from a first crowd fragment of the pair of crowd fragments having a required social network relationship with a second user from a second crowd fragment of the pair of crowd fragments;
combining the pair of crowd fragments; and
repeating the steps of identifying a pair of crowd fragments and combining the pair of crowd fragments.

13. The method of claim 12 wherein the required social network relationship is a degree of separation (DOS) that is less than a predefined maximum DOS and a required bidirectionality state.

14. The method of claim 1 wherein generating the crowd data regarding the crowd comprises:
dividing the crowd into one or more crowd fragments; and
for each crowd fragment of at least one of the one or more crowd fragments, generating a best-case average degree of separation (DOS) for the crowd fragment such that the crowd data comprises the best-case average DOS for the crowd fragment.

15. The method of claim 14 wherein generating the best-case average DOS for the crowd fragment comprises generating the best-case average DOS for the crowd fragment as an average DOS for social network relationships between pairs of users in the crowd fragment using a best-case DOS for each pair of users in the crowd fragment for which a social network relationship is not explicitly defined.

16. The method of claim 1 wherein the crowd data regarding the crowd comprises:
dividing the crowd into one or more crowd fragments; and
for each crowd fragment of at least one of the one or more crowd fragments, generating a worst-case average degree of separation (DOS) for the crowd fragment such that the crowd data comprises the worst-case average DOS for the crowd fragment.

17. The method of claim 16 wherein generating the worst-case average DOS for the crowd fragment comprises generating the worst-case average DOS for the crowd fragment as an average DOS for social network relationships between pairs of users in the crowd fragment using a worst-case DOS for each pair of users in the crowd fragment for which a social network relationship is not explicitly defined.

18. The method of claim 1 wherein the crowd data regarding the crowd comprises:
dividing the crowd into one or more crowd fragments; and
for each crowd fragment of at least one of the one or more crowd fragments, generating data identifying a degree of bidirectionality of friend relationships between users in the crowd fragment such that the crowd data comprises the data identifying the degree of bidirectionality of friend relationships between the users in the crowd fragment.

19. The method of claim 18 wherein generating the data identifying the degree of bidirectionality of friend relationships between the users in the crowd fragment comprises computing a ratio of bidirectional friend relationships between pairs of users in the crowd fragment to a total number of friend relationships between pairs of users in the crowd fragment.

20. A server computer comprising:
a controller; and
memory containing software executable by the controller, whereby the server computer is configured to:
obtain current locations of a plurality of users of a plurality of mobile devices, each of the plurality of users being a user of a corresponding one of the plurality of mobile devices;
form a crowd including a number of users from the plurality of users based on the current locations of the number of users, wherein the crowd is formed using a spatial crowd formation process based on an optimal inclusion distance that is a function of density of users of the plurality of users within a bounding region for the spatial crowd formation process, the optimal inclusion distance subject to change as the crowd is formed;
generate crowd data regarding the crowd, the crowd data comprising an aggregate profile for the crowd; and
provide access to the crowd data in response to receiving a request for the crowd data.

21. A non-transitory computer readable medium storing software for instructing a controller of a computing device to:
obtain current locations of a plurality of users of a plurality of mobile devices, each of the plurality of users being a user of a corresponding one of the plurality of mobile devices;
form a crowd including a number of users from the plurality of users based on the current locations of the number of users, wherein to form the crowd, the software includes software for instructing the controller to form the crowd using a spatial crowd formation process based on an optimal inclusion distance that is a function of density of users of the plurality of users within a bounding region for the spatial crowd formation process, the optimal inclusion distance subject to change as the crowd is formed;

generate crowd data regarding the crowd, the crowd data comprising an aggregate profile for the crowd; and provide access to the crowd data in response to receiving a request for the crowd data.

\* \* \* \* \*